(12) United States Patent
Suzuki

(10) Patent No.: US 8,619,242 B2
(45) Date of Patent: Dec. 31, 2013

(54) INFORMATION PROCESSING APPARATUS AND APPARATUS FOR EVALUATING WHETHER INFORMATION PROCESSING METHOD IS POSSIBLE

(76) Inventor: Takashi Suzuki, Yokohama (JP)

(*) Notice: Subject to any disclaimer, the term of this patent is extended or adjusted under 35 U.S.C. 154(b) by 779 days.

(21) Appl. No.: 12/086,977

(22) PCT Filed: Dec. 28, 2006

(86) PCT No.: PCT/JP2006/326422
§ 371 (c)(1),
(2), (4) Date: Jul. 20, 2010

(87) PCT Pub. No.: WO2007/077984
PCT Pub. Date: Jul. 12, 2007

(65) Prior Publication Data
US 2011/0125460 A1    May 26, 2011

(30) Foreign Application Priority Data
Dec. 28, 2005    (WO) ................ PCT/JP2005/024266

(51) Int. Cl.
*G01C 3/08*    (2006.01)

(52) U.S. Cl.
USPC ........................................ 356/28; 356/28.5

(58) Field of Classification Search
CPC ............... G01C 3/00; G01C 3/08; G01P 3/36
USPC ............ 356/3.01–3.15, 4.01–4.1, 5.01–5.15, 356/6–22, 28, 28.5
See application file for complete search history.

(56) References Cited

U.S. PATENT DOCUMENTS 5,602,401 A *   2/1997   Broude et al. ........... 250/559.45
6,321,182 B1    11/2001   Suzuki

FOREIGN PATENT DOCUMENTS

JP    8-329128 A    12/1996
JP    3227171 B    8/2001
JP    2005-167119 A    6/2005

OTHER PUBLICATIONS

Gerlach, W. et al., "Der Experimentelle Nachweis der Richtungsquantelung im Magnefield", Zeitschrift für Physik, 1922, pp. 349-352, vol. 9.
Gerlach, W. et al., "Das Magnetische Moment des Silberatoms", Zeitschrift für Physik, 1922, pp. 353-355, vol. 9.
Broglie, De L., "Waves and Quanta" Nature, Oct. 1923, p. 540, vol. 112, No. 2815.
Gerlach, W. et al., "Über die Rchtungsquantelung in Magnetfeld von Walther Gerlach und Otto Stern", Annalen der Physik, 1924, pp. 673-699, vol. 74, No. 16.
Heisenberg, W., "Über den anschaulichen Inhalt der quantentheoretischen Kinematik und Mechanik", Zeitschrift für Physik, 1927, pp. 172-198, vol. 43.

(Continued)

*Primary Examiner* — Luke Ratcliffe
(74) *Attorney, Agent, or Firm* — Smith Patent Office

(57) ABSTRACT

An information processing apparatus using a design and evaluation method for a device or an apparatus concerning microscopic particles in conformity with dual mechanics is provided, and this apparatus may be utilized as an evaluation apparatus for evaluating whether or not quantum computers can be realized; wherein the dual mechanics is universal mechanics constructed by combining classical mechanics and novel wave mechanics and may be applicable to all particles ranging from microscopic to macroscopic particles. As a result, it is possible to prevent making useless efforts for realizing quantum computers that are judged to be impossible to realize and to pitch those efforts that might be wasted on the above realization into developing other effective technologies.

13 Claims, 19 Drawing Sheets

(56) References Cited

OTHER PUBLICATIONS

Bohr, N., The Quantum Postulate and the Recent Development of Atomic Theory, Nature, Apr. 1928, pp. 580-590, vol. 121.
Dirac, P. A. M., "The Quantum Theory of the Electron", Roy. Soc. Proc., 1928, pp. 610-624, vol. 117.
Dirac, P. A. M., "The Quantum Theory of the Electron Part II", Roy. Soc. Proc., 1928, pp. 351-361, vol. 118.
Einstein, A. et al., "Can Quantum-Mechanical Description of Physical Reality Be Considered Complete?", Physical Review, May 1935, pp. 777-780, vol. 47.
Bohr, N., "Can Quantum-Mechanical Description of Physical Reality Be Considered Complete?", Physical Review, Oct. 1935, pp. 696-702, vol. 48.
Schrödineger, V., "Die gegenwärtige Situation in der Quantenmechaften", Die Naturwissenchaften, Nov. 1935, pp. 807-812, vol. 48.
Heisenberg, W., The Physical Principles of the Quantum Theory, 1930, pp. 20-23, Dover Publications Inc., New York, NY.
Bohm, D., Quantum Theory, 1951, pp. 99-101, 118-120, 126, 326, 405, 593-598, 604-605 and 614-623, Prentice-Hall, Inc., Englewood Cliffs, NJ and Maruzen Co., Ltd. Tokyo, Japan.
Dirac, P. A. M., The Principles of Quantum Mechanics, 1958, pp. 9-10, 40, 118, 253 and 262, Fourth Edition, Oxford University Press.
Landau L. D. et al., The Classical Theory of Fields, 1962, pp. 13, 27 and 48, Revised Second Edition, Pergamon Press.
Dirac, P. A. M., "The Evolution of the Physicist's Picture of Nature", Scientific American, May 1963, pp. 45-53, vol. 208, No. 5.
Born, M. et al., Principles of Optics, Electromagnetic Theory of Propagation, Interference and Diffraction of Light, 1964, pp. 377, 379-380, 382-386, 393, 419 and 424, Third (Revised) Edition, Pergamon Press.
Bell, J. S., "On the Einstein Podolsky Rosen Paradox", Physics, 1964, pp. 195, 197 and 200, vol. 1, No. 3., Physics Publishing Co., Long Island City, NY.
Feynman, R. et al., "The Feynman Lectures on Physics", 1965, pp. 1-1 and 3-5, vol. III, Addison-Wesley Publishing Company, Inc.
Pfleegor, R. L. et al., "Interference of Independent Photon Beams", Physical Review, Jul. 1967, pp. 1084-1088, vol. 159, No. 5.
Pfleegor, R. L. et al., "Further Experiments on Interference of Independent Photon Beams at Low Light Levels", Journal of the Optical Society of America, Jul. 1968, pp. 946-950, vol. 58, No. 7.
De Broglie, L. et al., "Interpretation of a Recent Experiment on Interference of Photon Beams", Physical Review, Aug. 1968, pp. 1284-1285, vol. 172, No. 5.
Ballentine, L. E., "The Statistical Interpretation of Quantum Mechanics", Review of Modern Physics, Oct. 1970, pp. 358-381, vol. 42, No. 4.
De Broglie, L. et al., "Photon Mass and New Experimental Results on Longitudinal Displacements of Laser Beams Near Total Reflection", Physical Review Letters, Apr. 1972, pp. 1001-1004, vol. 28, No. 15.
Troup G. J. et al., "Photon Mass and New Experimental Results on Longitudinal Displacements of Laser Beams Near Total Reflection", Physical Review Letters, Jun. 1972, pp. 1540, vol. 28, No. 23.
Lévy-Loblond, J. M., "The Pedagogical Role and Epistemological Significance of Group Theory in Quantum Mechanics", Rivista Del Nuovo Cimento, 1974, pp. 99-143, vol. 4, No. 1.
Strnad, J. et al., "On the de Broglie Waves", Eur. J. Phys. 1985, pp. 176-179, vol. 6, The Institute of Physics & the European Physical Society.
Tsuchiya, Y. et al., "Photon-Counting Image Acquisition System and Its Applications", Journal of Image Technology, Oct. 1985, pp. 215-220, vol. 11, No. 5, Society of Photographic Scientists and Engineers.
Ballentine, L. E., "Resource Letter IQM-2: Foundations of Quantum Mechanics Since the Bell Inequalities", Am. J. Phys, Sep. 1987, pp. 785-792, vol. 55, No. 9, American Association of Physics Teachers.
Ezawa, H., "Chapter 10, The Development of the Quantum Theory and Paradoxes", Quantum Mechanics and New Technology, 1987, pp. 204-243, Baifukan, Tokyo, Japan.
Zeilinger, A. et al., "Single-and Double-Slit Diffraction of Neutrons", Reviews of Modern Physics, Oct. 1988, pp. 1067-1073, vol. 60, No. 4, The American Physical Society.
Wignall, J. W. G., "Frame Dependence of the Phase of de Broglie Waves", Am. J. Phys., May 1989, pp. 415-416, vol. 57, No. 5, American Association of Physics Teachers.
Greiner, W., Relativistic Quantum Mechanics, Theoretical Physics 3, 1990, pp. 4-11, 34, 85-86, 96-97, 127-139, 141 and 233-236, Springer-Verlag, Berlin, Germany.
Aspect, A., "Wave-Particle Duality: A Case Study", Sixty-Two Years of Uncertainty, Historical Philosophical, and Physical Inquiries into the Foundations of Quantum Mechanics, 1990, pp. 45-59, Plenum Press, New York, NY.
Bennet, C. et al., "Quantum Cryptography", Scientific American, Oct. 1992, pp. 50-57, vol. 267, No. 4.
Suzuki, T., "Koshi no hado—Ryushi nijyu-sei no doji kansoku", Kogaku, Sep. 1993, pp. 550-551, vol. 22, No. 9.
Merzbacher, E., Quantum Mechanics, 1998, pp. 75-78 and 217-220, Third Edition, John Wiley & Sons, Inc.
Chuang, I. L. et al. "Experimental Realization of a Quantum Algorithm", Nature, May 1998, pp. 143-146, vol. 393.
Imoto, N., "Quantum Computing", Kogaku, 1999, pp. 209-214, vol. 28, No. 4.
Arndt, M. et al., "Wave-Particle Duality of $C_{60}$ Molecules", Nature, Oct. 1999, pp. 680-682, vol. 401.
Ozawa, M., "Conservation Laws, Uncertainty Relations, and Quantum Limits of Measurements", Physical Review Letters, Feb. 2002, pp. 050402-1-050402-4, vol. 88, No. 5, The American Physical Society.
Ozawa, M., "Position Measuring Interactions and the Heisenberg Uncertainty Principle", Physics Letters A, Jun. 2002, pp. 1-7, vol. 299, Elsevier Science B. V.
Nagakura, S. et al., The Physics and Chemistry Dictionary, 2003, p. 568, Iwanami Book Co.
Ozawa, M., "Physical Content of Heisenberg's Uncertainty Relation: Limitation and Reformulation", Physics Letters A, 2003, pp. 21-29, vol. 318, Elsevier Science B. V.
Holland, P. et al., "The Non-Relativistic Limits of the Maxwell and Dirac Equations: the Role of Galilean and Gauge Invariance", Studies in History and Philosophy of Modern Physics, 2003, pp. 161-187, vol. 34, Elsevier Science B. V.
Nakamura, T., "Car Navigation Systems and the Theory of Relativity", Nihon Butsuri Gakkai-shi, 2005, pp. 741-742, vol. 60, No. 9.
Yamamoto, Y., "Solid state quantum physics II—At the boundary between quantum mechanics and technology—" Nihon Butsuri Gakkai-shi, 2005, pp. 928-934, vol. 60, No. 12.
Nakajima, H., "Optical Design That is Possible Using Excel", 2005, pp. 142 and 147, New Technology Communications, Tokyo, Japan.
Extended European Search Report, directed to European Patent Application No. 06843790.4, dated Mar. 6, 2012, 1 pg.
Charles Harding, "Quantum Theoretical Physics is Statistical and Relativistic", International Journal of Theoretical Physics vol. 19, No. 12, Dec. 1980, pp. 925-934.
Nielsen Michael and Chuang Isaac, "Quantum computation and Quantum Information", 2000 Cambridge University Press, Cambridge, UK, XP002670382, ISBN 0 521 63503 9, pp. 42-50.
Alonso Marcelo and Finn Edward, "Physics", 1992, Addison-Wesley, XP002670383, ISBN 0 201 56518 8, pp. 605-606.
Cerny V., "Quantum computers and intractable (NP-complete) computing problems", Physical Review A (Atomic, Molecular, and Optical Physics) USA, vol. 48, No. 1, Jul. 1993, pp. 116-119, XP002670384, ISBN 1050-2947.

\* cited by examiner

Fig. 9
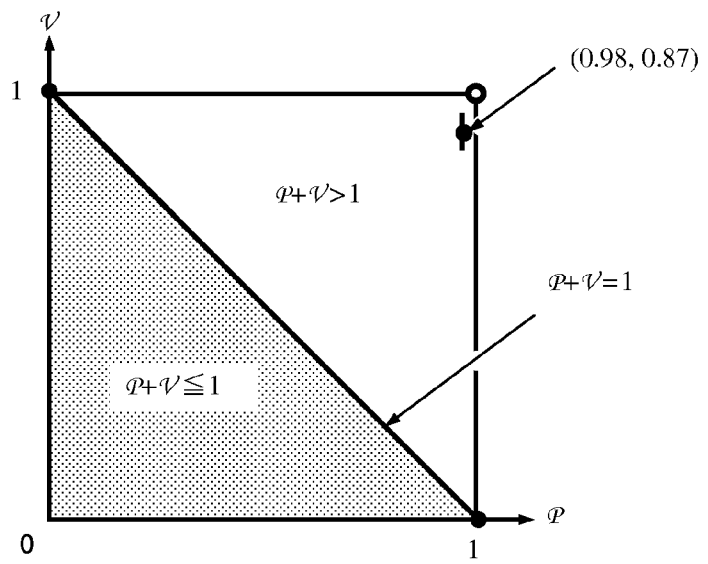
Fig. 10A  Fig. 10B  Fig. 10C
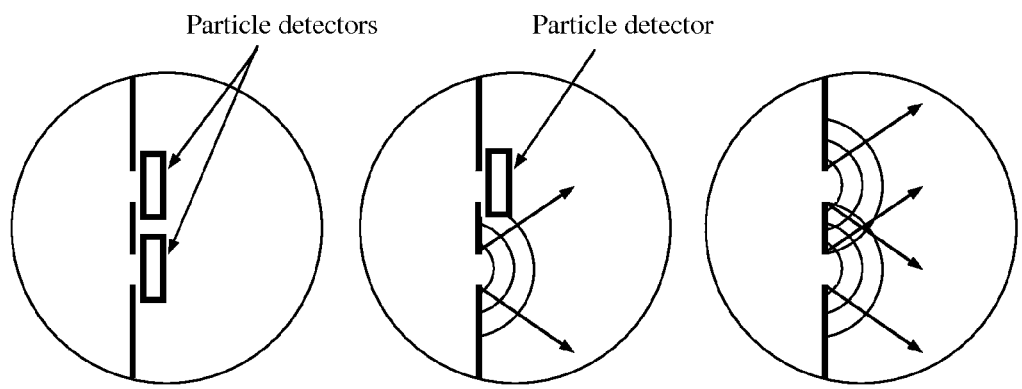

Fig.17A        Fig. 17B
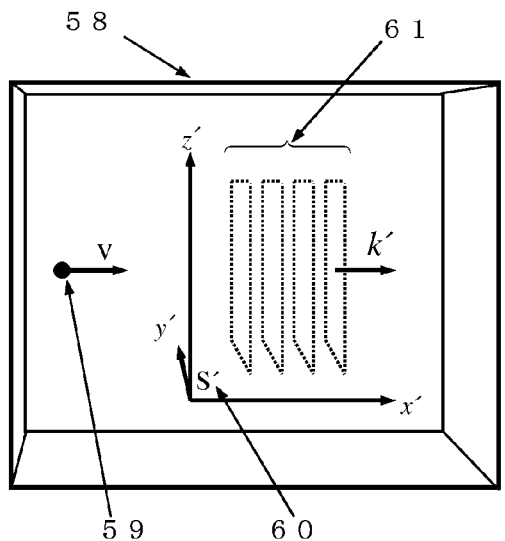 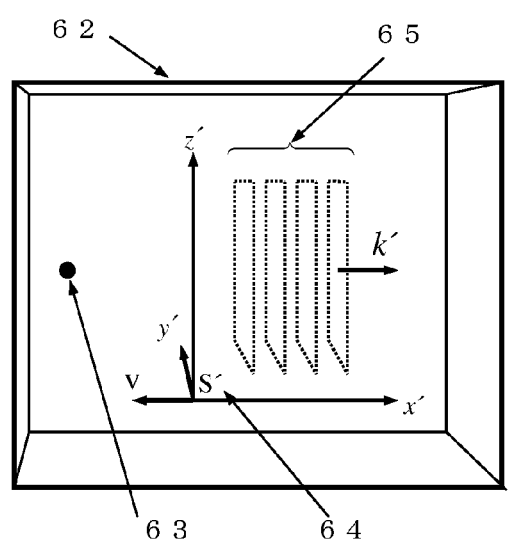
Fig. 18
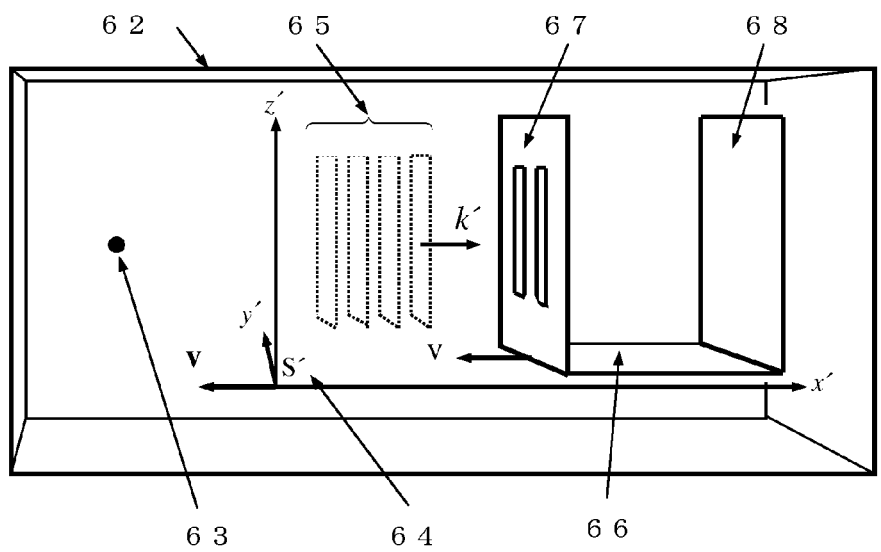

INFORMATION PROCESSING APPARATUS AND APPARATUS FOR EVALUATING WHETHER INFORMATION PROCESSING METHOD IS POSSIBLE

FIELD OF THE INVENTION

This invention relates to an information processing apparatus and an apparatus for evaluating whether an information processing method is possible. More specifically, it relates to, for example, an information processing apparatus capable of evaluating whether quantum computers can be realized or an apparatus for evaluating whether the information processing methods used in quantum computers are possible, where those apparatus are designed using design and evaluation methods for a device and an apparatus both relevant to microscopic particles based on dual mechanics. Here, dual mechanics constructed by combining classical mechanics and novel wave mechanics under the law of conservation of relativistic energy is universal mechanics applicable to all particles ranging from microscopic to macroscopic particles.

BACKGROUND OF THE INVENTION 4.1. Quantum Technologies

It has been considered that classical mechanics deals with macroscopic particles and quantum mechanics deals with microscopic particles. However, any concrete size to distinguish between macroscopic particles and microscopic particles has not been defined. From elementary particles to atoms or molecules, such particles that cannot possibly be observed using optical microscopes are assumed to be referred to as microscopic particles. This is merely a factitious criterion that existed around 80 years ago, when quantum mechanics was created. Nowadays, since electron microscopes etc. have been developed, the microscopic world has become almost visible except for the inside of each atom. Therefore, we must recognize afresh that the above distinction does not exist in nature itself. According to quantum mechanics, since individual microscopic particles have particular properties quite different from those of macroscopic particles, various phenomena peculiar to microscopic particles are expected to occur. Over the past dozen years or so, patents disclosing that the above properties and phenomena peculiar to microscopic particles have been applied to specific apparatus and technologies in the field of advanced information processing such as quantum computers and quantum cryptographic communications have come to be filed. The 'principle of superposition of states' exists as one of the fundamental principles in quantum mechanics. Those quantum computers utilize individual atoms or molecules, each of which may take a certain superposed state conforming to the above superposition principle, and individual optical or electronic devices produced by simulating the above atoms or molecules as memory and/or calculation devices dealing with each individual quantum mechanical information unit, i.e., quantum bit (qubit). Here, these devices for quantum bits are called quantum devices for convenience. The demand for fast computations is the highest in the field of cryptology using algorithms for prime factor decomposition. This is because it is necessary to protect valuable information that is exchanged through a communication network not limited to the Internet, through encryption. The currently used encryption method is said to take hundreds of years to decrypt even using a high-speed computer. If this encrypted information is wiretapped and decrypted in a short time by applying a quantum algorithm for prime factor decomposition, this encryption method cannot be used. On the other hand, quantum cryptographic communications have been intended for detecting wiretapping by utilizing each of the photons as individual carriers for signals. Even if quantum computers could be realized and if wiretapped cryptographs could be decrypted quickly, means for avoiding the wiretappings could be applied as long as the wiretappings could invariably be detected. In this sense, the quantum cryptographic communications function as insurance in preparation for the realization of quantum computers. As a part of this communication system, there is a case where characteristic phenomena in quantum mechanics called non-local correlation or correlation at a distance are utilized. As shown above, the technology contrived based on the peculiar phenomena in quantum mechanics may be called quantum technology for convenience.

4.2. Whether or not the Realization of Quantum Computers is Possible

The viewpoints of specialists on whether or not the realization of quantum computers is possible will be introduced based on recent documents:

In 2005, a review paper by Prof. Yamamoto of Princeton University entitled "Solid state quantum physics II—At the boundary between quantum mechanics and technology—" was published in the December issue of Nihon Buturi Gakkai-shi (the monthly journal published in Japanese by Physical Society of Japan) (Y. Yamamoto, Nihon Butsuri Gakkai-shi, 60, 928 (2005)). In this paper there are descriptions as follows: (1) Although the investigation on quantum mechanical measurement processes which are common ground between quantum mechanics and information science began in the 1980's, it had not been recognized as a serious science at that time. (2) Quantum algorithms for factorization, discrete logarithms, and information retrieval are superior to classical algorithms for the same. (3) Whether or not studies on quantum information should be developed into true technologies is uncertain at the present time (July 2005). In this way, it can be understood that whether or not quantum technology including quantum computers should be put into practical use is uncertain even in July 2005.

Another more academic viewpoint will be given below: Prof. Ozawa of Tohoku University published a paper I (M. Ozawa, Phys. Rev. Lett. 88, 050402-1 (2002)) in which he showed that, according to a novel uncertainty relation obtained by applying quantum mechanics, a lower limit depending on the magnitude of a measuring apparatus is proven to exist in the measurement error, resulting in obstruction of the realization of a small quantum computer. Furthermore, Prof. Ozawa published a paper II (M. Ozawa, Phys. Lett. A 299, 1 (2002)) in which he showed that a measurement process model breaking the Heisenberg uncertainty principle may be provided even within the framework of quantum mechanics. The paper I concluded that quantum mechanics itself denies a possibility of development of a small quantum computer, although no reference of comparison is given. Technologically, computers utilizing tubes have been tremendously developed and downsized by the emergence of semiconductor devices. Hence, if quantum computers utilizing quantum devices become larger than, for example, computers utilizing semiconductor devices, it is irrational. There are two reasons for inviting such a result that can be readily thought as irrational. One is that arguing a quantum computer in relation to the uncertainty principle but not to the principle of superposition of states is a problem. Another is that, as will be shown in 5.5.2., there have been fundamental errors in the Heisenberg uncertainty principle itself.

It has been understood that the quantum computer has not been contrived based on 'established physical laws'. This is because, if a quantum computer should rest on 'established physical laws', it is impossible for realization of the computer to be uncertain even at present. Furthermore, the technology that satisfies necessary technological conditions for filing the specification of a quantum computer for a patent cannot exist yet. This is why neither patent nor application concerning the quantum computer has been cited in this invention. The Heisenberg uncertainty principle together with the 'principle of superposition of states' has been the most fundamental of principles. Hence, without limiting to this uncertainty principle, each individual basic physical law in quantum mechanics must be closely reexamined.

4.3. Reliability of Fundamental Principles Supporting Quantum Mechanics

In 1935, Einstein, Podolsky and Rosen (A. Einstein, P. Podolsky, and N. Rosen, Phys. Rev. A 47, 777 (1935)) showed that a paradox later called 'EPR paradox' taken from their initials occurred when the principle of superposition of states was applied to two-particle systems. When criteria for observables to exist were defined by using the logic directly related to the uncertainty principle, Einstein et al. showed that the uncertainty principle does not hold if the state of each two-particle system could be completely described as a wave packet by applying the principle of superposition of states to the system. In short, the criterion for a physical quantity relevant to a certain system to exist means that the value of the physical quantity can be known exactly without imposing any disturbance through measurement to the system. From this result, Einstein et al. concluded that quantum mechanics based on the Copenhagen interpretation was incomplete. Although Bohr disputed immediately, since his argument remained in the repetition of the Copenhagen interpretation in which the complementarity principle acts as a pillar, his rebuttal was not convincing (Refer to N. Bohr, Phys. Rev. 48, 696 (1935)). Incidentally, from the expression of the state of the two-particle system given in the paper by Einstein et al., existence of 'nonlocal correlation' or 'correlation at a distance' between the two free particles far apart is derived. Therefore, this correlation being utilized in a part of a quantum cryptographic communication system is sometimes called an EPR effect (C. H. Bennett, G. Brassard, and A. K. Ekert, "Quantum Cryptography", Sci. Am. 267, 50 (1992); Japanese trans. in Nikkei Science, December 1992, pp. 50-60). On the other hand, in the same year, Schrödinger showed that, when the 'principle of superposition of states' on which quantum technology depends is applied to a system including a macroscopic object (cat), 'Schrödinger's cat paradox' occurs (E. Schrödinger, Naturwissenschaften, 23, 807 (1935)).

In recently published nonrelativistic or relativistic quantum mechanics textbooks, these quantum mechanics based on the Copenhagen interpretation have been described to be accurate theories. Strong evidence of this exists in the fact that Bell's inequality related to hidden variables that had been introduced to explain 'nonlocal correlation' has been negated according to the experiment on two-photon systems. However, it will be shown with this invention that the reason why Bell's inequality does not hold is not in the correctness of quantum mechanics but in the fact that the natural world does not require hidden variables. Hence, it was already pointed out in 1935 that the uncertainty principle and the 'principle of superposition of states' as fundamental principles in quantum mechanics had contained essential problems. Provided that what Einstein et al. and Schrödinger pointed out is correct, not only the realization of a quantum computer but also the existence of quantum mechanics itself is threatened.

In the following, the explanation of dual mechanics that is essentially built through the process of clarifying basic problems in quantum mechanics and their solutions will be given. This dual mechanics also provides a technological design method for devices and apparatus all related to microscopic particles. Hence, an explanation of those novel devices and apparatus of dual mechanical design will be given below. Since the description is long, it is divided into two for convenience. In the first half, '4. Background of the invention' and '5. Disclosure of the invention' will be explained. In the second half, '7. Best mode for carrying out the invention' will be explained.

4.4. Physical Significance of the Experiment of Simultaneous Observation of Duality Disclosed in Patent Reference 1

An invention on methods and apparatus of simultaneously observing the wave-particle duality of each particle, e.g., each individual photon or electron has recently been patented (Patent Reference 1). This patent discloses several pieces of experimental data indicating that the simultaneous observation of duality, which is considered to be impossible using conventional technology based on the uncertainty principle, has been successful using a newly developed interferometer. These experimental data show that the simultaneous observation of wave-particle duality of each photon has been achieved, the evidence of which is explained in detail in '5. Disclosure of the invention (5.5.4.)'. That is, it has been proven experimentally that each individual photon is a perfect particle and a perfect wave simultaneously. The perfect wave associated with each photon means a real wave. It has been known that each photon carries its energy as a particle. Therefore, a wave that causes interference phenomenon and associates with each photon has no energy. Since this characteristic of the wave carrying no energy is common to the property of a phase wave originally conceived by de Broglie, this wave will generally be called a phase wave.

According to the law of conservation of energy including the law of conservation of number of particles, that is, the law of conservation of relativistic energy, every particle including each individual photon interferes only with itself, but two different particles never interfere with each other (Refer to P. A. M. Dirac, The Principles of Quantum Mechanics (Oxford University Press, London, 1958), 4th ed., pp. 9-10). If we call this phenomenon as the 'principle of interference', it is considered that this principle has been sufficiently verified in interference experiments carried out using photons, electrons, or atoms. In recent years, even interference phenomena of fullerene molecules have been experimentally demonstrated (M. Arndt et al., Nature 401, 680 (1999): to be more accurate, the phenomena observed directly in this experiment are diffraction phenomena caused by a diffraction grating). However, as will be introduced later, there is an exemplary experiment in which interference phenomena of each individual photon emitted from two independent lasers were observed. However, since this observation has been carried out under extreme artificial conditions, it may be regarded that the 'principle of interference' is valid for general particles except for photons in a natural environment. Therefore, according to the aforementioned 'principle of interference', it turns out that not only photons but also massive particles have the same simultaneous, complete duality as observed in the above-mentioned experiment on the simultaneous observation of duality. The proposal of a matter wave, also known as a phase wave, by de Broglie for the wave associated with each massive particle comes to mind. This matter wave or phase wave is also called the de Broglie wave named after the proponent.

In 1923, de Broglie presented the concept of a matter wave or phase wave (See, for example, L. de Broglie, Nature 112, 540 (1923)). In that paper, de Broglie showed the following three principles concerning phase waves: (a) A rest particle with mass $m_0$ is associated with a periodic phenomenon at a frequency $v=m_0c^2/h$, (b) the phase of a phase wave that uniform velocity motion (translational motion) of the massive particle generates in an inertial system (inertial frame) is the same as that of the periodic phenomenon, and (c) a phase wave does not carry energy. Since a phase velocity that is velocity of the propagation of the phase wave is given by $c^2/v>c$ with v being velocity of the particle, the phase wave cannot carry energy. In other words, the phase wave cannot be a signal. Since the oscillation at a frequency $v=m_0c^2/h$ of the rest particle with mass $m_0$ becomes the source of the phase wave, the phase wave is clearly a relativistic wave. Originally, the phase wave had been considered to exist, because this wave associated with motion of a particle is generated and propagates in an inertial system. (This will be proven in the latter half of the description of this invention.) In contrast, a probability wave expressed by a wave function in quantum mechanics is an abstract wave that is defined in a mathematical space such as a Hilbert space having no direct relation to physical space (See, for example, P. A. M. Dirac, the aforementioned book, p. 40). Incidentally, in the aforementioned de Broglie's paper, each photon is described as having an extremely small but nonzero mass. However, according to the principle of invariant light speed, this de Broglie's idea obviously contradicts special relativity.

According to de Broglie's three principles, the space-time structure of each moving particle consists of a particle carrying energy and a phase wave without energy. In other words, the particle and the phase wave constitute a single unified particle. However, when the particle is at rest, the space-time structure of each particle consists of a particle having rest energy $m_0c^2$ and a phase space that is entirely overlapped with an inertial system fixed to the particle and is oscillating at a characteristic frequency $v=m_0c^2/h$. (As will be shown later, the phase space here is a physical existence completely overlapping real space-time and is different from a phase space in quantum mechanics.) This point differs from the case of each photon that does not have a rest mass and can never be at rest in any inertial system. However, notwithstanding whether or not it has a mass, an interference phenomenon may occur with each individual particle such as a photon or an electron due to the phase wave accompanied by the particle itself. Note that from both the conservation law of energy including the conservation law of the number of particles, which originated the 'principle of interference', and the aforementioned de Broglie's three principles, it can be understood that interference phenomena of massive particles occur based on the conservation law of relativistic energy including the conservation law of the particle number for low-energy phenomena and that the phase wave associated with a massive particle is also a relativistic wave as with light waves. Whether it is relativistic or not, wave functions in quantum mechanics have been determined as mathematical, probability waves. It will be shown later that confusion between mathematics and physics often seen in quantum mechanics proves fatal to this mechanics after all.

As described above, the simultaneous observation experiment showed simultaneous, complete duality of individual photons and the reality of individual phase waves associated with these photons. This result can readily be generalized to the simultaneous, complete duality of individual massive particles and the reality of individual de Broglie waves associated with these particles based on both the aforementioned Dirac's principle of interference and interference experiments concerning photons and various massive particles supporting this principle. Accordingly, it can be concluded that the reason for every type of particle not limited to photons which causes each of interference phenomena is that individual particles have respective real phase waves.

This simultaneous, complete duality that every particle has is fundamentally incompatible with wave-particle complementary duality for each particle that is a part of the complementarity principle proposed by Bohr (N. Bohr, Nature, 121, 580 (1928); refer particularly to p. 586) in connection with the uncertainty principle. Since this wave-particle complementary duality in Bohr's complementarity principle including an extremely broad concept has been completely contradicted by the above-mentioned simultaneous observation experiment, the uncertainty principle on which the complementarity principle is based is strongly questioned. This is because, according to the uncertainty principle, it has been asserted to be impossible to observe both the wave and particle properties of each individual particle simultaneously (See, for example, D. Bohm, Quantum Theory (Prentice-Hall, Englewood Cliffs, N.J., 1951), p. 118). In addition, although Feynman et al. (R. Feynman, R. Leighton, and M. Sands, The Feynman Lectures on Physics, Vol. III (Addison Wesley, Reading, 1965) p. 1-1) described that interference of each particle is the most mysterious physical phenomenon, the simultaneous, complete duality of each particle shown in the above experiment easily solves this problem. While each particle can pass through either slit of a double slit, each real phase wave accompanied by the particle can interfere with itself after passing through both of the slits. In this way, the results of the above simultaneous observation experiment show that, simultaneous to Bohr's complementarity principle, the Heisenberg uncertainty principle is also clearly an error.

4.5. Failure of the Principle of Superposition of States Caused by the Reality of Wave Functions An extremely important issue in physics will be pointed out here. If a wave associated with a particle exists, then the state of the particle and a wave function representing the state retain a one-to-one correspondence on a real time axis. In contrast, according to the superposition principle in quantum mechanics, the state of a particle and a wave function representing the state do not have a one-to-one correspondence (Refer to D. Bohm, the above-mentioned book, p. 126). Imagine, for example, a single molecule that can have an excited state and a ground state. The two eigenstates of this two-level molecule are represented by high-energy excited state $\psi_1$ and ground state $\psi_2$. Evidence that the logic of a quantum computer utilizing individual molecules as quantum bits is analog is that, in general, the state of the single molecule can be represented in accordance with the principle of superposition of states by $$\psi=a_1\psi_1+a_2\psi_2(<\psi_1|\psi_2>=0, |a_1|^2+|a_2|^2=1) \quad (1)$$

(Refer to, for example, Nobuyuki Emoto, "Quantum computing", KOGAKU 28, 209 (1999) (in Japanese)). However, the reason why the condition $<\psi_1|\psi_2>=0$ has been provided newly is because the above equation represents the superposition of the eigenstates. In the case of expressing the superposition in terms of interference, this condition must be altered to $<\psi_1|\psi_2>\neq 0$. The essential importance of the distinction between these two cases will be shown later. When observing a particle whose superposed state is represented by Eq. (1), only either the particle with energy $E_1$ represented by the state $\psi_1$ or the particle with energy $E_2$ represented by the state $\psi_2$ is observed. As such, when applying the superposition principle represented by Eq. (1) to the two eigenstates of each single free molecule, the energy of this molecule becomes indeterminate between $E_1$ and $E_2$. Obviously, the expression of Eq. (1) does not satisfy the conservation law of energy. This is because the conservation of energy of a single molecule means that the energy of the molecule is kept constant as long as there is no incoming or outgoing of new energy.

On the other hand, if the state of one single molecule is represented by a real wave function, this molecule takes either one of the two states: the eigenstate $\psi_1$ for the molecule before emission of energy and the eigenstate $\psi_2$ for the molecule after emission. Therefore, the state of the molecule and the wave function representing the state have a one-to-one correspondence on a real time axis. Accordingly, regardless of whether or not the state of the molecule is observed, the energy conservation law is automatically satisfied. Conversely, when the energy conservation law is valid, Eq. (1) becomes invalid. Thus, it is finally understood that to consider Eq. (1) as representing a single particle able to take any analog state represented by superposing $\psi_1$ and $\psi_2$ with the use of coefficients $a_1$ and $a_2$ is wrong. From a technological viewpoint, a quantum computer utilizing quantum bits, each of which may have the state represented by Eq. (1), has something in common with perpetual motion in the sense that each quantum bit contradicts the law of conservation of energy. Consequently, quantum computers cannot be apparatus making use of natural laws. Similarly, if wave functions exist, it will later be shown that "entangled states" cannot also exist. Thus, quantum computers that utilize both the superposed states and the "entangled states" for decryption would be doubly impossible to realize regardless of their sizes being large or small.

The superposed states being able to exist in the sense that the states are consistent with the energy conservation law are produced in the structure of an interferometer in which $<\psi_1|\psi_2>\ne 0$ is verified. However, the definitions of quantum bits and "entangled states" based on the 'principle of interference' must be determined case by case by ourselves in accordance with the concrete structure of the interferometer different from the case in which, for example, quantum bits are defined by Eq. (1) representing the 'principle of superposition of states'. Therefore, when applying many quantum bits, the interferometer becomes much complex and, at the same time, the definition of "entangled states" become extremely complex and abstract. Whatever the case, when the wave function for each photon exists, the "entangled states" of photons cannot exist. Therefore, with this invention, discussions on quantum computers utilizing "entangled states" for photons will no longer be continued.

As shown above, together with the reality of individual wave functions, the energy conservation law also prohibits application of the principle of superposition of states expressed by Eq. (1) to each single particle. When the energy conservation law is valid, wave functions exist and Eq. (1) becomes invalid. Inversely, when Eq. (1) is valid, the energy conservation law and the reality of wave functions become invalid. Accordingly, it must be stressed again that, at least, as long as the energy conservation law holds, Schrödinger's cat paradox will never occur even for individual microscopic particles as well as for individual macroscopic particles. As for quantum computers contradicting both the reality of wave functions and the energy conservation law, it has clearly been suggested that the realization of them is impossible regardless of whether their sizes are large or small. The existence of basic errors in such fundamental principles supporting quantum mechanics as the uncertainty principle and the principle of superposition of states must be recognized as an unquestionable fact.

It was stated previously that the clear distinction between the superposition of states in the sense of interference where $<\psi_1|\psi_2>\ne 0$ holds and the superposition of eigenstates where $<\psi_1|\psi_2>=0$ holds is extremely important. This importance is easy to understand when we hear that EPR paradox and Schrödinger's cat paradox are related only to the principle of superposition of states violating the energy conservation law without any relation to the principle of interference conforming to the law of conservation of relativistic energy. In this connection, the fact that interference phenomena are relativistic effects is inferred from the description by Dirac himself. (Refer to P. A. M. Dirac, the above-mentioned book, p. 9: It is specified here that interference phenomena conform to the energy conservation law, which includes the law of conservation of the number of particles.)

Hereafter, the superposition of states in the sense of interference will be called simply 'principle of interference' and superposition of states in the sense of producing wave packets will be called 'principle of superposition of states' to make a clear distinction between these two principles. Incidentally, there have been no textbooks for quantum mechanics in which these two principles have been distinguished clearly.

4.6. The Necessity of Statistical Wave Functions

It has empirically been known that the 'principle of superposition of states' is effective in the case where the result of an experiment in which each of a large number of particles is involved is described statistically. Consequently, an idea to interpret the wave function not as a probability wave for each particle but a statistical wave for a large number of particles is generated. Concerning this statistical interpretation of quantum mechanics, we can refer to an ingenious review paper by Ballentine (L. E. Ballentine, Rev. Mod. Phys. 42, 358 (1970)). An advantage of this interpretation is at least that the dissolution of Schrödinger's cat paradox can be expected. However, the effectiveness of this interpretation for the EPR paradox is unclear. Above all, the problem of this statistical interpretation is that, since it is nothing more than an alteration of interpretation, any concrete change in the formalism (mathematical formulation) of quantum mechanics is not seen and that it rather recedes from solving the intrinsic problem of interference of each individual particle with itself. It has been shown that, when the reality of the wave function associated with each particle is assumed, since the energy conservation law stands, Schrödinger's cat paradox turns out to be resolved. Accordingly, apart from real wave functions, the necessity of taking statistical wave functions into consideration in order to describe the result of an experiment in which an unspecified large number of particles is concerned arises. Thus, the 'principle of superposition of states' has the significance of its existence as a statistical principle applicable to these statistical wave functions. As is clear from the above consideration, the largest problem in the formalism of quantum mechanics has existed entirely in neglect of the distinction between the real wave function representing the state of each individual particle and the statistical wave functions describing the result of an experiment in which a large number of particles is involved.

The uncertainty principle also has no consistency with the energy conservation law as is the principle of superposition of states. This is because, different from classical mechanics, the position and the momentum of a single particle are uncertain having no simultaneously determined values (See, for example, D. Bohm, the above-mentioned book, pp. 100-101). On the other hand, the invention of the aforementioned Patent Reference 1 has disclosed a method of experimentally demonstrating that each particle has simultaneous, complete duality upsetting the established theory that, according to the uncertainty principle, the simultaneous observation of wave-particle duality of each individual particle is impossible. The property of a perfect particle means at least that each free particle simultaneously has a certain definite position and a certain definite momentum regardless of whether the particle is microscopic or macroscopic. This shows that the considerations and conclusions due to Einstein et al. (A. Einstein, P. Podolsky, and N. Rosen, the above-mentioned paper) had been correct. This result suggests that the uncertainty principle also is essentially a statistical principle applied to an ensemble of all individual particles each of which is measured for its position and momentum. It is clear that quantum mechanics has been so far constructed based on the principle of superposition of states and the uncertainty principle, both of which are inconsistent with the energy conservation law. Previously, it has been shown that phase waves and de Broglie waves are relativistic waves. It is also clear that nonrelativistic quantum mechanics cannot be wave mechanics for relativistic waves. Consequently, as will be shown later in 7.1.1., the nonrelativistic Schrödinger equation also turns out not to be a physical equation.

4.7. The Dirac Equation Contradicting Special Relativity

Wave functions have been regarded as probability waves also in relativistic quantum mechanics. Therefore, relativistic quantum mechanics also leads to phenomena contradicting classical mechanics or, specifically, special relativity. For example, according to the Dirac equation, a free electron in motion associates with microscopic trembling motion (Zitterbewegung) with light velocity ±c (P. A. M. Dirac, the above-mentioned book, p. 262). Regarding an electron as a classical particle having rest mass $m_0$ and velocity v, its relativistic energy can be written also as $$E = \frac{m_0 c^2}{\sqrt{1 - \frac{v^2}{c^2}}} = \frac{m_0 c^2}{\sqrt{1 - \beta^2}} \quad (\beta \equiv v/c) \quad (2)$$

(See, for example, L. D. Landau and E. M. Lifshitz, The Classical Theory of Fields, translated by H. Hamermesh (Pergamon Press, Oxford, 1962), revised 2nd ed., p. 27.) Substituting V=±c in the above equation, this energy diverges to ∞. Then, although the velocity v has been interpreted as a velocity of the center of mass that is obtained by averaging the above microscopic trembling motion, the velocity v used in a Lorentz transformation has no such meaning as an average velocity. In this way, Dirac's relativistic theory of electrons (P. A. M. Dirac, Proc. Roy. Soc. 117, 610 (1928); ibid, 118, 351 (1928)) evidently violates the definition of relativistic energy, i.e., Eq. (2). Dirac stated that, according to the uncertainty principle, each individual electron can move with velocity ±c. If the energy divergence to ∞ is allowed by the uncertainty principle, the uncertainty principle itself becomes also the principle of nonconservation of energy as previously pointed out. Thus, it is seen that the principle of nonconservation of energy has been maintained also in relativistic quantum mechanics. Therefore, although the contents of the experiment of the simultaneous observation of duality for photons (Patent Reference 1) will be explained later in detail in '5. Disclosure of the invention (5.5.4.)', detailed investigation of the thought experiment of Heisenberg's microscope will be given prior to that explanation. Then, it will become clear that the uncertainty principle had been derived as a result of mistaking measurement of the position of a single bright point for the resolution of two neighboring bright points using a microscope. As a result, the quantum mechanical world described by the uncertainty principle, that is, the Copenhagen interpretation, has turned out to be the wrong image for the microscopic world. The motion of each electron with velocity ±c can never be allowed by the uncertainty principle.

4.8. Systematic Representation of Conventional Mechanics

As a summary of the above, an outline of a structure of an old system of mechanics consisting of relativistic quantum mechanics, nonrelativistic quantum mechanics, and classical mechanics established before this invention is shown in FIG. 1. Quantum statistical mechanics, quantum field theory, i.e., a developed form of quantum mechanics accompanied by divergence difficulty, quantum electrodynamics, and the theory of elementary particles have been excluded from this drawing. One of the reasons of these exclusions is that the inventor is not familiar with these fields. However, there are two other reasons more essential than the above. The first reason is that the object systems to be dealt with are restricted under the following two conditions: (i) The density of particles included in the system is so low that interaction among the particles is negligible. Consequently, each individual particle behaves as a free particle when there is no external field. (ii) The conservation of energy including the conservation of the number of particles is maintained. The second reason is, as already roughly shown, that nonrelativistic quantum mechanics and relativistic quantum mechanics, that is, the basis of the above fields, can be definitely shown as nonphysical theories based on the following two grounds: (1) Both mechanics contradict special relativity. (2) Both mechanics are based on the uncertainty principle that was established based on elementary errors by Heisenberg.

Referring to FIG. 1, the conventional system of mechanics will be explained simply. In the explanations below, the basis of all mechanics is largely categorized into three mechanics, that is, from the top in this drawing, relativistic quantum mechanics, nonrelativistic quantum mechanics, and classical mechanics. Classical mechanics can be regarded as consisting of Newtonian mechanics, special relativity, the general theory of relativity (general relativity), and statistical mechanics. Special relativity converts into Newtonian mechanics simultaneously when Lorentz transformations are changed over to Galileo transformations through the procedure as c→∞. There are two fundamental equations in relativistic quantum mechanics: The Klein-Gordon equation is applied to spin-0 particles and the Dirac equation is applied to spin-1/2 particles, both of which are covariant under the Lorentz transformations. Wave functions satisfying these wave equations have been regarded as probability waves, as in the case of nonrelativistic quantum mechanics, and the principle of superposition of states and the uncertainty principle are valid. But, according to Dirac, the principle of superposition of states is considered a relativistic principle (Refer to P. A. M. Dirac, the above-mentioned book, p. 253). Relativistic quantum mechanics changes over to nonrelativistic quantum mechanics through the procedure of nonrelativization, substantially resulting in $m_0 c^2 = 0$. From this fact, it is very clear that nonrelativistic quantum mechanics violates the conservation of relativistic energy. As for fundamental equations in nonrelativistic quantum mechanics, there exist the Schrödinger equation also derived by the nonrelativization of the Klein-Gordon equation and the Pauli equation obtained by the nonrelativization of the Dirac equation. The Pauli equation, however, seldom comes to the surface. Although the Schrödinger equation has been regarded as covariant under the Galileo transformation, this problem will be discussed later again. Further, nonrelativistic quantum mechanics has been regarded as changing over to Newtonian mechanics through the procedure of h→0. Conversely, nonrelativistic quantum mechanics can be derived from analytical dynamics, that is, a developed form of Newtonian mechanics, through the procedure of quantization. In this procedure, since rest energy is ignored, it substantially gives $m_0c^2=0$. Theoretically, if $m_0c^2=0$, atomic power generation becomes impossible and, therefore, atomic power engineering cannot stand under nonrelativistic quantum mechanics. In other words, nonrelativistic quantum mechanics is clearly disqualified for the basic theory of all engineering.

The largest feature indicated by the system of mechanics depicted in FIG. 1 is the existence of the thick wall by which quantum mechanics dealing with microscopic particles conforming to nonconservation of energy and classical mechanics dealing with macroscopic particles conforming to conservation of energy are isolated from each other. 80 years have passed since the origination of quantum mechanics in 1925. However, although foundations of quantum mechanics even including Dirac's relativistic theory of electrons (P. A. M. Dirac, the above-mentioned papers of 1928, the hole theory of 1930, etc.) had been established in only 4 to 5 years, noticeable progress of quantum mechanics has not been seen since. The premise of conforming to conservation of energy must be established in any field of engineering. Quantum mechanics that has disregarded conservation of relativistic energy since its origination cannot provide theoretical foundations in recent fields of advanced and precise engineering. On the contrary, as seen in quantum computers, quantum mechanics that has been left behind by continuous progress of engineering during the past 80 years has begun to prevent normal development of advanced technology.

[Patent Reference 1] Patent No. JP3227171

DISCLOSURE OF THE INVENTION

A first object of this invention is to provide new methods of designing and evaluating devices and apparatus relevant to microscopic particles by constructing new mechanics named dual mechanics, instead of quantum mechanics, that can be means for designing such devices and apparatus. Further, a second object is to provide devices or apparatus relevant to microscopic particles and especially apparatus for evaluating whether or not quantum computers can be realized by applying those new design and evaluation methods.

5.1. Construction of a New System of Mechanics and the Position of the Dirac Equation In order to construct mechanics suitable for the above objects, all the ambiguous problems beginning from the uncertainty principle in present quantum mechanics must be clarified more concretely and in detail. These problems in quantum mechanics will be examined carefully in the following keeping the conventional system of mechanics illustrated in FIG. 1 in mind. This is because systematic understanding of the reason why these problems come into question will lead to finding the means for solving them. Moreover, since many of these problems are mutually related, such a simple course of action as enumerating subjects first and then showing each of individual solutions cannot be adopted. Therefore, work for unraveling both whether or not mutual relationships between the problems exist and complex relationships between the problems and solutions for coping with them is essential. A framework of evolved mechanics will emerge from the solutions of individual subjects obtained as a result of the work here. Only four most fundamental subjects that determine the framework will be examined carefully in the first step (7.1. Clarification of four fundamental subjects) of the later stage of this invention.

As shown in the column for relativistic quantum mechanics in FIG. 1, the principle of superposition of states is considered a relativistic principle in that the principle is applied to the states (of particles or systems) in relativistic space-time (or inertial systems) (Refer to P. A. M. Dirac, the above-mentioned book, p. 253). Although the object which Dirac called the principle of superposition of states in the above context directly indicates a form of representing the solutions of the Dirac equation, it also naturally includes the superposition principle in nonrelativistic quantum mechanics. It is thus understood that Dirac considered the superposition principle in nonrelativistic quantum mechanics as a relativistic principle similar to the representation of the solutions of the Dirac equation. However, Dirac could not sufficiently recognize the difference between the 'principle of interference' and the statistical 'principle of superposition of states'. The origin of these two principles exists in the Schrödinger equation that is linear with respect to scalar solutions, such that the mathematical difference of these two principles is certainly not so definite. Therefore, it is necessary to understand the difference in the physical properties of the solutions referring to experiments, where one of the properties for the distinction is whether or not interference terms arise as mentioned in relation to Eq. (1). In contrast, since the representation of the solutions of the Dirac equation is quite different from a scalar, the origin of this superposition can be clearly discriminated mathematically from the origin of the above two principles. This means that the characteristics of solutions for the Schrödinger equation and those for the Dirac equation are physically quite different.

The relativistic principle of superposition in the sense of Dirac is, apart from whether or not the expression of the solutions is correct, basically a principle shown in the expressions of the solutions for the Dirac equation. This relativistic superposition indicates that the solutions of the Dirac equation are represented by inseparable superposition of four components corresponding to four types of particles appearing as a combination of plus and minus of the spin and plus and minus of energy. In short, it indicates that the solutions of the Dirac equation are represented by a four-component spinor. Although only scalar solutions are dealt with in the Schrödinger equation, a pair of solutions corresponding to plus and minus of the spin, or a two-component spinor, are also obtained by the Pauli equation. The two-component spinor may be represented by superposing two scalar solutions of the Schrödinger equation, thereby causing a misunderstanding. The superposition of solutions based on the linearity of the Schrödinger equation can be interpreted at most as superposition in the meaning of the 'principle of superposition of states', that is, as already mentioned, a statistical principle. This is because, as will clearly be shown later, the 'principle of interference' is strictly a relativistic principle. In this way, Dirac has lumped together in a relativistic principle three types of very different superposition, i.e., the superposition of four components of solutions of the Dirac equation, the relativistic principle of interference, and the principle of superposition of states. Quantum mechanics by Dirac has been clearly in a state in which physics and mathematics have not yet been differentiated.

As given above, the characteristics seen only in the solutions of the Dirac equation exist in the following two points: One is that plus or minus spin, that is, a quantized internal degree of freedom of a particle, appears in the solutions, and another is that the solutions can be expressed by superposing four inseparable components of solutions. As already pointed out, the Dirac equation contradicts special relativity in that its solutions associate with microscopic trembling motions with the velocities ±c. Therefore, the two above-given characteristics should also be reexamined in detail from the viewpoint of special relativity or physics.

In the case of applying the Dirac equation to electrons, the four components of solutions represent electrons having positive rest mass and positive or negative spin and electrons having negative rest mass and positive or negative spin. According to Dirac, the vacuum is assumed to be filled with electrons in negative energy states. Then, by the Pauli principle, electrons in positive energy states can be kept from falling into negative energy states (W. Greiner, Relativistic Quantum Mechanics (Springer-Verlag, Berlin, 1990), pp. 233-236). When an electron in a negative energy state obtains energy, the electron becomes an electron with positive energy and breaks out of the negative energy state, resulting in a hole. This hole provides an antiparticle of the electron, i.e., a positron (the hole theory). Since charge and mass of the hole take positive values, a particle and its antiparticle have the same mass but different signs for internal quantum numbers, e.g., charge etc. According to the hole theory by Dirac, since innumerable electrons occupying negative energy states are needed, the concept of a single free electron technically turns out to be unacceptable (Refer to W. Greiner, the above-mentioned book, p. 86). Some concrete examples can be given to show that the relativistic theory of electrons based on the Dirac equation is incompatible with reality.

One example is cosmic rays including both particles and antiparticles each having a spin. These cosmic rays, irrespective of whether they are particles or antiparticles, are considered without hindrance that each individual one is a single free particle with spin-1/2. The second example is, as verified in many experiments, interference phenomena occurred as relativistic phenomena in which each single free particle interferes with itself. How can these phenomena be explained strictly using the four-component solutions of the Dirac equation? The Klein-Gordon equation having scalar solutions, different from conventional, can also be regarded as a wave equation valid in real space-time. However, as shown in the above example, the Dirac equation is distinctly not valid in physical space. Therefore, it can be concluded that the Dirac equation is not covariant under the Lorentz transformations valid in the physical space.

The hole theory is also extremely unrealistic. This unreality can be shown by comparison with the Klein-Gordon equation that is regarded as relating to spin-0 particles. The Klein-Gordon equation also has both positive and negative energy solutions (Refer to W. Greiner, the above-mentioned book, pp. 4-11). These solutions correspond to particles with positive rest mass and particles with negative rest mass respectively. When the vacuum is also assumed to be filled with negative energy state particles, all of the positive energy particles fall into negative energy states and emit light since the Pauli's principle does not work in this case. Going back to the previous case, it is also unreasonable that the energy of the vacuum filled up by electrons in negative energy states becomes negative infinity. As a counterproposal, an antiparticle in the quantum field theory is assumed to be such an extremely unreal particle that propagates backward along the time axis. Anyway, it may be said that the treatment of negative energy solutions together with that of the spin is a fundamental problem that is not yet completely resolved in the present elementary particle theory or quantum field theory.

With the present invention, the Dirac equation has already been evaluated as a non-physical wave equation. The basis of this evaluation will be clarified concretely at another time when the process of deriving the Dirac equation will be examined. Next, our investigation will move on to the problem of formalism.

The principle of superposition of states is, as already pointed out, a statistical principle and is derived from a wave equation that is linear with respect to wave functions. Hence, its direct relation to relativity has not necessarily existed from the beginning. However, we must pay sufficient attention to the fact that the wave equation being linear with respect to the wave functions is also a physical demand for each individual wave function itself causing interference in real space-time. This is because if interference phenomena are relativistic phenomena, a wave equation must be not only linear but also relativistic. In this sense, the statistical principle of superposition of states must be considered as one of the relativistic principles. As a matter of form, for example, a distinction can be made by denoting the relativistic wave function that is able to interfere by $\Psi$ and the statistical wave function by lower case $\psi$. Moreover, it is necessary to explicitly show that different statistical wave functions corresponding to different ensembles of particles having different eigenvalues are not able to interfere but are orthogonal with each other. However, the interference of statistical wave functions does not mean physical interference but means interference in an abstract space, in other words, a mathematical space. This mathematical interference is derived based on the procedure in which the statistical wave function $\psi$ is expressed by the sum of wave functions $\Psi$s each associated with respective individual particles belonging to an ensemble to which $\psi$ corresponds. For making the procedure be justified, the wave equation satisfied by the real relativistic wave function $\Psi$ and the wave equation satisfied by the statistical wave function $\psi$ must have the same form. The difference of these two wave equations can be distinguished by the difference of the letters representing the two wave functions. The specific contents of the procedure of deriving the statistical wave function $\psi$ from the real wave functions $\Psi$s will be clarified in each of individual embodiments in the latter half of this invention. As shown above, all of the statistical natural phenomena in which a large number of particles, each of whose motion cannot be described in real time, are involved can basically be described satisfactorily in statistical wave mechanics for the first time by applying the statistical wave function $\psi$ derived from the real wave functions $\Psi$s.

In every conventional textbook of quantum mechanics, only the wave functions as mathematical probability waves have been defined and there has been no discrimination made between the real wave function $\Psi$ and the statistical wave function $\psi$. It is not too much to say that an "entangled" state of quantum mechanics itself has been brought about by the lack of this discrimination. The norm for the logic of physics must be nature itself. An idea that only the unreal mathematical probability waves control natural phenomena is obviously mistaking the means for the ends.

As seen from the discussions above, quantum mechanics and the Dirac equation both contradicting special relativity will be completely removed from the system of dual mechanics that will replace the old system of mechanics shown in FIG. 1. The Klein-Gordon equation remains a relativistic wave equation although its physical meaning will be changed entirely from the conventional one.

5.2. The Concept of Spins Contradicting Special Relativity

Next, examination of the spin will be made as a continuation of the discussions on the Dirac equation.

The spin of each individual electron is considered to be a quantized angular momentum caused by its rotation as its own internal degree of freedom accompanied by a magnetic moment having either one of the two different directions of the rotation axis in accordance with the difference of rotational directions. These quantities, irrespective of whether it is the spin or the magnetic moment, have come from the very classical model of an electron that has a certain size and rotates on its axis. According to special relativity, any elementary particle has no size (L. D. Landau and E. M. Lifshitz, the above-mentioned book, p. 48). Hence, each individual electron classified as an elementary particle in the standard model must be regarded as a point charge. (Although there is an argument that special relativity does not hold in the dimension smaller than the Plank scale, this has not been verified yet.) Since the point charge cannot have a moment of momentum (angular momentum), the magnetic moment cannot be generated. Accordingly, this point also shows that the relativistic theory of electrons by Dirac is inconsistent with special relativity. Or it can be said that the standard model is incompatible with special relativity. It has been verified in the experiments on interaction between atoms and external magnetic fields that each electron has a quantized internal degree of freedom. Hence, according to special relativity, each individual electron must be a composite particle having an internal structure. It also seems that there are contradictions with respect to neutrons as nucleons. Since neutrons each having spin-1/2 have no charge, they should obviously not have any magnetic moment. However, though its magnetic moment is smaller than that of each electron ($\mu_e = -9.285 \times 10^{-24}$ J·T$^{-1}$), each neutron has a finite magnetic moment ($\mu_n = -0.966 \times 10^{-26}$ J·T$^{-1}$). In this way, the charge is not always a cause of magnetic moment generation and, moreover, the magnitude of the spin and that of the magnetic moment do not have a one-to-one correspondence. According to special relativity, every particle having angular momentum or magnetic moment can be considered a composite particle. Then, it can be said to be incomprehensible that the spin accompanied by a magnetic moment based on a nonrelativistic model derived from the Dirac equation that is regarded as a relativistic equation. In this way, the original shapes of the spin and the magnetic moment associated with each electron or neutron have not been completely studied yet.

The problems with respect to the spin derived from the Dirac equation will be demonstrated more concretely in the following:

In order to deal with the above problems, it is suitable to take the method in which the solutions of the Dirac equation are derived in an inertial system that is in the motion with a constant velocity v in the inverse direction of, for example, the z axis toward an electron at rest (W. Greiner, the above-mentioned book, pp. 127-139). These solutions are also called the Lorentz boost solutions. In rest solutions consisting of four components, the component representing an electron at rest with + spin is expressed by $$\psi^1 = \omega^1(0)\exp\left(-i\frac{m_0 c^2 t}{\hbar}\right) = \begin{pmatrix} 1 \\ 0 \\ 0 \\ 0 \end{pmatrix} \exp\left(-i\frac{m_0 c^2 t}{\hbar}\right) \quad (3)$$

(W. Greiner, the above-mentioned book, p. 127, Eq. (6.1)). Since this electron takes the z axis as the rotational axis, it has polarization in the direction of the z axis and has a spin of $\hbar/2$ (Refer to the above-mentioned book, p. 141). The incomprehensible thing here is that the specific relation between the spin wave function and the z axis cannot be read from the expression of Eq. (3).

Suppose that a Lorentz boost corresponding to translational motion in the negative direction of the z axis is applied to Eq. (3) representing a component of the rest solutions. Then, since the amplitude factor written by a column of simple numbers has no apparent relation to the relevant space-time coordinates, one should expect to get a component of a de Broglie wave exhibiting the phase invariance as follows:

$$\psi^{1'} = \begin{pmatrix} 1 \\ 0 \\ 0 \\ 0 \end{pmatrix} \exp\{i(k'z' - \omega't')\}. \quad (4)$$

In contrast, according to the conventional approach, the Lorentz transformations are applied to a spinor as the amplitude factor of the rest wave function and to the phase factor of the rest wave function individually. Then, in order to generalize the phase wave that is generated by applying the Lorentz boost in the negative direction of the z axis and propagates in the positive direction of the z' axis to a phase wave propagating in an arbitrary direction, an arbitrary rotation is given only to the spatial coordinates of the inertial system whose origin is fixed to the electron at rest (W. Greiner, the above-mentioned book, pp. 131-132). Substituting $p_x' = p_y' = 0$ to the generalized Lorentz boost solution thus obtained, one finally obtains not Eq. (4) but the following solution:

$$\psi^{1'} = \omega^{1'}(p'_{z'})\exp\{i(k'z' - \omega't')\} \quad (5)$$

$$= \sqrt{\frac{E' + E_0}{2E'}} \begin{pmatrix} 1 \\ 0 \\ \frac{p'_{z'} c}{E' + E_0} \\ 0 \end{pmatrix} \exp\{i(k'z' - \omega't')\}.$$

In this case, since the direction of the spin s coincides with that of the momentum vector p, the spin is pointed toward the positive direction of the z axis (Refer to W. Greiner, the above-mentioned book, p. 85, Fig. 2.2). However, Eq. (6.31) (W. Greiner, the above-mentioned book, p. 134) as the general Lorentz boost solution that ought to include the above Eq. (5) differs from ordinary solutions Eq. (2.44a) and Eq. (2.44b) (W. Greiner, the above-mentioned book, pp. 85-86) in the normalization constants. The above Eq. (5) that agrees with $\Psi_{p,+1,+1/2}$ of Eq. (2.44a) is obtained by substituting the spinor $\omega^\gamma(p)$ in Eq. (6.31) with $\omega^\gamma(\epsilon_\gamma p)$. However, since this substitution changes the normalization condition, $\omega^\gamma(p)$ of Eq. (6.30) divided by $\sqrt{E/E_0}$ is actually substituted for $\omega^\gamma(\epsilon_\gamma p)$.

In the first place, the problem propounded here is 'what will happen in the case when an inertial system makes a translational motion toward a single free particle at rest?' It has already been pointed out that, when a single particle at rest is an electron with spin-1/2 whose direction faces in the positive direction of the z axis, a problem occurs in representing the electron by a component of the rest solutions or Eq. (3). Even if the above electron should be represented by Eq. (3), one must apply the Lorentz transformation valid in physical space to the phase factor and the Lorentz transformation held in mathematical space to the spinor to derive Eq. (5). In brief, the most crucial problem in the Dirac equation is that this equation cannot give a correct answer to the question about a phenomenon that takes place in real space-time through description of the phenomenon by using real space-time coordinates. This problem has been caused, as already pointed out repeatedly, by the fact that the solutions of the Dirac equation are represented by an inseparable 4-component spinor. In other words, the problem is that this equation cannot describe the motion of an independent free particle. The above-mentioned question will be properly discussed again by conforming to special relativity in 7.1.1. as one of the fundamental problems that should be studied in the first step of the latter stage of this invention.

5.3. Bohm's Version of the EPR Experiment and the Concept of Spins

In the following, two experiments related to the spin, i.e., the Stern-Gelrach experiment and Bohm's version of the EPR experiment (thought experiment), will be discussed, and the procedure of deriving the Dirac equation will then be examined. In this procedure, it will be clarified that the Dirac equation itself violates the relativistic energy conservation principle.

5.3.1. The Concept of Spins

Spins were introduced by Pauli (in 1924) to account for multiple lines of atomic spectra, and Uhlenbeck et al. (G E. Uhlenbeck and S. A. Goudsmit) advocated (in 1925) a very classical model indicating that the spin is an angular momentum caused by rotation of each electron having its own size. In quantum mechanics or relativistic quantum mechanics after 1925, the spin is interpreted as a degree of freedom which each individual basic particle such as an electron or the like itself possesses, and for example, the anomalous Zeeman effect has been considered as caused by a magnetic moment accompanied by the spin of each electron in an atom. Although the concept of the spin originated from the classical model in this way, it is rather the relativistic theory of electrons proposed by Dirac that has strongly supported this model. This is because spins have appeared in the solutions of the Dirac equation. Reliance on this theory of electrons by Dirac had been established from the discovery of positrons in cosmic rays in 1932.

In 1935, Einstein et al. showed that quantum mechanics having both the principle of superposition of states and the uncertainty principle as fundamental principles is incomplete. Bohr's rebuttal given in the same year based on the complementarity principle was not so much persuasive as overturning the conclusion by Einstein et al. After a while, Bohm presented an EPR type thought experiment for spins in two-particle systems (D. Bohm, the above-mentioned book, pp. 614-623) based on the quantum mechanical analysis of the Stern-Gerlach experiment (D. Bohm, the above-mentioned book, pp. 593-598). In this proposal, investigations advanced along the reasoning of the uncertainty relation between individual components of spins, resulting in negating the view of Einstein et al. On the other hand, Bell derived an inequality that can be used to experimentally ascertain which of the theories of hidden variables or quantum mechanics with the Copenhagen interpretation is correct (J. S. Bell, Physics (Long Island City, N.Y.) 1, 195 (1964)). Bohm's versions of the EPR experiment that can be checked with Bell's inequality have actually been performed utilizing polarizations of photons instead of spins. In these experiments, the existence of hidden variables has been denied and many results supporting quantum mechanics with nonlocal correlation have been obtained (Although there have been many papers dealing with Bell's theorem and its theoretical and experimental studies, the following elaborate literature is a valuable, neatly arranged collection (resource letter) of leading papers: L. E. Ballentine, Am. J. Phys. 55, 785 (1987)). As a result, in order to make a decision at the end of the Copenhagen interpretation, it is not sufficient to resolve only both problems of the superposition principle and the uncertainty principle but to reveal the original shapes of nonlocal correlation in relation to spins in Bohm's version of the EPR experiment.

As already pointed out, the fact that each individual electron has its own quantized degree of freedom other than a charge means in special relativity that each electron has its own internal structure. In other words, it becomes possible that individual electrons are not elementary particles but composite particles with other unknown particles. Although regarding the electrons as composite particles contradicts the present standard model of elementary particles, this argument is consistent with the relativistic definition of the elementary particles, each of which can be represented by a point without any size (Refer to L. D. Landau and E. M. Lifshitz, the above-mentioned book, p. 48). Previous to presenting Bohm's version of the EPR experiment, Bohm begins with quantum mechanical analysis of the Stern-Gerlach experiment (D. Bohm, the above-mentioned book, pp. 593-598), refers to the problem of interference between two different eigenstates of spins in the middle of the above analysis, and finally arrives at proposition and consideration of Bohm's version of the EPR experiment (D. Bohm, the above-mentioned book, pp. 614-622). Before examining Bohm's version of the EPR experiment, Bohm's analysis of the Stern-Gerlach experiment in which spins of silver atoms are involved is examined first. The superposition principle has already been clarified to be a statistical principle. In addition, the Heisenberg uncertainty principle concerning the position and momentum of each individual particle will turn out to be incorrect (5.5.2.). Accordingly, the uncertainty principle, which is believed to effect between two arbitrary components of the spins, should also not exist. This will show that Bohm's objection against Einstein et al. is without foundation. Nevertheless, the problems of spin eigenstates and the superposition principle will be clarified in more detail through examination of Bohm's analysis of the Stern-Gerlach experiment. Examination of the solutions for these problems may allow concrete discussion of the meaning of the statistical principle of superposition of states and the origin of the spin and the magnetic moment associated with the spin when each electron is assumed to be a composite particle.

5.3.2. The Stern-Gerlach Experiment and the Spin

FIG. 2 is a schematic diagram of the Stern-Gerlach experiment (Refer to D. Bohm, the above-mentioned book, Fig. 1 on p. 593 and Fig. 2 on p. 598). The shape of the electromagnet is depicted referring to papers by Stern and Gerlach (Refer to W. Gerlach and O. Stern, Z. Phys. 9, 349 (1922); ibid. 353 (1922); Ann. Phys. 74, 673 (1924)). Since the shape of the N pole and that of the S pole are extremely different from each other, a strongly inhomogeneous magnetic field is generated. Silver atoms emitted from an aperture of an atomic source produce an atomic beam, which has a laterally long strip cross-sectional shape resulting from passing through a collimator constructed from two slit apertures apart from each other and is then incident on the electromagnet. Each slit aperture has a length s=0.8 mm along the y axis and a width w=0.03~0.04 mm along the z axis (Refer to W. Gerlach and O. Stern, Z. Phys. 9, 349 (1922), p. 349). Silver atoms reaching the detection plane form a pattern as shown by thick solid lines on the yz plane. Since the shapes of the two magnet poles are not symmetric with respect to the xy plane, the pattern lacks symmetry with respect to the y axis although it is symmetric with respect to the z axis. The distance along the z axis between the pattern drawn by the silver atomic beam with − spin and another pattern drawn by the silver atomic beam with + spin becomes maximum on the z axis, becoming shorter the further away from the z axis, and finally, the two patterns are overlapped with each other. Tracks of the silver atomic beam traveling on the x axis of this drawing were illustrated according to the drawing by Bohm. According to Bohm, since the atom passes through the gap between the two magnet poles instantaneously, the z motion of the atom in the gap can be neglected. Further, the motion of the atom along the x axis is dealt with by applying classical mechanics, while the motion along the z axis parallel to the magnetic field is treated quantum mechanically. In this way, Bohm traced the tracks of the silver atomic beams based on the above illogical assumptions. First of all, these two conditions must be examined.

According to the drawing shown in the paper by Stern and Gerlach (W. Gerlach and O. Stern, Ann. Phys. 74, 673 (1924), FIG. 1), magnet pole length l in the direction along the x axis is approximately 10 times longer than distance d, that is, the distance from the magnet poles to the observation plane shown in FIG. 2. Since the boundary conditions that the magnetic fields do not exist outside of the gap between the magnet poles were set in Bohm's analysis, the tracks of silver atomic beams shown in FIG. 2 are unnatural in every respect. Each silver atom should rather be affected by the magnetic field only during its passing through the gap between the magnet poles. Such inconsistent treatment of the motion of each atom that the motion along the x axis is treated by applying classical theory and the motion along the z axis by applying quantum theory is also unnatural and is not considered a theory in physics. This is because, as will be shown later, Bohm himself has denied the existence of a trajectory associated with the motion of each individual microscopic particle. Logically, denying the existence of the trajectory means the same as denying classical mechanics. If the characteristics of the forces working on the silver atom are clear, dealing with the motion along the z axis together with the motion along the x axis by applying the classical theory enables us to calculate the tracks of the silver atomic beams more accurately. Since the characteristics of the above forces are known in terms of the old quantum theory, aside from whether or not the theory is correct, the entire Stern-Gerlach experiment can be basically treated by application of the classical theory. This is because, since the average de Broglie wavelength ($6.7 \times 10^{-6}$ μm) of the silver atoms in this experiment is extremely short compared to the width w of the slit aperture that is shortest in any size of other parts of the experimental apparatus, the wave property of these atoms can substantially be neglected. Keeping this conclusion also in mind, the entire Stern-Gerlach experiment will be described along Bohm's consideration in the following:

The Hamiltonian $\mathcal{H}_I$ of the interaction between a silver atom and the magnetic flux density B in this experiment can be expressed with the use of a spin operator σ as $$\mathcal{H}_I = \mu(\sigma \cdot B) = \mu \begin{pmatrix} B_z & B_x - iB_y \\ B_x + iB_y & -B_z \end{pmatrix} \quad (6)$$

(Refer to D. Bohm, the above-mentioned book, p. 405, Eq. (78)). Here, by using the absolute value e of electronic charge, the magnetic moment μ of an electron is written as $$\mu = -\frac{e\hbar}{2mc}. \quad (7)$$

In Eq. (6), the x component of B can be ignored and, because the magnetic field is symmetric with respect to the xz plane, the y component of B may also be set to zero. Further, let the highly inhomogeneous magnetic field be approximated as $$B_z \doteq B_0 + zB'_0 \quad (8)$$

(Refer to D. Bohm, the above-mentioned book, p. 594), where $B_0$ denotes the magnetic flux density on the x axis and $$B'_0 = \left(\frac{\partial B_z}{\partial z}\right)_{z=0}. \quad (9)$$

Eqs. (8) and (9) mean that the motion of a silver atom is practically argued only in the xz plane. From these equations, the Hamiltonian of the interaction, Eq. (6), can be expressed as $$\mathcal{H}_I \doteq \mu(B_0 + zB'_0)\sigma_z. \quad (10)$$

Here, with the use of the Pauli spin matrix, the z component of the spin is expressed as $$s_z = \frac{\hbar}{2}\sigma_z = \frac{\hbar}{2}\begin{pmatrix} 1 & 0 \\ 0 & -1 \end{pmatrix}. \quad (11)$$

While the aim of the Stern-Gerlach experiment was to measure a magnetic moment of the nucleus of each silver atom, it turned out that the magnetic moment of an electron given by Eq. (7) was actually measured. Since this magnetic moment is a physical quantity associated with the electronic spin, this measurement can be regarded as measurement of the electronic spin $s_z$.

By applying the 'principle of superposition of states' to two spin eigenfunctions $v_+$ and $v_-$ each corresponding respectively to $\sigma_z=1$ and $\sigma_z=-1$ in Eq. (11), the state $\psi_0$ of each silver atom at time t=0 can be expressed by the following equation (D. Bohm, the above-mentioned book, p. 595, Eq. (12a)):

$$\psi_0 = f_0(z)(c_+v_+ + c_-v_-). \quad (12)$$

Here, $f_0(z)$ is an amplitude distribution on the z axis of the wave packet $\psi_0$ obtained by superposing two spin eigenfunctions each having a discrete eigenvalue with respect to the spin and a continuous eigenvalue with respect to the position along the z axis, and $c_+$ and $c_-$ are unknown coefficients for these two spin eigenfunctions. Note that for simplicity, it is assumed here that the wave function associated with a silver atom incident on the second slit aperture of the slit-collimator can be expressed by a plane wave.

A first point to be noticed in Bohm's consideration so far is that the state $\psi_0$ of each silver atom is expressed such that different silver atoms are physically indistinguishable from one another due to application of the superposition principle. Thus, it becomes clear at this point that the expression of $\psi_0$ unable to distinguish each individual silver atom contradicts the experiment in which an atom having + spin or an atom having − spin is always detected only one at a time on the observation plane. A second point to be noticed of crucial importance is that when the x axis is assumed to be a rotational axis of an atomic source not shown in FIG. 2, the direction of the spin of each silver atom emitted from the source must be indeterminate since a rotational angle of the source has arbitrariness. However, each silver atom emitted from the source is, as seen in Eq. (12), already represented by the spin eigenfunctions related only to the z component before its incidence on the electromagnet. This is extremely unnatural. From the above two reasons, it can be understood that the principle of superposition of states and the concept of spins have been lacking in physical rationality from the beginning.

As in the case of $\psi_0$, each individual silver atom while passing through the electromagnet can also be expressed by superposing the two spin eigenfunctions $v_+$ and $v_-$ as shown below (Refer to D. Bohm, the above-mentioned book, p. 595, Eq. (12b)):

$$\psi = f_+(z,t)v_+ + f_-(z,t)v_-. \tag{13}$$

In this way, as in Eq. (12), the state of every individual atom while passing through the electromagnet can be expressed individually by the same state $\psi$. Provided that the boundary condition with respect to time t is determined, each atom after passing through the electromagnet may also basically be represented by the above equation.

Incidentally, it is noticed that there is a lack of consistency between Eq. (12) representing the state of each particle before incidence on the electromagnet and Eq. (13) representing the state of the particle while or after passing through the magnet. That is, the unknown coefficients $c_+$ and $c_-$ in Eq. (12) disappear from Eq. (13). Since there is no reason for each ratio (coefficient) of superposing the two eigenstates to change between before and after passing through the magnet, $c_+$ and $c_-$ should not be time dependent. Accordingly, expressing Eqs. (12) and (13) more correctly, the following equations are derived respectively:

$$\psi_0 = f(z,0)(c_+v_+ + c_-v_-), \tag{14}$$

$$\psi_t = f_+(z,t)c_+v_+ + f_-(z,t)c_-v_-, \tag{15}$$

where in the above equations the following equation stands true:

$$\int_{-\infty}^{\infty} |f(z,0)|^2 dz = \int_{-\infty}^{\infty} |f_+(z,t)|^2 dz = \int_{-\infty}^{\infty} |f_-(z,t)|^2 dz = 1. \tag{16}$$

In addition, for simplicity, one may assume $|c_+|^2 = |c_-|^2 = 1/2$. From the standpoint of making $\psi$ a probability wave, this assumption means that each ratio of superposing the state of a silver atom with + spin and the state of a silver atom with − spin is equivalent. On the other hand, from the standpoint of making $\psi$ a statistical wave, the above assumption means that each ratio of the number of silver atoms with + spin and that of silver atoms with − spin both included in the atomic beam is equivalent. In any case, Eqs. (14) and (15) are ultimately represented respectively as follows:

$$\psi_0 = \frac{1}{\sqrt{2}} f(z,0)(v_+ + v_-), \tag{17}$$

$$\psi_t = \frac{1}{\sqrt{2}} (f_+(z,t)v_+ + f_-(z,t)v_-). \tag{18}$$

For further simplicity, one may set $$f_+(z,t) = f(z-z_+,t), f_-(z,t) = f(z-z_-,t) \tag{19}$$

at the observation plane. Then, Eq. (18) can be rewritten as $$\psi_t = \frac{1}{\sqrt{2}} (f(z-z_+,t)v_+ + f(z-z_-,t)v_-). \tag{20}$$

As shown above, similar to the initial state $\psi_0$ for each silver atom, the state of each atom that should be detected on the observation plane is expressed such that each individual atom is indistinguishable from one another. According to Bohm, using $B_0'$ represented by Eq. (9), the magnetic moment $\mu$ given by Eq. (7), and the time $\Delta t$ that is necessary for each atom to pass through the gap of the electromagnet, the following expressions are obtained (Refer to D. Bohm, the above-mentioned book, p. 597, Eq. (18)):

$$z_+ = -\frac{B_0'\mu\Delta t}{\hbar} t > 0, \quad z_- = \frac{B_0'\mu\Delta t}{\hbar} t < 0. \text{ (errors)} \tag{21}$$

As shown in FIG. 2, if the length of the electromagnet in the direction along the x axis is l and the velocity of each atom in the direction along the x axis is v, $\Delta t = l/v$.

Actually, Eq. (21) includes two errors. One is the sign and another is the physical quantity of the denominator. Although the dimension of the numerator is $J \cdot m^{-1} \cdot s^2$, since that of the denominator is $J \cdot s$, the dimension of z becomes $m^{-1} \cdot s$ resulting in having no dimension in length. These two errors will be clarified later through comparison with $z_+$ and $z_-$, which will be obtained by applying classical mechanics also to the motion along the z axis. Since spin eigenfunctions $v_+$ and $v_-$ do not interfere with each other, $$\int_{-\infty}^{\infty} \langle \psi_t | \psi_t \rangle dz = \frac{1}{2} \int_{-\infty}^{\infty} |f(z-z_+,t)|^2 \langle v_+ | v_+ \rangle dz + \tag{22}$$
$$\frac{1}{2} \int_{-\infty}^{\infty} |f(z-z_-,t)|^2 \langle v_- | v_- \rangle dz$$
$$= \frac{1}{2} \int_{-\infty}^{\infty} |f(z-z_+,t)|^2 dz +$$
$$\frac{1}{2} \int_{-\infty}^{\infty} |f(z-z_-,t)|^2 dz,$$

is obtained from Eq. (20), where $$\int_{-\infty}^{\infty} |f(z-z_+,t)|^2 dz = \int_{-\infty}^{\infty} |f(z-z_-,t)|^2 dz = 1 \tag{23}$$

is obtained from Eqs. (16) and (19). As already noticed, both $\psi_0$ given by Eq. (12) before the incidence on the magnet and $\psi_t$ given by Eq. (20) on the detection plane have been expressed such that the spin of each individual silver atom is indistinguishable from one another. Consequently, when the probability density on the detection plane is calculated simply, a half of a silver atom with + spin and a half of a silver atom with − spin are simultaneously obtained as seen from Eq. (22). In this way, the experiment is clearly contradicted when the principle of superposition of states is applied to each individual atom. In a case like this, according to the Copenhagen interpretation, the superposed state is supposed to reduce to either one of the two states caused by the action of observation. However, there is no evidence of physical causality for this process of wave-function reductions. Consequently, restating the conclusion again, application of the superposition principle to every eigenstate of each single silver atom in order to represent the state of the single silver atom is essentially impossible as in the case of Eq. (1) representing the state of a single two-level molecule. When both the statistical wave function corresponding to an ensemble of particles including all particles supplied to an experiment and the statistical eigenfunctions each of which corresponds to a subensemble including particles having the same eigenvalue are determined, a statistical wave function for all of the particles is expressed by a linear combination of the statistical eigenfunctions individually defined for every eigenvalue. Assuming that this statistical principle can rationally describe or predict only the result of the experiment, all of the contradictions will be resolved. Here, it is essential to normalize these statistical wave function and statistical eigenfunctions. Then the sizes of individual subensembles corresponding to eigenfunctions are expressed by the squares of the absolute values of individual coefficients that are used to express the statistical wave function in the linear combination of individual eigenfunctions.

Incidentally, the phenomena of wave-function reduction or collapse must be explainable based on the causality from the standpoint that the wave functions really exist. This problem will be elucidated as one of the most fundamental subjects in the first step 7.1.1. of the later stage of this invention. Incidentally, this subject indicates the existence of the most fundamental relativity or symmetry that must always be kept in any mechanical system for describing the motion of each free particle.

When both the real wave functions and the statistical wave functions are defined as described above, the necessity of discriminating between these two types of wave functions arises. One way is, as already shown, to denote the real wave function by $\Psi$ and the statistical wave function by $\psi$. The meaning of the statistical wave function $\psi$ is quite different from that of the conventional probability wave function $\psi$. Suppose, for example, that the total number of silver atoms is 100 and these 100 atoms are regarded as an ensemble. Then let the state of the ensemble be expressed by normalized statistical wave function $\psi$. Further, regard 50 silver atoms with + spin as a subensemble, and then attach the coefficient $1/\sqrt{2}$ to the normalized statistical wave function $\psi_+$ in order to show that $\psi_+$ represents the state of the subensemble. The same also applies to 50 silver atoms with − spin. With these definitions, since the total number of silver atoms supplied to the experiment is assumed to be 100, Eq. (20) shows that the 50 silver atoms with − spin should be detected on the positive (+) side of the z axis and the 50 silver atoms with + spin should be detected on the negative (−) side (Refer to FIG. 2). In this case, since each of the ensembles of silver atoms is formally regarded as an abstract particle, the variables z and t cannot be variables in real space time but represent abstract space-time coordinates. It may be considered that, as in the conventional case, a mathematical space like a Hilbert space should correspond to such the abstract space time. However, as only these definitions are insufficient, a procedure must be determined to derive the statistical wave function $\psi$ from each individual real wave function $\Psi$ associated with each individual particle. This procedure will be explained concretely, as already indicated, in certain embodiments in the later stage of this invention.

Now, the discussion will return to Bohm's analysis of the Stern-Gerlach experiment.

Bohm dealt with the motion of each silver atom along the x axis classically in contrast to dealing with the motion along the z axis quantum mechanically. However, as already pointed out, quantum mechanics is of no use for calculating the trajectories of silver atomic beams arriving at the detection plane in this experiment, and classical mechanics should be applied to both of the motions along the x axis and z axis. This is because, as will be shown in 5.5.2., the uncertainty principle by Heisenberg includes errors and there exists a trajectory also in the motion of each individual microscopic particle. The force working on a silver atom in the magnetic field is given as follows (Refer to D. Bohm, the above-mentioned book, p. 326, Eq. (68)):

$$F = \mu \nabla (\sigma \cdot B). \tag{24}$$

In the case of this experiment, through application of Eq. (9) etc. used by Bohm to approximate the interaction between a silver atom and the magnetic field in the gap of the electromagnet, the above equation can be written as $$F_z = \mu \frac{\partial B_z}{\partial z} \sigma_z \doteq \mu B'_0 \sigma_z. \tag{25}$$

It is seen from Eq. (24) that $F_z$ expressed by Eq. (25) primarily represents the magnitude of a vector directed along the z axis. Accordingly, since the magnetic moment $\mu$ expressed by Eq. (7) is negative, the direction of the force working on the silver atom becomes opposite to the direction of the gradient $B_0'$ of the magnetic flux density or the direction of the spin. In this experiment, since the direction of $B_0'$ coincides with that of the magnetic flux density $B_z$, a silver atom with $\sigma_z=1$, that is, a upward spin, receives a downward force and a silver atom with $\sigma_z=-1$, that is, a downward spin, receives an upward force. Here, on the x axis shown in FIG. 2, when the origin of space-time coordinates is temporarily fixed to the entrance of the electromagnet, the Newtonian equation of motion in the z direction is, with the use of mass M of a silver atom, given by $$M \frac{\partial^2 z(t)}{\partial t^2} = F_z. \tag{26}$$

On the other hand, since x=vt, the trajectories of individual silver atoms from the entrance to the exit of the electromagnet are determined according to the initial conditions set temporarily and the above equation in the xz plane as the two parabolas symmetrical with respect to the x axis as shown below:

$$z = \pm \frac{\mu B'_0}{2Mv^2} x^2. \tag{27}$$

Denoting the length of magnetic poles in the direction along the x axis by l, the z coordinates of individual silver atoms at the exit of the electromagnet are written as $$z = \pm \frac{\mu B'_0}{2Mv^2} l^2 \tag{28}$$

and from the gradients of tangential lines at x=l of the parabolas Eq. (27), it is seen that the z components $v_z$ of the velocities are expressed as $$v_z = \pm \frac{\mu B_0' l}{Mv}. \quad (29)$$

In addition, if the distance from the exit of electromagnet to the observation plane is denoted by d, the time taken by a silver atom moving from the exit to this plane is d/v. Ultimately, the positions of individual atoms on the observation plane are given as $$z_\pm = \pm \frac{\mu B_0' l^2}{2Mv^2} + V_z \frac{d}{v} = \pm \frac{\mu B_0' l^2}{2Mv^2} \pm \frac{\mu B_0' l d}{Mv^2} = \pm \frac{\mu B_0' l}{Mv^2}\left(\frac{l}{2} + d\right). \quad (30)$$

Setting d=0 and $\Delta t = l/v$ in the above equation, the z coordinates of individual silver atoms at the exit of electromagnet are expressed as $$z_+ = \frac{\mu B_0'(\Delta t)^2}{2M} < 0, \quad (31)$$

$$z_- = -\frac{\mu B_0'(\Delta t)^2}{2M} > 0.$$

By substituting t with $\Delta t$ in Eq. (21) derived by Bohm, since this Eq. (21) can be directly compared with the above Eq. (31), it is noticed that two errors, i.e., the signs and the physical quantity of denominators, exist in Eq. (21).

Eq. (31) gives the z coordinates of individual silver atoms, which travel along the x axis, at the exit of the electromagnet. The positions $z_+$ and $z_-$ where individual silver atoms arrive at the observation plane are given by Eq. (30). Finally, with the use of $z_+$ and $z_-$ obtained from Eq. (30), the distribution of all the silver atoms on the observation plane can be derived from Eq. (20) as $$\langle \psi_t | \psi_t \rangle = \frac{1}{2}|f(z-z_+, t)|^2 + \frac{1}{2}|f(z-z_-, t)|^2. \quad (32)$$

Consequently, if the silver atomic beam collimated by the two slit apertures is supposed to be parallel to the x axis, the distribution of all the silver atoms can be determined by substituting $z_+$ and $z_-$, which are obtained by applying classical mechanics, for $z_+$ and $z_-$ in the above equation.

In the analysis of the Stern-Gerlach experiment by Bohm, an equivocal method was used in such a manner that classical mechanics is applied to the motion along the x axis and quantum mechanics is applied to the motion along the z axis of each individual particle. Even if classical mechanics was applied only to the motion along the x axis, applying classical mechanics clearly contradicts the argument by Bohm himself stating that the trajectory for each microscopic particle does not exist. (The following description stating that "the momentum and position of every particle cannot even exist with simultaneously and perfectly defined values" is seen in Bohm, the above-mentioned book, pp. 100-101. If so, it turns out that every particle has no trajectory.) When dealing with this problem, aside from whether or not both Eq. (11) representing the spin and Eq. (24) expressing the interaction between the spin and the magnetic field are correct, basically as shown above, statistical wave mechanics should be used for obtaining the distributions of individual silver atoms on the observation plane and classical mechanics should be used for finding the centers $z_+$ and $z_-$ of the respective distributions. That is, a method of using suitable roles of respective mechanics should be employed.

However, the more essential problems in Bohm's analysis of the Stern-Gerlach experiment exist in Eqs. (10) and (24) representing the interaction between the spin and the magnetic field. The Hamiltonian Eq. (10) concerning this interaction shows that the magnetic field acting on the magnetic moment of a silver atom is generally divided into a homogeneous component and an inhomogeneous component and, therefore, the magnetic moment of that silver atom shows different reactions to those components. This expression has been obtained by artificially dividing the magnetic field on the left hand side of Eq. (8) into the two terms on the right hand side. It is natural to consider that this division does not occur naturally. This is because it is difficult to imagine that the magnetic moment of an extremely small silver atom having an arbitrary direction reacts by discriminating whether or not the magnetic field is homogeneous, including both the direction of the magnetic field and direction of the gradient of inhomogeneity of the magnetic field, during the short time $\Delta t = l/v = 5.5 \times 10^{-4}$ sec. In the end, as in relativistic quantum mechanics, questions on the model of the spin and its associated magnetic moment remain also in nonrelativistic quantum mechanics.

Here, referring to another article (H. Ezawa, Chap. 10 The development of the quantum theory and paradoxes in "Quantum Mechanics and New Technology", ed. by Physical Society of Japan (Baifukan, Tokyo, 1987), pp. 204-242 (in Japanese); refer to pp. 221-225 concerned with the analysis of the Stern-Gerlach experiment) in which detailed results of analysis on the Stern-Gerlach experiment are described, the behavior of each silver atom in the gap between the magnetic poles will be reexamined.

As the original article will be referred to for details, only the main points will be described in the following:

(1) The wave function $\phi_{+out}$ related to the upward spin and emitted from the electromagnet represents the state of each individual silver atom in motion with the momentum $p_x = \hbar k$, $p_y = 0$, $p_z = \hbar \mu B_0'1/2E$ (E denotes the average of kinetic energy of each individual silver atom that is emitted from a furnace at temperature 1320 K or, more exactly, 1323 K). Each individual atom represented by the wave function $\phi_{+out}$ has an additional downward momentum $\Delta p_z = \hbar \mu B_0'1/2E$ in comparison with the wave function $\phi_{+in}$ incident on the electromagnet. The wave function $\phi_{-out}$ related to the downward spin has an additional upward momentum $-\Delta p_z$ in comparison with the wave function $\phi_{-in}$. This shows that the wave representing the motion of a silver atom passing through the gap between the magnetic poles splits into a component curving downward and another component curving upward in accordance with the spin of the silver atom. These momentum variations $\pm \Delta p_z$ also agree with those predicted by classical mechanics and are represented by $$\pm \Delta p_z = \pm \frac{\mu B_0' l \cdot \hbar k}{2E} \sim \mp 1.2 \times 10^{-24} \mathrm{kg} \cdot m \cdot s^{-2}. \quad (33)$$

(2) The average wavelength of silver atoms incident on a slit having a width of 0.03 to 0.04 mm becomes $6.7 \times 10^{-6}$ μm using $\lambda = p/h$. If the width of the slit is 30 μm, this width is approximately $4.5 \times 10^6$ times the average wavelength. Inferring from l=3 cm and FIG. 1 (Ann. Phys. 74, 673 (1924)), if the distance (D in FIG. 2) from the slit to the observation plane is assumed to be approximately 3.5 cm, the diffraction of a wave associated with each individual silver atom by the slit can be ignored on this plane. Because being able to ignore this diffraction means to be able to ignore the wave nature of each individual silver atom, the split of each wave seen in the above item (1) may be considered to actually correspond to the split of the atomic rays. (The discussion on this item in the original article based on the uncertainty principle has been changed into a more fundamental discussion based on the diffraction phenomena.)

(3) Each individual silver atom moving on the x axis collides with a glass plate after it passes through the gap between the magnetic poles. Since the distance d between the magnetic poles and the glass plate is unknown, calculation of $\Delta z = z_- - z_+$ will be attempted by assuming that the observation plane is positioned at the exit of the magnetic poles. According to the results of the analysis of items (1) and (2), each silver atom with mass M is expected to approximately take a parabolic trajectory. Therefore, Eq. (33) readily gives $$\Delta_z = 2 \times \frac{1}{2} \frac{|\Delta p_z|}{M} \frac{l}{v} = \frac{\mu B_0'(\Delta t)^2}{M} \sim 0.36 \text{ mm}, \left(\text{where } \Delta t = \frac{l}{v}\right). \quad (34)$$

Since $\Delta z \sim 0.36$ mm in the above equation is the distance between the two split silver atomic rays at the exit of the gap between the magnetic poles, error in FIG. 2 according to Bohm's original drawing in which the track of the silver atomic rays does not split to the exit of the gap between the magnetic poles is immediately revealed. In addition, substituting the following data, that is, $\mu = -0.93 \times 10^{-23}$ J/T, $(B_0 \sim 1.8$ T,) $B_0' \sim 2.4 \times 10^3$ T/m, $l = 3 \times 10^{-2}$ m, $v \sim 5.5 \times 10^2$ m/s, and $M = 1.8 \times 10^{-25}$ kg used in the aforementioned literature (H. Ezawa, the above-mentioned book), into Eq. (31) derived by applying the classical theory, $\Delta z \sim 0.36$ mm is obtained in agreement with Eq. (34). Note that in the actual Stern-Gerlach experiment, $\Delta z = 0.20$ mm was obtained on the observation plane that is slightly separated from the exit of the electromagnet.

In the above literature, it was mentioned that one must not think classical mechanically such that a silver atom with a downward spin, for example, curves up by receiving an upward force while passing through the gap between the magnetic poles. This is because, according to quantum mechanics, since the reduction of a wave packet takes place at the moment when each silver atom collides with the glass plate, only one single atom with either − spin or + spin should probabilistically be detected on the positive or negative side of the z axis respectively. In other words, it means that the silver atom in the state of superposition of the two different spins must not be described as having either one of the two spins before its detection.

However, the above analysis conforming to quantum mechanics has no consistency with the results of analysis shown in the above items (1) and (2). This is because it has been described in the analysis of item (1) that 'these momentum variations $\pm \Delta p_z$ also agree with those predicted by classical mechanics'. If so, whether the observation plane is placed at the exit or inside of the gap between the magnetic poles, as long as the silver atomic rays split into two, the experimental result that should be obtained is that each single atom detected at $z = z_- > 0$ always has a − spin and that detected at $z = z_+ < 0$ always has a + spin. Actually, this result had been obtained at least on the observation plane in the Stern-Gerlach experiment so that it is possible to argue this problem classical mechanically.

Further, also in the above literature, the following idea was introduced: Superpose two waves that have been vertically split between the magnetic poles by passing through another pair of magnetic poles etc. without any intermediate observation. Then, by observing whether or not interference occurs, it will be seen whether or not the reduction of a wave packet occurs for the first time on the glass plate. Since Bohm has tried a similar thought experiment, this problem will be considered again in 5.3.4. (A conclusion that the interference cannot occur will be obtained).

5.3.3. The Stern-Gerlach Experiment and a Hypothesis of Particles with Magnetic Charges In FIG. 2, in spite of the direction of each silver atomic spin being random at the time of incidence on the gap between the magnetic poles, the reason why each atom draws either one of the two parabolic trajectories in the gap will be deduced. It is understandable to regard that the factor in each silver atom reacting to the magnetic field exists not in a vector quantity like the magnetic moment having a direction but in a scalar quantity with a positive or negative sign. If so, because such physical quantity of reacting to the gradient of magnetic field like a scalar is unknown, one may recall a magnetic charge as a physical quantity reacting to the magnetic field like a scalar. A silver atom with an upward spin should have a magnetic charge corresponding to the S pole instead of the spin or its associated magnetic moment, and a silver atom with a downward spin should have a magnetic charge corresponding to the N pole. Distinguishing by sign, the sign of a magnetic charge corresponding to the S pole should usually be − and the sign of a magnetic charge corresponding to the N pole should be +. However, because of $\nabla \cdot B = 0$, magnetic charges do not exist in electromagnetism.

The magnetic moment of each silver atom can be considered to be caused by a 5 s electron in the outermost shell. As already mentioned, from the relativistic viewpoint, an electron having an internal degree of freedom quantized binary with a negative and a positive value, i.e., a quantum number other than an electric charge suggests that the electron is not an elementary particle but a composite particle having an internal structure. Accordingly, taking the above examination of the Stern-Gerlach experiment into consideration, it is natural to deduce that an electron is the composite particle consisting of a charged particle having −e and a particle having + or − magnetic charge. If so, then an electron that is a charged particle having −e and a positron that is also a charged particle having +e can respectively combine with either one of the two types of particles having the relationship between a particle and an antiparticle with respect to magnetic charges, resulting in formation of a group consisting of 4 types of different particles. In addition, in the case of allocating a pair of electrons to an orbit of an atom, the potential energy of a pair electrons combined with magnetic charged particles having different signs should be lower than that of a pair of electrons combined with magnetic charged particles both having the same sign. The reason why the Pauli exclusion principle holds can be understood through such consideration. When the magnetic field is applied to a silver atom, the difference in potential energy and difference in direction of the force working on the silver atom arise in accordance with whether the magnetic charged particle combined with the 5 s electron has a + magnetic charge or a − magnetic charge. Consequently, the anomalous Zeeman effect and the phenomenon in the Stern-Gerlach experiment can reasonably be explained simultaneously.

It is known that in spin-1/2 nucleons, a neutron having no electric charge also has a magnetic moment. If the magnetic moment and the electric charge have no relation, those particles including Dirac particles each having a magnetic moment may need to be substituted with particles each having a magnetic charge. However, since the magnetic moment of each nucleon is smaller than that of each electron, the value of a unit magnetic charge cannot be specified at the present stage. Incidentally, Dirac predicted the existence of a magnetic monopole as a particle having a + or a – magnetic charge (in 1932). In this case, a unit magnetic charge $q_m$ can be expressed as follows (The physics and chemistry dictionary, Iwanami Book Co. (2003), p. 568 (in Japanese)):

$$q_m = \frac{2\pi \hbar c}{e}. \tag{35}$$

In the Stern-Gerlach experiment, new particles each having a magnetic charge $q_m$ instead of a spin accompanied by a magnetic moment will be introduced to attempt derivation of $\Delta z$. For simplicity, it is assumed that a homogeneous magnetic field $H_0$ exists in the region where each silver atom passes from the entrance to the exit of the electromagnet. Then, for the above silver atom, the equation of motion in the z direction is given by $$M \frac{d^2 z(t)}{dt^2} = \pm q_m H_0. \tag{36}$$

Accordingly, $F_z = \mu B'_0 \sigma_z = \pm \mu B_0$ in Eq. (25) should be substituted by $F_z = \pm q_m H_0$. By making this substitution in Eq. (26), the z coordinates of each individual silver atom at the exit of the electromagnet are written from Eq. (27) as $$z = \pm \frac{q_m H_0}{2Mv^2} l^2. \tag{37}$$

From the above equation, one finally obtains $$\Delta z = z_- - z_+ = \frac{q_m H_0 l^2}{Mv^2}. \tag{38}$$

Here, with the use of $z_+ - z_- \sim 0.2$ mm*, $B_0 = \mu_0 H_0 \sim 1.8$ T*, $l = 3 \times 10^{-2}$ m*, $v \sim 5.5 \times 10^2$ m/s, and $M = 1.8 \times 10^{-25}$ kg (Refer to H. Ezawa, the above-mentioned literature etc.: References of these data each with a * mark at the right shoulder are from W. Gerlach and O. Stern, Z. Phys. 9, 349 (1922); ibid. 353 (1922); Ann. Phys. 74, 673 (1924). Furthermore, the silver atomic velocity v means the average velocity $\overline{V}$ which is derived using the equation $m\overline{V}^2/2 = 3kT/2$ relating the temperature of the electric furnace T=1050° C.=1323 K to the average velocity $\overline{V}$ of thermal motion, k being a Boltzmann constant), we obtain $$q_m \sim 8.4 \times 10^{-27} \text{N·m·A}^{-1}, \tag{39}$$

where $\mu_0$ is the magnetic permeability of a vacuum, i.e., $\mu_0 = 4\pi \times 10^{-7}$ N·A$^{-2}$. Then, from Eq. (35), the absolute value of the unit magnetic charge of Dirac's magnetic monopole becomes $q_m \sim 2.6 \times 10^{-14}$ N·m·A$^{-1}$. Thus, it is seen that the unit magnetic charge of Dirac's magnetic monopole is approximately $3.1 \times 10^{12}$ times the above magnetic charge, which each electron may have according to the consideration based on the Stern-Gerlach experiment.

Suppose that common particles called electrons are composite particles each accompanying an extremely light particle having the above-mentioned magnetic charge. Then the reason why these magnetic charges have never been discovered so far in the experiments in which apparatus that are able to generate intense magnetic fields such as accelerators have been used will be considered. For example, an electron beam will be used instead of the silver atomic beam in the Stern-Gerlach experiment. Although electrons cannot actually proceed in the xz plane due to the Lorentz force, each electron is assumed here to move in this plane ignoring the above force. Assume that the kinetic energy of an electron emitted by its source not shown in the drawing is 10 eV, which is comparatively low. In this case, the velocity of the electron is $v \sim 1.9 \times 10^6$ m/s. Because of the low velocity, the mass of the moving electron is equal to its rest mass $M = 9.1 \times 10^{-31}$ kg. $\Delta z \sim 3.2$ μm is obtained from Eq. (38) using these values, the magnetic charge given by Eq. (39), $l = 3 \times 10^{-2}$ m, and $\mu_0 H_0 = 1.8$ T. Since the velocities of electrons emitted by an electron gun are much faster, $\Delta z$ becomes smaller. Hence, even if each electron has the magnetic charge given by Eq. (39), it is very difficult to notice the existence of this magnetic charge in usual experiments. Incidentally, if a spin and its associated magnetic moment can be substituted by the magnetic charge, the shapes of tops of magnetic poles for the electromagnet in the Stern-Gerlach experiment need not be made extremely asymmetric sandwiching the gap between the poles.

Discussion of the magnetic charges will end once here, returning again to the analysis of the Stern-Gerlach experiment.

5.3.4. A Thought Experiment of Interference Using Two Stern-Gerlach Electromagnets Bohm, like Dirac, did not clearly recognize the essential difference between the 'principle of interference' and the 'principle of superposition of states'. Consequently, he though that the cause of interference terms not appearing when the 'principle of superposition of states' is applied to each individual particle is that uncontrollable phase disturbances, which are based on interaction with an observation apparatus, imposed on the wave function representing each individual eigenstate arise when each individual observation is carried out. In other words, Bohm considered that, when a silver atomic beam split into two by the electromagnet are superposed again without observing on the observation plane, interference between the two eigenfunctions concerning different eigenvalues might occur.

FIG. 3 shows an apparatus for a silver atomic interference experiment in which two of the electromagnet used in the Stern-Gerlach experiment are arranged in tandem as proposed by Bohm (D. Bohm, the above-mentioned book, pp. 604-605: Refer especially to FIG. 3). However, contrary to Bohm's intention, this apparatus does not work as an interferometer. There are two reasons. One reason is that, although this drawing shows a situation of an atomic beam split into two by the first electromagnet and then bent by magnetic fields along the y axis, these atomic beams cannot be bent in a plane vertical to the magnetic fields in such manners as illustrated in this drawing since each silver atom is neutral. The second reason is that, although this drawing shows two atomic beams superposed into one beam just at the entrance of the second electromagnet as illustrated in the small circle indicated by a broken line, it is impossible for these beams to individually curve by themselves in space where no types of fields exist. Both of these situations contain rudimentary errors. In this case, if only superposition of two atomic beams is performed, a method using transmission type diffraction gratings is available. However, the essence of this problem is not merely in superposing two split atomic beams again but, from the beginning, in whether or not the Stern-Gerlach electromagnet has the same function for the atomic beam as the function of a beam splitter for a light wave. The answer to this question is clearly no. This is because, as shown in FIG. 2, a silver atom with + spin traces a trajectory of an oblique downward line and a silver atom with − spin draws another trajectory of an oblique upward line after passing through the gap between the magnetic poles. Thus the trajectory available for the silver atom is determined depending solely on the sign of its spin. The configuration shown in FIG. 3 utilizing the electromagnets each of which can never work as a beam splitter cannot be used as an interferometer.

Although the answer has already been obtained, a theoretical examination for confirmation will be given to the problem of whether or not an atomic beam with + spin and another atomic beam with − spin can interfere with each other. The 'principle of interference' according to Dirac states that each particle interferes only with itself and interference between two different particles never occurs. Consequently, if a Stern-Gerlach electromagnet has the function of a beam splitter, it means that a probability wave representing each single silver atom with + spin, for example, is included in either of two split silver atomic beams. Therefore, interference should take place by superposing the two atomic beams again. However, as easily seen from the result of the Stern-Gerlach experiment, this electromagnet does not function as a beam splitter. Thus, this problem of interference results in a simple question of whether or not an atom with + spin and an atom with − spin can be identical. In other words, it is a question of whether a 5 s electron in the outermost shell of a silver atom is able to have both an upward spin and a downward spin simultaneously. The answer is obviously no. That is, the atom with the upward spin and the atom with the downward spin are different atoms with different 5 s electrons. Thus, provided that the above spin eigenvalues are generally substituted by arbitrary eigenvalues, the following fundamental principle of crucial importance is obtained: 'It is impossible for a single particle to have different eigenvalues simultaneously.' It can be seen that the Schrödinger's cat paradox has never been able to exist from the beginning even for microscopic particles. Ultimately, with respect to the two spin eigenfunctions $v_+$ and $v_-$, it gives $$<V_+|V_->=0. \quad (40)$$

This fundamental principle has already been applied to Eq. (1).

Incidentally, denoting an eigenfunction having an eigenvalue a by $\psi_a$ and another eigenfunction having an eigenvalue a' by $\psi_{a'}$, Bohm himself stipulated that $<\psi_a|\psi_{a'}>=0$ when a≠a' (D. Bohm, the above-mentioned book, p. 222). $<\psi_a|\psi_{a'}>=0$ means that interference between $\psi_a$ and $\psi_{a'}$ never occurs. As shown above, the interference between different spin eigenfunctions, which is once tried to be identified even by proposing a dysfunctional interferometer shown in FIG. 3, has been completely denied also by Bohm himself. Consequently, the hypothesis stating that observation of only silver atoms having either one of the two spins at the observation plane in the Stern-Gerlach experiment is due to the wave function reducing to either one of the two eigenstates at the moment of the observation accompanied by disturbances added to the phases of the two eigenfunctions is completely negated. However, as will be shown later, when Bohm analyzed his version of the EPR experiment, each individual event of the phase disturbances imposed on each system being observed caused by each interaction of the system with the observation apparatus was still considered in that analysis, although this event has no evidence.

The simple and clear principle obtained above stating that 'it is impossible for a single particle to have different eigenvalues simultaneously' is represented similar to Eq. (40) as $$|V_+>|V_->=0. \quad (41)$$

This is because, if a single particle does not have two eigenvalues simultaneously, either $|v_+>=0$ or $|v_->=0$ is valid. Eq. (41) together with Eq. (40) means that, for at least each single particle system, a state represented by any product of different eigenfunctions cannot really exist. Provided that a single particle cannot have two eigenvalues simultaneously, it can be shown that Bohm's version of the EPR thought experiment for two-particle systems cannot be justified. If it is so, the existence of quantum mechanical nonlocal correlation that is described as being derived from the EPR thought experiment should also be negated. Keeping Eq. (41) in mind, detailed examination of Bohm's version of the EPR thought experiment will be carried out in the following:

5.3.5. Bohm's Version of the EPR Thought Experiment

Bohm's version of the EPR thought experiment can be regarded as an application of the Stern-Gerlach experiment for measuring a magnetic moment accompanied by the spin to two-particle systems. As already mentioned, since the 'principle of superposition of states' for each single particle is not valid, and, as will be shown later, the Heisenberg uncertainty principle does not hold, the uncertainty principle for the spin also cannot exist. Consequently, Bohm's version of EPR experiment cannot be a thought experiment for negating the conclusion by Einstein et al. (Refer to A. Einstein, P. Podolsky, and N. Rosen, the above-mentioned paper). In addition, according to Bohm, if the particles are numbered 1 and 2 respectively, the state of the above two-particle systems can be represented by a superposition of the two products obtained by multiplying two spin eigenstates for respective particles $|v_+(1)>|v_-(2)>$ and $|v_-(1)>|v_+(2)>$, that is, an "entangled state". According to Eq. (41), since $|v_+(1)>$ and $|v_-(1)>$ cannot exist at the same time, the above "entangled state" also cannot physically exist. In this way, Bohm's version of the EPR thought experiment cannot hold with a double meaning. However, actually, the existence of hidden variables has been regarded as being denied by Bohm's version of EPR experiments, which were carried out by substituting the spin with the polarization of individual photons, and the results of those experiments have been interpreted as supporting quantum mechanics associated with nonlocal correlations (Refer to L. E. Ballentine, Am. J. Phys. 55, 785 (1987)). It will be shown in the following that the nonlocal correlations are not the phenomena peculiar to quantum mechanics but the causality or correlations provided in classical mechanics from the beginning.

FIG. 4 schematically illustrates Bohm's version of the EPR experiment. Suppose that a spin-0 molecule at the center of this drawing indicated by a x mark has split into two atoms having reversed spins. The particles 1 and 2 after splitting mutually proceed in opposite directions on the x axis and then impinge on the Stern-Gerlach electromagnets respectively. Every magnetic field is orientated along the z axis. For example, the particle 1 incident on the first electromagnet traces a trajectory approximated by either an upward or downward parabola according to the sign of the spin while passing through the gap between the magnetic poles. When the particle after passing through the electromagnet has a − spin, the particle will be detected by a detector 1, and when it has a + spin, it will be detected by a detector 2. By applying the principle of superposition of states to the two-particle system consisting of the two free particles having the reversed spins, the state of z components of the spins for the two-particle system at the observation planes can be written as follows (Refer to D. Bohm, the above-mentioned book, p. 617):

$$\psi = \frac{1}{\sqrt{2}}[u_+(1)u_-(2)e^{i\alpha_c} + u_-(1)u_+(2)e^{i\alpha_d}] \quad (42)$$

where $u_+(1)$ denotes the spin eigenfunction of the particle 1 with + spin and $u_-(1)$ denotes that of the particle 1 with − spin, either of which should be detected at the right-hand observation plane. Hence, for the particle 2 that should be detected at the left-hand observation plane, $u_-(2)$ means the spin eigenfunction with − spin and $u_+(2)$ means that with + spin. $e^{i\alpha_c}$ and $e^{i\alpha_d}$ introduced by Bohm indicate phase disturbances imposed on the state of the two-particle system and caused by the observation apparatus. As already explained, such phase disturbances cannot physically exist and thus can be essentially ignored. However, when conforming to Bohm's view, if these phase factors do no exist, interference should occur, resulting in contradicting the experimental result. Although Eq. (42) does not hold physically, an interpretation of this equation will be introduced along the line of Bohm's idea below:

Eq. (42) shows that, when the particle 1 with + spin is observed at the right-hand observation plane, the particle 2 with − spin should be observed at the left-hand observation plane and that particles with spins having the same signs should never be observed at both observation planes. Accordingly, at the moment when the particle 1 with + spin is detected at the right observation plane, it can be predicted with 100% probability that the particle 2 with − spin will be detected at the left observation plane without making any observation. Thus, according to the criterion determined by Einstein et al. stating that, when a physical quantity of a particle can be measured without imposing any disturbance on the particle, the quantity really exists, the z component of the spin of the particle 2 is actually a real physical quantity.

Here, supplementary explanations will be given for Eq. (42). It has already been mentioned that Eq. (42) represents an "entangled state". According to Eq. (42), at the moment the spin of the free particle 1 is known, the spin of the free particle 2 should also be known without any measurement. This has been called a 'nonlocal correlation' in quantum mechanics and an EPR effect in quantum cryptographic communications. However, the appearance of this correlation has been caused by representing the state of each two-particle system as the product of two different eigenfunctions of the different particles. For example, in the case of the term $u_+(1)u_-(2)$, when the spin of the particle 1 is observed as +, since the eigenfunction $u_+(1)$ collapses according to the Copenhagen interpretation, $u_+(1)u_-(2)$ collapses without even any observation of the particle 2, resulting in observing that the spin of the particle 2 is −. On the other hand, since $u_-(1)$ collapses the instant that the spin of the particle 1 is measured as +, $u_-(1)u_+(2)$ also collapses as a result. Consequently, the quantum mechanical 'nonlocal correlation' turns out to have been caused by representing the state of each two-particle system as the "entangled state". However, as shown in Eq. (41), since the particle 1, for example, cannot take on the different states $u_-(1)$ and $u_+(1)$ simultaneously, $u_+(1)u_-(2)$ and $u_-(1)u_+(2)$ represent two states that cannot exist simultaneously. Therefore, as easily understood, the "entangled state" is a state that cannot actually exist. Since Eq. (42) itself is invalid, if the 'nonlocal correlation' is detected in an experiment, the 'nonlocal correlation' is nothing but an outcome of the fact that the law of conservation of angular momentum is kept in each two-particle system when the spin is regarded as an angular momentum of each particle. In an experiment that has been performed by substituting the spin of each particle with the polarization of each photon in Bohm's version of the EPR experiment, the state of polarization of each free two-photon system can be represented by an equation similar to Eq. (42). However, this is because a pair of photons having mutually orthogonal polarizations each emitted from a source in mutually opposite directions maintains the respective states of polarization while propagating through the free space. As a result, the conclusion obtained is that, in the experiment, not the quantum mechanical 'nonlocal correlation' shown by Eq. (42) but only a fraction of correlations or causalities based on the various laws of conservation in classical mechanics has been observed.

The result obtained above has shown that the argument that the discrimination between a quantum mechanical correlation and a classical mechanical correlation is not possible in each two-particle system is incorrect. This is because the reality of an "entangled state" of the two-particle system itself has been negated. Consequently, it turns out that an "entangled state" does not exist even in each many-particle system of three or more particles. It can be understood after all that super-high-speed quantum computers utilizing "entangled states" generated among many quantum bits cannot be realized for the use of decryption.

The relationship between Bohm's version of the EPR experiment and an uncertainty relation between individual components of the spin will be examined based on the descriptions by Bohm himself.

Eq. (42) represents the state of a total system in the case of observing the z component of each spin of the two particles. In order to relate this observation to the uncertainty principle on the angular momentum, one may next observe, for example, the y component of each spin of the two particles. Therefore, in FIG. 4, after rotating only the two electromagnets and four detectors at the observation planes into a unit as one body 90 degrees around the x axis, the spins should then be measured. Here, the yz-coordinate system fixed to the observation plane must not be rotated. This is because, if the coordinate system is rotated, the y component will not to be observed. In this rotated system, denoting the two spin eigenfunctions by $v_+$ and $v_-$, the state of each two-particle system is written as $$\psi = \frac{1}{\sqrt{2}}[v_+(1)v_-(2)e^{i\alpha_c} + v_-(1)v_+(2)e^{i\alpha_d}] \quad (43)$$

(Refer to Bohm, the above-mentioned book, p. 618). Consequently, if the y component of the spin of the particle 1 is measured, the y component of the spin of the particle 2 is known without any measurement. Referring to the criterion for reality defined by Einstein et al., the y component of the spin of the particle 2 is determined as a real physical quantity. Since the z component of the spin of the particle 2 has been previously referred to as a real physical quantity, the uncertainty relation between these two components of the spin becomes invalid. However, these two components have not been able to be simultaneously measured. Since two arbitrary components of an angular momentum are noncommutable, these two components of the spin cannot have certain definite values simultaneously in accordance with the uncertainty principle. Accordingly, Bohm asserted that the criterion for the reality given by Einstein et al. had been incorrect.

Naturally, even if the spin is a real physical quantity and the two arbitrary components of the spin are noncommutable, the above-mentioned Bohm's conclusion is incorrect. The core of philosophy in the paper written by Einstein et al. is as follows: 'a proposition that two noncommutable physical quantities have certain definite values at the same time and another proposition that these quantities can simultaneously be measured with certainty are not identical'. It has turned out that, defining the criterion of real physical quantities directly connected with the uncertainty principle, Einstein et al. logically demonstrated the above fact reasonably, although it was rather indirect. Neither Bohr nor Bohm could negate the result that, when both the principle of superposition of states and the uncertainty principle are valid, two noncommutable physical quantities may be measured, only if not simultaneously, without imposing any disturbances. Therefore, the principles of quantum mechanics, i.e., the complementarity principle, the uncertainty principle, and the principle of superposition of states could not be protected until they considered the criterion of real physical quantities defined by Einstein et al. to be incorrect. Incorrectness of the principle of superposition of states has already been shown. Later, errors of the complementarity principle and the uncertainty principle respectively will be directly given. It is clarified now after 70 years that the assertion by Einstein et al. published in 1935 was correct after all.

It has been shown that Bohm's version of the EPR thought experiment has no physical meaning. However, since this thought experiment becomes good material for directly demonstrating the concepts of the spin and its associated magnetic moment being unnatural, this problem of the spin will be considered again by referring to FIG. 4.

Rotating the two electromagnets in FIG. 4 90 degrees gives Eq. (43) as the wave function $\psi$ representing the state of each two-particle system. Dealing with only the particle 1 for simplicity, this experiment agrees with the Stern-Gerlach experiment. In the arrangement of FIG. 2, the x axis viewed from the side of the atomic beam source is set as a rotational axis. After rotating only the slit-collimator and the electromagnet into a unit as one body 90 degrees counterclockwise around the x axis, a silver atom with a downward spin should then be detected on the positive side of the y axis and a silver atom with an upward spin should be detected on the negative side of the y axis. Next, the three components, i.e., the slit-collimator, the electromagnet, and the yz-coordinate system on the observation plane are rotated as one body 90 degrees counterclockwise around the x axis. In this case, a silver atom having a downward spin with respect to the z axis obtained after the above rotation will be detected on the positive side of the z axis and a silver atom with an upward spin will be detected on the negative side of the z axis. In spite of the direction of each individual spin of silver atoms incident on the gap between magnetic poles being random by nature, positive or negative directions of the spin of a detected silver atom always correspond to negative or positive sides of the position of the silver atom detected on the coordinate axis parallel to the magnetic field vector. In effect, in the experiment in which the unit consisting of the slit-collimator and the electromagnet is rotated or in the other experiment in which the other unit consisting of the above unit plus the yz-coordinate system on the observation plane is rotated, provided that the rotational angles in both cases are the same, the same pattern formed by evaporated silver atoms should be obtained depending only on the direction of the magnetic field vector irrelevant to the manner of setting the coordinate system on the observation plane. Consequently, setting the yz-coordinate system itself has no substantial meaning in this experiment. In other words, the key to this experiment is the direction of change of the strength of the magnetic field so that the distinction between the z component and the y component of the spin has no meaning. Accordingly, as in the Stern-Gerlach experiment, the distinction between Eq. (42) on the z component of the spin and Eq. (43) on the y component of the spin is meaningless also in the EPR thought experiment.

Ultimately, also in the above consideration, making spins as mere scalar quantities distinguished by their positive or negative signs is more natural than dealing with spins as vector quantities distinguished by whether their directions are upward or downward. In this case, Eq. (24) becomes invalid. Previously, also in the relativistic consideration in which a solution of a progressive wave has been derived from a rest solution of the Dirac equation by applying the Lorentz boost, unnaturalness has been seen in the manners of deciding the direction of the spin of the rest solution and of calculating the Lorentz transformation. The consideration on the Stern-Gerlach experiment given above in relation to Bohm's version of the EPR experiment has indicated experimentally that making the spin be a vector quantity is unnatural. If so, the conclusion here is that the anticommutation relation between the two arbitrary components of the spin does not exist, and therefore, the uncertainty relation between the two arbitrary components of the spin also does not exist.

The problems with the spin shown above will be summarized here. If the existence of the electron spin with its associated magnetic moment is recognized as conventional, each electron must be a composite particle having an internal structure according to the definition of elementary particles in special relativity. Even though an electron is a composite particle, if the spin and its associated magnetic moment are intrinsically irrelevant to each other, the existence of a scalar quantity must be assumed as a substitutable physical quantity for them. Then, this scalar quantity receives a force not in the direction of change in strength of a magnetic field but in both the positive and negative directions along the magnetic field vector. Such a scalar quantity does not exist except for a magnetic charge. Accordingly, a model having an electron as a composite particle consisting of a particle with an −e charge and a particle with a positive or negative magnetic charge is possible. Either model requires experimental verification.

Analysis by Bohm of the Stern-Gerlach experiment and Bohm's version of the EPR experiment has included every fundamental problem in quantum mechanics given below: (1) Confusion between the 'principle of superposition of states' and the 'principle of interference', (2) Application of the 'principle of superposition of states' to each single particle, (3) Existence of "entangled states" and 'nonlocal correlations', and (4) Existence of the uncertainty principle for individual components of a spin. In the case of single-particle systems, the 'principle of superposition of states' is the law in which the wave function for each system can be represented by a linear combination of eigenfunctions. If so, even in two-particle systems, the wave function for each system should be represented by a linear combination of every eigenfunction for individual particles. Consequently, the "entangled states" have been unnecessary from the beginning. The 'nonlocal correlations' demonstrated in experiments are, as already explained, nothing but one of the classical causalities based on the law of conservation of relativistic energy including the law of conservation of number of particles. There has been a fundamental error in excluding classical mechanics from physics of microscopic particles.

5.3.6. Opposition of the Dirac Equation to Special Relativity and its Cause

In the above, we have looked at concrete examples opposing both the Dirac equation and the concept of spins to special relativity. Ground for these oppositions is, if to inquire their origin, contained in the Dirac equation itself. Next, the ground for the Dirac equation contradicting special relativity will be clarified in detail.

The relativistic Hamiltonian of a free particle can be written as $$H=c\sqrt{p_x^2+p_y^2+p_z^2+m_0^2c^2}. \quad (44)$$

However, as long as the expression of the Hamiltonian remains as Eq. (44), even if a wave equation can be written by using the operators $\hat{E}$ and $\hat{H}$ as $$\hat{E}\psi=\hat{H}\psi, \quad (45)$$

this equation cannot be solved like the Schrödinger equation. Dirac newly contrived Dirac's Hamiltonian $H_D \equiv c\alpha \cdot p + \beta m_0 c^2$, and with the knowledge of $$c\sqrt{p_x^2+p_y^2+p_z^2+m_0^2c^2}=H \ne H_D=c\alpha \cdot p+\beta m_0 c^2, \quad (46)$$

he created his wave equation as $$\hat{E}\psi(\ne \hat{H}_D\psi)=(c\hat{\alpha}\cdot\hat{p}+\hat{\beta}m_0c^2)\psi, \quad (47)$$

where $\hat{\alpha}$, $\hat{\beta}$, and $\hat{p}$ are operators. Eq. (46) clearly has a defect. The irrational function $c\sqrt{p_x^2+p_y^2+p_z^2+m_0^2c^2}$ can never been mathematically and physically expressed by the rational linear function $c\alpha \cdot p+\beta m_0 c^2$ with respect to the variable p. Eq. (47) which can only be represented strictly by $\hat{E}$ $\psi \ne \hat{H}_D$ $\psi$ violates the equality E=H related to relativistic energy. The more fundamental meaning of this equality E=H, that is, the 'equivalence principle of energy E and Hamiltonian H', will be clarified as one of the four underlying subjects examined in the first step of the later stage of this invention. The equations defining relativistic energy are given only by Eq. (2) and Eq. (44). $H_D$ clearly cannot express the relativistic energy of each individual free particle. It is only natural that the Dirac equation violating the definition of relativistic energy opposes special relativity. The reason why the Dirac equation is not covariant under the usual Lorentz transformation in free space is that, as already pointed out and shown above again, the free Dirac equation itself is not a wave equation valid in real space-time. Thus, every wave equation in quantum mechanics shown in FIG. 1 illustrating an old system of mechanics is not a wave equation in real space-time after all.

Dirac's theory of electrons that is said to be relativistic is currently highly appreciated as the highest and most detailed theory and utilized as a teaching material for graduate schools. Moreover, it is no exaggeration to say that, from quantum field theory, quantum electrodynamics, and the theory of elementary particles to astrophysics, the frontiers of theoretical physics have inherited the relativistic theory of electrons by Dirac in some way. However, it is very likely that theoretical physics has built a grand house of cards based on the Copenhagen interpretation and Dirac's relativistic theory of electrons. After 80 years since the proposal of quantum mechanics and 100 years since the proposal of special relativity, there is finally strong evidence that quantum mechanics contradicting special relativity cannot be a natural science.

When a real wave function is denoted by $\Psi$, an equation available as a relativistic wave equation for each individual free electron is only the Klein-Gordon equation satisfying the law of conservation of energy given in the form $$\hat{E}^2\Psi=\hat{H}^2\Psi. \quad (48)$$

As shown in FIG. 1 illustrating an old system of mechanics, usual quantum mechanics has been obtained by changing quantum mechanics from relativistic to nonrelativistic. If the free Klein-Gordon equation is transformed into a nonrelativistic equation, the usual free Schrödinger equation without a mass term is obtained (Refer to, for example, W. Greiner, the above-mentioned book, pp. 7-8). Similarly if the free Dirac equation is transformed into a nonrelativistic equation, the free Pauli equation without a mass term is obtained (Refer to W. Greiner, the above-mentioned book, pp. 96-97). According to this textbook, since the Dirac equation is described as representing the motion of spin-1/2 particles (Dirac particles), it follows that the Pauli equation should essentially be applied to calculate energy levels of individual hydrogen atoms. However, as is clear from previous discussions, as long as the spin is not taken into consideration, the Schrödinger equation can be used in calculating the energy levels of hydrogen atoms. Nevertheless, it will clearly be proven later in 7.1.1. and 7.1.2. that the reason that the nonrelativistic Schrödinger equation is unable to be a physical wave equation is in this equation itself having no mass term.

As has often been mentioned, interference of each individual particle is a relativistic phenomenon based on the law of conservation of relativistic energy. Accordingly, it should be impossible for the Schrödinger equation as a nonrelativistic wave equation to completely explain the interference phenomenon. Following the Dirac equation, problems of the Schrödinger equation will be specifically pointed out.

5.4. Non-Physical Property of the Schrödinger Equation and its Solution

It is well known that relativistic wave equations should be covariant under the Lorentz transformations. It is naturally considered that the nonrelativistic Schrödinger equation is covariant under the Galileo transformations. But it is not well known that some contrivance is required to prove that. To show the above covariance of the free Schrödinger equation, a gauge transformation written as $$\psi'=e^{if}\psi \quad (49)$$

must be introduced together with the Galileo transformations (Refer to, for example, M. Lévy-Leblond, Riv. Nuovo Cimento 4, 99 (1974). For a more general case in which electromagnetic fields exist, refer to E. Merzbacher, Quantum Mechanics (John Wiley & Sons, New York, 1998), 3rd ed., pp. 75-78). Without this gauge transformation, probability cannot be conserved and the covariance of the Schrödinger equation under the Galileo transformations cannot be derived. Further, this phase change f being essential has been regarded as one of the reasons that the wave function $\psi$ associated with each particle does not exist (Refer to, for example, J. Strnad and W. Kuhn, Eur. J. Phys. 6, 176 (1985)). However, there being no physical basis for this phase change should have rather been the question.

Some time later, a quite different view was shown on the above covariance of the Schrödinger equation. Wignall (J. W. G Wignall, Am. J. Phys. 57, 415 (1989)) noticed that, after applying the low-velocity Lorentz transformation, which includes terms up to the order of $\beta^2 \equiv (v/c)^2 \ll 1$, to the following Schrödinger equation $$i\hbar\Psi_t+(\hbar^2/2m_0)\Psi_{xx}-(m_0c^2+V)\Psi=0 \quad (50)$$

having a solution of the de Broglie wave $\Psi$, the covariance of this equation can be shown by further assuming $\beta \ll 1$ and thereby ignoring terms of order $\beta^2$ ($\beta^2 \approx 0$). Here, v denotes the velocity of a particle having rest mass $m_0$ and the subscripts t and x of $\Psi$ denote differentiations $\partial/\partial t$ and $\partial/\partial x$. Thus, in the case of Eq. (50), since this equation does not need to be covariant under the Galileo transformation, the artificial phase change due to the Gauge transformation Eq. (49) also does not need to be introduced. Based on this result, Wignall concluded that, although de Broglie waves are represented by complex functions, the reasoning that 'those waves each of which needs the phase change f are not real waves" cannot apply to the de Broglie waves. However, in the above demonstration, although the low-velocity Lorentz transformation was used up to a certain intermediate stage, he could not but introduce the additional condition of $\beta \ll 1$ in the ending stage. As it turned out, he could not show an approximate Lorentz transformation itself under which Eq. (50) becomes covariant. Before then, it had already been pointed out that the low-velocity Lorentz transformation including terms up to order $\beta^2$ does not generate a group (Refer to M. Lévy-Leblond, the above-mentioned paper). In this regard, it is already known that both the Lorentz transformations and the Galileo transformations constitute groups respectively.

Although Wignall himself did not show the method for deriving Eq. (50), a description as a clue for that method can be seen in the textbook written by Dirac (P. A. M. Dirac, the above-mentioned book, p. 118). When the velocity of a particle is small compared to the velocity of light, assuming $\beta^2 \equiv (v/c)^2 \ll 1$, the relativistic Hamiltonian of a free particle with positive energy can be approximated as $$H \doteq \frac{1}{2m_0}(p_x^2 + p_y^2 + p_z^2) + m_0 c^2. \tag{51}$$

Usually, since the rest energy $E_0 = m_0 c^2$, i.e., the constant term in the above Hamiltonian, has no influence on the particle motion, the term is ignored (P. A. M. Dirac, the above-mentioned book, p. 118: This substantially means $m_0 c^2 = 0$). However, let this term be retained as it is here. Applying the Hamiltonian expressed by Eq. (51), the wave equation $$\hat{E}\Psi = \hat{H}\Psi \tag{52}$$

is obtained. Then, going through the procedure for quantization $$\hat{E} \to i\hbar \frac{\partial}{\partial t}, \tag{53}$$
$$\hat{p} \to -i\hbar \nabla,$$

Eqs. (51) and (52) lead to the free Schrödinger equation with a mass term as follows (Refer to Eq. (11) in Japanese Patent Application Laid-open No. Hei 08-329128 or U.S. Pat. No. 6,321,182 B1):

$$i\hbar \frac{\partial \Psi}{\partial t} + \frac{\hbar^2}{2m_0} \nabla^2 \Psi - m_0 c^2 \Psi = 0. \tag{54}$$

Assuming V=0, Eq. (50) used by Wignall coincides with the above equation. The upper case $\Psi$ has been used in Eq. (50) to designate a de Broglie wave function. Assigning the upper case $\Psi$ to the wave functions in Eqs. (52) and (54) means that, simultaneously to $\Psi$ representing the de Broglie wave function, the wave equation having its solution $\Psi$ is relativistic in that at least this equation has a mass term.

Dirac ignored the constant term $m_0 c^2$ in Eq. (51) representing the Hamiltonian because this term does not influence the motion of a particle. However, it can be shown that Eq. (54) keeping the mass term is an approximately relativistic free wave equation physically and mathematically derived correctly compared to the free Dirac equation contradicting the theory of relativity. But, for the moment, only two characteristics of Eq. (54) will be shown.

It can easily be shown that Eq. (54) has the rest solution of $$\Psi(r, t) = \exp\left(-i\frac{m_0 c^2 t}{\hbar}\right). \tag{55}$$

Substituting Eq. (55) into Eq. (54) immediately shows that Eq. (55) is a solution. This is clearly the effect of retaining the mass term. The Klein-Gordon equation has the solution of the exact same rest wave function as Eq. (55). It is well known that applying a Lorentz boost (Lorentz transformation) to Eq. (55) provides a plane de Broglie wave. In this way, Eq. (55) as the rest solution corresponds to one of the previously mentioned de Broglie's three principles, that is, (a) a particle at rest with the rest mass $m_0$ associates with a periodic phenomenon with the frequency $v = m_0 c^2/h$. Accordingly, Eq. (55) is the most important wave function that should be called the origin of wave mechanics. Moreover, it is also an important wave function that relates classical mechanics to wave mechanics concerning de Broglie waves in that the rest energy of the particle becomes the direct source of this wave function.

Another characteristic of Eq. (54) will be shown. It is well known that the Lorentz transformation going over into the Galileo transformation through the transition to the limit $c \to \infty$ shows special relativity being changed over to Newtonian mechanics at the limit. Assuming the transition to the limit $c \to \infty$ in Eq. (54), this equation can be written as $$m_0 c^2 \Psi = 0, \tag{56}$$

leaving only the mass term. The solution of Eq. (56) is clearly only $$\Psi = 0. \tag{57}$$

Eq. (57) generally shows that, when assuming the transition to the limit $c \to \infty$, wave mechanics for de Broglie waves is changed over to Newtonian mechanics. This is because, also in the case of the Klein-Gordon equation, the solution $\Psi = 0$ is obtained in the limit $c \to \infty$. Since the two solutions expressed by Eqs. (55) and (57) have extremely important meanings, explanations of the meanings will be carried out below.

First, take notice that, in the limit $c \to \infty$, the free Klein-Gordon equation and the free Schrödinger equation with a mass term respectively have the solution $\Psi = 0$. $\Psi = 0$ means that $\Psi$ cannot merely be a mathematical, probability wave. This is because, if $\Psi$ should be a probability wave, $\Psi = 0$ means that a particle with mass $m_0$ does not exist anywhere. In addition, obtaining only the solution $\Psi = 0$ in the limit $c \to \infty$ indicates that wave mechanics is unnecessary within this limit and only Newtonian mechanics should be utilized. However, attention must be paid to the fact that, in the case of microscopic particles, making $\Psi = 0$ in the limit $c \to \infty$ is physically extremely impractical. This is because, since $c \to \infty$ means that the velocity of a particle is extremely small and thus the de Broglie wavelength of the particle becomes long, the wave property of the particle cannot be ignored. Therefore, allowing $\Psi=0$ unconditionally in the limit $c\to\infty$ is confined to the case of macroscopic particles whose de Broglie wavelengths are extremely short. When analyzing individual systems relevant to independent free particles, sufficient attention must be paid to whether or not a device or an apparatus such as a slit or a double slit, etc. with which the wave property of each particle is involved is included in the individual systems. Even if $c\to\infty$ is valid for each microscopic particle, the motion of each independent free particle may be described approximately by applying only classical mechanics as long as its wave property can be ignored. This result can similarly be applied to the general case when the potentials of external forces exist. High-energy physics deals with particles in motion of high velocities near the velocity of light. In such cases, since the de Broglie wavelengths of these particles become extremely short, the wave properties of the particles can usually be neglected so that the transition to the limit $\Psi\to 0$ is permitted. Then, the motion of each particle can be described using only the relativistic equation of motion. Further, the fact that the free Klein-Gordon equation and the free Schrödinger equation with a mass term are directly changed over to the Newtonian equation of motion simultaneous to the fact that the Lorentz transformation is changed over to the Galileo transformation in the limit $c\to\infty$ means that nonrelativistic wave mechanics dependent on the Galileo transformations never exists. Therefore, the nonrelativistic Schrödinger equation together with the gauge transformation of Eq. (49) also becomes physically unnecessary. As shown above, from both of the facts that the free Klein-Gordon equation and the Schrödinger equation with a mass term respectively have both the rest solution represented by the same Eq. (55) from which a de Broglie wave is obtained by applying a Lorentz transformation and the solution $\Psi=0$ in the limit $c\to\infty$, it is almost conclusive that $\Psi$ is not a mathematical probability wave but a de Broglie wave function satisfying de Broglie's three principles.

Both the existence of an approximate Lorentz boost whose application to the rest solution represented by Eq. (55) gives a plane de Broglie wave and the fact that the Schrödinger equation of Eq. (54) becomes covariant under the same approximate Lorentz transformation will be demonstrated in detail as one of the four fundamental subjects considered in the first stage of the later half of this invention (Refer to 7.1.2.). It should be noted that the Newtonian equation of motion also becomes covariant under this approximate Lorentz transformation. To give the conclusion first, strictly speaking, both the macroscopic and microscopic particles do not conform to Newtonian mechanics. However, since $\Psi=0$ is available for the macroscopic particles unconditionally in the limit $c\to\infty$ although this limit itself is non-physical, the macroscopic particles may practically conform to Newtonian mechanics. Each of microscopic particles conforms to either mechanics in which fundamental equations of motion are covariant under either the above-mentioned approximate Lorentz transformation or the Lorentz transformation respectively. In other words, the microscopic particles never follow Newtonian mechanics.

Even if a particle is at rest, the de Broglie wave function does not always become zero at every space-time coordinate of the relevant inertial system as seen from Eq. (55). Hence, generally, every free particle including each of macroscopic particles like celestial objects has a space-time structure unifying a particle part localized in the space with the de Broglie wave function expanding in the space. Therefore, except for the localized space occupied by the single free particle, the entire surrounding space is occupied by the phase space of this free particle. In this sense, the space of a vacuum does not physically exist. Since this fact also relates to the space-time structure of the universe and has an extremely important meaning, it will be discussed as one of the four fundamental subjects in the first stage of the later half of this invention (Refer to 7.1.4.).

Thus far, examinations of the basic problems of the old system of mechanics shown in FIG. 1 and of the solutions for the problems have been completed with four fundamental subjects remaining. In the following, as foretold at the beginning, the reasons for concluding that the experiment of simultaneous observation of duality (Refer to Patent No. JP3227171: filed Jun. 14, 1991 and registered Jun. 31, 2001) has shown the achievement of the simultaneous observation of duality of each individual photon will be explained in detail. Until now, this simultaneous observation of wave-particle duality has been regarded as impossible because of the uncertainty principle (Refer to, for example, D. Bohm, the above-mentioned book, pp. 118-120). However, in result of demonstrating that this simultaneous observation is possible, errors of the Copenhagen interpretation including the uncertainty principle have been clearly shown. At the same time, the reality of a phase wave and a phase oscillation shown in de Broglie's three principles has resurfaced according to this experimental result indicating the reality of the phase wave associated with each individual photon.

5.5. Experimental Verification of Wave-Particle Complete Duality for Each Individual Photon Before explaining the physical significance of the experiment for simultaneous observation of duality, the steps for attaining basic background information will be shown. First of all, as common practice for when discussing simultaneous observation of duality, the thought experiment using Young's double-slit interferometer will be examined carefully. Here, the relationship between the uncertainty principle that has been regarded as the factor in preventing simultaneous observation and the devices built in Young's interferometer for observing the particle property will be thoroughly examined. In this process, the thought experiment due to Heisenberg using a microscope will be inspected, demonstrating that the uncertainty principle had been derived under Heisenberg's misunderstanding about the resolving power (Refer to '5.5.2. The uncertainty principle and Heisenberg's triple errors'). As a result, the correct forms of the uncertainty relations will be shown, and then it will be clarified that a trajectory may exist even for each microscopic particle. It will also be shown that each individual particle should have wave-particle complete duality. It will be understood that, experimentally, direct observation of the wave-particle complete duality of each individual particle is impossible but observation of only statistical duality is possible. Then, "path-distinction probability" $\mathcal{P}$ as a new statistical quantity representing particle properties and visibility of interference fringes $v$ denoting a known statistical quantity representing wave properties will be introduced. This thought experiment using the Young's interferometer in which the devices for observing particle properties $\mathcal{P}$ are incorporated, it will quantitatively show that only the statistical complementary duality $\mathcal{P}+v\leq 1$) can be measured. This statistical complementary duality means a statistical duality obtained when only either a wave property or a particle property can be measured for each individual particle. Based on the two-dimensional representation method of this quantitative statistical duality applying $\mathcal{P}$ and $v$, the statistical simultaneous complete duality $\mathcal{P}+v>1$) that should be obtained only when the simultaneous wave-particle complete duality of each individual particle can be observed is quantitatively determined. This simultaneous observation apparatus shown in the above-mentioned Patent Reference 1 (Patent No. JP3227171) was so designed as to enable us to measure the statistical simultaneous complete duality that should be obtained only when this simultaneous wave-particle complete duality of each individual particle can be observed.

5.5.1. The Thought Experiment Using Young's Double-Slit Interferometer and the Uncertainty Principle FIG. 5 schematically shows a thought experimental apparatus using a Young's interferometer. This experimental apparatus consists of a screen 3 having two slit apertures 1 and 2 at a distance d, a screen 4 for observing interference fringes, a monochromatic light source 5 for illuminating particles passing through the slit apertures 1 and 2, photodetectors 6 and 7 for detecting photons reflected from the particles passing through the apertures 1 and 2, and a particle source not shown in this drawing, where each individual particle and a plane wave 8 associated with the particle are incident on the screen 3. When the distance between the screen 3 and the screen 4 is denoted by L, it is assumed that L>>d. And it is also assumed that, when a particle has passed through the slits, at least one photon is reflected from the particle and is detected by a detector. Accordingly, when turning off the light source 5 to stop observing the particles passing through the slits, interference fringes 9 with visibility v=1 are formed on the screen 4 as indicated by a broken line. Each photodetector has its own imaging lens that produces an image of a relevant slit aperture on a photoelectric device. In order for each photodetector to reliably produce an image of the relevant slit on the photoelectric device, the resolving power R of the lens must be sufficiently smaller than the distance d between the two slits (R<d).

The resolving power of a microscope varies according to the degree of coherence of the illumination light. In the case of coherent illumination, denoting the wavelength of the illumination light emitted from the light source 5 by $\lambda$ and the numerical aperture (N.A.) of an objective by N, the resolving power R representing the distance between two resolved points is given as follows (M. Born and E. Wolf, Principles of Optics (Pergamon Press, Oxford, 1964), 3 rd ed., p. 424):

$$R = 0.77 \frac{\lambda}{N}. \tag{58}$$

In the case of incoherent illumination, the coefficient 0.77 in Eq. (58) should be altered to 0.61 (ibid, p. 419). Although the maximum of N equals 1, since this value is much too impractical for the case shown in FIG. 5, the above equation is conveniently approximated as R≈$\lambda$ under the assumption that N is approximately from 0.61 to 0.77. In textbooks covering this problem of simultaneous observation, the wavelength $\lambda$ of illumination light has simply been described as short enough (R. P. Feynman, R. B. Leighton, and M. Sands, The Feynman Lectures on Physics vol. III (Addison-Wesley, Reading, 1965), p. 3-5), or has been described as no greater than the distance d between the slits (See, for example, D. Bohm, the above mentioned book, p. 118). However, if d≥$\lambda$ according to Bohm, d≥R is obtained and this result does not always satisfy the previously mentioned condition that the resolving power of the lens must be sufficiently smaller than the distance d between the slits. Although the resolving power of a lens should have no direct relation to the accuracy in measuring the position of a single particle by an optical system, it is deeply related to Heisenberg's experimental interpretation of the uncertainty principle. Hence, the problem of resolving power must be reexamined in detail.

FIG. 6 illustrates the situation of imaging in the case when the resolving power of an imaging system is expressed by R=$\lambda$ and the distance between the slits by d=$\lambda$. For simplicity, examination will be conducted in a two-dimensional plane perpendicular to both slits 1 and 2. In order to further simplify the discussion, different from the case of the photodetectors in FIG. 5, the optical axis of a cylindrical lens 10 of an imaging magnification 1 is assumed perpendicular to the surface of a screen including the slits. This extremely simplifies the analysis since both the object plane and the image plane become perpendicular to the optical axis of the lens and the calculation for forming an image can be made two-dimensionally. More specifically, this means that resolving power will be evaluated with line images instead of with point images. For further simplicity, the two slits are assumed to be two incoherent line sources. This is because, provided that through which slit each individual particle has passed can be distinguished, a photon reflected from a particle passed through the slit 1 and a photon reflected from a particle passed through the slit 2 must be different from each other. According to the 'principle of interference', two different photons never interfere with each other. Consequently, the two intensity distributions of line images 13 and 14 are mutually superposed incoherently. Note that the influence of the width of each slit will be briefly discussed once this examination is finished. In this same drawing, the plane surface of the screen is represented by the x axis and the plane surface of the photoelectric device 12, i.e., the image plane, by the x' axis. If the angle made by the optical axis and the ray that passes through the outermost aperture of the lens 10 is denoted by $\Theta$, the numerical aperture N of the lens is given by N=sin $\Theta$. Applying Eq. (58) by ignoring the difference in aperture shape, R≈$\lambda$ is obtained at $\Theta$=50.4 degrees. In this case, however, the two line images 13 and 14 are never resolved. The reason for this will be explained below.

As seen from Heisenberg's interpretation of the uncertainty principle presented through the thought experiment of the position measurement using a microscope, it appears at first sight that an intrinsic relationship exists between the resolving power of an imaging system and the uncertainty principle. (In fact, Heisenberg's biggest error was in almost identifying the error in the position measurement by the microscope with its resolving power.) In the case where the position of the central maximum value of intensity distribution of a point (or line) image is situated at the position of a minimum value nearest to the position of the central maximum value of intensity distribution of another point (or line) image, the resolving power of this imaging system is generally defined by the distance between the above two points (or lines) in the object space. This definition has been sometimes called Rayleigh's criterion. The line images 13 and 14 shown in FIG. 6 have this exact positional relationship that is indicated by the definition of the resolving power of this imaging system.

In order to verify that the line images 13 and 14 are in the positional relationship indicated by the definition of the resolving power of the imaging system, the intensity distribution of the line image 13 will be derived. Although mid-process explanations are omitted, this intensity distribution will be derived by applying the Fourier transformation to a complex amplitude distribution in the aperture stop (a pupil function) of the lens 10 and taking the square of the absolute value of the resulting complex amplitude distribution on an observation plane 11. The complex amplitude distribution in the aperture stop of the aberration-free lens 10 may be represented simply by a plane wave in the aperture stop. Setting the width of the aperture stop to be identical with the lens width 2λ and the distance between the lens 10 and the observation plane 11 to L, the intensity distribution of the line image 13 is expressed by $$I(x') = |U(x')|^2 = \left[\frac{\sin(kax'/L)}{kax'/L}\right]^2. \tag{59}$$

For simplicity, provided that L=2 a and x'=λ, I(x')=0 is obtained and, therefore, it is seen that Eq. (59) represents the intensity distribution of the line image 13 and that the resolving power of this lens is R=λ. Incidentally, in this case, Θ may be 45 degrees.

When the respective intensity distributions of the two line images 13 and 14 in the positional relationship indicated by the definition of the resolving power are superposed under the condition that they do not mutually interfere, the intensity distributions become virtually connected such that the center is slightly concave, as shown by a thick solid line 15 between the line images 13 and 14. Although it is easy to understand if the resolving power means the shortest distance in which the central peaks of the line images 13 and 14 do not overlap, according to the actual definition, the two peaks are not sufficiently resolved as shown in FIG. 6. As a result, about one third of the quantity of light received by the photodetector 12, which is provided for receiving only the central peak of the line image 13 within the width of the detector 2R=2λ, comes from the light reflected from the particles passing through the slit 1. In this way, even if the wavelength λ of the light does not exceed the distance d between the slits, it is impossible for the case of d=λ to determine through which of the two slits each particle has passed with 100% probability. More accurately, the photoelectric device 12 detects those particles that have passed through the slit 2 with a probability of about 67% (67 out of 100 particles) and those particles that have passed through the slit 1 with a probability of about 33% (33 out of 100 particles).

The result described above reveals the essence of duality possessed by individual particles. Especially, note that probability (%) here means statistical probability (%). In other words, the description that each particle passes through the slit 2 with a probability of about 0.67 and the slit 1 with the remaining probability of about 0.33 can never apply to this case. Like this, in the case of d=λ, although it is impossible to determine through which slit each particle has passed with 100% probability, it can be understood that each particle can only pass through either one of the two slits. Since this conclusion has been rationally derived conforming to the physical laws, it has universality. For instance, it is impossible for each particle to begin to pass through both slits simultaneously as soon as the light source is switched off. Therefore, it can be said that, even if the light source and the two photodetectors are removed, each particle passes through only either one of the slits. However, as soon as the light source is switched off, interference fringes are observed on the observation plane, which is different from the situation before it is switched off. In this case, it is considered that, although a real wave associates with each individual particle and each particle passes through either one of the two slits, the interference fringes are observed due to existence of a mechanism in which each real wave can pass through both slits resulting in interference on the observation plane and, making this interference pattern as a probability density, each particle should be detected in accordance with this probability density. How-ever, since phase waves or de Broglie waves are not merely probability waves, strictly speaking, the meaning of the probability density here does not completely agree with that in conventional quantum mechanics. Even so, because a phase wave or a de Broglie wave naturally associates with the particle part of a single particle, this probability density may substantially correspond to the conventional probability density. There is no other mechanism than this one shown above that can reasonably explain the procedure in which interference fringes are gradually constructed on an observation plane 4 by each individual particle over time. As a result, it can also be concluded here that each individual particle has the duality consisting of a complete particle property and a complete wave property.

Next, how far the two slits must be separated from each other in order to obtain a probability of 100% will be theoretically examined. For simplicity, only results of this examination as a guide for dealing with this problem will be given. When the central peak of the line image 14 is situated at a position 2.5λ away from the central peak of the line image 13, approximately 99% of the light received by the photodetector 12 is occupied by the light reflected from the particles passing through the slit 2, and the remaining 1% is caused by the light reflected from the particles passing through the slit 1. Even if the distance exceeds 2.5λ, e.g., 10λ, the probability of 100% can never be achieved. This is because, similar to the diffracted image 13, the diffracted image 14 has small peaks being strung one after another on both sides of the central peak. Accordingly, when each slit is substituted by a line source assuming that the width of individual slits is all but zero, provided that the distance between the two slits is greater than 2.5λ, i.e., $$d \geq 2.5\lambda, \tag{60}$$

the slit through which a particle has passed can be judged with a margin of error of no greater than approximately 1%. It should be noted that, as long as each photon possesses a wave property, it is impossible to make this judgment without any error. Consequently, if each slit has some width, the error will certainly exceed 1%. The more important matter that should be mentioned here is that, in the process of each photon being reflected by each particle, it is understood that the momentum is conserved before and after the reflection, dealing with both individual photons and particles simply as particles. Hence, the above error should occur in the procedure of producing an image by passing each reflected photon having a wave property through the imaging system when measuring the position of each particle that has reflected the aforementioned photon. Accordingly, if geometrical optics holds, it is possible to make the above judgment without any error.

Next, how this observation of particle properties affects the construction of interference fringes will be considered.

First, the case in which d=R=λ holds will be examined. In FIG. 5, suppose that the momentum of a particle associated with a plane wave 8 is p. When the observation of the particle properties is not carried out, interference fringes of visibility v=1 will be constructed. Then, provided that a straight line that is perpendicular to the observation plane 4 is placed at the midpoint between two slits on a screen 3, the position on the observation plane 4 at which the above straight line intersects coincides with the position where the intensity of the central interference fringe takes a maximum value. Let the angle formed by this perpendicular line and the line connecting from the midpoint between the two slits to the position on the plane 4 at which the interference fringe next to the central fringe takes its maximum value be denoted by θ. When observing each particle property assuming that a single photon is reflected by the particle passing through a slit, the maximum momentum along the x axis given to the particle is $$\Delta p_x = \frac{h}{\lambda} = \frac{h}{d}. \quad (61)$$

On the other hand, when the de Broglie wavelength of the particle is denoted by $\lambda_d$, the momentum of this particle can be written as $$p = \frac{h}{\lambda_d} = \frac{h}{d\theta}. \quad (62)$$

Consequently, when the change in momentum $\Delta p_x$ along the x axis given by Eq. (61) is additionally included in the particle having this momentum, the traveling direction of the particle can be changed at a maximum of $$\frac{\Delta p_x}{p} = \theta. \quad (63)$$

In other words, when each individual particle is incident perpendicularly on the screen 3 and passes through the slits, the particle just after passing through the slits is changed in its traveling direction due to diffraction, and further changed in the traveling direction by at most an angle θ subtended at the particle by one period of interference fringes. Actually, when observing paths of individual particles, since the momentum added each time to individual particles varies randomly from 0 to $\Delta p_x$, the construction of interference fringes may be obstructed even though d=R=λ holds. Thus, in the case of d=R=λ, we can conclude that the interference fringes cannot be constructed even if the slit through which each particle has passed cannot be identified with 100% probability.

As is understood from the above explanations, the reason for obstructing construction of interference fringes when observing each individual particle property does not lie in an absolute principle called the uncertainty principle. This is because, when radiating individual photons toward each particle just after passing a slit to indirectly form an image of the slit with the use of the photons reflected from the particle for identifying the slit through which the particle has passed, those photons each having a wavelength shorter than the distance between the slits (λ≤d, p=h/λ≥h/d) must be first of all used to overcome a problem of the resolution limit of the imaging system. When a photon having the minimum momentum (p=h/d) satisfying the above condition collides with a particle, construction of interference fringes will be obstructed since the traveling direction of the particle is changed by the angle θ subtended at the particle by one period of interference fringes according to the conservation of momentum. In this way, there is no need to recourse to the uncertainty principle to concretely explain the reason why interference fringes could not be formed. What is necessary are: (i) each photon with wavelength λ has the momentum p=h/λ, (ii) the conservation of momentum in each elastic scattering, and (iii) the imaging theory based on the diffraction theory in physical optics.

When the construction of interference fringes is obstructed as a result of identifying the slit through which each particle has passed, it is seen from Eq. (61) that setting Δx=d≥R=λ generally leads to $$\Delta x \times \Delta p_x \geq h. \quad (64)$$

Accordingly, it appears that the uncertainty relation is evidently satisfied. This is the reason why the simultaneous observation of duality has been regarded as impossible under the uncertainty principle (Refer to D. Bohm, aforementioned book, p. 118). However, in the above discussions, expression of Δx=d≥R=λ in which error Δx in position measurement has been substituted for the distance d between the two slits has been a crucial error. It will be shown shortly (in 5.5.2.) that, when deriving the uncertainty principle, Heisenberg also made a similar error in which the error Δx in position measurement was misunderstood for the resolving power R.

It has been ascertained that, in the case of d=R=λ, the formation of interference fringes can be concluded to be impossible. However, as already shown, there is an error of approximately 33% in distinguishing the slit through which each particle has passed under this condition. In order to determine the slit with probability of 99% or greater, the relation between the wavelength and the distance between the slits must be set as d≥2.5λ even if the individual slits are assumed to have no width. Since the momentum of a photon whose wavelength is shorter than d, i.e., λ=d/2.5, is larger than that of a photon whose wavelength equals d (λ=d), the construction of interference fringes will surely be obstructed. There is a matter that should be mentioned here in relation to the above. When describing only about the line image 13 shown in FIG. 6, the photodetector 12 having a width 2λ receives a quantity of light contained only in the central peak of the line image 13. This quantity of light amounts to approximately 90% of that contained in the line image 13. How to experimentally interpret the uncertainty principle can be inferred here from. The meaning of the uncertainty principle in experiments becomes intrinsically different from that shown by Heisenberg in his thought experiment using a microscope. This will be explained in detail below.

5.5.2. The Uncertainty Principle and Heisenberg's Triple Errors

Heisenberg's thought experiment using a microscope (W. Heisenberg, The Physical Principles of the Quantum Theory (University of Chicago Press, Chicago, Ill., 1930), Printed by Dover, New York, 1950, pp. 20-23) will be examined thoroughly by referring to FIG. 7. This drawing shows an apparatus that measures the position of an electron 16 having a certain momentum (or velocity) in free motion on the x axis by using a light source for illumination not shown in this drawing and a microscope 17. For supplying electrons each having the certain momentum, a pinhole through which each electron whose velocity has been measured has passed may be positioned on the x axis sufficiently distant from the microscope. In addition, because this is a thought experiment, use of only those electrons in motion on the x axis after passing through the pinhole as objects for this measurement is allowed. For simplicity, the microscope 17 is assumed as an image-forming system with magnification ×1 using a cylindrical lens as in the case shown in FIG. 6. Hence, if innumerable photons are instantaneously reflected by the electron 16, a line image 21 identical with the line image 13 in FIG. 6 may be formed on the x' axis in an image plane 19.

As already explained using FIGS. 5 and 6, the procedure of measuring position x of each individual microscopic particle such as an electron etc. consists of a two-step process. The first step is a process in which at least one of the microscopic particles, e.g., photons, working as probes is made to elastically collide with each of object individual particles for the measurement. In this step, the conservation of momentum is retained in this system consisting of probe particles and the object particle before and after the collision and wave properties of these two types of particles are apparently irrelevant to this measurement process. The second step is a process in which each photon reflected by each individual particle is observed. In the case of using an optical microscope, the wavelength of each reflected photon directly influences the resolving power of the microscope. If "error $\Delta x$ in measuring the position on the x axis is almost equal to the resolving power" as Heisenberg determined, it can be expressed as $\Delta x \sim R \approx \lambda/\sin \Theta$. Note that it is defined for convenience that $\Delta x$ indicates the absolute value of an error in measurement (difference between the measured value and the real value). The definition of the resolving power here followed the approximated definition used by Heisenberg. For further simplification, in FIG. 7, epi-illumination is employed, and the illumination light is parallel to the optical axis (z axis) 18, propagating toward the negative direction of this axis. In this case, in FIG. 7, the maximum and minimum values of a change in momentum for each photon that is incident again on the microscope after colliding with and being reflected by the electron with respect to the direction of the x axis are given by $\pm h \sin \Theta/\lambda$. Incidentally, since the resolving power of the microscope is defined as $R \approx \lambda/\sin \Theta$, these maximum and minimum values are approximately $\pm h/R$. Provided that this maximum value of the change in momentum of this photon corresponds directly to the maximum value of the change in momentum of the electron according to the conservation of momentum, the change in momentum given to this electron is $\Delta p_x \approx h/R$ at most. When assuming that many photons collide with this electron at once, statistical processing is necessary. If the number of these probes of photons is m, while the error in this measurement becomes smaller as $\Delta_m x \sim R/\sqrt{m}$, the uncertainty of the momentum becomes larger as $\Delta_m p_x \approx \sqrt{m} h/R$ (W. Heisenberg, the aforementioned book, p. 22). Therefore, whether the number of probe photons is only one or m, $$\Delta x \times \Delta p_x = \Delta_m x \times \Delta_m p_x \sim h \quad (65)$$

is obtained, which is one of the representations of Heisenberg's uncertainty principle. The above equation is usually regarded as expressing that the position x and the momentum $p_x$ of a single particle cannot be measured simultaneously without error. However, in the end, it is interpreted that a particle even does not have a certain definite position and a certain definite momentum simultaneously from the beginning (Refer to D. Bohm, the aforementioned book, pp. 99-101). More precisely speaking in keeping with the above-given Bohm's context, Eq. (65) shows that even either one of the position and the momentum cannot have a certain definite value.

In the above discussions, one of the errors made by Heisenberg existed in his determination that, in the case of a single probe photon, "(i) error $\Delta x$ in measuring the position on the x axis is almost equal to the resolving power: $\Delta x \sim R$". Although Heisenberg called $\Delta x$ "uncertainty" or "accuracy" in the position measurement, as shown later, this must be considered an "error" when the number of probes of photons is only one. However, before measurement, $\Delta x$ may be called "uncertainty". An error in position measurement using a microscope and a resolving power of the microscope are alike but different concepts. This is because the error in measuring the position of a single bright point (or line) and the "resolving power" that is artificially defined as "the shortest distance between two neighboring bright points (or lines) that can be resolved" are clearly different. This difference will be explained referring to drawings. An error in measuring the position of a bright line means an error in measuring a position 16 of the bright line (corresponding to a position 20 of the peak in the intensity distribution of the line image 21), that is, the difference between the value on the x axis corresponding to the measured value x'(t') and the real value x'=x=0 shown in FIG. 7. In contrast, the resolving power means the shortest distance R on the x axis corresponding to the shortest distance $R \neq 0$ between the two peaks of neighboring intensity distributions of the line images 13 and 14 shown in FIG. 6. As shown in FIG. 7, when a photon is detected at the position indicated by a x mark, the error $\Delta x = \Delta x'$ in this position measurement should be represented not by $\Delta x = \Delta x' \sim R$ but by $$\Delta x = \Delta x' \leq R. \quad (66)$$

The above inequality clarifying only by itself that Heisenberg's uncertainty principle goes against natural laws is extremely important. This is because, although $\Delta x'=0$ is impossible if $\Delta x' \sim R$, it is possible for the error in measurement to be $\Delta x'=0$ if $\Delta x' \leq R$. Incidentally, since the accuracy in measurements indicates how major the extent of deviation of measured values from the real value, this accuracy depends on the number of times that measuring is performed and is never 0. According to a statistical estimation, when measuring is carried out a plurality of times and certain conditions in which, for instance, a certain mean of measured values is defined as an accuracy of measurement, etc., are provided, it is possible to express errors in individual measuring and the accuracy in a certain relation. Though it was described that the error in position measurements becomes small (the accuracy becomes high) when the number of probes of photons is m, it has turned out that Heisenberg did not accurately recognize the difference between the error or accuracy and the resolving power in the position measurements. Once specifications of a microscope including an illumination optical system are determined, the resolving power of this microscope is uniquely determined irrelevant to the number of times that measuring is performed. There are crucial and intrinsic problems in the fact that the differences among the four aforementioned technical terms (uncertainty, accuracy, error, resolving power) are not accurately reflected in Eq. (65). These problems will be examined in detail below.

The most important point in observing the position x of each electron is that, in the first step of this observation, conservation of energy and conservation of momentum including conservation of the number of particles hold in a system consisting of both particles. In a word, classical mechanics is recognized as valid. Actually, it is well-known that the two aforementioned conservation laws are valid before and after Compton scattering. Accordingly, in this first step, regarding each electron as a classical particle, the existence of its trajectory can be allowed before and after the elastic collision. Heisenberg himself also wrote with the meaning that whether or not the trajectory before the collision exists should be left to individual discretion (W. Heisenberg, the aforementioned book, p. 20). However, in view of universality of laws in mechanics, rather the trajectory of each electron must be made to exist according to the laws in classical mechanics valid before and after the elastic collision. Therefore, Heisenberg's second error is that, in spite of the validity of the conservation of the number of particles, energy, and momentum, he jumped to the conclusion that "(ii) the trajectory before the elastic collision cannot be an initial condition for the electron in motion after collision". First of all, the error of this decision will be demonstrated below.

Since the position x and the momentum $p_x$ of an electron is in a noncommutable relation:

$$xp_x - p_x x = i\hbar, \quad (67)$$

it is impossible to simultaneously measure these two values without error (W. Heisenberg, Z. Phys. 43, 172 (1927)). However, as already pointed out the core of the paper by Einstein et al., 'a proposition that two noncommutable physical quantities have certain definite values at the same time and another proposition that these quantities can simultaneously be measured with certainty are not identical'. In other words, even if the two noncommutable physical quantities cannot simultaneously be measured with certainty, it cannot be determined that these physical quantities do not have certain definite values simultaneously. Actually, since the momentum (or velocity) of the electron at time t of this collision is already known according to the precondition in this thought experiment, the uncertainty of the momentum can be written as $\Delta p_x(t) \sim 0$. On the other hand, because the error $\Delta x(t)$ in this position measurement of the electron at the same time t has been assumed to be almost equal to the resolving power, it can be written as $\Delta x(t) \sim R$ or $\Delta_m x(t) \sim R/\sqrt{m}$. Consequently, use of these values at the same time gives $$\Delta x(t) \times \Delta p_x(t) = \Delta_m x(t) \times \Delta_m p_x(t) \sim 0 << h. \quad (68)$$

This clearly shows that Heisenberg's uncertainty relation Eq. (65) or the uncertainty relation Eq. (64) described by Bohm are invalid. On the contrary, since Heisenberg noticed beforehand that Eq. (68) holds, he could not but admit with reluctance the existence of the trajectory before the elastic collision. However, making the trajectory before the elastic collision be useless in predicting the trajectory after the collision, he refused to acknowledge the physical significance of the trajectory before the collision. In Eq. (65), the error $\Delta x(t)$ of the position measurement and the error $\Delta p_x(t)$ of the momentum measurement are represented as errors at the same time t. Therefore, for the sake of clearly differentiating from Eq. (65), let Eq. (68) be called the "simultaneous" uncertain relation. However, in this case, it is necessary to pay full attention to the fact that only the position x of an electron whose momentum is already known as $p_x$ is actually measured. In other words, at the time that the position x of an electron is measured, its momentum $p_x$ is known simultaneously. On the other hand, when the limit as m approaches infinity is considered, $$\lim_{m \to \infty} \Delta_m x(t) = 0. \quad (69)$$

Even approximately realizing this limit $m \to \infty$ in an experiment is impossible as long as the electron is not at rest. However, the initial condition $\Delta p_x(t) \sim 0$ and Eq. (69) mean in principle that the electron has certain definite position and momentum simultaneously before Compton scattering. This indicates that, firstly, whether or not an electron has its trajectory before an elastic collision should not simply be left to individual discretion but the existence of this trajectory should be recognized as a physical law. Secondly, since the energy and momentum of a system is conserved before and after Compton scattering, it is known that the momentum of an electron keeps a fixed value after collision. Thus, the electron must have a trajectory whose ending point before collision coincides with the starting point of the trajectory after the collision. Heisenberg clearly made the second error by concluding that "(ii) the trajectory before the elastic collision cannot be an initial condition for the electron in motion after a collision".

The third error made by Heisenberg has been that "(iii) the uncertainty relation Eq. (65) was described in appearance as the following simultaneous uncertainty relation:

$$\Delta x(t) \times \Delta p_x(t) = \Delta_m x(t) \times \Delta_m p_x(t) \sim h$$

The simultaneous measurement of x and $p_x$ is in principle impossible according to Eq. (67). Accordingly, it is necessary to make measurements in a correct order that, if x has been measured at time t, $p_x$ must be measured after $\Delta t$ has elapsed, i.e., at time $t' = t + \Delta t$. Although the uncertainty of the x component of momentum of each electron at the time t has been $\Delta p_x(t) \sim 0$ according to the initial condition, $p_x$ naturally changes after the collision of a photon. In order to know the variation of the momentum, it should be measured at the time t' after the collision. However, there is a method to predict this variation $\Delta p_x(t')$ without measurement of the momentum. As already examined, the maximum and minimum of the variation in momentum after the collision of a photon are represented by $\pm h/R$. Consequently, since, with the use of Eq. (66) and $\Delta x(t) \lesssim R$, $\Delta p_x(t')$ can be represented by $$\Delta p_x(t') \lesssim \frac{h}{R} \lesssim \frac{h}{\Delta x(t)}, \quad (70)$$

$\Delta x(t) \times \Delta p_x(t') \lesssim h$ is obtained. Ultimately, taking the variable of time into consideration, Eq. (65) representing Heisenberg's uncertainty principle can be rewritten consistently with Eq. (67) in the following form:

$$\Delta x(t) \times \Delta p_x(t') = \Delta_m x(t) \times \Delta_m p_x(t') \lesssim h, \ t < t'. \quad (71)$$

To clearly distinguish from the uncertainty relation of Eq. (65), let the above inequality be called a nonsimultaneous uncertainty relation. This is because the time t when the position of an electron is measured and the time t' when its momentum should be measured are different. It can be seen that expressing Eq. (65) in the form of a simultaneous uncertainty relation is the third error made by Heisenberg. It has thus been revealed that, in the process of deriving the uncertainty relation, Heisenberg repeated the three above-given serious errors (i), (ii), and (iii).

Eq. (71) representing the nonsimultaneous uncertainty relation proves, as pointed out in the beginning, that Heisenberg's determination stating that, in the case of a single probe photon, "(i) error $\Delta x$ in measuring the position along the x axis is almost equal to the resolving power: $\Delta x \sim R$" is a fatal error. This is because although Eq. (65) makes it impossible to accurately measure even only either one of the position x(t) or the momentum $p_x(t)$, Eq. (71) shows that, contradictory to the above, both the position x(t) and the momentum $p_x(t')$ can be accurately measured by staggering individual measurements.

Incidentally, it may generally be said that the probability for a photon reflected by an electron at the position 16 to arrive at the arbitrary position x'(t') indicated by the x mark within the interval $-R \leq x' \leq R$ is approximately 90%. Accordingly, the result of measuring the position x of a single electron can be predicted with a probability of approximately 90% as follows:

$$-R \leq x(t) \leq R \text{ or } 0 \leq \Delta x(t) \leq R. \quad (72)$$

Simply speaking, when each position of 100 electrons is measured, about 90 electrons have measured values within the above interval. Moreover, the probability with which an electron arrives at the position x=x'=0 indicating a central maximum value in an intensity distribution of the line image is largest within this interval. On the other hand, in the case when the x component of momentum of an electron is measured at the later time t' (>t), its variation $p_x(t')-p_x(t)$ before and after the collision and the absolute value of this variation $\Delta p_x(t')=|p_x(t')-p_x(t)|$ can be written as follows:

$$-\frac{h}{R} \le p_x(t') - p_x(t) \le \frac{h}{R}, \qquad (73)$$

$$0 \le \Delta p_x(t') \le \frac{h}{R},$$

$$t < t'.$$

Therefore, the nonsimultaneous uncertain relation represented by Eq. (71) means that, 'when the x component of momentum of an electron is measured at the time t' after the position measurement in which the position x(t) of the electron whose x component of momentum is exactly known beforehand is included with approximately 90% probability within the interval $-R \le x(t) \le R$, the variation of the component, $p_x(t')-p_x(t)$, exists with approximately 90% probability within the range from h/R to -h/R'. However, it must not be forgotten that the probability with which the variation in the x component of momentum exists outside of the above range remains approximately 10%.

Next, following Heisenberg (Refer to W. Heisenberg, the aforementioned book, p. 23), the case in which the position of each electron is measured by making the electron pass through a narrow slit will be examined referring to FIG. 8. Here, instead of an optical microscope, only the slit is used as a device for position measurement. An extremely important issue is to be pointed out. The difference between this position measuring method and that using a microscope is in the point that the variation in momentum of an electron whose position has been measured at the time t can actually be measured at the later time t'=t+Δt.

The process of measuring a position in this method consists of two steps. The position of an electron whose momentum is known beforehand is measured in the first step by making this electron to pass through a slit having a known width, and then detecting the electron that has passed through the slit by a detector in the second step, where it is confirmed that this electron is the one that has passed through the slit. This step of the confirmation operation, that is, measuring the position of the electron on the surface of the detector, simultaneously means to measure the variation in momentum of the electron. The above observation process is combined with a supplementary examination of the interesting thought experiment designed by Ballentine on the uncertainty principle (L. E. Ballentine, Rev. Mod. Phys. 42, 358 (1970): Refer especially to p. 365, FIG. 3 and related descriptions).

In FIG. 8, each electron having the momentum p associated with a plane phase wave 22 is incident perpendicularly on the screen 23. This screen 23 has a slit aperture of width 2 a, and simultaneously as the electron passes through the slit, the associated phase wave is diffracted. Thus far is the first step and the (maximum) error in measuring the position of the electron is equal to the width of the slit, i.e., Δx=2 a. A detection plane 28 for electrons is positioned at a distance L (>>2 a) from the screen 23 and detectors 29 are lined at a pitch δx' on this plane 28. Although the de Broglie wave associated with each electron forms a Fraunhofer diffraction pattern on the detection plane 28, this pattern is considered actually to give a probability density for the single electron to be found on this plane 28. After an extremely large number of electrons have passed through the slit, a diffraction pattern due to these electrons is formed on the detection plane 28. This diffraction pattern associated with a central high peak 30 and lower peaks 31, 32 and etc. on both sides of the central peak has the same function form as the line image 13 shown in FIG. 6 under a condition L>>2 a. The behavior of each of these electrons in this second step will be examined in the following.

There is a theory called the boundary-diffraction-wave theory by Rubinowicz (See, for example, M. Born and E. Wolf, the aforementioned book, p. 449), the result of which agrees with that of Kirchoff's diffraction theory. Since this theory is convenient in extracting and discussing only boundary-diffraction waves that generate at the edges or boundaries of an aperture, this thought experiment will be analyzed by applying this theory.

In the case of a slit 24 in FIG. 8, consider the interference between a boundary-diffraction wave propagating along a line 25 connecting the upper edge of the slit and a point 27 on the detection plane and another boundary-diffraction wave propagating along a line 26 connecting the lower edge of the slit and the point 27. Here, the point 27 indicates the position where the intensity of the diffraction pattern is 0, nearest to the center O' of the pattern. Since the phase difference between the boundary-diffraction wave propagating along the line 25 and the boundary-diffraction wave propagating along the line 26 becomes exactly π, provided that the difference in length of the line 25 and the line 26 agrees with the de Broglie wavelength $\lambda_d$, these two boundary-diffraction waves interfere destructively, such that the intensity at this point 27 becomes 0. Then, if an angle formed by the normal standing at the center of the slit toward the detection plane 28 and a line connecting the center of the slit and the point 27 is set to Θ, it follows that 2 a sin Θ≈$\lambda_d$. Although no electron should actually reach this position, if an electron is detected at this point 27, the x' component of momentum of this electron, namely change in momentum $\Delta p_{x'}$, is expressed as $\Delta p_{x'}$=p sin Θ≈$9\lambda_d$/2 a. Accordingly, for individual electrons that reach within the range of the width W of the central peak 30 on the detection plane 28 and occupy approximately 90% of the total number of electrons that have passed through the slit, it gives $$\Delta p_{x'} \le p\sin\Theta \approx p\frac{\lambda_d}{2a} = \frac{h}{2a} = \frac{h}{\Delta x}, \qquad (74)$$

where Δx=2 a is used. Then, taking into consideration a lapse of time from when an electron has passed through the slit to when the electron arrives at the detection plane 28, expressing the error in position measurement in the first step as Δx(t)=2 a and writing $\Delta p_{x'}$ in Eq. (74) as $\Delta p_{x'}(t')$ gives $$\Delta x(t) \times \Delta p_{x'}(t') \le h(t<t'). \qquad (75)$$

The error of Heisenberg's uncertainty relation represented by Eq. (65) is clear because it does not include the inequality sign <. Furthermore, comparison with the uncertainty relation of Eq. (64) according to Bohm shows that the direction of the inequality sign is the reverse. The uncertainty relation represented by Eq. (75) agrees with Eq. (71) representing the statistical, nonsimultaneous uncertainty relation, which is derived when the position of each individual electron is measured under the premise that the electron can be provided possessing a fixed momentum. Eq. (75) shows it possible to predict that, when measuring the position of each electron whose x component of momentum is known beforehand as 0 with the error of Δx=2 a on the x axis, the x' component of momentum of the electron will change its value within the range from +$\Delta p_{x'}(t')$ to −$\Delta p_{x'}(t')$ with a probability of approximately 90%. From a different point of view, a range within which each electron that has its momentum changed within the range specified by $\pm\Delta p_x(t')$ should arrive will be derived. From Eq. (74), setting the position of the point 27 in FIG. 8 to x' gives $$\sin\Theta = \frac{x'}{\sqrt{L^2 + x'^2}} \approx \frac{\lambda_d}{2a}. \tag{76}$$

Accordingly, it is predicted that the electron will be found with about the same 90% probability within the following range on the x' axis $$-\frac{\lambda_d L}{\sqrt{4a^2 - \lambda_d^2}} \leq x' \leq \frac{\lambda_d L}{\sqrt{4a^2 - \lambda_d^2}}, L \gg 2a. \tag{77}$$

Also in this measuring experiment, $\Delta p_x(t) \sim 0$ may hold as an initial condition as in the case of measuring using a microscope. Accordingly, even when the error in a position measurement is $\Delta x = 2a$, the simultaneous uncertainty relation $$\Delta x(t) \times \Delta p_x(t) \sim 0 \ll \hbar \tag{78}$$

holds just in the aperture plane. The incorrectness of Heisenberg's uncertainty relation represented by Eq. (65) that does not include the inequality sign $\ll$ is obvious. In the first step of the measuring, since the wave property of each individual free electron is irrelevant to the motion of the electron until it reaches the slit-aperture plane, naturally the existence of the trajectory of this electron can be expected.

Next, the problem of trajectories in the second step will be considered. Adopting the arguments by Ballentine (L. E. Ballentine, the aforementioned paper, particularly p. 365, Fig. 3 and related descriptions), it becomes as follows: In FIG. 8, L can be made infinitely large. Hence, the error $\delta p_{x'}$ in measuring the x' component of momentum p sin $\Theta$ can be made infinitely small. As a result, since the product of this error and the error $\delta x'$ of a position measurement can be written as $$\lim_{L \to \infty} (\delta x' \times \delta p_{x'}) \sim 0 \ll \hbar < h, \tag{79}$$

Heisenberg's uncertainty relation represented by Eq. (65) is also invalid in this case.

The validity of Eq. (79) will be demonstrated in a concrete example that can be experimented. For instance, assuming that the kinetic energy of an electron incident on the slit 24 is 100 eV, $\Delta x = 2a = 1$ μm, and $\delta x' = 1$ μm, the maximum measurement error on the x' component of momentum can be expressed with the use of L as $(\delta p_{x'})_{max} = L^{-1} \times 5.4 \times 10^{-30}$ kgms$^{-1}$. Accordingly, setting L to 51 m gives $\delta x' \times \delta p_{x'} \approx 10^{-3} \hbar \ll h$. The value of $\delta x' \times \delta p_{x'}$ may decreased by increasing L. Returning to the case of the simultaneous uncertainty relation expressed by Eq. (78), conditions for when $\Delta p_x \sim 0$ holds will be examined. In FIG. 8, suppose that, after an electron whose momentum is known beforehand through measuring as corresponding to the kinetic energy of 100 eV has passed through a slit 1 μm wide not shown in this drawing, this electron is led to the slit 24 with a width of $\Delta x = 2a = 1$ μm at a distance of 5,100 m from the former slit. Then, since the maximum uncertainty of the momentum of the electron detected by a detector which is positioned just behind the slit 24 becomes $(\Delta p_x(t))_{max} = 1.1 \times 10^{-33}$ kgms$^{-1} \sim 0$, $\Delta x(t) \times \Delta p_x(t) \approx 10^{-5} \hbar \sim 0 \ll h$ can be obtained. Previously, in the thought experiment using a microscope (Refer to FIG. 7), it was mentioned that, 'for supplying electrons each having the certain momentum, a pinhole through which each electron whose velocity has been measured is passed may be positioned on the x axis sufficiently distant from the microscope'. If the slit with a 1 μm width not shown in FIG. 8 is substituted with a pinhole with a 1 μm diameter in FIG. 7, it is seen that those individual electrons in motion on the x axis with $\Delta p_x(t) \approx 0$ may be supplied.

As shown above, it is seen that the experiment shown in FIG. 8 is not only a thought experiment but a practicable experiment and that the simultaneous uncertainty relation represented by Eqs. (68), (78), and (79) is a physical law that is actually valid. This physical law strongly suggests that, although the position and momentum of each individual microscopic particle cannot be measured simultaneously in principle, those quantities can possess fixed values simultaneously. Accordingly, it is reasonable to consider that, in FIG. 8, each electron has its trajectory throughout the procedure from emission from the electron source not shown in this drawing, and passing through the slit 24 to arriving at the detector 29 on the detection plane 28. In other words, generally, when designing an apparatus provided with a source of microscopic particles and a detecting plane for these particles, this apparatus may be designed with the premise that each particle draws its trajectory from emission from the source to arrival at the detection plane. Eq. (79) can be called the simultaneous uncertainty relation first suggested by Ballentine. On the other hand, the nonsimultaneous uncertainty relation expressed by Eq. (75) is a statistical physical law, which predicts with approximately 90% probability that, when the position of a microscopic particle whose x component of momentum is known beforehand as $p_x = 0$ is restricted within the region specified by $\pm \Delta x(t)$ at the time t, its momentum $p_x(t')$ at the later time $t' = t + \Delta t$ can be predicted to have a value within the range specified by $\pm h/\Delta x(t)$. It will be shown in the later half (7.2.2. the second embodiment) that this physical law may also be applied to designing an apparatus having a small aperture.

Incidentally, by way of introduction to considering the thought experiment using a microscope, Heisenberg more or less stated that 'it is a matter of personal belief whether or not the trajectory of an electron is considered to exist before the measurement of its position'. This is because 'the past trajectory of the electron is irrelevant to the whereabouts of the electron after measurement (W. Heisenberg, the aforementioned book, p. 20)'. Incorrectness of these arguments is clear from the results of examining the two different processes of measuring the position of each electron. Denying the existence of a trajectory after the collision because the trajectory cannot be predicted is clearly an error. It has been shown that the Heisenberg uncertainty principle itself cannot exist as a physical law.

The uncertainty relation that has been described as being theoretically derived according to the formalism of quantum mechanics will be examined. Using the standard deviation $\sigma[x]$ for the position x and standard deviation $\sigma[p_x]$ for the momentum $p_x$, the one-dimensional uncertainty relation represented by $$\sigma[x] \times \sigma[p_x] \geq \frac{\hbar}{2} \tag{80}$$

is obtained. (Refer to E. Merzbacher, Quantum Mechanics (John Wiley & Sons, New York, 1998), 3rd ed., pp. 217-220: Note that although the author expressed the positive square roots of the individual variances (standard deviations) as $\Delta x$ and $\Delta p_x$, they are changed into $\sigma[x]$ and $\sigma[p_x]$ here as these notations are misleading.) In the above equation, when a distribution of measured values is a Gaussian distribution centered on a true value, the equality sign holds. Eq. (80) contains several questionable points that do not agree with reality. That is, (1) although the distributions of measured values in both experiments shown in FIGS. 7 and 8 are symmetric with respect to individual centers, they cannot be Gaussian distributions. Furthermore, even if the distributions of measured values could be assumed to be Gaussian distributions, they cannot correspond to multiple measured values obtained in real measuring experiments since the standard deviations lack dependence on the number of times of measuring. Namely, (2) the standard deviations in Eq. (80) lack dependence on the number of times of measuring. (In the paper III by Prof. Ozawa (M. Ozawa, Phys. Lett. A 318, 21 (2003)), it is pointed out that the resolving power of a microscope and the standard deviation cannot be identified.) Note that when a distribution of measured values is assumed to be a Gaussian distribution, the statistical quantity that corresponds to the standard deviation and relates to m number of actual measured values is the square root of the unbiased variance $\sigma_{m-1}$. Incidentally, the problem raised by the noncommutable relation (67) had been whether or not the principle making it impossible to simultaneously measure x and $p_x$ of a single particle means that these x and $p_x$ do not have fixed values simultaneously. As already examined with FIGS. 7 and 8, since the number of times for measuring at least one of these physical quantities is practically limited to one time (m=1), the result of this measuring cannot but be expressed as an error. However, (3) the expression of Eq. (80) does not include any error resulting from a single measurement. Furthermore, (4) the expression of Eq. (80) does not reflect the fact that the simultaneous measuring of x and $p_x$ is impossible. When deriving the uncertainty relation based on the thought experiment, Heisenberg made three errors. The uncertainty relation derived based on quantum theory contained more questionable points than those contained in the uncertainty relation derived through the thought experiment, and as a result of progressing in abstraction, relationship with actual measurements of the two physical quantities, which are noncommutable, was broken. The original form of Eq. (80), in which a lower limit $\hbar/2$ had been $\hbar$, has been the very evidence clarifying that the Copenhagen interpretation had never reached the natural law.

Following the principle of superposition of states, it has been shown that the Heisenberg uncertainty principle also contains errors. The originator himself had incorporated the uncertain principle promptly into quantum mechanics. Compared to orthodox physics originated by Newton and Einstein, quantum theory ruled by mathematical probability waves has been just a theory based on artificial principles. (Later in 7.1.2., it will be shown that the Schrödinger equation itself has an error.)

In the case of the simultaneous uncertainty relation, Planck's constant h exists as a very large upper limit of the products of the position and momentum measurement errors, and in the case of the nonsimultaneous uncertainty relation, Plank's constant h exists as an upper limit of the products of the position measurement errors and the momentum uncertainties for about 90% of object particles for individual measurements. This result contradicts both Prof. Ozawa's paper I (M. Ozawa, Phys. Rev. Lett. 88, 050402-1 (2002)) in which production of a small quantum computer was made impossible because of the existence of a lower limit for the measurement errors depending on the size of measuring apparatus and paper II (M. Ozawa, Phys. Lett. A 299, 1 (2002)) in which a breakdown of the uncertainty principle was found only in a specific model. In addition, there was Prof. Ozawa's paper III (M. Ozawa, Phys. Lett. A 318, 21 (2003)) in which a generalized uncertainty relation was proposed for application to arbitrary measuring processes. However, since this uncertainty relation also has the same lower limit $\hbar/2$ as Eq. (80), it conflicts with both the simultaneous and nonsimultaneous uncertainty relations, each having a reversed inequality sign. From a different viewpoint, since any of the above papers by Prof. Ozawa were based on quantum mechanics, the contents are naturally inconsistent with Einstein et al. (A. Einstein, P. Podolsky, and N. Rosen, Phys. Rev. A 47, 777 (1935)) making quantum mechanics itself incorrect. Moreover, according to dual mechanics in which quantum bits themselves do not exist, quantum computers are impossible to realize regardless of size. The fact that quantum computers with super high processing speed for decryption cannot be realized is just evidence for quantum mechanics being incorrect.

As already mentioned, Dirac attempted to justify such phenomenon contradicting the conservation of relativistic energy as a microscopic trembling motion with light velocity $\pm c$ by applying the uncertainty principle (P. A. M. Dirac, the above-mentioned book, p. 262). The basis of the above justification is in short as follows: in order to experimentally find the velocity of an electron, the position of the electron must be accurately measured at two slightly different space-time points, and if the position of the electron is found with great accuracy between these two points, the momentum of this electron will almost diverge toward infinity according to the uncertainty principle so that the velocity can be $\pm c$. If the momentum diverges toward infinity, the energy naturally diverges toward infinity as well. That is, Dirac had recognized that his relativistic theory of electrons contradicts the law of conservation of relativistic energy. Further, Dirac had considered that the validity of the theory of electrons contradictory to special relativity could be ensured by the Heisenberg uncertainty principle that also contradicts the conservation of energy. From the viewpoint of special relativity, it is well understood that conventional quantum mechanics including Dirac's theory of electrons had been constructed by logic that is full of contradictions.

Bohm negated the concept of trajectories for individual particles itself based on the uncertainty principle. That is, he stated that "indeterminism is inherent in the very structure of matter, and momentum and position cannot even exist with simultaneously and perfectly defined values (D. Bohm, aforementioned book, pp. 100-101)". This Bohm's interpretation completely wiped out traces of classical mechanics remotely remaining in the interpretation by Heisenberg. Bohm's interpretation on the uncertainty principle is described as follows: "If measurement of position is made with accuracy $\Delta x$, and measurement of momentum is made simultaneously with accuracy $\Delta p$, then the product of the two errors from these measurements can never be smaller than an order of $\hbar$ $\Delta p \Delta x \geq (\sim \hbar$ (D. Bohm, the aforementioned book, p. 99)." It has thus turned out that, although momentum and position cannot in principle be measured simultaneously, Bohm considered these quantities to be measurable simultaneously. However, the Heisenberg uncertainty principle had been proven incorrect. As a result, it becomes clear that Bohm proposed Bohm's version of the EPR experiment based on this failed uncertainty principle, and without any evidence, criticized the paper by Einstein et al. (A. Einstein, P. Podolsky, and N. Rosen, the aforementioned paper). The debate over quantum theory by Einstein and Bohr was put to an end at last. Discussions on the errors of the uncertainty principle and ways to rectify them are put on hold.

5.5.3. A Quantitative Method for Representing Statistical Duality

Incidentally, since the de Broglie waves possess no energy, it is impossible to directly observe the simultaneous, complete duality of each individual particle. The most reliable method for observing the wave property of each individual particle is to observe interference fringes. The interference fringes cannot be formed only by one or two particles. To observe interference fringes, it is necessary to integrate results of an interference experiment for numerous particles one by one until interference fringes are formed as a continuous intensity distribution. Accordingly, it is understood that the interference fringes cannot but necessarily be observed only as a statistical phenomena. The most advantageous point of making use of the interference fringes is that the wave property can be quantitatively expressed, even though statistically, by applying visibility v of the interference fringes. In view of the symmetry between the wave property and the particle property, this suggests that the statistical method of observing the particle property can also be introduced. In effect, even if the observation of the simultaneous, complete duality of each particle is impossible, it is seen that the quantitative observation of statistical duality is sufficiently possible.

Each of the statistical quantities representing the wave properties and the particle properties of individual particles both observed in experiments is defined as follows: As already mentioned, the wave property can be defined by applying the visibility v of interference fringes. Incidentally, denoting the maximum intensity of interference fringes by $I_{max}$ and the minimum intensity of interference fringes by $I_{min}$ gives $$\mathcal{V} \equiv \frac{I_{max} - I_{min}}{I_{max} + I_{min}}, \quad (81)$$

$$(0 \leq \mathcal{V} \leq 1).$$

Accordingly, the wave property of each individual particle can quantitatively be represented, though indirectly, through the statistical quantity of visibility v of interference fringes. The particle property will be represented by a "path-distinction probability" $\mathcal{P}$ defined below. Let the total number of particles supplied in an experiment be N and the number of particles identified as having passed through individual slits (paths) be n. Then, the path-distinction probability is defined as $$\mathcal{P} \equiv \frac{n}{N}, \quad (82)$$

$$(0 \leq \mathcal{P} \leq 1).$$

It is easy to understand that $\mathcal{P}$ denotes a statistical particle property. Although these observable statistical quantities do not directly represent the wave-particle duality of each individual particle, naturally, these quantities cannot be irrelevant to the property. The relationship between the wave-particle duality of each individual particle and the statistical wave-particle duality indicated by an ensemble of N particles will be clarified below.

Provided that paths for n (n≤N) particles within the N particles used in the experiment of FIG. 5 are individually identified, the path-distinction probability is written by $\mathcal{P}$ =n/N. Remaining (N−n) particles will form interference fringes, and with regard to only these particles, they will form interference fringes with the visibility of v=1. For the convenience of calculation, when the average of an intensity distribution provided by N particles is normalized as N/N=1, the average of the intensity distribution provided by a single particle that does not interfere becomes 1/N. Naturally, since the average of the intensity distribution of interference fringes provided by a single particle must also be 1/N, the maximum of this intensity distribution of interference fringes amounts to 2/N. Accordingly, the maximum of the intensity distribution of interference fringes provided by only (N−n) particles is 2(N−n)/N=2(1−$\mathcal{P}$) and the minimum thereof is 0. On the other hand, since the intensity distribution provided by n particles that could never interfere is expressed by n/N=$\mathcal{P}$ the intensity distribution of interference fringes provided by N particles ultimately gives $$I_{max} = 2(1-\mathcal{P}) + \mathcal{P} = 2-\mathcal{P} \quad I_{min} = \mathcal{P} \quad (83)$$

Substituting $I_{max}$ and $I_{min}$ into Eq. (81) yields the visibility of these interference fringes as v=1−$\mathcal{P}$ Consequently, the relationship between the visibility v and the path-distinction probability $\mathcal{P}$ is very simply given as $$\mathcal{P} + v = 1. \quad (84)$$

The addition of $\mathcal{P}$ and v being a constant means that the statistical particle property $\mathcal{P}$ and the statistical wave property v are complementary. Actually, even if the quantum efficiency of the photodetectors 6 and 7 and the detecting surface of interference fringes is assumed to be 1, the photoelectric device 12 receives only 90% of the quantity of light that impinges on the lens 10, as already explained with FIG. 6. Before then, these photodetectors may not receive all of the light scattered by the particle. Therefore, it is seen that the statistical complementary duality expressed by Eq. (84) can generally be rewritten as $$\mathcal{P} + v \leq 1. \quad (85)$$

Incidentally, in the thought experiment shown in FIG. 5, let the roles of photons and particles be interchanged. Then, a parallel light beam impinges on the screen 3 having two slit apertures. The light source 5 is substituted for instance by an electron source. The photodetectors 6 and 7 should also be substituted by electron detectors having electron lenses. These substitutions afford Eq. (85) to hold also for photons. Therefore, Eq. (85) is valid for arbitrary particles after all.

The meaning of Eq. (85) will be examined next. Path-distinction probability $\mathcal{P}$ and visibility v of interference fringes are represented by 0≤$\mathcal{P}$ v≤1. Accordingly, with the use of the path-distinction probability $\mathcal{P}$ and the visibility v, a statistical duality observed in respective experiments can be simply represented by a point $\mathcal{P}$ v) in two-dimensional $\mathcal{P}$v space. The statistical dualities observed by the well-known observation apparatus shown in FIG. 5 have been represented by Eq. (85). These statistical dualities will be shown in FIG. 9. In FIG. 9, provided that the horizontal axis indicates a statistical particle property $\mathcal{P}$ and the vertical axis indicates a statistical wave property v, every statistical duality is included within a square having each side of length 1 as a domain of positive values. This square is divided by a line $\mathcal{P}+v=1$ of Eq. (84) into two triangles, where the triangular region including this line and the region under this line indicate the statistical complementary duality expressed by Eq. (85). As will be shown shortly, the complementary duality can only be observed as this statistical complementary duality. For understanding the characteristics of the statistical duality represented by the above triangular region, the relationship between the typical statistical duality $\mathcal{P}$ v)=(0.5, 0.5) positioned on the straight line $\mathcal{P}+v=1$ and the duality of each individual particle will be investigated in the following.

Suppose for example that the total number of particles supplied in the observation experiment of FIG. 5 is 100. Then, the statistical duality $\mathcal{P}$ v)=(0.5, 0.5) signifies that 50 particles have their individual paths distinguished and 50 particles do not but result in forming interference fringes. For simplification, this means that 50 particles are collided by photons and the remaining 50 particles are not. Hence, if the light source is switched off, the statistical duality to be obtained will immediately be changed to $\mathcal{P}$ v)=(0,1). On the contrary, when all of the 100 particles are made to collide with photons by increasing brightness of the light source, the statistical duality to be observed will immediately be changed to $\mathcal{P}$ v)=(1,0). The three aforementioned types of statistical dualities are positioned on the line $\mathcal{P}+v=1$. In this way, there is not a single particle that contributes to both values of $\mathcal{P}$ and v in the experiments demonstrating complementary dualities. Photons for illumination can only collide with particles that have passed through the slits. Speaking in more detail, the strength of illumination light is irrelevant to individual particles that are passing through the slit apertures cut in a thick screen. This means that, even if the quantity of illumination light is made to change in three steps as described above, these changes in the quantity of light do not affect the behavior of each individual particle that is passing through the slits. Accordingly, provided that each individual particle is ascertained to have passed through only either one of the two slits when the intensity of light from the source is at its maximum, each particle only passes through either slit even if the light source is switched off. If so, for interference fringes to be formed, a real wave that is associated with each individual particle and is able to pass through both slits must exist. The same conclusions as those obtained for this experimental apparatus have been obtained based on a more quantitative evaluation. In this way, even if the statistical duality is complementary, the simultaneous, complete duality of each individual particle is an undisputed fact. Different from Bohr's assertion of complementarity with respect to each individual particle (N. Bohr, Nature, 121, 580 (1928). Refer especially to p. 586), the complementarity can only be observed as a statistical complementary duality.

The evaluation of whether or not each individual particle possesses a wave property does not depend only on whether or not interference fringes should be formed. The above indisputable complete duality can also be proven by thought experiments applying extremely simple apparatus shown in FIGS. 10A to 10C based on a fundamental evaluation method for the wave property. FIGS. 10A to 10C only show magnified views of the vicinity of a double slit in three different observation methods. In case of FIG. 10A, particle detectors are placed directly behind each individual slit and 50 particles pass through the double slit. For simplification, each detector will detect 25 particles respectively. In FIG. 10B, a particle detector is placed directly behind one of the slits and 50 particles pass through the double slit, where the detector will detect 25 particles. However, number of those particles that pass through the other slit accompanied by no detector will also be 25. In case of FIG. 10C, since 50 particles pass through the double slit without detecting from behind the slits, interference fringes of v=1 will be formed. Therefore, as will easily be seen, the same complementary duality of $\mathcal{P}$ v)=(0.5, 0.5) will be obtained in both experiments FIG. 10A+FIG. 10C and FIG. 10B+FIG. 10C using a total of 100 particles. Also in these experiments demonstrating the complementary duality, not a single particle contributes to both values of $\mathcal{P}$ and v.

Here, the experiment shown in FIG. 10B that even clarifies a limitation of the $\mathcal{P}$ v representation of duality should be noted. According to FIG. 10B, each of the 25 individual particles that has passed through the slit behind which no detector is placed has both a wave property in that every particle is diffractive and a particle property in that every particle contributes only $\mathcal{P}$ since the slit through which the particle has passed can be distinguished. Namely, it can be concluded from just these 25 particles that every particle has the wave and particle properties simultaneously. This fact is extremely important because it clarifies that observing a wave property of each individual particle is not restricted to only observing interference fringes but is also possible by observing diffraction phenomena. Actually, observation of interference fringes using Young's interferometer is possible, first of all because diffraction occurs when each particle passes through the slit. If each particle does not have the wave property, this diffraction never occurs, and therefore, the interference fringes are never formed. In this way, it has been confirmed only from the experiment shown in FIG. 10B that every particle intrinsically possesses the simultaneous, complete duality. It is clear that the above discussions on FIGS. 10A to 10C are applicable to all types of particles including photons.

From the above examinations, it is seen that the concept of the wave-particle complementary duality of each individual particle presented by Bohr (N. Bohr, Nature, 121, 580 (1928). Refer especially to p. 586) was a complete mistake.

It is understood that the statistical complementary duality represented by Eq. (85), $\mathcal{P}+v\leq 1$, obtained using the apparatus shown in FIG. 5 is irrelevant to the simultaneous duality of each individual particle. In other words, if complementary duality can be observed, this duality has no relevance to the simultaneous duality of each particle. Next, the relationship of this simultaneous duality of each particle with a statistical duality that is not complementary will be examined. As with the previous examination, let the total number of particles supplied in an experiment be 100. Assume that, although 50 of those particles have their individual paths distinguished and the remaining 50 particles do not, only one of the 50 particles whose individual paths have been distinguished has been involved in formation of interference fringes. That is, suppose that a single particle from the 100 particles has been simultaneously observed for its duality. In this case, $\mathcal{P}=0.5$. However, since 51 particles have contributed to formation of interference fringes, it is seen that the maximum value of the intensity distribution of the interference fringes formed only by these particles is 1.02 according to the definition of visibility and the minimum value of the intensity distribution of the interference fringes is 0. These interference fringes should be raised uniformly only by 0.49 due to 49 particles obtained by subtracting the single particle involved in forming interference fringes from the 50 particles whose individual paths have been determined. This is because the average intensity distribution must be 1 according to the conservation of relativistic energy including the conservation of the number of particles (Refer to FIG. 11). Consequently, the maximum value of the intensity distribution of the interference fringes formed by all of the particles is 1.51 and the minimum value thereof is 0.49. Since substituting these values into Eq. (81) gives v=0.51, the statistical duality in this case can be represented by $\mathcal{P}$ V)=(0.5, 0.51). This duality described also as $\mathcal{P}$ +v=1.01>1 is included in the triangular region above the line $\mathcal{P}$ +v=1. Difference in observation apparatus in an experiment or difference in observation conditions when using the same apparatus can give rise to some difference in statistical duality observed in the experiment. However, even in those cases, there should be no difference in the intrinsic duality of each individual particle. Accordingly, when a statistical duality of $\mathcal{P}$ v) included in the region $\mathcal{P}$ +v>1 is observed and if the duality is positioned even slightly above the line $\mathcal{P}$ +v=1, it proves that each particle has been observed possessing the simultaneous, complete duality.

Here, observations on the $\mathcal{P}$ v representation of statistical duality shown in FIG. 9) will be summarized. According to the typical observation apparatus of duality shown in FIG. 5 and various textbooks, only the statistical complementary duality represented by $\mathcal{P}$ +v≤1 can be observed. However, this statistical duality has no relation to observation of the intrinsic duality of each individual particle. When this intrinsic, simultaneous complete duality has been observed, the statistical duality can be represented by a point $\mathcal{P}$ v) included in the region $\mathcal{P}$ +v>1. A concrete method of observing the statistical duality relevant to this intrinsic duality will be given below.

5.5.4. Experimental Verification of the Simultaneous Complete Duality of Photons As already mentioned, an apparatus that makes it possible to simultaneously observe the duality of each individual photon has recently been patented (Patent No. JP3227171: filed on Jun. 14, 1991 and registered on Jun. 31, 2001). The statistical duality observed by applying this apparatus to photons was represented by $\mathcal{P}$ v)≑(0.98, 0.87) as already depicted in FIG. 9. Since this duality can also be rewritten as $\mathcal{P}$ +v≑1.85>1, it clearly demonstrates that the simultaneous complete duality of each individual photon had been observed. Because explanations of the mechanisms capable of observing the simultaneous complete duality of each photon as the statistical duality $\mathcal{P}$ +≑1.85>1 using this apparatus were not given in the above patent, these explanations will be supplemented in detail in the following. This is because, although the simultaneous complete duality of each photon has been qualitatively confirmed already in the thought experiment shown in FIG. 10B, this duality must also be proven by a quantitative observation method applying the $\mathcal{P}$ v representation of duality.

The simultaneous observation experiment was carried out using a laser beam of ordinary intensity emitted from a He—Ne laser and a Michelson interferometer, as shown in FIG. 1 of the above patent. Here, explanations will be given using FIG. 12. In order to observe the duality of each photon by experiment, it is necessary to conduct an interference experiment in which photons are supplied one by one individually to an interferometer and a state where only a single photon exists in the interferometer is duplicated repeatedly (Refer to, for example, A. Aspect, in Sixty-Two Years of Uncertainty, edited by A. I. Miller (Plenum Press, New York, 1990) p. 45 as an interference experiment in which such the single-photon source was used). However, even in the experiment by Aspect et al. using the single-photon source, the same interference fringes as those obtained in interference experiments using a typical laser source as a quasi-single-photon source, which is provided by attenuating the laser beam using a ND filter, or even using an ordinary intensity laser. This is because the stationary interference phenomenon is irrelevant to the intensity of the light source. If interference fringes are observed using an intense light source, the interference fringes will always be observed if the time is spent even if a ND filter is applied to the light source for attenuation. In addition, whatever light source should be applied, it is impossible to observe interference fringes formed by each single photon, and consequently, there is no method for simply and quantitatively evaluating the wave property of each individual photon except for using the visibility of interference fringes as a statistical evaluation quantity. Thus, it turns out that interference experiments may be conducted easily by using a laser light source having an ordinary intensity. Moreover, as already confirmed, whatever light source should be applied, as long as conventional types of the interferometer and the observation method shown in FIG. 5 are applied, it is impossible to observe simultaneous duality of each individual photon through the statistical duality because only the statistical complementary duality will be observed. FIG. 9 illustrating the method for representing a quantitative statistical duality $\mathcal{P}$ v) does not provide any prerequisites for how to supply particles to the interferometer and how to observe duality. In the end, as explained in relation to FIG. 11, whatever experimental method is applied, it turns out that the simultaneous complete duality of each individual particle is verified only if a single point $\mathcal{P}$ v) of statistical duality included in the region $\mathcal{P}$ +v>1 can be observed. Accordingly, the problem is narrowed down to what kind of interferometer and observation method should be applied to allow observation of the statistical duality included in this region.

An outline of the mechanisms for making it possible to observe the statistical duality in the region $\mathcal{P}$ +v>1 with the use of a simultaneous observation apparatus shown in FIG. 12 will be explained below. How to derive a visibility v representing a statistical wave property will be shown first. This apparatus has an unprecedented structure in which two interferometers are arranged in parallel without any space between them. The functions of this parallel interferometer will be explained. A laser beam emitted from the He—Ne laser 33 is expanded into a parallel beam after passing through a microscope objective 34 and a collimator lens 35, which then impinges on a Michelson interferometer. This parallel beam is split into two by a beamsplitter 36, and these two split parallel beams are reflected by mirrors 37 and 38 respectively to be superposed again through the beamsplitter 36, resulting in forming interference fringes on a screen 39. The period of these interference fringes can be arbitrarily controlled by, for example, slightly tilting the mirror 37 with respect to the mirror 38, thereby adjusting an intersecting angle θ of parallel beams $52(B_1)$ from the minor 38 and $53(B_2)$ from the minor 37. A rectangular aperture having width 4 a and height 2 b is opened in the screen 39 where interference fringes are formed and two rectangular apertures $\mathcal{A}_l$ and $\mathcal{A}_r$ each having the width 2 a and the height 2 b are adjoined in this aperture. Within these apertures, interference fringes having the intensity distribution shown in FIG. 13 should be formed beforehand. Although the visibility is set as v=1 in FIG. 13 for convenience, it is rather normal for this value to actually become slightly smaller than 1 depending on the devices that have been used. The positional relationship on the x axis between the apertures and the interference fringes has been adjusted, for example, by moving the mirror 38 backward or forward. Because of this adjustment, as seen from FIG. 13, the interference fringes are formed such that the aperture $\mathcal{A}_l$ contains 3 bright fringes and the aperture $\mathcal{A}_r$ contains 2 bright fringes, though the number of interference fringes within each individual aperture is the same. Naturally, the quantity of light passed through the aperture $\mathcal{A}_l$ is greater than that passed through the aperture $\mathcal{A}_r$. Accordingly, if the beams passed through the respective apertures are converged on a focal plane 43 using a lens, and the difference in intensities between the two beams passed through the aperture $\mathcal{A}_l$ and the two beams passed through the aperture $\mathcal{A}_r$ is detected, it is seen that the prescribed interference fringes are formed within the apertures. Further, as shown later, the visibility of the interference fringes may also be calculated. The experimentally obtained value was v=0.87±0.06.

This apparatus is a single Michelson interferometer up to the screen 39 on which interference fringes should be formed. However, it is seen that the system including up to the plane 43 where intensity is measured is a parallel interferometer in which the two systems of interferometers having the apertures $\mathcal{A}_l$ and $\mathcal{A}_r$ respectively are arranged in parallel without any space between them.

Next, how to derive the path-distinction probability $\mathcal{P}$ representing a statistical particle property will be summarized. In this case, there are characteristics in the optical system provided just behind the aperture plane 39. First, mechanisms for separating the two beams that have passed through the aperture $\mathcal{A}_l$ and the two beams that have passed through the aperture $\mathcal{A}_r$ from each other, and then for measuring light quantities of the individual four beams become necessary. As shown in FIG. 12, prisms 40 and 41 that join together facing sides each of which should have a vertical angle are placed between the aperture plane and a collimator lens 42, attached firmly to the aperture plane. In fact, the rectangular aperture of width 4 a and height 2 b is divided into two halves by the joining of these prisms, resulting in forming the two adjacent apertures $\mathcal{A}_l$ and $\mathcal{A}_r$ each of width 2 a and height 2 b without any space between them. The prisms 40 and 41 refract the beams having passed through the aperture $\mathcal{A}_l$ and the beams having passed through the aperture $\mathcal{A}_r$ in opposite directions from each other, which are then incident on the collimator lens 42, converging at the focal plane 43. The two beams 54($B_1$) and 55($B_2$) having passed through the aperture $\mathcal{A}_l$ are focused on two points 44($P_1$) and 45($P_2$) and two beams 56($B_1$) and 57($B_2$) having passed through the aperture $\mathcal{A}_r$ are focused on two points 46($Q_1$) and 47($Q_2$). Four slit apertures are placed at the above-given four focal points on the focal plane 43 of the collimator lens 42 and the beams focused at the individual focal points and then passed through the slits impinge on photodetectors 48($D_1$), 49($D_2$), 50($D_3$), and 51($D_4$), resulting in their intensities being measured. Let the intensities of the respective beams thus obtained be designated as $I_1$, $I_2$, $I_3$, and $I_4$ in turn. Incidentally, if the intensity of only the convergent beam 54($B_1$), which is formed by a part of the parallel beam 52($B_1$) passing through the lens 42, could be measured as $I_1$ and if the intensity of only the conversing beam 54($B_1$), which is formed by a part of the parallel beam 53($B_2$) passing through the lens 42, could be measured as $I_2$, the path-distinction probability in the interferometer having the aperture $\mathcal{A}_l$ could be $\mathcal{P}=1$ in either case. However, actually, for instance, the intensity $I_2$ that is measured through the slit placed at the focal point 45($P_2$) includes stray crosstalk light, which is a very small portion of the convergent beam 54($B_1$) focused at the neighboring focal point 44($P_1$). Accordingly, subtracting this crosstalk gives $\mathcal{P}=0.98\pm0.002$.

In this way, together with the visibility obtained previously, the statistical duality given by this parallel interferometer becomes $\mathcal{P}$ v)=(0.98±0.00, 0.87±0.06). Then, since this duality becomes $\mathcal{P}$ +v$\mathcal{V}$ 1.85>1, it is seen by referring to FIG. 9 that this duality is a statistical duality obtained as a result of observing the simultaneous complete duality of each individual photon. Giving a supplementary explanation, formation of interference fringes within the aperture can be seen from the inequality $I_1+I_2>I_3+I_4$. The visibility of interference fringes can be calculated from $(I_1+I_2)-(I_3+I_4)$ and the distance between the two focal points $P_1$ and $P_2$.

The process up until obtaining the above statistical duality measured value $\mathcal{P}$ v)=(0.98±0.00, 0.87±0.06) will be explained in detail.

A He—Ne laser having several mW output (3~4 mW) of linearly polarized light was mainly used in the experiment. Afterwards, for confirmation, an interference experiment was performed by applying a single-mode Ar-ion laser in combination with a ND filter to make an extremely low-light level in which only one photon exists in the interferometer on average. First, the experiment using the He—Ne laser will be explained, and then finally, the extremely low-light level interference experiment will be briefly mentioned.

In the apparatus shown in FIG. 12, measurements of individual rectangular apertures $\mathcal{A}_l$ and $\mathcal{A}_r$ were set to 25 mm long and 15 mm wide. The interferometer was adjusted such that the intensity distribution of longitudinal interference fringes formed within the apertures can be generally expressed as $$I(x,y)=I_{max}[1+\cos(2\pi x/l+\pi/2)]/2, \qquad (86)$$

where $I_{max}$ denotes the maximum intensity of the interference fringes, $l=\lambda/\theta$ denotes their period, $\lambda$ denotes a wavelength of light, and $\theta$ denotes the intersecting angle of the two parallel beams 52($B_1$) and 53($B_2$). The visibility of these interference fringes was assumed as v=1. Further, setting the number of interference fringes formed or, in other words, periods included in each individual aperture to N, the interferometer should be adjusted such that it becomes $$N=2a/l=(2n-1)/2, n=1, 2, 3, \qquad (87)$$

in relation to Eq. (86). In this experiment, as shown in FIG. 13, the intensity distribution of the interference fringes was arranged so as to give n=3, and was then adjusted so as to give N=2.5. Use of wavelength $\lambda$=633 nm of a He—Ne laser beam and period l=6 mm of the interference fringes gives $\theta\approx0.106\times10^{-6}$ radian≈0.022 sec. As a result of these adjustments, since the aperture $\mathcal{A}_l$ includes three bright interference fringes whereas the aperture $\mathcal{A}_r$ includes two bright interference fringes, the quantity of light passing through the aperture $\mathcal{A}_l$ will always exceed that passing through the aperture $\mathcal{A}_r$. When the intensity of light passing through the aperture $\mathcal{A}_l$ is denoted as I $[\mathcal{A}_l]$ and that passing through the aperture $\mathcal{A}_r$ as I$[\mathcal{A}_r]$, ratio $R_1$ of these intensities theoretically becomes $$R_1 \equiv \frac{I[\mathcal{A}_1]}{I[\mathcal{A}_r]} = 1.29. \tag{88}$$

Each of the two pairs of beams having passed through the individual apertures $\mathcal{A}_l$ and $\mathcal{A}_r$ is refracted in opposite directions with individual angles $\pm\beta(=5.9')$ by the prisms 40 and 41 and then incident on the collimator lens 42 having a focal length f=500 mm.

Consequently, four parallel beams impinge on the collimator lens 42. Here, suppose that, shutting out the beam 53($B_2$), only the beam 52($B_1$) impinges perpendicularly on the aperture plane. Let the centers of two independent intensity distributions of point images formed on the focal plane 43 of the collimator lens 42 by the incidence of the beam 52($B_1$) on this collimator lens be designated as 44($P_1$) and 46($Q_1$) respectively. Similarly, suppose that, shutting out the beam 52($B_1$), only the beam 53($B_2$) impinges on the aperture plane and let the centers of two independent intensity distributions of point images formed on the focal plane 43 of the collimator lens 42 by the incidence of the beam 53($B_2$) on this collimator lens be designated as 45($P_2$) and 47($Q_2$) respectively. Further, let the four intensity distributions of point images all formed in the above two cases be expressed as $$I(P_1)=|U(P_1)|^2, \; I(Q_1)=|U(Q_1)|^2 \text{(due to beam } B_1\text{)}; \tag{89}$$

$$I(P_2)=|U(P_2)|^2, \; I(Q_2)=|U(Q_2)|^2 \text{(due to beam } B_2\text{)}. \tag{90}$$

When each of individual intensity distributions of point images is generally expressed using the center P of each distribution and the coordinates (x',y') on the focal plane 43, $$I(P) = |U(P)|^2 = I_0 \left[\frac{\sin\{ka(x'-x'_P)/f\}}{ka(x'-x'_P)/f}\right]^2 \left[\frac{\sin(kby'/f)}{kby'/f}\right]^2 \tag{91}$$

is obtained (Refer to, for example, M. Born and E. Wolf, the aforementioned book, p. 393). Eq. (91) represents a Fraunhofer diffraction pattern when a plane wave having a wave number $k=2\pi/\lambda$ impinges on the rectangular aperture that is 2 b long and 2 a wide. Alternatively, it can be said that this equation is the square of the absolute value of a Fourier transformation of a complex amplitude distribution within the rectangular aperture due to the collimator lens 42. $I_0$ denotes intensity at the center P of the intensity distribution of the point image and is the maximum of the intensity distribution.

For reference, the two independent intensity distributions $I(P_1)$ and $I(P_2)$ and their positional relationship are shown in FIG. 14. Further, the two independent intensity distributions $I(Q_1)$ and $I(Q_2)$ and their positional relationship are similar to this drawing. However, since an intensity of light is measured using a 40 μm-wide slit placed parallel to the y' axis just in front of a photodetector, the y' dependence of an intensity distribution represented by Eq. (91) can be ignored. Then, since Eq. (91) substantially expresses an intensity distribution of a line image depending only on x', $I(P_1)$ and $I(P_2)$ can be regarded as each representing the intensity distribution of a line image. Each of these intensity distributions of line images is basically the same as the shape of the intensity distribution of a line image generated by an optical system having the resolving power R=λ as shown in FIGS. 6 and 7. When the resolving power of the collimator lens 42 is denoted by R, the width of the central peak of $I(P_1)$, for example, becomes 2 R and the distance between $P_1$ and $P_2$ becomes 2.5 R.

Here, there are two points that must be noted. One point is that, as seen from FIG. 14, the second low peak counting left from the central peak of $I(P_2)$ overlaps the central peak of $I(P_1)$. Actually, since the width of the central peak of $I(P_1)$ is 2 R, the second low peak counting left from the central peak of $I(P_2)$ and respective halves of the two low peaks on both sides of the above second low peak are included within the width of the central peak of $I(P_1)$. Photons included in these peaks stray onto the photodetector $I(P_1)$, which is primarily provided for receiving those photons included only in the central peak of $I(P_1)$, so that the path-distinction probability of this detector is lowered. These stray photons should be called crosstalk for convenience. The other point is that the width of the slit placed on the focal plane 43 of the lens 42 for leading only the central peak of $I(P_1)$ to the photodetector 48 is 40 μm. The theoretical value of the distance between $P_1$ and $P_2$ in FIG. 14 is f$\theta$=f$\lambda$/l≅52.8 μm. Since this value corresponds to 2.5 R, the width 2 R of the central peak of $I(P_1)$ becomes 42.2 μm. Hence the width 40 μm of the slit corresponds to 95% of the width of the central peak of $I(P_1)$. These two points must be taken into consideration later when the path-distinction probability for photons included in the beam $B_1$ will be derived accurately by using the photodetector 48. Similarly, when deriving the path-distinction probability for photons included in the beam $B_2$ by using the photodetector 49, the crosstalk from the beam $B_1$ must be taken into consideration. Incidentally, the measured distance between $P_1$ and $P_2$ was 53±2 μm. The period l of interference fringes in the apertures when this measured value is used may be calculated as l=6±0.3 mm from f=500 mm and λ=633 nm. This value of the period will be used later for calculating the visibility v of the interference fringes.

In this experiment, amplitude distributions $U(P_1)$ and $U(P_2)$ interfere mutually and form a single intensity distribution. Similar effect takes place also for amplitude distributions $U(Q_1)$ and $U(Q_2)$. From the conditions of the interference fringes within the aperture $\mathcal{A}_l$ shown in FIG. 13, it is seen that two wavefronts for the beams $B_1$ and $B_2$ interfere constructively at the center of the aperture $\mathcal{A}_l$. Hence, when the intensity distribution on the focal plane of the lens 42 is represented by $I(P_1, P_2)$, this can be written with the use of Eq. (91) as $$\begin{aligned}I(P_1, P_2) &= |U(P_1) + U(P_2)|^2 \\ &= I(P_1) + I(P_2) + U(P_1)U^*(P_2) + U^*(P_1)U(P_2) \\ &= \phi I(P_1) + \phi I(P_2),\end{aligned} \tag{92}$$

where U* denotes the complex conjugate of U and $\phi$ is defined by $$\phi = I(P_1,P_2)/\{I(P_1)+I(P_2)\}, \tag{93}$$

$\phi$ being a nondimensional function. Here, it should be noted that Eq. (92) is an identical equation. Moreover, even though $\phi$ is a function of position coordinates, since $\phi$ is merely a nondimensional number, Eq. (92) expresses that the intensity $I(P_1, P_2)$ of each point can be divided into two components of intensities $\phi I(P_1)$ and $\phi I(P_2)$. The intensity distribution $I(P_1, P_2)$ obtained through a numerical calculation of Eq. (92) is shown in FIG. 15. The fact that the two maximum values of the two highest peaks are larger than the individual maximum values of $I(P_1)$ and $I(P_2)$ and that a small peak appears in the middle of the two highest peaks are evidence that $U(P_1)$ and $U(P_2)$ interfere constructively.

On the other hand, from the conditions of the interference fringes within the aperture $\mathcal{A}_r$ shown in FIG. 13, it is seen that two wavefronts for the beams $B_1$ and $B_2$ interfere destructively at the center of the aperture $\mathcal{A}_r$. Accordingly, when the intensity distribution on the focal plane of the lens 42 is represented by $I(Q_1, Q_2)$, this is written with the use of Eq. (91) as $$I(Q_1,Q_2)=|U(Q_1)-U(Q_2)|^2=I(Q_1)+I(Q_2)-U(Q_1)U^*(Q_2)-U^*(Q_1)U(Q_2). \tag{94}$$

The intensity distribution $I(Q_1, Q_2)$ obtained through a numerical calculation of Eq. (94) is shown in FIG. 15. The facts that the two maximum values in the intensity distribution $I(Q_1, Q_2)$ are smaller than the individual maximum values of $I(Q_1)$ and $I(Q_2)$ and that the intensity at the middle of the two high peaks becomes zero are evidence that $U(Q_1)$ and $U(Q_2)$ interfere destructively.

The method to derive the path-distinction probability of the interferometer having the aperture $\mathcal{A}_l$ will be explained in detail. When crosstalk exists, it is impossible to directly measure a path-distinction probability experimentally. Therefore, for the time being, we will derive this path-distinction probability theoretically. Once a theoretical method is known, indirectly deriving the path-distinction probability experimentally becomes possible. However, v=1 must be assumed in the case of theoretical derivation.

Consideration will be given to output of the photodetector 48($D_1$) in FIG. 12. When designating this output as $I[P_1]$, the main part of this output is due to the convergent beam 54($B_1$) and a very small part of the convergent beam 55($B_2$) joins this output as crosstalk. Therefore, in order to derive the path-distinction probability, the output $I[P_1]$ must be divided into the above two components. For that purpose, a quantity called a beam ratio used in holography should be referred. A photosensitive material in which interference fringes formed due to interference between an object beam and a reference beam have been recorded is called a hologram, and the ratio of intensity of the object beam to intensity of the reference beam is called a beam ratio. As seen from Eq. (92), since the intensity distribution $I(P_1, P_2)$ can be regarded as interference fringes formed due to interference between $U(P_1)$ and $U(P_2)$, the beam ratio is ratio of $I(P_1)$ to $I(P_2)$. Here, in Eq. (92), when searching for the ratio R(x', y') of the component $\phi I(P_1)$ of intensity related to $I(P_1)$ to the component $\phi I(P_2)$ of intensity related to $I(P_2)$, it can be written as $$R(x', y') = \frac{\phi I(P_1)}{\phi I(P_2)} = \frac{I(P_1)}{I(P_2)} = R(x'). \tag{95}$$

The above equation shows that the ratio R(x', y') equals the beam ratio R(x'), which indicates the ratio of the respective intensities of the two beams $I(P_1)$ and $I(P_2)$ at each position before interference occurs. When applying Eq. (91) to $I(P_1)$ and $I(P_2)$, since the dependence on y' of their ratio is lost, the ratio of individual intensities of the two beams $I(P_1)$ and $I(P_2)$ at each position can ultimately be written as R(x'). Previously, it was mentioned that since $\phi$ is merely a nondimensional number function in Eq. (92), the interference fringes $I(P_1, P_2)$ can be divided into the two components $\phi I(P_1)$ and $\phi I(P_2)$. Eq. (95) shows that the ratio of this division agrees with the ratio of $I(P_1)$ to $I(P_2)$, that is, the beam ratio for forming the two-beam interference fringes $I(P_1, P_2)$. From this, the interpretation that the intensity $\phi I(P_1)$ is caused by the convergent beam 54($B_1$) and the intensity $\phi I(P_2)$ is crosstalk coming from the convergent beam 55($B_2$) holds.

According to the above interpretation, when a path-distinction probability of photons included in the convergent beam 54($B_1$) to the photodetector 48($D_1$) is represented by $\mathcal{P}(B_1: D_1)$, a numerical calculation of $\mathcal{P}(B_1: D_1)$ gives $$\mathcal{P}(B_1:D_1) = \frac{\int_{S_1} \phi I(P_1) dx'}{I[P_1]} = \frac{\int_{S_1} \phi I(P_1) dx'}{\int_{S_1} \phi [I(P_1) + I(P_2)] dx'} \cong 0.988, \tag{96}$$

where $S_1$ denotes the interval on the x' axis occupied by the slit aperture of the photodetector $D_1$. Similar calculation gives $\mathcal{P}(B_2: D_2) \cong 0.988$. Further, with respect to the crosstalk of the convergent beam 55(B2) to the photodetector 48($D_1$) etc., numerical calculations give $\mathcal{P}(B_2: D_1) = \mathcal{P}(B_1: D_2) \cong 0.012$. In this way, the theoretical value of the path-distinction probability of each individual photodetector 48($D_1$) and 49($D_2$) became $\mathcal{P} \cong 0.99$. The crosstalk of each detector was approximately 1%.

However, Eq. (96) does not give the expression of $\mathcal{P}(B_1: D_1)$ whose value can be determined based on experimental measurements. Therefore, defining an approximate path-distinction probability composed of measurable quantities as $\mathcal{P}_{app}$ gives $$\mathcal{P}_{app}(B_1:D_1) \equiv \frac{\int_{S_1} I(P_1) dx'}{\int_{S_1} [I(P_1) + I(P_2)] dx'} \cong 0.981. \tag{97}$$

Although $\mathcal{P}_{app}$ is small by 0.007 compared to $\mathcal{P}(B_1: D_1)$ given by Eq. (96), since the error is under 1%, it is apparent that $\mathcal{P}_{app}$ gives a very good approximation for $\mathcal{P}$. While it depends on accuracy of experiments, a value corresponding to $\mathcal{P}(B_1: D_1)$ given by Eq. (96) will be derived by adding 0.007 to a value $\mathcal{P}_{app}(B_1: D_1)$ that is obtained by experiment. Similarly, numerical calculations give $\mathcal{P}_{app}(B_2: D_2) \cong 0.981$. Further, for the crosstalk of the beam $B_2$ to the photodetector 48($D_1$) etc., numerical calculations give $\mathcal{P}_{app}(B_2: D_1) = \mathcal{P}_{app}(B_1: D_2) \cong 0.019$. Accordingly, in the case of crosstalk, a value corresponding to a theoretical value will be obtained by subtracting 0.007 from a value of the approximate path-distinction probability $\mathcal{P}_{app}(B_1: D_1)$ that is obtained by experiment.

As shown above, it has been proven, although approximately, that path-distinction probabilities can be obtained experimentally based on Eq. (97). For example, consideration will be given for measuring $\mathcal{P}_{app}(B_2: D_2)$. Following Eq. (97), $\mathcal{P}_{app}(B_2: D_2)$ can be written as $$\mathcal{P}_{app}(B_2:D_2) \equiv \frac{\int_{S_2} I(P_2) dx'}{\int_{S_2} [I(P_1) + I(P_2)] dx'}. \tag{98}$$

Accordingly, when $I_{S_2}(P_r)$ and $I_{S_2}(P_2)$ represent those intensities obtained by measuring $I(P_1)$ and $I(P_2)$ through the slit $S_2$ of the photodetector $D_2$, Eq. (98) can be rewritten as $$\mathcal{P}_{app}(B_2:D_2) = \frac{I_{S_2}(P_2)}{I_{S_2}(P_1) + I_{S_2}(P_2)}. \quad (99)$$

With the interferometer shown in FIG. 12, $I_{S_2}(P_1)$ denotes the intensity of the beam 52($B_1$) alone measured by the photodetector 49($D_2$) after obstructing the beam 53($B_2$), while $I_{S_2}(P_2)$ denotes the intensity of the beam 53($B_2$) alone measured by the photodetector 49($D_2$) after obstructing the beam 52($B_1$). When $I_{S_2}(P_1)$ and $I_{S_2}(P_2)$ were respectively measured five times and $\mathcal{P}_{app}$ ($B_2$: $D_2$) was calculated in the above manner, resulting values were all included in the following region:

$$\mathcal{P}_{app}(B_2: D_2) \doteq 0.973 \pm 0.002. \quad (100)$$

For the sake of direct comparison to the theoretical value given by Eq. (96), since 0.007 may be added to the above value, the value of path-distinction probability can be finally written as $\mathcal{P}$ ($B_2$: $D_2$)=0.98±0.002≅0.98. Although this is an example of path-distinction probability derived experimentally, since the error compared with the theoretical value $\mathcal{P}$ ≅0.99 is 1%, it can be said that the theory and the experiment are in good agreement. Incidentally, even if $\mathcal{P}_{app}$ ($B_2$: $D_2$)≐0.97 is applied directly without adding 0.07 to the experimental value of path-distinction probability, the error to the theoretical value remains 2%. Note that in the first report of this experiment (Takashi Suzuki, KOGAKU 22, 550 (1993); in Japanese), the theoretical value $\mathcal{P}$ ≅0.99 was used by mistake as the path-distinction probability.

Next, results of measuring visibility v of interference fringes formed within the aperture $\mathcal{A}_l$ will be shown. In the case of visibility, since it is different from the case of path-distinction probability and has no relevance to crosstalk, the visibility can be obtained by calculation using only experimentally measured quantities. For measuring this visibility, it is essential to utilize the interferometer having the aperture $\mathcal{A}_r$ which is adjacent to the interferometer having the aperture $\mathcal{A}_l$ This is because, in order to calculate a visibility of interference fringes within the aperture $\mathcal{A}_l$ interference fringes having the same visibility but including different numbers of bright fringes have been formed in advance within the respective apertures $\mathcal{A}_l$ and $\mathcal{A}_r$ having the same form. As already shown, the period of the interference fringes that was calculated back from the measured distance between the two focal points $P_1$ and $P_2$ was l=6±0.3 mm. The visibility of the interference fringes within the apertures can be derived by calculation based on the known values of this period, $I_{S_1+S_2}(P_1,P_2)$ that is the sum of the outputs of the two photodetectors $D_1$ and $D_2$, and $I_{S_3+S_4}(Q_1,Q_2)$ that is the sum of the outputs of the two photodetectors $D_3$ and $D_4$. Here, when an output of the photodetector $D_1$ measured through the slit $S_1$ is denoted by $I_{S_1}(P_1,P_2)$ and an output of the photodetector $D_2$ measured through the slit $S_2$ by $I_{S_2}(P_1, P_2)$, the measured value of the intensity distribution of I($P_1$,$P_2$) can be expressed as $$I_{S_1+S_2}(P_1,P_2) = I_{S_1}(P_1,P_2) + I_{S_2}(P_1,P_2) \quad (101)$$

Then, letting $S_3$ and $S_4$ denote slit apertures of the photodetectors $D_3$ and $D_4$ respectively, the ratio of $I_{S_1S_2}(P_1,P_2)$ to $I_{S_3S_4}(Q_1,Q_2)$ is written as $$R_2 = \frac{I_{S_1+S_2}(P_1, P_2)}{I_{S_3+S_4}(Q_1, Q_2)}. \quad (102)$$

This $R_2$ almost corresponds to $R_1$=1.29 that was the ratio of I [$\mathcal{A}_l$] representing the intensity of light passed through the aperture $\mathcal{A}_l$ to I[$\mathcal{A}_r$], representing the intensity of light passed through the aperture $\mathcal{A}_r$ shown in Eq. (88). $I_{S_1+S_2}(P_1, P_2)$ and $I_{S_3+S_4}(Q_1,Q_2)$ were respectively measured five times and $R_2$ was calculated, giving $$R_2 = 1.25 \pm 0.02. \quad (103)$$

Resulting in $R_2 < R_1$ shows that the visibility of interference fringes formed within the apertures $\mathcal{A}_l$ and $\mathcal{A}_r$ may be lower than the theoretical visibility of v=1. When setting the width of each aperture as 2 a=15 mm together with the use of the above value of $R_2$ and the period of interference fringes l=6 mm, the calculation of the experimental value of visibility of the interference fringes formed within the aperture $\mathcal{A}_l$ gives $$v = 0.87 \pm 0.06. \quad (104)$$

The reason for the decreased visibility seems to exist in the deterioration of coatings for optical devices such as the collimator lenses 35 and 42, the semitransparent mirror 36, and the reflecting mirrors 37 and 38, all of which were made more than 15 years ago, resulting in that the intensity ratio of the parallel beam 52(B1) to the parallel beam 53(B2) is slightly deviated from 1, and in that light scattering has occurred.

As given above, the statistical duality obtained in the experiments of simultaneous observation of duality is represented by $\mathcal{P}$ v)=(0.98±0.002, 0.87±0.06)≈(0.98±0.00, 0.87±0.06) (Refer to FIG. 9). In the two-dimensional representation of statistical duality shown in FIG. 9, the fact that observing this statistical duality included in the region $\mathcal{P}$ +v>1 becomes an experimental evidence that each individual photon itself has the simultaneous complete duality is already described in detail. In other words, the above experiments had shown that each individual photon has a spatially dual structure comprising a photon as a particle having energy and momentum and its associated real phase wave carrying no energy.

For the purpose of confirming the above conclusion, an experiment carried out by combining together a pseudo-single-photon source and a high-sensitive image pick-up device with a parallel-interferometer will be described. In FIG. 12, a laser beam (λ=488 nm) was attenuated to 1.2×10$^6$ photons/sec by inserting a ND filter between the single mode Ar-ion laser 33 and the microscope objective 34. The two diffraction patterns I($P_1$, $P_2$) and I($Q_1$, $Q_2$) were formed on the focal plane 43 of the collimator lens 42. The density of photons forming these diffraction patterns was 2×10$^4$ photons/sec. Converting this density of photons into an average spatial density gave 1 photon/15 km. The optical path length from the microscope objective 34 to the surface of a photoelectric device was a little shorter than 2 m. Photons emitted by a single-mode laser have a Poisson distribution. Therefore, provided that the above optical path length is 2 m, the probability of two photons existing in this length was 1.3 times/sec. According to this calculation, it turned out that each of (2×10$^4$−2.6) photons interfered per second with itself, resulting in formation of the two diffraction patterns I($P_1$, $P_2$) and I($Q_1$, $Q_2$).

Images of the above diffraction patterns I($P_1$, $P_2$) and I($Q_1$, $Q_2$) were formed on the photoemissive plane surface of the high-sensitive image pick-up device (PIAS: Photon-Counting Image Acquisition System; for the PIAS, refer to Y. Tsuchiya et al., J. Imaging Technol., 11, 215 (1985)) using a microscope objective. An output of the PIAS is shown in FIG. 16. Although the left and right sides of the diffraction patterns I($P_1$, $P_2$) and I($Q_1$, $Q_2$) in this drawing are reversed to those of the two diffraction patterns on the focal plane 43, this is because these diffraction patterns on the focal plane 43 had been magnified and projected by the microscope objective on the photoemissive surface of the PIAS. Even under this very low intensity of light, as seen from the diffraction pattern I(P$_1$, P$_2$), the small peak generated by the interference between the beams U(P$_1$) and U(P$_2$) could be obtained in the center between the two highest peaks. Since isolating the vibration of the measuring apparatus was not sufficient, it was difficult to get stable photometric data during two minutes of exposure. Under such circumstances, the ratio of the intensity of the diffraction pattern I(P$_1$, P$_2$) to that of the diffraction pattern I(Q$_1$, Q$_2$) corresponding almost to the ratio represented by Eq. (88), i.e., R$_1$=1.29, was measured several times and the maximum value obtained was 1.23. Thus, it was confirmed under the above very low intensity of light that interference phenomena of each individual photon with itself occurred, and therefore, the photon associated with a real wave.

5.5.5. The Experiment of Simultaneous Observation of Duality and the Uncertainty Principle Here, the relation of the above experiment of simultaneous observation of duality and the uncertainty principle will be examined. The interferometer having the aperture $\mathcal{A}_1$ will be examined. In this optical system, the aperture $\mathcal{A}_1$ of width 2 a confines the position of each photon along the x axis. In other words, although the position of each photon along the x axis can be measured by using this aperture $\mathcal{A}_1$ the absolute value of the maximum error of the position measurements is expressed by $$\Delta x = 2a (\Delta x \leq 2a). \tag{105}$$

On the other hand, when focusing on the intensity distribution I(P$_1$) shown in FIG. 14, the resolving power R of this optical system is defined by the distance from the point P$_1$ where I(P$_1$) exhibits the maximum value to a point nearest to P$_1$ where I(P$_1$) exhibits the minimum value of 0. Then, when I(P$_1$) is expressed by Eq. (91) and provided that P$_1$ is set as the origin of the x' axis, it is seen that the distance R from this origin to the point giving the first minimum value of I(P$_1$) is given by πf/ka. That is, $$R = \frac{\pi f}{ka} = \frac{f\lambda}{2a}. \tag{106}$$

In FIG. 12, since the x component of momentum of each individual photon included in the parallel beam 52(B$_1$) incident on the aperture $\mathcal{A}_1$ is almost 0, the x' component of the change in momentum $\Delta p_{x'}$ of the photon that should arrive at the position x'=R can be written from Eq. (106) as $$\Delta p_{x'} = \frac{hR}{\lambda f} = \frac{h}{2a}. \tag{107}$$

Consequently, from Eqs. (105) and (107), the following uncertainty relation is derived as $$\Delta x(t) \times \Delta p_{x'}(t') \leq h (t < t'). \tag{108}$$

This uncertainty relation coincides with the expression of Eq. (75) is a statistical, nonsimultaneous uncertainty relation, which is different from the Heisenberg uncertainty relation and whose existence has newly been shown.

On the other hand, the quantity of light contained in the central peak having a width 2 R of the intensity distribution of I(P$_1$) occupies approximately 90% of that contained in the entire intensity distribution of I(P$_1$). Therefore, the nonsimultaneous uncertainty relation given by Eq. (108) means that, when the position of a photon along the x axis is measured with an error $\Delta x$, the x' component of the change in momentum $\Delta p_{x'}$ of the photon after the measurement will be included with the probability of approximately 90% within the region expressed by $$-\frac{h}{\Delta x} \leq \Delta p_{x'}(t') \leq \frac{h}{\Delta x}. \tag{109}$$

Such photon that has undergone the change in momentum will be found with the same 90% probability within the interval $$-f\frac{\lambda}{2a} \leq x' \leq f\frac{\lambda}{2a} \tag{110}$$

on the x' axis because the resolving power of this optical system is given by Eq. (106). If geometrical optics were valid, all of the photons should have been found at the position x'=0. Hence, provided that the difference in the position from x'=0 is denoted by $\Delta x'$, the following simultaneous uncertainty relation $$\Delta x' \times \Delta p_{x'} \leq \frac{f\lambda}{4a^2} h \approx 1.4 \times 10^{-5} h \ll h \tag{111}$$

will be derived using Eqs. (107) and (110) and 2 a=15 mm, etc. for approximately 90% probability of each individual photon found along the x' axis at the focal plane 43. The existence of the simultaneous uncertainty relation represented by Eq. (111) has been confirmed first by experiment. Also in this simultaneous observation experiment, actually measured on the observation plane 43 was only the coordinate x' of the position of each individual photon and measurement of the momentum p$_{x'}$ was unnecessary. This was one of the factors in leading to the success of the simultaneous observation of wave-particle duality.

Further, the simultaneous uncertainty relation valid on the x axis in the aperture plane 39 will be expressed as follows: Examination of the aperture $\mathcal{A}_1$ as an example gives $\Delta x$=2 a=15 mm. Since the aperture $\mathcal{A}_1$ is illuminated by the parallel beam from the collimator lens 35, the uncertainty of the momentum of each individual photon incident on the aperture $\mathcal{A}_1$ can be assumed as p$_x$≈0 with respect to the beam 52(B$_1$) for example, finally resulting in $$\Delta x \times \Delta p_x \approx 0 \ll h. \tag{112}$$

From the above expression together with Eq. (111), it is seen that the Heisenberg uncertainty relation represented by Eq. (65) is not valid in either observation planes, leading to $$\Delta x \times \Delta p_x \neq h. \tag{113}$$

Previously, in FIG. 8, the relation between the position measurement using a slit having the width 2 a and the uncertainty principle was examined. The nonsimultaneous uncertainty relation expressed by Eq. (108) agrees with Eq. (75) and Eq. (110) agrees with an equation that is obtained by substituting L with f and $\lambda_d$ with $\lambda$ in Eq. (77) on the premise of 2 a>>$\lambda_d$. Further, the nonsimultaneous uncertainty relation expressed by Eq. (108) is a statistical law indicating that, when the position of a particle having p$_x$≈0 is measured by a method whose maximum error is $\Delta x$, the change in momentum along the x axis exists with a high probability of approximately 90% within the region specified by $\pm h/\Delta x$. In this way, it has been proven by the above experiment of simultaneous observation of duality that a general principle called the Heisenberg uncertainty principle does not exist. Although it has been written in quantum mechanics textbooks that 'the uncertainty principle obstructs the simultaneous observation', it is impossible for a principle that does not exist to obstruct the experiment. It should be noted that while the existence of the simultaneous uncertainty relation represented by Eq. (111) was one of the technological factors in leading to the success of this simultaneous observation experiment, there were also other factors such as providing the parallel interferometer shown in FIG. 12 and then setting $n \geq 3$ ($N \geq 2.5$) in Eq. (87).

Incidentally, we have seen that a scalar wave function or a complex amplitude U in physical optics works very well in the theoretical analysis of this simultaneous observation experiment. Later, in '7.1.3. The third subject: The procedure for deriving relativistic wave equations', it will be shown that when the mass of a particle is set to 0, the Klein-Gordon equation formally agrees with the above scalar wave equation in physical optics.

5.5.6. A Foregoing Experiment Showing the Reality of Phase Waves and a Correction of the 'Principle of Interference'

An interference experiment whose result cannot be explained without assuming that each individual photon is associated with a real wave was carried out by Mandel et al. (R. F. Pfleegor and L. Mandel, Phys. Rev. 159, 1084 (1967); J. Opt. Soc. Am., 58, 946 (1968)). Two beams emitted respectively by two independent single-mode He—Ne lasers were after attenuated by passing through ND filters superposed by the use of an interferometer. Even though the light intensities were lowered by the attenuation to a degree that, with high probability, one photon was absorbed by a detector before the next one was to be emitted by either of the lasers, interference occurred. In this case, because interference fringes were not stationary, a specific feature was given to an apparatus to detect the interference fringes. In this apparatus, the plane in which the interference fringes were formed was different from the plane in which each individual photon contributed to forming the fringes was detected (Refer to R. F. Pfleegor and L. Mandel, the aforementioned papers). (Similarly, in the parallel interferometer shown in FIG. 12, the aperture plane 39 in which interference fringes are formed differs from the plane 43 detecting each individual photon.) Mandel et al. concluded that the results of their experiment also were based on the principle of interference presented by Dirac (Refer to P. A. M. Dirac, aforementioned book, pp. 9-10). In contrast, de Broglie et al. (L. de Broglie and J. A. e Silva, Phys. Rev. 172, 1284 (1968)) asserted that the experiment by Mandel et al. could be explained by de Broglie's concept of the simultaneous existence of electromagnetic waves and photons. The reality of phase waves each associated with an individual photon has been demonstrated by the application of the parallel interferometer shown in FIG. 12. Consequently, it turns out that, also in the experiment by Mandel et al., two very weak phase waves respectively emitted by two lasers always interfere with each other at the detection plane of the interference fringes. Based on the results of the simultaneous observation experiment shown previously, since a single photon can obviously be emitted only by either one of the two lasers, aside from whether they were classical electromagnetic waves or phase waves, the existence of very feeble waves individually emitted from both lasers cannot be denied. Therefore, it is necessary to rewrite the principle of interference by Dirac in the following manner: 'Although a phase wave associated with a photon (particle) interferes in principle with another phase wave accompanied by another photon (particle) as well as with itself, a photon (particle) as a particle part possessing energy does never interfere with another photon (particle) as well as with itself in either case'.

In the case of massive particles emitted from an actual particle source, since de Broglie wavelengths of individual different particles are extremely short and unequal, and moreover, initial phases of individual de Broglie waves and phase differences among individual de Broglie waves are random, the above interference effects can be ignored. The same holds for photons emitted by different sources other than lasers. Therefore, in general, the principle of interference due to Dirac may be considered valid. However, as given above, the experiment by Mandel et al. has had great importance in evaluating the essence of interference phenomena.

5.5.7. Physical Significance of the Simultaneous Observation Experiment and the Construction of Dual Mechanics The results obtained directly through the experiment of simultaneous observation of duality will be summarized here. Firstly, it has been proven that interference of each photon with itself is caused by a spatial-temporal dual structure of the photon consisting of a particle part possessing energy and momentum and its associated wave part of a real phase wave carrying no energy. In other words, each photon has simultaneous complete duality. Secondly, it has been shown that the simultaneous uncertainty relation between the error in the measurement of the position and the error in the measurement of the momentum of the particle part of each photon holds, and therefore, this result has clearly substantiated that a trajectory of the particle part of each photon exists. Thirdly, it has been proven that the statistical nonsimultaneous uncertainty relation holding true between the error in the measurement of the position of each individual photon and the change in momentum of the photon whose position has been measured beforehand exists. Approximately 90% of photons each of whose position has been measured beforehand conform to this statistical uncertainty relation.

The results that can be derived rationally for massive particles based on the above-mentioned results for photons, the law of conservation of relativistic energy including the law of conservation of the number of particles, and the discussions that began with FIG. 5 and ended with FIG. 11 will be summarized here. The cause of every massive particle generating interference with itself exists in its spatial-temporal dual structure consisting of a particle part possessing energy and momentum and its associated wave part of a real de Broglie wave carrying no energy. In other words, every massive particle has simultaneous complete duality. Since the simultaneous uncertainty relation between the error in the measurement of the position and the error in the measurement of the momentum of the particle part of each massive particle holds, a trajectory of the particle part of each massive particle exists. In addition, the statistical nonsimultaneous uncertainty relation holding true between the error in the measurement of the position of each individual massive particle and the change in momentum of the massive particle whose position has been measured beforehand exists. Approximately 90% of massive particles each of whose position has been measured beforehand conform to this statistical uncertainty relation. In contrast, the most fundamental concepts of probability waves, the principle of superposition of states, and the Heisenberg uncertainty principle in quantum mechanics have failed.

The results obtained based on the reality of phase waves (de Broglie waves) will be summarized. The state of each individual particle and the wave function representing a real phase wave have a one-to-one correspondence on a real time axis. As a result, it turns out that the so-called principle of superposition of states should be clearly separated into the 'principle of interference' with which real phase waves are involved and the statistical 'principle of superposition of states' to which the real phase waves are irrelevant. The role of the statistical 'principle of superposition of states' is to describe or predict statistical results of an experiment in which numerous particles are involved. Therefore, statistical wave functions, each representing the state of an ensemble of particles, all of which are involved in the experiment, should be defined. The individual eigenfunctions can be corresponded to the respective states of subensembles each of which contains those particles having the same specific eigenvalue. A wave equation having solutions of the above statistical wave functions must have the same form as a wave equation having solutions of real phase waves each associated with individual particles that are elements of the ensemble represented by the statistical wave function. In the above, provided that a law valid for each individual particle is defined as a primary principle (law), a statistical law valid for an ensemble of numerous particles involved in an experiment should be regarded as a secondary principle (law). Referring to such criteria for classification, the 'principle of interference' is a primary principle and the statistical 'principle of superposition of states' and the statistical 'nonsimultaneous uncertainty principle' are clearly secondary principles. Although the primary principles (laws) can surely be called natural laws, there is room for arguing for each law whether or not the secondary principles (laws) as physical laws can be called natural laws. For example, those particles that relate to the statistical 'nonsimultaneous uncertainty relation' valid between the position x and momentum $p_x$ make up approximately 90% of all the object particles. Further, strictly speaking from a physical viewpoint, massive continua, that is, solids and liquids, do not exist in the natural world. This is because the solids and liquids are aggregations of particles such as atoms and molecules. The secondary principles concerning ensembles of numerous particles are different from primary principles concerning each individual particle, and have a statistical aspect meaning that particle-by-particle descriptions using real space-time coordinates must be abandoned.

As seen from the above discussions, when arguing technologies on microscopic particles utilizing natural laws, the natural laws have mainly signified secondary principles (laws). It is no exaggeration to say that, except for macroscopic laws concerning solids and liquids, the secondary principles are mostly statistical laws. The basis of statistical wave mechanics will be established with this invention.

An outline of main conclusions obtained in the course of continuous preliminary works for constructing dual mechanics is as follows:

(1) All particles from celestial objects to photons have simultaneous complete duality consisting of a particle part and a phase or phase wave part. (As will be mentioned later, the simultaneous complete duality for massive particles comes from each individual particle having a space-time dual structure itself.)

(2) Mechanics describing the behavior of each free particle in motion has a dual system integrating particle mechanics in which a trajectory is made to exist for each individual particle and wave mechanics for a phase wave associated with the particle. (An equation of motion to which the particle conforms and a wave equation to which the phase wave conforms are simultaneously valid but are basically different equations.)

(3) Only the Klein-Gordon equation is available as a relativistic wave equation. However, a wave function represents a phase wave (In the case of massive particles, it is also called a matter wave or a de Broglie wave) instead of a conventional probability wave. (Since the Dirac equation does not hold in physical space, this equation is excluded from dual mechanics.)

(4) The solution of the Klein-Gordon equation in the limit $c \to \infty$ can be written as $\Psi(r, t)=0$ when $\Psi$ denotes a de Broglie wave. This means that $\Psi$ cannot be a probability wave, and simultaneously, wave mechanics becomes unnecessary and only Newtonian mechanics is available as particle mechanics in the limit $c \to \infty$. (This can be called unification of dual mechanics.)

(5) In any case when the velocity of a microscopic massive particle is near the velocity of light or a particle is a macroscopic particle, since the wavelength of the phase wave becomes extremely short and the wave property can be ignored ($\Psi \to 0$), only particle mechanics is available. (This is also called unification of dual mechanics.)

(6) The Schrödinger equation having a mass term, which is derived by using the relativistically approximated Hamiltonian obtained under the condition $\beta^2 \equiv (v/c)^2 \ge <1$, has a de Broglie wave as a solution, and moreover, a rest solution as with the Klein-Gordon equation. Further, the solution of this Schrödinger equation in the limit $c \to \infty$ can be written as $\Psi(r, t)=0$, as with the Klein-Gordon equation, when $\Psi$ denotes a de Broglie wave. (Since the nonrelativistic Schrödinger equation does not hold in physical space, this equation is excluded from dual mechanics.)

(7) The space-time structure of a free particle represented by the rest solution of a wave equation consists of a particle with mass $m_0$ localized in space and its surrounding entire phase space oscillating with angular frequency $\omega = m_0 c^2 / \hbar$. That is, the rest particle itself has a space-time dual structure consisting of the particle and the phase space.

(8) When the state of an ensemble of an infinite number of particles that can correspond to all the indefinite number of particles supplied to an experiment is denoted by the normalized statistical wave function $\psi$, relativistic statistical wave mechanics whose basic equation is the statistical Klein-Gordon equation having $\psi$ as its solution holds. That statistical Klein-Gordon equation must have the same form as the Klein-Gordon equation having $\Psi$ as its solution.

(9) The superposition principle concerning interference phenomena of individual particles is different from the so-called principle of superposition of states and must be considered independently as the 'principle of interference' subject to the law of conservation of relativistic energy.

(10) The 'principle of superposition of states' is a statistical law that should be applied to a set of states of subensembles each consisting of particles all having the same eigenvalue, where the number of subensembles is the same as the number of eigenvalues, so that this principle can represent the state of an ensemble consisting of all of an indefinite number of particles that should be supplied to an experiment. Accordingly, this principle is valid in relativistic statistical wave mechanics.

(11) The 'simultaneous uncertainty relation' for each individual particle and the statistical 'nonsimultaneous uncertainty relation' become valid instead of the Heisenberg uncertainty principle. The 'simultaneous uncertainty relation' signifies the existence of a trajectory in the motion of a single particle. The statistical 'nonsimultaneous uncertainty relation' is a statistical law indicating that, when the position of a particle having $p_x \approx 0$ before measuring is measured by a method whose maximum error is $\Delta x$, the change in momentum along the x axis exists with a high probability of approximately 90% (in the case of a one-dimensional treatment) within the range defined by $\pm h/\Delta x$.

(12) Referring to special relativity, an electron has a high possibility of not being an elementary particle but being a composite particle. Further, possibility that the electron is a composite particle consisting of a particle possessing a charge and another particle with a + or − magnetic charge cannot be denied completely. If so, instead of the magnetic moment associated with a spin, the existence of the particle with a + or − magnetic charge can be assumed. However, even at the present time when the magnetic charge has not yet been identified in experiments, it may be assumed that, including the electron, particles each having a mass larger than the mass of an electron and the + or − spin are composite particles each having an individual internal structure.

Quantum mechanics concerning only microscopic particles had excluded classical mechanics (Refer to FIG. 1). From the summary given above, it turns out that the fundamentals for universal mechanics relevant also to microscopic particles have rather existed also in classical mechanics as mechanics for particle parts according to various conservation laws. As shown in the above conclusions (1) and (7), every particle has a space-time dual structure. Hence, in order to accurately express the general name of particles, it will be appropriate to designate not as quanta representing an extremely vague concept but as 'dual particles' or 'dualicles' clearly reflecting the above-mentioned space-time structure. However, normally, it may simply be called particles. For the sake of accurately describing the motion of each dual particle, both mechanics, that is, wave mechanics and particle mechanics, are simultaneously essential as shown in the conclusion (2). The mechanics integrating wave mechanics and particle mechanics will be called dual-particle mechanics or dual mechanics meaning that the motion of a dual particle is dualistically described by applying both wave mechanics and particle mechanics. In general, the motion of every particle from elementary particles including photons to magnificent celestial objects can be described by dual mechanics as a single system of mechanics in which mass is the only and primary internal degree of freedom.

The above discussion concludes the preliminary work for constructing the entire system of dual mechanics which can be, instead of quantum mechanics, new mechanics for providing design and evaluation methods in the field of advanced information processing technology and new elemental technology. Nonrelativistic quantum mechanics and relativistic quantum mechanics in the system of mechanics shown in FIG. 1 result in losing at least their positions as the most fundamental mechanics maintained for 80 years since their establishment inspired by the simultaneous observation experiment explained in detail in the above.

5.6. Application of a New System of Mechanics to Technology 5.6.1. Main Aspects of this Invention As described at the beginning of '5. Disclosure of the invention', a first object of this invention is to provide new methods for designing and evaluating devices and apparatus relevant to microscopic particles by constructing new mechanics which, instead of quantum mechanics, can be means for designing these devices and apparatus. Further, a second object is to provide devices or apparatus relevant to microscopic particles and especially apparatus for evaluating whether or not quantum computers can be realized by applying these new design and evaluation methods.

Main items of embodiments of this invention for achieving the above objects will be explained in detail in the following:

(First Aspect of the Invention)

An apparatus according to this aspect of the invention is involved with each microscopic massive particle, wherein at least a part of this apparatus is characterized in that it is designed using at least either relativistic statistical wave mechanics or semirelativistic statistical wave mechanics both in the system of dual mechanics consisting of relativistic dual mechanics and semirelativistic dual mechanics, which are obtained by integrating broad particle mechanics and broad wave mechanics under both the equivalence principle of energy E=H indicating equivalence between energy of a wave-like expression E=hν and the relativistic Hamiltonian H as a particle-like expression of energy and the law of conservation of relativistic energy; where the broad particle mechanics is constructed by adding statistical particle mechanics, which consists of relativistic statistical particle mechanics and semirelativistic statistical particle mechanics both based on narrow particle mechanics and dealing with ensembles each including particles, to the narrow particle mechanics, which consists of relativistic particle mechanics and semirelativistic particle mechanics both insisting that 'there is a trajectory of each individual particle in motion', and the broad wave mechanics is constructed by adding statistical wave mechanics, which consists of relativistic statistical wave mechanics and semirelativistic statistical wave mechanics both based on narrow wave mechanics and dealing with states of individual ensembles each including particles involved in at least a part of the aforementioned apparatus, to the narrow wave mechanics, which consists of relativistic wave mechanics and semirelativistic wave mechanics both insisting that a real phase oscillation associates with each individual particle at rest and a real phase wave associates with each individual particle in motion (Refer to FIG. 26).

(Second Aspect of the Invention)

Second aspect of the present invention is a method of designing a device or an apparatus by applying statistical wave mechanics that can describe a state of an ensemble of massive microscopic particles all involved with the above device or apparatus in a system consisting of the above device or apparatus and an inertial system fixed to the device or apparatus, wherein the method is characterized in that it includes: a step of unifying at least one of the space-time coordinates as a variable of the wave function ($\Psi_n$) representing the state of each individual particle belonging to the above ensemble, that is, for example, unifying all of each individual time $t_n$ into a hypothetical time t representing the same time in order to determine a statistical wave function ($\psi$) representing the state of the above ensemble, and then representing it by the sum of all of those wave functions.

(Third Aspect of the Invention)

Further, a third aspect of the present invention is a method of designing a device or an apparatus by applying statistical wave mechanics that can describe a state of an ensemble of individual particles in a system consisting of a device or an apparatus concerning all of individual particles each associated with a de Broglie wave and an inertial system fixed to a detection plane for all of the above particles that are involved with the above device or apparatus, wherein the method is characterized in that it includes: a first step of determining the statistical wave function ($\psi$) representing the state of the above ensemble; a second step of determining, in the case when the above device or apparatus is provided with a part that narrowly restricts a path for the above individual particles (width w), for example, apertures, whether or not to take into consideration a spread on the detection plane due to diffraction of an assumed statistical plane de Broglie wave incident on the above part (width w), which narrowly restricts the path; and a third step of calculating a spread (width $w_c$) of particle rays on the above detection plane, where the rays have geometrical optically passed through the above part (width w) narrowly restricting the path for each individual particle by applying particle mechanics or statistical particle mechanics, as well as calculating a main spread (width W) of the diffraction pattern on the detection plane assuming that the statistical plane de Broglie wave has impinged on the part (width w) narrowly restricting the path when the diffraction should be taken into consideration, and calculating the spread (width $w_c$) of the particle rays that have geometrical optically passed through the part (width w) narrowly restricting the path by applying particle mechanics or statistical particle mechanics when consideration of diffraction is unnecessary.

(Fourth Aspect of the Invention)

Further, a fourth aspect of the present invention is a method of designing a device or an apparatus concerning all of individual particles each associated with a de Broglie wave ($\Psi$), wherein the method is characterized in that the above designing is performed by applying the statistical nonsimultaneous uncertainty relation that is valid between a maximum value of measurement errors or range of restricted values, which is obtained by measuring or restricting a first physical quantity (e.g., position of a particle) of every individual particle using the above device or apparatus concerning all of the individual particles, and change in a second physical quantity (momentum of each particle), which is in a canonical conjugate relation with the first physical quantity, due to the above measurement or restriction.

(Fifth Aspect of the Invention)

Further, a fifth aspect of the present invention is a method of designing a device or an apparatus by applying statistical wave mechanics that can describe a state of an ensemble of individual particles in a system consisting of the above device or apparatus concerning all of the above individual particles each associated with a de Broglie wave and an inertial system fixed to the detection plane of the individual particles, wherein the method is characterized in that it includes: judging at least whether or not the influence of diffraction should be taken into consideration for designing the above device or apparatus based on the comparison of W and w, for example, the value of R=W/w, where width W of the main spread of the distribution of particles on the detection plane caused by the diffraction is given by W=w+2λL/w, λ denoting the de Broglie wavelength, w denoting the width of the aforementioned part restricting a path for the above individual particles or the maximum value of measurement errors in measuring each individual position of the particles or the width of restricted values in restricting the positions, and L denoting the distance from the position of the part (width w) narrowly limiting the path for the above individual particles or position where the aforementioned measurement or restriction is performed to the detection plane.

(Sixth Aspect of the Invention)

Further, an apparatus according to this sixth aspect of the present invention is an evaluation apparatus for evaluating the function of another apparatus using N number of devices or two-level molecules each of which can take two different states concerning microscopic particles, wherein the state of the N number of devices after the time t elapses is represented by $\theta(t)=(2^{-t/\tau})^{1/2}\psi_1(t)+(1-2^{-t/\tau})^{1/2}\psi_2(t)$ based on the initial condition at time t=0 that all the N number of devices are in an excited state, the half-life τ of an excited state, a statistical wave function $\psi_1(t)$ representing the excited state, and a statistical wave function $\psi_2(t)$ representing a ground state.

The evaluation apparatus is characterized in that it includes: an input means for inputting at least the values of the half-life τ concerning said devices and the time t or the value of the ratio t/τ of the time t to the half-life τ; a memory means for storing at least one of the two formulas $(2^{-t/\tau})$ and $(1-2^{-t/\tau})$ representing the squares of two individual coefficients included in the expression of said $\psi(t)$ and at least the values of the half-life τ of said devices and the time t or the value of the ratio t/τ of the time t to the half-life τ input by said input means; a calculation means for reading at least one of the formulas $(2^{-t/\tau})$ and $(1-2^{-t/\tau})$ and at least the values of the half-life τ concerning said devices and the time t or the value of the ratio t/τ of the time t to the half-life τ stored by said memory means and calculating at least one of the values of $(2^{-t/\tau})$ and $(1-2^{-t/\tau})$ or, when the number N of the above devices has been input, at least one of values of the number of devices $2^{-t/\tau}N$ in the excited state and number of devices $(1-2^{-t/\tau})N$ in the ground state, based on at least one of the two formulas $(2^{-t/\tau})$ and $(1-2^{-t/\tau})$ or at least the values of the half-life τ concerning said devices and the time t or the value of the ratio t/τ of the time t to the half-life τ; and an output means for outputting the results of said calculations.

(Seventh Aspect of the Invention)

Further, a method according to this seventh aspect of the present invention is a method of designing a device or an apparatus concerning each individual particle associated with a de Broglie wave whose diffraction cannot be neglected, wherein the method is characterized in that it includes applying semirelativistic particle mechanics as an approximation of relativistic particle mechanics for calculating at least a part of a geometric optical trajectory of said each individual particle in the above device or apparatus in the case when $\beta^2$ can be approximated to 0, $\beta(=v/c)$ being the ratio of velocity of said each individual particle v to the velocity of light c.

(Eighth Aspect of the Invention)

Further, an apparatus according to this eighth aspect of the present invention is a calculation apparatus for calculating a geometric optical trajectory of each individual particle associated with a de Broglie wave whose diffraction cannot be neglected, wherein the apparatus is characterized in that it includes: an input means for inputting at least physical quantities of said each particle at t=0 as initial conditions, and when a field of external force exists, the positions where the external force acts and the intensity of the field of external force; a memory means for storing the above inputs and an equation of motion for numerically calculating the trajectory of said each individual particle based on the above inputs; a calculation means for calculating the trajectory of each particle based on the above inputs and the above equation of motion both of which should be read from the above memory means; and an output means for outputting the above trajectory for each individual particle or the position where the particle should be detected.

5.6.2. Results of the Invention

As mentioned above, this invention provides devices and apparatus using a designing method based on dual mechanics whose basic principles are given by the equivalence principle E=H with respect to the wave-like energy E=hν and the Hamiltonian H representing particle-like energy and the law of conservation of relativistic energy. Since the conservation of relativistic energy definitely negates nonrelativistic quantum mechanics, the Schrödinger equation, the principle of superposition of states with respect to each individual particle, and the Heisenberg uncertainty principle are also invalidated, and therefore, designing based on dual mechanics shown in this invention enables us to rationally design functions and structures by correctly reflecting fundamental behaviors of each individual microscopic particle.

Further, according to this invention, whether or not quantum computers each applying quantum bits as functional devices should be realized can be evaluated by the use of ordinary computers. Although specialists in this field cannot yet predict whether or not quantum technologies including quantum computers should be put to practical use, resources have been greatly thrown into the development in the field of advanced information-processing technologies using quantum technologies. Applying this invention to the evaluation of whether or not quantum computers should be put to practical use, the industrial value of the existence of the above field of advanced information processing itself using quantum technologies can easily be estimated.

That is, according to the results of the estimation based on this invention, the function of each quantum bit has no difference from that of a conventional, digital, functional device. Accordingly, the conclusion obtained is that the realization of super high-speed quantum computers for decryption is impossible. Hence, if this realization of super high-speed quantum computers for decryption is impossible, naturally, the necessity of technologies in quantum cryptographic communications will be virtually lost. Resources thrown into the above two quantum technologies should have reached a considerable amount. Such resources can turn to fruitful themes having better industrial prospects hereafter. In this sense, the above evaluation technologies based on dual mechanics disclosed in this invention will produce extremely beneficial industrial effects.

Further, another effect of this invention appears in the case of designing an apparatus related to each microscopic particle having wave-particle duality in motion under the field of an external force.

As a concrete example, for instance, Bohm's analysis of the apparatus used in the Stern-Gerlach experiment included a distinct contradiction in that both classical mechanics accepting the existence of trajectories and quantum mechanics rejecting the existence of trajectories were applied and even gave incorrect answers (Refer to Eq. (21)). In contrast, according to the designing method based on dual mechanics, application of Eq. (220) appearing later for evaluating diffraction shows that the effect of diffraction caused by the wave property of each silver atom should be disregarded in this experiment. Furthermore, since the average velocity of silver atoms is less than 10% of the velocity of light, the trajectories can be calculated by applying the Newtonian equation of motion in semirelativistic particle mechanics so that, as a result, the fundamental structure of the apparatus can be determined. In the case when the effect of diffraction cannot be ignored, since the external force does not influence de Broglie waves, the fundamental structure of the apparatus should be determined by the calculation of trajectories based on particle mechanics, and then the effect of diffraction can be determined applying statistical wave mechanics in the step of detailed designing. For instance, when designing an apparatus consisting of a particle source, slit apertures to form a particle beam, the particle beam passed through the apertures, a field of external force acting on the beam, and a detector for detecting the particle beam passed through the field of external force, positions of the particle beam on the surface of the detector and width of a main spread of the particle beam may be derived. From these results, the basic width that the detector should have can be designed.

In this way, there has been no regular design method in quantum mechanics, and moreover, exact designs could not be provided so far. In contrast, in dual mechanics presented in this invention, basic preparatory plans for designing apparatus may be provided beforehand so as to accommodate any case. This difference is an effect only possessed by the designing method based on dual mechanics.

Thus far, fundamental industrial effects of this invention have been shown. Apparatus founded on the designing method invented based on dual mechanics can provide basic and elemental technologies with high reliability to the fields of advanced industrial technologies related not only to physics but also to chemistry, medical science, etc. for the sake of new developments in these fields.

BRIEF DESCRIPTION OF THE DRAWINGS

FIG. 9 is a diagram explaining a two-dimensional $\mathcal{P}$ v coordinate system for representing a statistical duality with the use of path-distinction probability $\mathcal{P}$ and visibility v.

FIGS. 10A to 10C are diagrams explaining the existence of another observation method for wave-particle duality. FIGS. 10A and 10B show situations in each of which 25 particles pass through each slit of a double slit, resulting in a total of 50 particles passing therethrough, and FIG. 10C shows a situation in which 50 particles pass through a double slit.

FIGS. 17A and 17B are diagrams explaining symmetry (fundamental translational symmetry) in a description of relative motion between a particle and its inertial reference system. FIG. 17A represents the case when an inertial reference system S' is at rest and FIG. 17B represents the case when a particle is at rest.

FIG. 18 is a diagram explaining a mechanism for interference fringes being formed in an interferometer that is in motion toward each individual particle at rest.

FIG. 28A is a diagram showing a slit-collimator and the apparatus for the Stern-Gerlach experiment, FIG. 28B is a diagram explaining an evaluation method of the performance of the slit-collimator based on particle mechanics, and FIG. 28C is a diagram showing an appearance of a spread of silver atoms on an observation plane evaluated by applying dual mechanics.

DESCRIPTION OF REFERENCE NUMERALS

Figure 1:
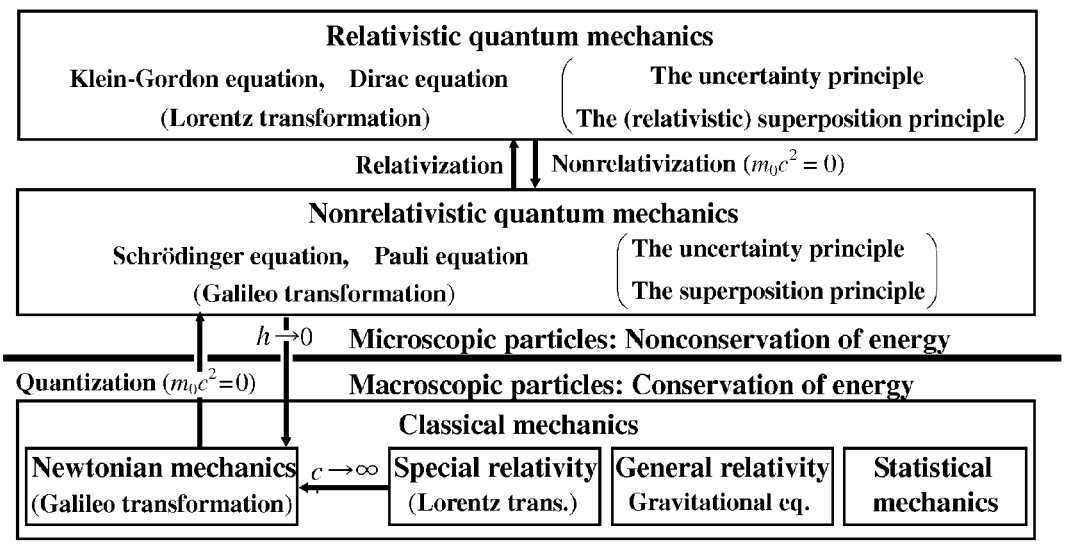
FIG. 1 is a diagram showing a fundamental system of conventional mechanics consisting of classical mechanics, quantum mechanics, and relativistic quantum mechanics.

1 . . . a slit
2 . . . a slit
3 . . . a screen
4 . . . an observation plane for interference fringes
5 . . . a light source
6 . . . an optical system for path distinction
7 . . . an optical system for path distinction
8 . . . a plane wave associated with each particle
9 . . . an intensity distribution of interference fringes when the interference fringes are formed on the observation plane 4
10 . . . an imaging lens
11 . . . an image plane
12 . . . a photodetector
13 . . . an intensity distribution of a line image corresponding to the slit 2
14 . . . an intensity distribution of a line image corresponding to the slit 1
15 . . . an intensity distribution formed by superposing two intensity distributions of line images 13 and 14
16 . . . an electron
17 . . . a microscope objective
18 . . . the optical axis of the microscope objective
19 . . . an image plane
20 . . . the image position of a line image (typically a point image) of an electron
21 . . . the intensity distribution of the line image (typically a point image) of an electron
22 . . . a plane phase wave associated with an electron
23 . . . a screen
24 . . . a slit aperture for position measurement
25 . . . a straight line connecting the upper edge of the slit and a point 27 on a plane for detecting electrons
26 . . . a straight line connecting the lower edge of the slit and the point 27 on the plane for detecting electrons
27 . . . a point on the plane for detecting electrons
28 . . . a plane for detecting electrons
29 . . . a device for detecting electrons
30 . . . the central peak of a Fraunhofer diffraction pattern formed by electrons
31 . . . a low peak next to the central peak of the Fraunhofer diffraction pattern formed by electrons
32 . . . a low peak next to the central peak of the Fraunhofer diffraction pattern formed by electrons
33 . . . a laser source
34 . . . a microscope objective
35 . . . a collimator lens
36 . . . a semitransparent mirror
37 . . . a reflecting mirror
38 . . . a reflecting mirror
39 . . . an aperture plane
40 . . . a prism
41 . . . a prism
42 . . . a collimator lens
43 . . . a focal plane of the collimator lens
44 . . . a point of convergence of a convergent beam 54 formed by a parallel beam 52 passing through the aperture $\mathcal{A}_l$ and the lens 42
45 . . . a point of convergence of a convergent beam 55 formed by a parallel beam 53 passing through the aperture $\mathcal{A}_l$ and the lens 42
46 . . . a point of convergence of a convergent beam 56 formed by a parallel beam 52 passing through the aperture $\mathcal{A}_r$ and the lens 42
47 . . . a point of convergence of a convergent beam 57 formed by a parallel beam 53 passing through the aperture $\mathcal{A}_r$ and the lens 42
48 . . . a photodetector
49 . . . a photodetector
50 . . . a photodetector
51 . . . a photodetector 52 ... a parallel beam
53 ... a parallel beam
54 ... a convergent beam formed by the parallel beam 52 passing through the aperture $\mathcal{A}_l$ and the lens 42
55 ... a convergent beam formed by the parallel beam 53 passing through the aperture $\mathcal{A}_l$ and the lens 42
56 ... a convergent beam formed by the parallel beam 52 passing through the aperture $\mathcal{A}_r$ and the lens 42
57 ... a convergent beam formed by the parallel beam 53 passing through the aperture $\mathcal{A}_r$ and the lens 42
58 ... a closed box
59 ... a free particle
60 ... an inertial reference system
61 ... a plane de Broglie wave
62 ... a closed box
63 ... a free particle at rest
64 ... an inertial reference system
65 ... a plane de Broglie wave
66 ... a Young's interferometer
67 ... a first screen having a double-slit aperture
68 ... a second screen (an observation plane for interference fringes)
69 ... an imaging-lens system
70 ... an aperture stop
71 ... a front group of the imaging-lens system
72 ... a rear group of the imaging-lens system
73 ... an entrance pupil
74 ... an exit pupil
75 ... an image plane
76 ... a first screen constituting a slit-collimator
77 ... a second screen constituting the slit-collimator
78 ... a straight-line trajectory of a silver atom having a negative spin
79 ... a straight-line trajectory of a silver atom having a positive spin
80 ... the center line (x axis) of an initial silver atomic beam
81 ... a straight line connecting the upper edge of the slit aperture in the screen 76 and the lower edge of the slit aperture in the screen 77
82 ... a straight line connecting the lower edge of the slit aperture in the screen 76 and the upper edge of the slit aperture in the screen 77

THE BEST MODE FOR CARRYING OUT THE INVENTION 7.1. Clarification of Four Fundamental Subjects—Toward Completion of Dual Mechanics—

In order to complete a system of dual mechanics to replace the system of mechanics shown in FIG. 1, it is necessary to clarify the four following fundamental subjects: (1) Proof of existence of symmetry (relativity), or in other words, the fundamental translational symmetry that every mechanics should possess in the description of motion of a free particle, (2) proof of existence of an approximate Lorentz transformation under which the Schrödinger equation having a mass term should be covariant, (3) clarification of the process of deriving a relativistic wave equation, and (4) clarification of the relationship between the space-time structure of each individual particle in special relativity and that of the universe in general relativity. These subjects and their solutions will be described in detail successively below.

7.1.1. First Subject: Symmetry (Relativity) that Every Mechanics should Possess

The 'symmetry (relativity) that every mechanics should possess' will be explained as a first fundamental subject using FIGS. 17 and 18.

The most basic role of mechanics exists in describing motion of each individual particle. Therefore, at least one particle as the object for this description and a space-time coordinate system as a reference for describing the motion of the particle are necessary. In special relativity, this reference space-time coordinate system is called an inertial reference system and the system itself has physical properties. In this most basic and simplest mechanical system, the description of motion of the particle must be identical in either case when the particle makes a translational motion toward the inertial system at rest or conversely when the inertial system makes a translational motion toward the particle at rest. Let this be called the 'symmetry (relativity) in the description of motion' or simply the fundamental translational symmetry. The existence of this symmetry means validity of at least the conservation of kinetic energy and momentum on one hand and nonexistence of the absolute spatial coordinate system on the other hand. Incidentally, the nonexistence of the absolute space-time coordinate system is one of the most fundamental matters that must be taken into consideration in clarifying the space-time structure of the universe.

The existence of this symmetry in classical mechanics is shown using FIGS. 17A and 17B. FIG. 17A shows a situation where a free particle 59 moves at a constant velocity v along the x' axis toward an inertial reference system 60 (S': {x', y', z', ict'}) at rest in a closed box 58. Let an inertial system fixed to the particle be denoted by S: {x, y, z, ict} and the real space-time coordinates (abbreviated as space-time coordinates, hereafter) of the particle by (x, y, z, t). In Newtonian mechanics, the space-time coordinates of this particle in an S' system are expressed according to a Galileo transformation as $$x'=x+vt,\ y'=y,\ z'=z,\ t'=t. \tag{114}$$

On the other hand, contrary to the case of FIG. 17A, FIG. 17B shows a situation where an inertial reference system 64 (S': {x', y', z', ict'}) moves at the constant velocity v in the negative direction of the x' axis toward the free particle 63 at rest. Similarly in Newtonian mechanics, provided that the space-time coordinates of the particle in the inertial system fixed to the particle are set to (x, y, z, t), the space-time coordinates of this particle can be written in the S' system as $$x'=x+vt,\ y'=y,\ z'=z,\ t'=t. \tag{115}$$

Comparing Eq. (114) with Eq. (115), it is seen that the 'symmetry in the description of motion' is valid in Newtonian mechanics. Especially, provided that the initial condition of a particle in a S system is written as x=y=z=0 at t=0, x'=y'=z'=t'=0 is derived also in the S' system from Eq. (114), for instance. In this case, both Eqs. (114) and (115) can be rewritten very simply as $$x'=vt',\ y'=z'=0. \tag{116}$$

Eq. (116) is equivalent to the Newtonian equation of motion for a free particle.

The existence of this 'symmetry in the description of motion' can be easily proven also with the special theory of relativity. In the case of FIG. 17A, provided that an inertial system fixed to the particle is denoted by S: {x, y, z, ict} and space-time coordinates of the particle by (x, y, z, t), space-time coordinates of the particle in the S' system can be expressed according to a Lorentz transformation as $$x' = \frac{x+vt}{\sqrt{1-\beta^2}}, y' = y, z' = z, t' = \frac{t+v\frac{x}{c^2}}{\sqrt{1-\beta^2}}. \quad (117)$$

On the other hand, also in the case of FIG. 17B, space-time coordinates of the particle to which the inertial system S is fixed are, as in Eq. (117), expressed in the S' system according to the Lorentz transformation as $$x' = \frac{x+vt}{\sqrt{1-\beta^2}}, y' = y, z' = z, t' = \frac{t+v\frac{x}{c^2}}{\sqrt{1-\beta^2}} \quad (118)$$

thus showing the existence of the 'symmetry in the description of motion'. Here, also provided that the initial condition for the particle in the S system is set to x=y=z=0 at t=0, x'=y'=z'=t'=0 is derived also in the S' system from Eq. (117), for instance. Also in this case, both Eqs. (117) and (118) can be rewritten very simply as $$x'=vt', y'=z'=0 \quad (119)$$

resulting in agreement with Eq. (116). However, attention must be paid to the fact that, although the mass of the particle conforming to Eq. (116) is given by the rest mass $m_0$ irrespective of its velocity, the mass of the particle conforming to Eq. (119) is expressed as $$m = \frac{m_0}{\sqrt{1-\beta^2}}. \quad (120)$$

As shown above, the existence of the 'symmetry in the description of motion' has been proven in particle mechanics (classical mechanics), which includes Newtonian mechanics and special relativity.

The existence of this 'symmetry in the description of motion' is shown in newly defined relativistic wave mechanics. The free Klein-Gordon equation is given as $$\frac{\partial^2 \Psi}{\partial t^2} - c^2 \nabla^2 \Psi + \frac{m_0^2 c^2}{\hbar^2} \Psi = 0. \quad (121)$$

In FIG. 17A, provided that the free particle 59 should conform to the above wave equation, the solution representing the state of this particle in motion, that is, in other words, a wave associated with the particle becomes a plane de Broglie wave 61 given as $$\Psi'=\exp\{i(k'x'-\omega't')\}. \quad (122)$$

Next, the case shown in FIG. 17B will be considered. Set the inertial system fixed to the particle to S: {x, y, z, ict}. The state of this particle 63 at rest can be represented by a rest solution of the free Klein-Gordon equation in this inertial system, i.e., $$\Psi = \exp\left(-i\frac{m_0 c^2 t}{\hbar}\right) = \exp(-i\omega t). \quad (123)$$

When making this state of the particle in the S system be represented in the inertial system 64 (S': {x', y', z', ict'}) moving at the constant velocity v in the negative direction of the x' axis toward the particle 63 at rest, a plane de Broglie wave 65 represented by $$\Psi'=\exp\{i(k'x'-\omega't')\} \quad (124)$$

is derived based on the phase invariance under the Lorentz transformation. From the agreement of Eq. (124) with Eq. (122), it is seen that the 'symmetry in the description of motion' is valid in relativistic wave mechanics. For this symmetry to hold in wave mechanics, it is seen that the wave equation must have the rest solution of Eq. (123). This rest solution becomes 0 outside the closed box 62. Outside this box, a rest wave function having a form of Eq. (123) in which the mass $m_0$ of the particle is substituted with mass M of the box will exist. This mass M naturally includes the mass $m_0$ of the particle.

It is already known that the wave function Eq. (124) representing a plane de Broglie wave is obtained from the wave function Eq. (123) of a rest particle by applying a Lorentz boost (Lorentz transformation). However, it has never been recognized that the above fact is also an indication of the 'symmetry in the description of motion (fundamental translational symmetry)' as a basic condition that every mechanics must satisfy. It will be explained using FIG. 18 that this symmetry has an extremely important physical significance in the system shown in FIG. 17B. Incidentally, there are descriptions concerning a drawing similar to FIG. 18 and the Lorentz boost solutions of the Dirac equation in Japanese Patent Application Laid-open No. Hei 8-329128 (U.S. Pat. No. 6,321,182 B1, patented on Nov. 20, 2001), and as a conclusion, it is mentioned that a phase wave is a wave that has a physical reality. The positioning of this prior application to this present invention will be further clarified in the stage when descriptions of the first embodiment of this invention are finished.

The difference between the system shown in FIG. 18 and that shown in FIG. 17B exists in the point that a Young's interferometer 66 is placed in the inertial system 64 (S': {x', y', z', ict'}) in FIG. 18. The interferometer 66 consisting of a first screen 67 having a double slit and a second screen 68 for observing interference fringes travel together with the inertial system S' fixed to the interferometer at a constant velocity v toward the particle 63 at rest. The plane de Broglie wave 65 represented by Eq. (124) generates in the inertial system S' and impinges on the interferometer. The de Broglie wave $\Psi$ that has passed through the double slit forms an interference pattern on the second screen. When the rest particle 63 has passed through the double slit of the interferometer moving toward this particle, the particle is detected at a due position on the second screen 68 in accordance with a normalized density distribution (probability density) of the particle represented by the above interference pattern. Remembering that the particle 63 was at rest until it passed through the double slit on the screen 67, it is seen that the part corresponding to the classical particle of each individual rest particle can naturally only pass through either slit of the double slit. Accordingly, if the plane de Broglie wave represented by Eq. (124) that was generated in the inertial system S' does not really exist, the interference will never occur. Going back yet even further, if the proper oscillation of the phase space of the particle represented by Eq. (123) does not exist, this plane de Broglie wave will never exist. Previously, the reality of a phase wave has been demonstrated first in the experiments of simultaneous observation of wave-particle duality. The above thought experiment concerning the system shown in FIG. 18 has theoretically shown first the reality of a phase wave (Refer to Japanese Patent Application Laid-open No. Hei 08-329128 and U.S. Pat. No. 6,321,182 B1). Incidentally, as will be described later, the behavior of the plane de Broglie wave 65 in the interferometer can be analyzed by applying the Helmholtz-Kirchhoff integral theorem (M. Born and E. Wolf, the aforementioned book, p. 377, Eq. (7)) and Kirchhoff's boundary conditions (M. Born and E. Wolf, the aforementioned book, p. 379, Eq. (15)).

From the above considerations, it is seen that there exists the fundamental symmetry (relativity) in the description of motion of a free particle at the root of all these mechanics irrespective of whether it is Galilean relativity or Einstein's relativity or whether it is particle mechanics such as Newtonian mechanics and special relativity or relativistic wave mechanics. In addition, this symmetry in relativistic wave mechanics is caused by the fact that every particle itself has its own phase space represented by Eq. (123). This also basically means that wave mechanics must be relativistic. The free Schrödinger equation having a mass term represented by Eq. (54) has the same rest solution expressed by Eq. (123). Therefore, as will be treated as the subsequent subject of this subject, new relativistically approximated wave mechanics having the above symmetry will come into existence using the wave equation expressed by Eq. (54) as a fundamental equation in the new mechanics.

The existence of the following causality for generation of a de Broglie wave can be recognized from the results of investigating FIGS. 17 and 18. From the fact that a de Broglie wave represented by Eq. (124) is obtained by applying a Lorentz transformation to Eq. (123) representing an oscillation of the phase space of a particle itself, it is seen that the de Broglie wave is generated only in this inertial system as a result of a relative motion between the particle and its inertial reference system. Thus, the existence of causality for the generation of a de Broglie wave is recognized. It is relatively easy to find out the mechanism of generating a de Broglie wave as a physical phenomenon in specific experiments. For example, we can take up the Stern-Gerlach experiment shown in FIG. 2. Each individual silver atom emitted from a silver atomic source not shown in this drawing will be detected on an observation plane that is at rest in relation to the source. Suppose that a real space-time coordinate system, i.e., an inertial system, is fixed to this observation plane. Accordingly, the instant that a silver atom is emitted from the source toward the observation plane, a phase wave or de Broglie wave associated with the atom will be generated in the inertial system fixed to the observation plane. Viewing from another angle, since relative motion between the oscillating phase space intrinsic to the silver atom and the inertial system fixed to the observation plane begins at the instant the silver atom has emitted from the source, the de Broglie wave is generated making this relative motion a direct source of this wave. Although the phase space of a particle has temporal periodicity, it does not have spatial periodicity. Therefore, it can be understood that a spatial-temporal wave associated with a particle must be generated only in an inertial system fixed to an observation apparatus in relative motion to the particle. Essentially, a de Broglie wave has been a wave that cannot but be derived only in relativistic wave mechanics provided with Lorentz transformations.

Provided that the generation of a de Broglie wave is a physical phenomenon, the collapse or extinction of the de Broglie wave as its reversal process should also be a physical phenomenon. Relative motion between a phase space inherent to a silver atom and its inertial system fixed to the observation plane has been a direct source of the de Broglie wave. Therefore, since the relative motion as the source of the wave is extinguished the instant that the silver atom attaches to the observation plane, the de Broglie wave will also disappear instantaneously. In this way, the wave-function collapse is an obvious physical phenomenon in relativistic wave mechanics. Together with the former phenomenon of generating a de Broglie wave, the existence of causality on the generation and collapse of a de Broglie wave is clarified. Yet, as easily inferred, it turns out that a similar causality on the generation and collapse of a phase wave associated with a photon exists.

Incidentally, the extinction of a phase wave caused by the observation of its associated photon usually means the extinction of the photon itself. However, the extinction of a de Broglie wave caused by the observation of its associated electron does not mean the disappearance of the electron. The electron detected by the observation plane or detector usually remains in the observation plane or detector and is associated with a de Broglie wave corresponding to the state of the electron.

As given above, the existence of the symmetry in the description of the motion of a free particle has been shown in all mechanics such as Newtonian mechanics, special relativity, and relativistic wave mechanics. This symmetry in relativistic wave mechanics is brought about by a real oscillation of the phase space of a particle itself and a Lorentz transformation as the representation of a physical phenomenon. Similarly, these two physical phenomena result in the causality of the generation and collapse of a de Broglie wave and ensure the reality of the de Broglie wave. Further, it is seen that, resulting from the dual space-time structure of a particle consisting of a particle part and a wave part, both special relativity for describing motion of the particle part and relativistic wave mechanics for describing motion of the wave part are simultaneously necessary for describing motion of a single free particle. Let the mechanics obtained by integrating special relativity and relativistic wave mechanics based on a common characteristic that respective basic equations each describing motion are covariant under the Lorentz transformations be called relativistic dual mechanics. In contrast, Newtonian mechanics does not have any wave mechanics as a partner to integrate. This is because, as already shown, nonrelativistic wave mechanics cannot exist as physics.

Nonrelativistic quantum mechanics will be examined from the viewpoint of the above symmetry. In the case of FIG. 17A, the nonrelativistic Schrödinger equation has a plane wave solution $\psi'=\exp\{i(k'x'-\omega't')\}$ as a probability wave. However, this Schrödinger equation without a mass term cannot have a rest solution. Accordingly, in the case of FIG. 17B, no type of wave can be generated in the inertial system S'. As is clear from the above consideration, it can be understood that, since nonrelativistic quantum mechanics does not have the 'symmetry in the description of motion' or 'fundamental translational symmetry', it cannot exist as mechanics.

Therefore, it is seen that artificially making the nonrelativistic Schrödinger equation be covariant with respect to the Galileo transformation by using a Gauge transformation represented by Eq. (49) (M. Lévy-Leblond, Riv. Nuovo Cimento 4, 99 (1974). E. Merzbacher, Quantum Mechanics (John Wiley & Sons, New York, 1998), 3rd ed., pp. 75-78) has been a typical antiphysical action. Ironically, the cat paradox presented by Schrödinger has also turned out to have its fundamental cause in the Schrödinger equation itself.

7.1.2. Second Subject: Rediscovery of Semirelativistic Lorentz Transformations

As a second fundamental subject, we will search for an 'approximate Lorentz transformation under which the Schrödinger equation having a mass term, Eq. (54), should be covariant'. It has already been mentioned that the relativistically approximated free Schrödinger equation Eq. (54) has the rest solution Eq. (123). Only if the rest solution exists it is possible to show the occurrence of interference in the interferometer 66 shown in FIG. 18. This is because the Lorentz transformations may be applied irrespective of velocity level of the inertial system S'. Accordingly, a minimum condition for the existence of wave mechanics making the relativistically approximated Schrödinger equation Eq. (54) as its fundamental equation has already been provided.

A clue to searching for the above-mentioned approximate Lorentz transformations has been described in the outstanding, pioneering paper by Wignall (J. W. G. Wignall, Am. J. Phys. 57, 415 (1989)). As already introduced, Wignall investigated whether or not the Schrödinger equation (50) $i\hbar \Psi_t + \hbar^2/2m_0)\Psi_{xx} - (m_0c^2+V)\Psi=0$,
which has the de Broglie wave $\Psi$ as a solution, is covariant under the following low-velocity Lorentz transformation:

$$x' \approx \left(1 + \frac{\beta^2}{2}\right)x + v_0 t, \quad t' \approx \left(1 + \frac{\beta^2}{2}\right)t + \frac{v_0}{c^2}x. \tag{125}$$

The above Lorentz transformation is valid under the condition $\beta^2 = (v_0/c)^2 \ll 1$. However, the goal of the approximate Lorentz transformation remained one step away. This small unsolved part will be settled below.

In contrast to the simple form of the low-velocity Lorentz transformation Eq. (125) used by Wignall, the correct low-velocity Lorentz transformation keeping all terms up to order $\beta^2$ is written as $$x' \approx (x + v_0 t)\left(1 + \frac{\beta^2}{2}\right), \quad t' \approx \left(t + \frac{v_0}{c^2}x\right)\left(1 + \frac{\beta^2}{2}\right). \tag{126}$$

A similar transformation of k and ω becomes $$k' \approx \left(k + \frac{v_0}{c^2}\omega\right)\left(1 + \frac{\beta^2}{2}\right), \quad \omega' \approx (\omega + v_0 k)\left(1 + \frac{\beta^2}{2}\right). \tag{127}$$

From Eqs. (126) and (127), the transformation of phases between two inertial systems is expressed as $$k'x' - \omega't' \approx (kx - \omega t)\left(1 + \frac{\beta^2}{2}\right). \tag{128}$$

Here, further provided that $\beta \ll 1$, since it gives $\beta^2 \approx 0$, $$k'x' - \omega't' \approx (kx - \omega t). \tag{129}$$

As a result, under the low-velocity Lorentz transformation together with the additional condition of $\beta \ll 1$, the expression of phase invariance $$\Psi' = \Psi \tag{130}$$

may be obtained with respect to a de Broglie wave associated with the motion of a free particle with the mass $m_0$. Thus far, we have considered in the stage of obtaining Eq. (129) that Eq. (130) is valid for a wave packet by applying the principle of superposition of states. However, as already mentioned, since the principle of superposition of states is valid only in statistical wave mechanics, such representation for the wave packet will not be allowed here. As shown above, the plane de Broglie wave $\Psi$ has been proven to be covariant under the low-velocity Lorentz transformation with the aforementioned condition. Basically, Wignall provided a procedure for proving the above.

Next, covariance of the above Schrödinger equation will be examined. For the examination, a function Z(x, t) is defined as follows:

$$Z(x,t) \equiv \left(i\hbar\Psi'_{t'} + \frac{\hbar^2}{2m_0}\Psi'_{x'x'} - (m_0c^2 - V)\Psi'\right) - \left(i\hbar\Psi_t + \frac{\hbar^2}{2m_0}\Psi_{xx} - (m_0c^2 - V)\Psi\right). \tag{131}$$

Eq. (131) can be rewritten into an expression in the inertial system without primes using Eq. (130) and the low-velocity Lorentz transformation. Skipping the details of a lengthy calculation, an intermediate result is given as $$Z(x,t) \equiv -i\hbar\left(v_0\Psi_x - \frac{\beta^2}{2}\Psi_t\right) + \frac{\hbar^2}{2m_0}\left[\beta^2\Psi_{xx} + \left(\frac{v_0}{c^2}\right)^2\Psi_{tt} - 2\frac{v_0}{c^2}\Psi_{xt} - \frac{v_0}{c^2}\beta^2\Psi_{xt}\right]. \tag{132}$$

The sixth term in the above equation is not included in the Wignall's equation. Here, following Wignall, let the plane wave $\Psi$ be rewritten as $$\Psi(x,t) = u(x)e^{-i\omega t}. \tag{133}$$

Further, setting $\omega \neq m_0 c^2/\hbar$ Eq. (132) becomes $$Z(x,t) \approx \left(\frac{\hbar^2}{2m_0}u_{xx} - \frac{m_0 v_0^2}{2}u + \frac{i\hbar v_0}{2}u_x\right)\beta^2 e^{-i\omega t}. \tag{134}$$

Wignall's equation corresponding to the above equation does not include the second and third terms. Here, assuming $\beta \ll 1$ again leads to $\beta^2 \approx 0$, thereby giving $$Z(x,t) \approx 0. \tag{135}$$

In this manner, by applying the low-velocity Lorentz transformation valid under the condition of $\beta^2 \ll 1$ and then further applying an additional low-velocity condition of $\beta \ll 1$, the phase invariance of a de Broglie wave and the form invariance of the Schrödinger equation (50) can be shown. However, even by using the above method of proving invariance due to Wignall, it is also clear that he could not exhaustively show an approximate Lorentz transformation itself concretely, under which the above Schrödinger equation should be covariant.

The conditional low-velocity Lorentz transformation due to Wignall will be converted into an approximate Lorentz transformation valid under a single low-velocity condition. Further applying the additional low-velocity condition of $\beta \ll 1$ after applying the low-velocity Lorentz transformation valid under the condition of $\beta^2 \ll 1$ is equivalent to carrying out an operation to the limit or the transition to the limit $\beta^2 \to 0$ after application of this transformation. Therefore, in the above discussions, this transition to the limit may be applied for deriving the phase invariance of a de Broglie wave $\Psi$ and the form invariance of the Schrödinger equation (50). Applying this operation to Eq. (128) gives $$k'x' - \omega't' = \lim_{\beta^2 \to 0} (kx - \omega t)\left(1 + \frac{\beta^2}{2}\right) = kx - \omega t, \quad (136)$$

showing the phase invariance. Similarly, Eq. (134) reduces to $$Z(x,t) = \lim_{\beta^2 \to 0} \left(\frac{\hbar^2}{2m_0}u_{xx} - \frac{m_0 v_0^2}{2}u + \frac{i\hbar v_0}{2}u_x\right)\beta^2 e^{-i\omega t} = 0, \quad (137)$$

readily providing the form invariance of the Schrödinger equation with a mass term (50). Application of a similar operation to the low-velocity Lorentz transformation of Eq. (126) gives $$x' = \lim_{\beta^2 \to 0}(x + v_0 t)\left(1 + \frac{\beta^2}{2}\right) = x + v_0 t, \quad (138)$$

$$t' = \lim_{\beta^2 \to 0}\left(t + \frac{v_0}{c^2}x\right)\left(1 + \frac{\beta^2}{2}\right) = t + \frac{v_0}{c^2}x. \quad (139)$$

As shown above, it turns out that, by adding the condition of $\beta \ll 1$ ($\beta^2 \approx 0$) to the low-velocity Lorentz transformation, simple transformation formulas $$x' = x + v_0 t, \; y' = y, \; z' = z, \; t' = t + \frac{v_0}{c^2}x \quad (140)$$

may be obtained. In general, when the relative velocity between two inertial systems is small compared with the velocity of light c, it has been known that Eq. (140) is approximately obtained instead of the Lorentz transformation (117) (Refer to, for example, L. D. Landau and E. M. Lifshitz, The Classical Theory of Fields, translated by H. Hamermesh (Pergamon Press, Oxford, 1962), revised 2nd ed., p. 13). Applying the transition to the limit $\beta^2 \to 0$ to the Lorentz transformation readily gives Eq. (140). Therefore, when the condition of $\beta \ll 1$ ($\beta^2 \approx 0$) is valid with respect to the relative velocity between the two inertial systems from the beginning, it is shown that the approximate Lorentz transformation represented by Eq. (140) derived directly from the Lorentz transformation can be used. In this way, it turns out that the Schrödinger equations each with a mass term, i.e., Eqs. (50) and (54), are covariant under the approximate Lorentz transformation Eq. (140).

The Lorentz transformation that we have tried to establish has been recognized as the approximate Lorentz transformation Eq. (140) valid under the condition $\beta \ll 1$ ($\beta^2 \approx 0$). At this time, the characteristics of this Lorentz transformation will be investigated in the following.

Spatial components of the approximate Lorentz transformation Eq. (140) are equivalent to those of the Galileo transformation and only the temporal component of this transformation Eq. (140) is approximately relativistic. Hence, it is impossible to derive a Loerntz contraction by using this transformation. For convenience, let this Lorentz transformation, which is approximately relativistic only for the temporal component, be called semirelativistic (or temporally relativistic) Lorentz transformation. Accordingly, the Schrödinger equations, Eqs. (50) and (54), covariant with respect to this semirelativistic Lorentz transformation can be called semirelativistic Schrödinger equations. Previously, it was mentioned that there exist special relativity as particle mechanics and relativistic wave mechanics as wave mechanics both having common relativity represented by the Lorentz transformation, and relativistic dual mechanics is defined by integrating these two relativistic mechanics. Therefore, it is assumed that there exist semispecial relativity as particle mechanics and semirelativistic wave mechanics having the semirelativistic Schrödinger equation as a fundamental equation, both having common relativity represented by the semirelativistic Lorentz transformation, and semirelativistic dual mechanics should be defined by integrating these two semirelativistic mechanics. For confirmation thereof, the existence of the 'symmetry in the description of motion' will be verified, as the minimum fundamental condition for the existence of these mechanics, in each of semispecial relativity and semirelativistic wave mechanics.

When a semirelativistic Lorentz transformation is applied to the system shown in FIG. 17A, the space-time coordinates of the particle 59 may be expressed as $$x' = x + vt, \; y' = y, \; z' = z, \; t' = t + \frac{v}{c^2}x. \quad (141)$$

Similarly, in the case of the system shown in FIG. 17B, the space-time coordinates of the particle 63 may be written as $$x' = x + vt, \; y' = y, \; z' = z, \; t' = t + \frac{v}{c^2}x. \quad (142)$$

Since Eqs. (141) and (142) are identical, it is seen that the 'symmetry in the description of motion' is valid in semispecial relativity. Here, provided that the initial condition in the S system to which the particle is fixed is x=y=z=0 at t=0, x'=y'=z'=t'=0 is derived also in the S' system from Eq. (114), for instance. Since the same holds for the case of FIG. 17B, both Eqs. (141) and (142) can be rewritten simply as $$x'=vt', y'=z'=0. \quad (143)$$

Since the relativistic mass of a particle is expressed in semispecial relativity as $$m = \lim_{\beta^2 \to 0} \frac{m_0}{\sqrt{1-\beta^2}} = \lim_{\beta^2 \to 0} m_0\left(1 + \frac{\beta^2}{2}\right) = m_0, \quad (144)$$

the mass of a particle in motion coincides with the rest mass $m_0$. Therefore, also in semispecial relativity that is valid under the condition of $\beta \ll 1$ ($\beta^2 \approx 0$), Eq. (143) shows that the Newtonian equation of motion for free particles is also valid as in Newtonian mechanics.

In the case shown in FIG. 17A, the solution of the semirelativistic wave equation with respect to the particle 59 in the inertial system 60 (S': {x', y', z', ict'}) becomes a plane de Broglie wave represented by $$\Psi = \exp\{i(k'x' - \omega't')\}. \quad (145)$$

The case shown in FIG. 17B will be examined. The state of a particle in the inertial system S to which the particle is fixed is represented by a rest solution $$\Psi = \exp\left(-i\frac{m_0 c^2 t}{\hbar}\right) = \exp(-i\omega t) \quad (146)$$

of the semirelativistic wave equation. When this state of the particle in the S system should be expressed in the S' system, since this expression corresponds to the case where x=0 is used in Eq. (136) representing the phase invariance under the semirelativistic Lorentz transformation, the plane de Broglie wave 65

$$\Psi' = \exp\{i(k'x' - \omega't')\} \quad (147)$$

is obtained. Since Eqs. (145) and (147) are identical, it is shown that the 'symmetry in the description of motion' is also valid in semirelativistic wave mechanics.

However, it should be noted that even if the semirelativistic Lorentz transformation Eq. (141) is directly applied to the rest solution Eq. (146), the de Broglie wave Eq. (147) cannot be derived. In this case, the low-velocity Lorentz transformation may be applied first to retain terms up to order $\beta^2$ and then the operation to the limit $\beta^2 \to 0$ should be carried out. Actually, in this system, the following two relations, i.e., $\omega = m_0 c^2/\hbar$ and $$\omega' \doteq \frac{1}{\hbar}\left(m_0 c^2 + \frac{m_0 v'^2}{2}\right) = \omega\left(1 + \frac{\beta^2}{2}\right) \quad (148)$$

with v=v', are valid. On the other hand, the time transformation in the low-velocity Lorentz transformation Eq. (126) is expressed as $$t \doteq \left(t' - \frac{v'}{c^2}x'\right)\left(1 + \frac{\beta^2}{2}\right). \quad (149)$$

From Eqs. (148) and (149), $$\omega t = \lim_{\beta^2 \to 0} \omega\left(t' - \frac{v'}{c^2}x'\right)\left(1 + \frac{\beta^2}{2}\right) \quad (150)$$
$$= \lim_{\beta^2 \to 0}\left(\omega' t' - k't' - \frac{\beta^2}{2}k'x'\right)$$
$$= \omega' t' - k'x'$$

is obtained, where $k' = m_0 v'^2/\hbar$ has been used. Also through the above method, the phase invariance $$\Psi = \exp(-i\omega t) = \exp\{i(k'x' - \omega't')\} = \Psi' \quad (151)$$

can be shown under the semirelativistic Lorentz transformation in the case of k=0. This proof shows that a physical mechanism of generating a de Broglie wave also exists in semirelativistic wave mechanics, as in relativistic wave mechanics. In other words, this shows that relative motion between a particle and its inertial reference system generates the de Broglie wave only in the inertial system. Consequently, as shown in FIG. 18, even if the interferometer moves toward a particle at rest, the rest particle 63 associated with the plane de Broglie wave 65 generated in the inertial system 64(S') may cause an interference phenomenon after it has passed through the double slit in the screen 67. The particle will be found at a point on the observation plane in accordance with an interference pattern, that is, a probability density, formed by the associated de Broglie wave. Simultaneously, since the relative motion between the particle and the interferometer as a factor in generating the de Broglie wave vanishes, the de Broglie wave is also extinguished instantaneously in the interferometer. After the physical mechanism of generating a de Broglie wave, the existence of the physical mechanism of a collapse of the de Broglie wave has been shown also in semirelativistic wave mechanics.

As in relativistic wave mechanics, the existence of causality on the generation and collapse of each individual de Broglie wave has been shown, and consequently, the existence of each individual phase wave has theoretically been verified in semirelativistic wave mechanics. It is clear from the above considerations that the temporal relativity contributes stronger than the spatial relativity to the wave property of each individual particle. Either way, it is clear that, in general, the proper oscillation of a phase space of each material particle and the temporal relativity are essential factors in generating each individual de Broglie wave in wave mechanics including relativistic wave mechanics. Accordingly, wave mechanics is mechanics that cannot basically exist without dual particles and relativistic space-time. However, the phase space and the space-time are almost identical. Although such things that correspond to the concepts of phase space and relativistic space-time exist in the natural world, it must be fully acknowledged that such a thing that corresponds to the concept of a vacuum does not physically exist in a strict sense. After all, since the rest wave function represents a state of the phase space as a part of a dual particle, it can be understood that the concept of the dual particle and that of the space-time are inseparably related.

As mentioned above, the existence of semirelativistic dual mechanics, which results from integrating semirelativistic wave mechanics and semispecial relativity both of which have the semirelativistic Lorentz transformation as a common space-time-coordinate transformation formula, has been shown. As a result, making a set of dual mechanics consisting of semirelativistic dual mechanics and relativistic dual mechanics, it turns out in general that an equation of motion applied to the particle part and a wave equation applied to the phase space part, both of which have the common space-time-coordinate transformation formula, are essential for describing the motion of each individual dual particle in dual mechanics. Both of the above equations are organically unified through the proper oscillation of the phase space of a dual particle. In other words, it turns out in general that a solution of an equation of motion and a solution of a wave equation are integrated based on the law stating that, when observing a dual particle, the particle part should be detected at a point on an observation plane, which is also a solution of the equation of motion, in accordance with the probability density given by the wave function. It is seen after all that the concept of a wave function $\Psi$ obtained by integrating the concept of a probability wave due to Born and the concept of a phase wave due to de Broglie has been necessary.

The fact that the semirelativistic Lorentz transformations constitute a group can be shown as one other characteristic of semirelativistic Lorentz transformations. Holland et al. stated that the semirelativistic Lorentz transformation represented by Eq. (140) generates the group (P. Holland and H. R. Brown, Studies in History and Philosophy of Modern Physics 34, 161 (2003): Refer especially to p. 166). Although the above paper does not show how to prove that, the relationships between the semirelativistic Lorentz transformation and the Lorentz transformation or the Galileo transformation will be further clarified through verification of the above fact. Clarifying the relationships among the above transformations will lead to the determination of the theoretical structure of dual mechanics. It will be shown in the following that the semirelativistic Lorentz transformations generate a group.

Suppose that a, b, •, d, . . . are arbitrary elements of an ensemble G, where, for instance, the element a is defined by a semirelativistic Lorentz transformation $T(v_a)$ obtained in the limit $\beta^2 \to 0$ such that $$a \equiv T(v_a): x' = x + v_a t, \, t' = t + \frac{V_a}{c^2} x, \quad (152)$$

Then, the inverse of a, i.e., $a^{-1}$, is similarly defined as $$a^{-1} \equiv T(-v_a): x' = x - v_a t, \, t' = t - \frac{V_a}{c^2} x. \quad (153)$$

The addition theorem of two velocities v(v/c<<1) and v'(v'/c<<1) for a Lorentz group reduces as $\beta^2 \to 0$ to $$v'' = \lim_{\beta^2 \to 0} \frac{v + v'}{1 + \frac{vv'}{c^2}} = v + v'. \quad (154)$$

Hence, the composition of two arbitrary elements a and b can be provided by $$ab \equiv T(v_a + v_b): x' = x + (v_a + v_b)t, \, t' = t + \frac{v_a + v_b}{c^2} x, \quad (155)$$

showing that ab is also an element of G. From Eq. (155), $$ab = ba \quad (156)$$

and (ab)d=a(bd) are derived. Further, from $$aa^{-1} = a^{-1}a = T(v_a - v_a) = T(0) \equiv e, \quad (157)$$

the unit element e of G can be defined leading to ae=ea=a. As shown above, because all of the conditions for G being a commutative group are satisfied, it has been proven that the semirelativistic Lorentz transformations constitute a group.

It is seen from Eq. (154) in the above proof that the Lorentz group results in a semirelativistic Lorentz group in the limit $\beta^2 \to 0$. This means that relativistic wave mechanics and special relativity result in semirelativistic wave mechanics and semispecial relativity in the limit $\beta^2 \to 0$ respectively. In other words, relativistic dual mechanics results in semirelativistic dual mechanics in the limit $\beta^2 \to 0$. In addition, it is easily understood from the Eqs. (152) and (154) that both the semirelativistic Lorentz group and the Lorentz group result in a Galilean group in the limit $c \to \infty$. As already shown, the solution of both the Klein-Gordon equation and the semirelativistic wave equation in the limit $c \to \infty$ is only $\Psi(x, t) = 0$. Since this solution indicates that a phase wave associated with the particle does not exist, it follows that nonrelativistic mechanics, that is, Newtonian mechanics, is completely unrelated to wave mechanics. Because particles each of whose wave property can be ignored without condition are only macroscopic particles, we can say that Newtonian mechanics is mechanics for the exclusive use of macroscopic particles.

It turns out that wave mechanics is unnecessary in the limit $c \to \infty$. Besides this condition, there are cases where the wave property of each individual particle can be ignored, substantially assuming the transition to the limit $\Psi \to 0$, and the motion of the particle can be described by applying only particle mechanics. Since the de Broglie wavelengths of those particles each of which is in motion with a velocity near the velocity of light are extremely short and remarkably smaller than any structure of usual experimental apparatus, the wave property is negligible. In such cases, even in experiments pertaining to the field of high-energy physics in which relativistic dual mechanics should primarily be applied, the motion of each individual particle can be treated by relativistic particle mechanics alone, assuming the transition to the limit $\Psi \to \psi$. In the case where the velocities of particles are small, as in the Stern-Gerlach experiment, the de Broglie wavelength of each individual silver atom is sufficiently shorter than the width 0.03-0.04 mm of a slit aperture positioned in front of an electromagnet, and the wave property of each of those silver atoms is negligible. Accordingly, assuming $\Psi \to 0$, the motion of each individual particle can be treated by applying only semirelativistic particle mechanics. Ultimately, the motion of each individual silver atom can be described by using the Newtonian equation of motion as the fundamental equation in semirelativistic particle mechanics. Applying an operation to the limit such as $\Psi \to 0$ or $c \to \infty$ shown above means, although approximately, that only particle mechanics as unified mechanics should be applied to individual cases in which dual mechanics should primarily be applied. Therefore, these operations may be called unifying operations. However, when unification is applied in actual designs related to microscopic particles, it is necessary to provide specific criteria instead of $\Psi \to 0$ in accordance with individual design objects.

[Appendix 1] Numerical Solution for Relativistic Equation of Motion on a Charged Particle in Motion Under Static Electromagnetic Fields Not confined to the case when unification is applied, when designing devices and apparatus related to particles each associated with a phase wave, the basis of designing is an equation of motion in special relativity or semispecial relativity as particle mechanics. Since the relativistic equation of motion and the Newtonian equation of motion in semispecial relativity are equations of motion in classical mechanics as shown in FIG. 1, these equations could not primarily be applied to microscopic particles conforming to the Heisenberg uncertainty principle. However, these equations of motion in classical mechanics have actually been used in designing accelerators and electronic equipment having electron guns such as televisions.

How to derive a trajectory of a microscopic particle from an equation of motion in classical mechanics by means of numerical calculations will be reviewed below.

The equations of motion necessary when designing apparatus related to charged particles in motion under static electromagnetic fields and their numerical solutions will be explained based on classical mechanics. Although explanations will basically be made on the relativistic equation of motion, applying the rest mass $m_0$ instead of the relativistic mass m of the particle may suffice for the case of nonrelativistic equation of motion. Note that the relation between m and $m_0$ is expressed as $$m = \frac{m_0}{\sqrt{1 - \beta^2}} = \gamma m_0, \quad (158)$$

where $\gamma$ is the Lorentz factor and $\gamma = 1$, which is obtained in the nonrelativistic case because the operation to the limit $c \to \infty$ is possible. However, in general, we may assume that, although approximately, the nonrelativistic equation of motion in which the rest mass $m_0$ is applied can be used as long as $\beta \lesssim 0.1$, that is, until the velocity of a particle v reaches approximately 10% of the velocity of light. Incidentally, when $\beta=0.1$ should be set as a boundary value, since the rate of the Lorentz contraction amounts to approximately 0.5%, the rate of an increase in mass is also approximately 0.5%. In this way, setting the boundary value as $\beta=0.1$ means that the mass and the Lorentz factor are approximated as $m=m_0$ and $\gamma=1$ respectively until the mass reaches $m=1.005\, m_0$. Since the velocity can be represented by $v=0.1\,c$ at this time, it is necessary to pay attention to the fact that the difference between this value of velocity and the limit when $c \to \infty$ is extremely large.

When the position of a particle is denoted by r, the momentum by p, and the force acting on this charged particle by F, the relativistic equation of motion is expressed as $$\frac{dp}{dt} = F. \tag{159}$$

The Lorentz force acting on a particle having a charge q in motion with a velocity v under static electromagnetic fields is written in the MKS system of units as $F=q(E+v \times B)$ so that Eq. (159) may be represented as $$\frac{dp}{dt} = q(E + v \times B). \tag{160}$$

Since the velocity included in the above equation can be written from Eq. (158) as $v=p/\gamma m_0$, the following equation of motion is obtained in the end:

$$\frac{dp}{dt} = q\left(E + \frac{p}{\gamma m_0} \times B\right). \tag{161}$$

How to numerically solve Eq. (161) will be explained in the following: Making the position of a particle at a certain time $t=t_i$ be denoted by $r_i$ and the momentum by $p_i$, the position at time $t=t_{i+1}=t_i+\Delta t$ after an infinitesimal time $\Delta t$ may be written as $$r_{i+1} = r_i + v_i \Delta t = r_i + \frac{p_i}{\gamma_i m_0} \Delta t \tag{162}$$

taking $v_i=p_i/\gamma_i m_0$ into consideration, where $p_i=m_i v_i$. However, in this case, attention must be paid to the usage of subscripts in that, although setting i=0 at t=0 results in $m_0$ for $m_i$, this $m_0$ means not the rest mass but $m_{i=0}$. Even if initial values $r_0$ and $p_0$ are given at t=0, provided that $\gamma_0$ is unknown, $r_1$ cannot be obtained from the above equation. When the total energy of the particle is denoted by E, it gives $E^2=p^2c^2+m_0^2c^4$, and using this E gives $$\gamma = \frac{E}{m_0 c^2}. \tag{163}$$

Since $\gamma_i$ is obtained for provided $p_i$ from the above equation, $r_{i+1}$ should be determined by substituting the set of $r_i$ and $p_i$ into Eq. (162).

Thus, though $r_{i+1}$ can be obtained from Eq. (162), how to derive $r_{i+2}$ will be explained next: When i is substituted by i+1 in Eq. (162), $r_{i+2}$ should be obtained. For that purpose, it is necessary to know $p_{i+1}$. This is because, if we know $p_{i+1}$, $\gamma_{i+1}$ can also be known from Eq. (163). The change $\Delta p_i$ in the momentum $p_i$ of the particle during the infinitesimal time $\Delta t$ is, referring to Eq. (161), written as $$\Delta p_i = q\left(E_i + \frac{p_i}{\gamma_i m_0} \times B_i\right)\Delta t, \tag{164}$$

where $E_i=E(r_i)$ and $B_i=B(r_i)$. Accordingly, the momentum at the time $t=t_{i+1}$ is obtained as follows:

$$p_{i+1} = p_i + \Delta p_i = p_i + q\left(E_i + \frac{p_i}{\gamma_i m_0} \times B_i\right)\Delta t. \tag{165}$$

In this way, by providing the initial values $r_0$ and $p_0$, the trajectory can be extended little by little like $r_{i+1}, r_{i+2}, \ldots$ by cyclically applying Eqs. (162) and (165).

Incidentally, when $\beta \lesssim 0.1$, that is, when nonrelativistic treatment is allowed, although approximately, $\gamma_i=1$ and $m_i=m_0$ can be substituted into Eqs. (162) and (165).

Figure 19:
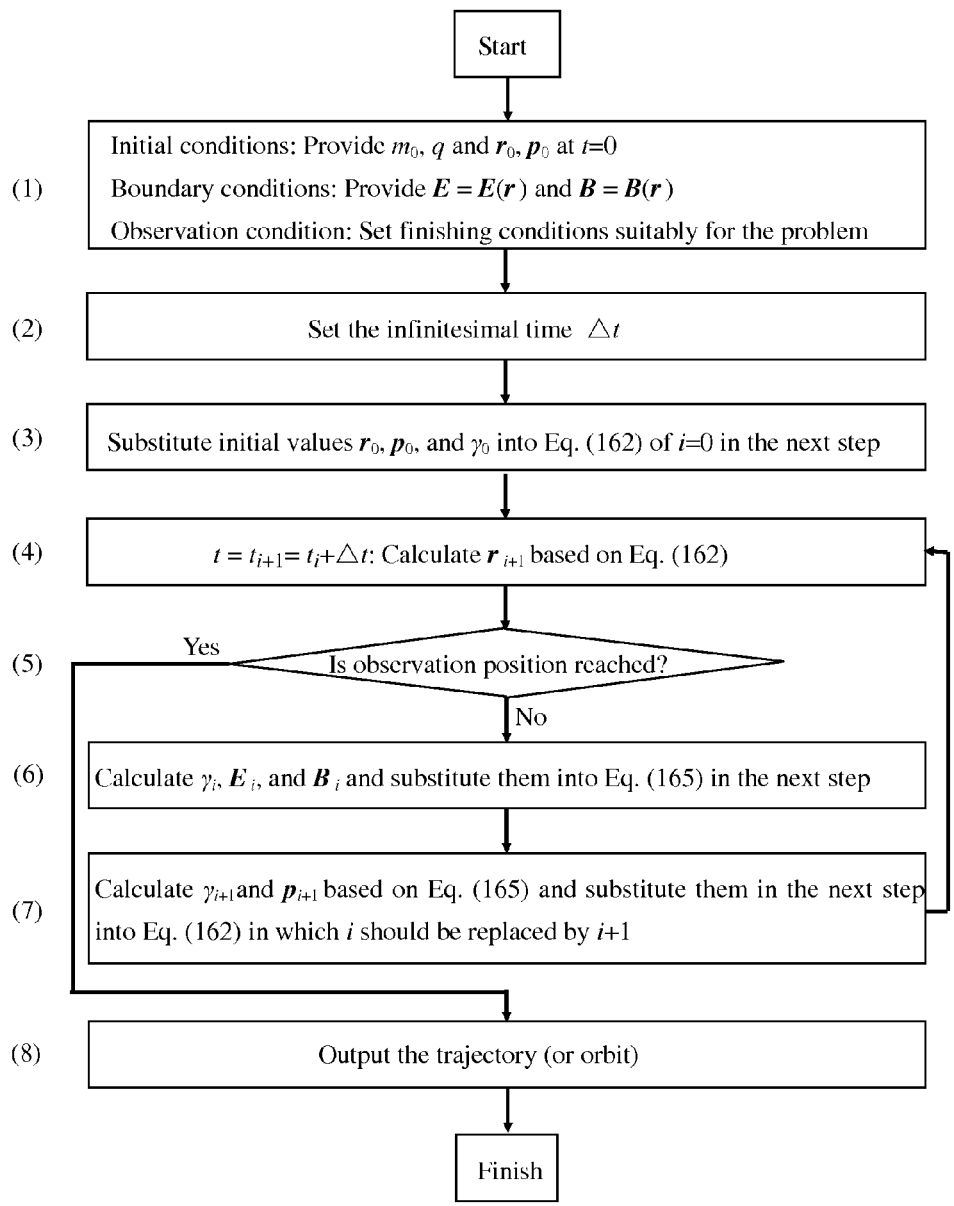
FIG. 19 is a flowchart showing the process of deriving a trajectory of a particle by relativistic calculations.
Figure 20:
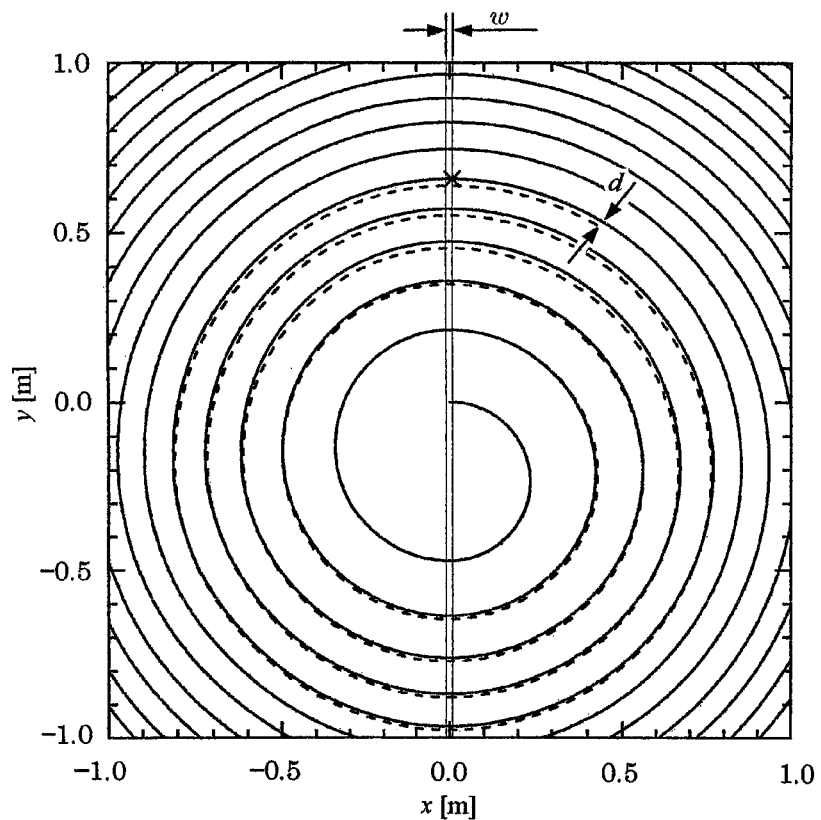
FIG. 20 is a diagram comparing a result of deriving an orbit of a proton by relativistic calculations with a result of deriving an orbit of the proton by nonrelativistic calculations in a synchrocyclotron.

FIG. 19 shows a flowchart representing a process from relativistically calculating an entire trajectory by applying Eqs. (162) and (165) to outputting the trajectory when designing apparatus related to charged particles. FIG. 20 shows an example of an orbit of a proton in a synchrocyclotron, which is calculated according to this flowchart in which every step is numbered. This example shows a part of the synchrocyclotron having an orbital plane in the xy plane and a part of the orbit both cut out and put into a framework of 2 square meters whose center is at the origin. A solid line indicates a result of the relativistic calculation of the orbit and a broken line indicates a result of the nonrelativistic calculation of the orbit.

Explanations will be given for preparations that are necessary before carrying out calculations. When applying values expressed by applying MKS system of units as they are to calculating an orbit of an electron or a proton in an accelerator, a problem of a lack in significant figures occurs. Therefore, in general, the mass or energy of the particle is expressed using electron volts [eV]. For example, the rest mass of an electron is expressed as $m_e=0.511$ [MeV] and that of a proton as $m_p=938$ [MeV]. Furthermore, when a unit of momentum is transformed using the equation $$\frac{mv^2}{r} = evB \tag{166}$$

expressing the balance of the centrifugal force and the Lorentz force both acting on an electron having a charge −e in a circular motion with a radius r under a uniform magnetic field B, it is written as p [eV/c]=crB [T·m] or p [MeV/c]=300rB [T·m]. When the equation of motion expressed by Eq. (161) is rewritten by applying the above system of units such as [MeV] and the expression q=ne where n is a valency of charges, $$\frac{dp}{dt} = 300 \, n\left(E + \frac{p}{\gamma m_0} \times B\right). \quad (167)$$

As it is seen from the above unit of momentum [MeV/c] corresponding to the unit of a mass [MeV], a velocity turns out to have a value β, which results from dividing an ordinary velocity v by the velocity of light, i.e., a ratio of the velocity to the light velocity, as its magnitude. Therefore, it is necessary to pay attention to the fact that the infinitesimal time Δt for numerically integrating Eq. (167) with respect to time also has been transformed to a system of time having 1/c as its unit time.

As the next step of preparations, it is necessary to rewrite Eq. (167) to equations that are possible to numerically calculate. Since the orbital plane has been the xy plane, as it is easily seen, Eq. (162) representing the position of the particle is expressed as $$x_{i+1} = x_i + \frac{p_{x,i}}{\gamma_i m_0} \Delta t, \quad (168\text{-}1)$$

$$y_{i+1} = y_i + \frac{p_{y,i}}{\gamma_i m_0} \Delta t. \quad (168\text{-}2)$$

In addition, since a magnetic field B has only a z component $B_z$ because B at a position $(x_i, y_i)$ is orientated along the z axis and the electric field E has components $E_x$ and $E_y$, Eq. (165) representing the momentum can be written as $$p_{x,i+1} = p_{x,i} + 300 \, n\left(E_x + \frac{p_{y,i}}{\gamma_i m_0} B_z\right)\Delta t, \quad (169\text{-}1)$$

$$p_{i+1} = p_{y,i} + 300 \, n\left(E_y + \frac{p_{x,i}}{\gamma_i m_0} B_z\right)\Delta t. \quad (169\text{-}2)$$

Accordingly, when calculating based on the flowchart shown in FIG. 19, Eq. (162) in steps (3) and (4) can be substituted by a pair of equations of Eq. (168) and Eq. (165) in steps (6) and (7) by a pair of equations of Eq. (169).

Step (1) in FIG. 19 will be explained here. The rest mass of the proton is set to $m_0$=938 [MeV], the valency of charges to n=1, and the position and momentum of the proton to $(x_0, y_0)$=(0,0), and $(p_{x,0}, p_{y,0})$=(46.9, 0.00) [MeV/c], respectively as initial conditions at t=0.

Note that by applying the above values of $m_0$ and $p_{x,0}$, $\gamma_0$=1.00125 is obtained from Eq. (163) where E is the total energy. In this case, the ratio of the particle velocity to the light velocity becomes $\beta_{x,0}$=0.05 for an initial velocity $v_{x,0}$. In this way, when the initial velocity is small compared to the velocity of light, the velocity can be applied instead of the momentum to one of the initial values. For example, provided that there are 12 significant digits, no problem occurs even if the maximum of the initial velocity is $v_0$=0.9 c. However, as in a synchrotron, when β can be made nearly 1 by making the initial velocity extremely large, that is, for example, when β=0.999999999999 is attained at a maximum initial velocity, β=0.999999999998 is obtained at the next smaller value of velocity. In the above cases, the values of γ become 707115 and 500006, respectively, and at the same time, when the particle is an electron, the magnitudes of the total energy E become 361 GeV and 256 GeV, respectively. This means that it is impossible to represent the total energy of the electron by a fractional value less than 105 GeV between 361 GeV and 256 GeV. Accordingly, except for general electric equipment, the momentum is usually given as an initial value in designing accelerators.

Static electric and/or magnetic fields are given as boundary conditions. In FIG. 20, an electric field in the region of width w=0.02 [m] between a pair of electromagnets has only a component $E_x$=0.5 [MV/m] whose direction is synchronized with the direction of the motion of a proton and the magnetic field is set as $B_z$=1.0 [T] in a vertical direction. The condition for observing the particle or ending the calculation is set in the following manner. In the relativistic case, a starting point is settled at a position $(x_0, y_0)$=(0,0) at time t=0 and the position for observation is fixed at a point on an orbit (outside the framework of FIG. 20) after t=3,300 [ns] has elapsed. Incidentally, this time is given by ($10^5$ times: loop count in the flowchart of FIG. 19)×Δt×1/c [s]. In the nonrelativistic case, in addition to substituting $\gamma_i$=1 and $m_i$=$m_0$ into the flowchart shown in FIG. 19 and Eqs. (162) and (165), the position for observation is fixed at a point on the orbit at after t=330 [ns] (loop count is $10^4$ times) has elapsed, applying the same initial conditions and boundary conditions as those in the relativistic case. The end of the orbit indicated by the broken line in FIG. 20 corresponds to this observation position. A sufficiently small value of Δt=0.01 [s/c]=3.3 [ns] is selected for an infinitesimal time in the second step, having 1/c as a unit time.

Figure 21:
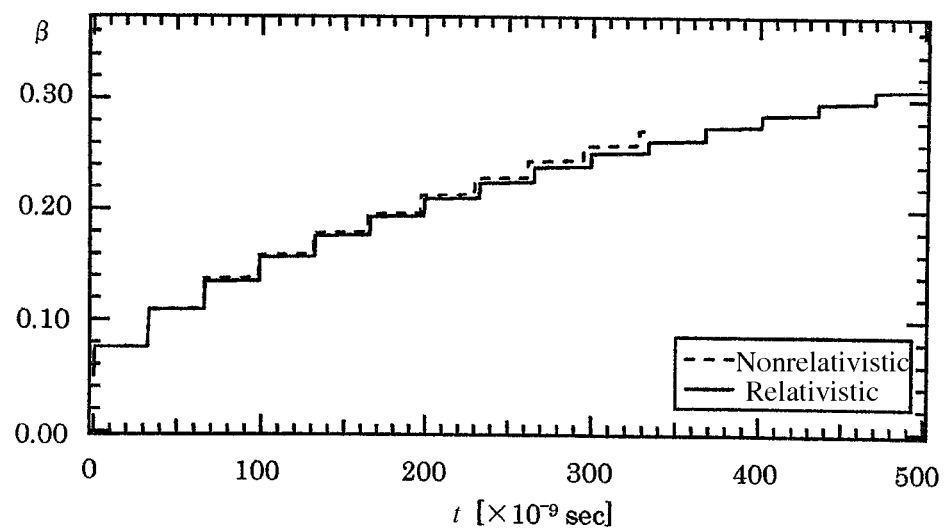
FIG. 21 is a diagram comparing a result of deriving temporal variations of ratio $\beta$ of a velocity of a proton to velocity of light by relativistic calculations with a result of deriving the temporal variations of the ratio $\beta$ by nonrelativistic calculations in the synchrocyclotron.

FIG. 20 shows orbits of a proton calculated under the above conditions. The solid line indicates the orbit obtained by making a numerical integration of the relativistic equation of motion and the broken line indicates the orbit obtained based on the nonrelativistic equation of motion. In FIG. 21, the horizontal axis shows the time elapsed since t=0 and the vertical axis shows the ratio β of the velocity of the proton to the velocity of light at that time. This is a graph where the solid line denotes the relativistic case and the broken line denotes the nonrelativistic case. It is seen from this graph that the velocity of the proton exceeds 10% of the velocity of light after 32.9 [ns] has elapsed. Consequently, whether it be the orbits shown in FIG. 20 or the graph shown in FIG. 21, the deviance of the broken line from the solid line shows an error caused by the nonrelativistic treatment of the subject that should actually be treated relativistically. Incidentally, the nonrelativistic orbit has the characteristic of isochronism in that the necessary time to draw each individual semicircular orbit is constant (Refer to FIG. 21). Accelerators each having this isochronism are primarily called cyclotrons.

Let us remark on the above error appeared in FIG. 20. The x mark inscribed on the relativistic orbit indicates the position of the proton at the same time as the time that the proton reached the end of the nonrelativistic orbit. The total length of the relativistic orbit from the starting point is shorter than that of the nonrelativistic orbit by 0.4 [m]. This shows that since the mass has increased according to the relativistic effect, the velocity has decreased more than that in the nonrelativistic case. The distance from the end of the nonrelativistic orbit to its nearest point on the relativistic orbit is d=0.016 [m]. Since the mass has increased according to the relativistic effect, it is understood that these differences from the nonrelativistic orbit have appeared.

Accelerators are indispensable in experiments concerning microscopic particles such as elementary particles etc. The basis for designing such accelerators is, as seen above, to derive orbits or trajectories of those particles with higher precision by numerically solving the equations of motion in classical mechanics from Newtonian mechanics to the special theory of relativity. However, in quantum mechanics, it has been concluded that those orbits or trajectories of microscopic particles could never exist according to the uncertainty principle. There has been such an extreme conflict between theory and experiments in the history of physics concerning microscopic particles from the beginning. However, it has already been revealed that the uncertainty principle was derived through absolute errors due to Heisenberg. From the viewpoint of dual mechanics, it is quite natural to design accelerators dealing specifically with particles having high velocities based on accurate calculations of orbits or trajectories.

[Appendix 2] Derivation of the Equation of Motion in Semispecial Relativity

Previously, attention was called upon the discrepancy between theory and experiments in that theoretically, although the transition to the non-physical (nonrelativistic) limit c→∞ has been necessary to utilize the Newtonian equation of motion, this equation can actually be used, although approximately, instead of the relativistic equation of motion as long as $\beta \lesssim 0.1$ is satisfied. Here, we will show anew that the equation of motion in semispecial relativity can be derived directly from the relativistic equation of motion of Eq. (159) by the transition to the physically appropriate limit $\beta^2 \to 0$.

For simplicity, consideration will be made concerning the following one-dimensional relativistic equation of motion:

$$\frac{d}{dt}\left(m\frac{dx}{dt}\right) = F_x. \tag{170}$$

Expanding the relativistic mass m represented by Eq. (158) under the condition $\beta_x^2 \ll 1$, under which the low-velocity Lorentz transformation is valid, and then, ignoring those terms of order $\beta_x^4$ and higher gives $$\frac{d}{dt}\left(m\frac{dx}{dt}\right) \doteq m_0 \frac{d^2x}{dt^2} + \frac{3m_0}{2}\frac{d^2x}{dt^2}\beta_x^2. \tag{171}$$

Here, introducing the additional low-velocity condition of $\beta_x^2 \to 0 (\beta_x \ll 1)$ for transferring to semispecial relativity gives $$\lim_{\beta_x^2 \to 0} \frac{d}{dt}\left(m\frac{dx}{dt}\right) = \lim_{\beta_x^2 \to 0}\left(m_0 \frac{d^2x}{dt^2} + \frac{3m_0}{2}\frac{d^2x}{dt^2}\beta_x^2\right) \tag{172}$$

$$= m_0 \frac{d^2x}{dt^2}$$

$$= F_x$$

and thus the equation of motion in semispecial relativity results in the Newtonian equation of motion.

It is easy to show that the Newtonian equation of motion is covariant with respect to the Galileo transformation because t=t' is valid. For confirmation, the covariance of the Newtonian equation of motion will be examined under the semirelativistic Lorentz transformation. From Eq. (140) representing the semirelativistic Lorentz transformation and dx/dt=v, $$dx' = \frac{\partial x'}{\partial x}dx + \frac{\partial x'}{\partial t}dt = vdt + v_0 dt \tag{173}$$

and

-continued $$dt' = \frac{\partial t'}{\partial x}dx + \frac{\partial t'}{\partial t}dt = \frac{v_0}{c^2}dx + dt \tag{174}$$

are obtained. From the above equation together with $\beta^2 = v_0^2/c^2$, it follows $$v_0 dt' = \beta^2 dx + v_0 dt. \tag{175}$$

Here, application of the transition to the limit $\beta^2 \to 0 (\beta \ll 1)$ to $v_0 dt$ obtained from the above equation results in $$\lim_{\beta^2 \to 0} v_0 dt = \lim_{\beta^2 \to 0}(v_0 dt' - \beta^2 dx) = v_0 dt'. \tag{176}$$

Further, $$vdt' = \frac{v_0 v}{c^2}dx + vdt \tag{177}$$

is obtained from Eq. (174). Applying the transition to the limit $v_0 v/c^2 \to 0$ to vdt obtained from the above equation gives $$\lim_{\beta^2 \to 0} vdt = \lim_{\beta^2 \to 0}\left(vdt' - \frac{v_0 v}{c^2}dx\right) = vdt'. \tag{178}$$

Substituting Eqs. (176) and (178) into the right-hand side of Eq. (173), $$\frac{dx'}{dt'} \doteq v + v_0 \tag{179}$$

is given. The above equation agrees with Eq. (154) representing the addition theorem concerning velocities. In addition, since both of Eqs. (176) and (178) can be represented by dt' ≐ dt, Eq. (179) leads to $$\frac{d^2x'}{dt'^2} \doteq \frac{d}{dt'}(v + v_0) = \frac{dv}{dt'} \doteq \frac{d^2x}{dt^2}. \tag{180}$$

Here, provided that the potential of an external force is uniform, since $F_x' = F_x$ is valid, it is seen that the Newtonian equation of motion is also covariant approximately with respect to the semirelativistic Lorentz transformation. In this way, since the transition to the limit $\beta^2 \to 0$ is equivalent to the inequality $\beta \ll 1$, the equation of motion in special relativity approximately results in the Newtonian equation of motion in semispecial relativity under the condition $\beta \ll 1$ for velocities, and therefore, it follows that the transition to the limit so much as c→∞ is unnecessary. This result is consistent with the fact that the Newtonian equation of motion Eq. (143) for a free particle has been derived under the semirelativistic Lorentz transformation.

Previously, showing the orbit of a proton in the synchrocyclotron in FIG. 20, it was explained that the broken line indicates the orbit based on the nonrelativistic equation of motion, that is, the Newtonian equation of motion in classical mechanics. However, in dual mechanics, an alternative explanation is necessary restating that the broken line indicates the orbit calculated following the Newtonian equation of motion as the basic equation in semirelativistic particle mechanics applicable also to microscopic particles. Incidentally, all systems of particle mechanics are naturally applicable to macroscopic particles. This concludes the discussions for determining the system of particle mechanics having a structure of three layers and the equation of motion in each individual particle mechanics.

Previously, it was stated that when the state of an ensemble corresponding to all the particles supplied to an experiment is represented by the statistical wave function ψ, relativistic statistical wave mechanics whose basic equation is a statistical Klein-Gordon equation having ψ as its solution exists. Similarly, as a result of the existence of semirelativistic wave mechanics having been proven, the existence of semirelativistic statistical wave mechanics whose basic equation is a statistical, semirelativistic Schrödinger equation having a statistical wave function ψ as its solution becomes a reality. Accordingly, the 'principle of superposition of states' and the 'uncertainty principle' can be statistical, fundamental laws valid also in semirelativistic statistical wave mechanics. It turns out that, basically, semirelativistic dual mechanics including semirelativistic statistical wave mechanics and semispecial relativity or semirelativistic statistical particle mechanics should be applied to various experimental problems to which non relativistic quantum mechanics has been hitherto applied.

7.1.3. Third Subject: Procedures for Deriving a Relativistic Wave Equation

Next, 'procedures for deriving a relativistic wave equation' will be explained as a third subject.

It is clarified that the system of dual mechanics in which semirelativistic dual mechanics is added to relativistic dual mechanics has a dual structure consisting of particle mechanics dealing with particles and wave mechanics dealing with waves associated with the particles. The common ground for these two mechanics concerning objects having direct opposite spatial characteristics has existed in the facts that an oscillation frequency of the phase space proper to a particle is expressed using the rest energy of the particle, and that the square of the absolute value of the wave function having reality practically gives a probability density for a particle part of the particle being detected at an observation plane. Further, the most significant particle mechanics has been special relativity and the most significant wave mechanics has been relativistic wave mechanics. These two mechanics have been similar in the respect that the transformation formulas with respect to space-time coordinates between two inertial systems are given by the Lorentz transformations. Here, first, how to derive the Klein-Gordon equation as a fundamental wave equation in relativistic wave mechanics, in other words, the exact procedures of deriving this equation will be clarified. Then, it will be proven that the square of the absolute value of the real wave function Ψ may give the above probability density.

The bases for creating a relativistic wave equation are two different expressions of a wave-like expression and a particle-like expression for the energy of the same single free particle:

$$E = h\nu = \hbar\omega. \tag{181}$$

$$H = c\sqrt{p_x^2 + p_y^2 + p_z^2 + m_0^2 c^2}. \tag{182}$$

The signs of E and H are determined based on the following laws:

$$m_0 \gtreqless 0 \Rightarrow h, \hbar, E, H \gtreqless 0. \tag{183}$$

Under the above agreements, $$E = H \tag{184}$$

holds irrespective of whether the sign of the rest energy $m_0 c^2$ is positive or negative. Let Eq. (184) be called the 'equivalence principle of wave-like energy and particle-like energy' or simply the 'equivalence principle of energy'. Eq. (181) is the most fundamental formula in wave mechanics representing the total energy of a particle part with the use of a proper oscillation frequency of the phase space of a dual particle or an oscillation frequency of a phase wave (de Broglie wave). Incidentally, when the total energy of a particle part is represented by Eq. (2), the above equivalence principle of energy can be described as $$h\nu = mc^2 \text{ or } \frac{m}{\nu} = \frac{h}{c^2} = const. \left(\frac{m}{\omega} = \frac{\hbar}{c^2} = const.\right). \tag{185}$$

Eq. (182), that is the most fundamental in particle mechanics, is the relativistic Hamiltonian also representing the total energy of the particle part. Let $m_0 > 0$ correspond to the case of a particle having positive mass and $m_0 < 0$ to the case of a particle having negative mass, i.e., an antiparticle. However, the agreements written by Eqs. (182) and (183) do not agree with the present theory of elementary particles in which a particle and its antiparticle have the same mass. This problem is, similarly to the problem of spins, one of the several basic problems that cannot be solved within the framework of dual mechanics.

Although Eq. (184) is simple, it has a substantial meaning. This is because this equation shows that the total energy of a particle expressed by using the real oscillation frequency ν representing the property of a wave and the total energy of the particle expressed by using momentum are equivalent. In the case when $m_0 > 0$ and $p = 0$, one of the three de Broglie's principles, that is, "(a) a rest massive particle with rest mass $m_0$ associates with a periodic phenomenon with an oscillation frequency given by $\nu = m_0 c^2/h$", is obtained from Eqs. (181), (182), and (184). Consequently, it can be said that Eq. (184) is an equation obtained by extending this de Broglie's relation $\nu = m_0 c^2/h$ to the case when $p \neq 0$. In this way, Eqs. (181), (182), and (184) are the most fundamental and general formulas in dual mechanics. Because, as will be shown later, these formulas are applicable to every individual free particle from each individual elementary particle including photons to each individual magnificent celestial object.

From Eq. (184), the relativistic wave equation should be written formally as $$\hat{E}\Psi = \hat{H}\Psi. \tag{186}$$

It should be noted that the same single free wave equation is applicable not only to each individual particle but also to each individual antiparticle. Therefore, which particle is to be studied is primarily a matter of our own decision. As long as the distinction is made, a particle or an antiparticle may be treated as a single independent free particle. Even so, it is realistically impossible to express Eq. (186) using the Hamiltonian of Eq. (182), which is represented by an irrational function, by a linear partial differential equation of the first rank.

On the other hand, referring to the 'equivalence principle of energy' expressed by Eq. (184) provided as a fundamental principle in dual mechanics, the failure of the Dirac equation (47) in which $E = c\alpha \cdot \vartheta + \beta m_0 c^2$ can readily be detected. Expressing the location of this basic problem more carefully and easily to understand than those expressions of Eqs. (46) and (47) gives the following:

$$E = h\nu = H = c\sqrt{p_x^2 + p_y^2 + p_z^2 + m_0^2 c^2} \neq c\alpha \cdot p + \beta m_0 c^2 = H_D. \tag{187}$$

Obviously, it gives E≠$H_D$ and the Dirac's Hamiltonian $H_D$ does not satisfy the 'equivalence principle of energy'. It is common knowledge that an irrational function cannot be represented by a rational function. Therefore, even if E and $H_D$ are operators, $\hat{E}\Psi \neq \hat{H}_D\Psi$. It turns out that the Dirac equation constituted by making $(\hat{E}-\hat{H}_D)\Psi=0$ in spite of $\hat{E}\Psi\neq\hat{H}_D\Psi$ has been an artificial wave equation contradicting natural laws, as with the Schrödinger equation. The free Dirac equation has been regarded as having a solution Ψ consisting of four components corresponding to four different particles. Every particle including each electron associates a phase wave or a de Broglie wave propagating in the real space-time. It is impossible for this 4-component solution Ψ to travel in the real space-time. This is why the Dirac equation is an artificial equation. The significance of the existence of the Schrödinger equation and the Dirac equation will be considered briefly after a first embodiment (7.2.1. First embodiment) is explained.

However, it is extremely difficult to deal with Eq. (186) as is. Therefore, let it be rewritten simply as $$\hat{E}^2\Psi = \hat{H}^2\Psi = c^2(\hat{p}_x^2+\hat{p}_y^2+\hat{p}_x^2+m_0^2c^2)\Psi \tag{188}$$

Here, substitutions as with Eq. (53) are made as follows:

$$\hat{E} \to i\hbar\frac{\partial}{\partial t}, \quad \hat{p} \to -i\hbar\nabla. \tag{189}$$

Applying Eq. (189) to Eq. (188) gives the free Klein-Gordon equation $$\frac{\partial^2\Psi}{\partial t^2} - c^2\nabla^2\Psi + \frac{m_0^2c^2}{\hbar^2}\Psi = 0. \tag{190}$$

The fact that the above equation can be applied to a free particle having either positive or negative mass is noteworthy. As already mentioned, Eq. (190) has a rest solution and also has a phase wave or de Broglie wave as its solution. So far the substitutions expressed by Eq. (189), which is the procedure for acquiring Eq. (190), have been called quantization. However, a quantum has been conforming to Bohr's complementary principle and an unphysical principle such as the Heisenberg uncertainty principle, and is thus an extremely artificial concept that cannot exist in the natural world. Now that it is known that the dual structure of each common particle consists of a particle part and its proper phase space and Eq. (190) represents a wave equation having the solution of a phase wave generated in the phase space, it is rather suitable to call Eq. (189) a procedure for making waves. Further, since the Dirac equation is not a physical wave equation for each individual real wave, the view that the Klein-Gordon equation is the wave equation concerning each individual spin-0 particle (Refer to W. Greiner, the aforementioned book, pp. 6-7 and pp. 8-10) must be reconsidered.

The Klein-Gordon equation being the wave equation concerning each individual spin-0 particle is based on the following reasons: Provided that the wave function as a solution of the Klein-Gordon equation is represented by φ, the quantity ρ assumed to be a probability density is expressed from a continuity equation as $$\rho(x,t) = \frac{i\hbar}{2m_0c^2}\left(\phi^*\frac{\partial\phi}{\partial t} + \phi\frac{\partial\phi^*}{\partial t}\right). \tag{191}$$

Here, since φ and ∂φ/∂t may be arbitrary values, ρ(x, t) may be not only a positive value but also a negative value. If so, ρ(x, t) cannot be the probability density (Refer to W. Greiner, the aforementioned book, p. 6). Consequently, when the absolute value of the electric charge is set to e and then both sides of Eq. (191) are multiplied by e, the value of ρ'(x, t)=eρ(x, t) can be positive, negative, or 0. Considering that the electric charge of a particle and that of its antiparticle take opposite signs from each other, ρ'(x, t) can be interpreted as the charge density (Refer to W. Greiner, the aforementioned book, pp. 8-9). Thus, since the Dirac equation is applied to each individual spin-1/2 charged particle, the Klein-Gordon equation is identified as a wave equation for each individual spin-0 particle.

However, it can easily be proven under the agreement of Eq. (183) that ρ(x, t) represents a probability density: Following Eq. (133), a typical solution Ψ of the free Klein-Gordon equation (190) can be written as $$\Psi(x,t) = u(x)e^{-i\omega t}. \tag{192}$$

Here, substituting φ in Eq. (191) with Ψ(x, t) of the above equation, it gives $$\rho(x,t) = \frac{\hbar\omega}{m_0c^2}|u(x)|^2 = \frac{E}{E_0}|u(x)|^2 > 0 \tag{193}$$

$$(E = \hbar\omega, \quad E_0 = m_0c^2),$$

resulting in ρ(x, t) taking only a positive value in contradiction to the above description by Greiner. Further, multiplying a wave function u(x) by a normalization constant $(E_0/E)^{1/2}$, the value of integration of ρ(x, t) over the entire space may become 1. If so, ρ(x, t) can be regarded as the probability density. In the end, it turns out that the Klein-Gordon equation represented by Eq. (190) may be regarded as a wave equation for each of arbitrary free particles irrespective of spins and electric charges.

Here, massless particles will specifically be referred. This reference has three significances. One is that the following three formulas hold for each of massless free particles:

$$E = h\nu = \hbar\omega > 0, \tag{194}$$

$$H = c\sqrt{p_x^2 + p_y^2 + p_z^2} = cp > 0, \tag{195}$$

$$\frac{\partial^2\Psi}{\partial t^2} - c^2\nabla^2\Psi = 0. \tag{196}$$

Figure 12:
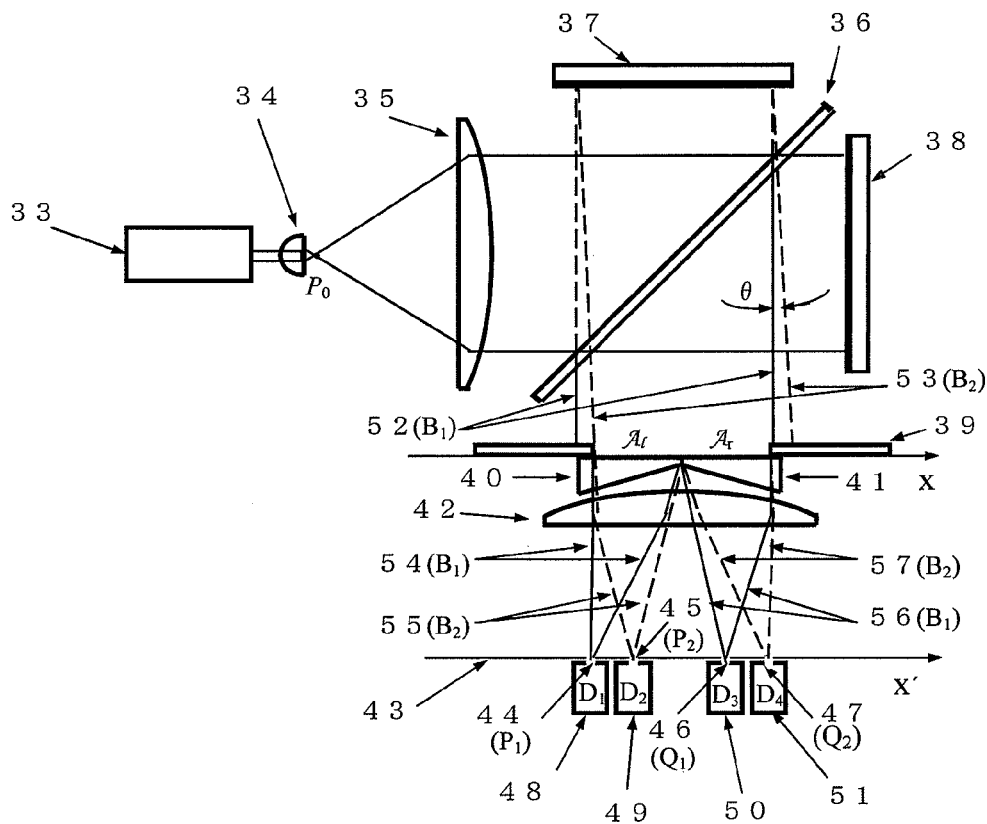
FIG. 12 is a diagram explaining in detail that it is possible to observe the simultaneous duality of each individual photon using a conventional interferometer.
Figure 13:
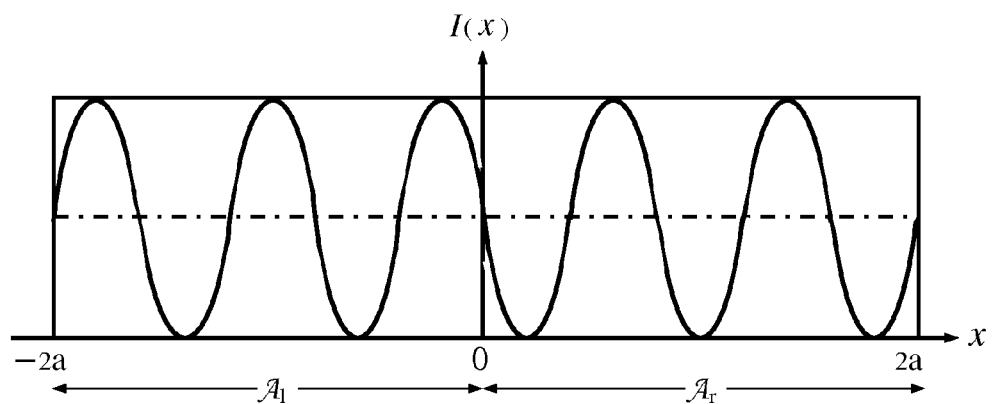
FIG. 13 is a diagram showing a theoretical intensity distribution of interference fringes that should be formed in advance in apertures $\mathcal{A}_l$ and $\mathcal{A}_r$ of the interferometer shown in FIG. 12.
Figure 14:
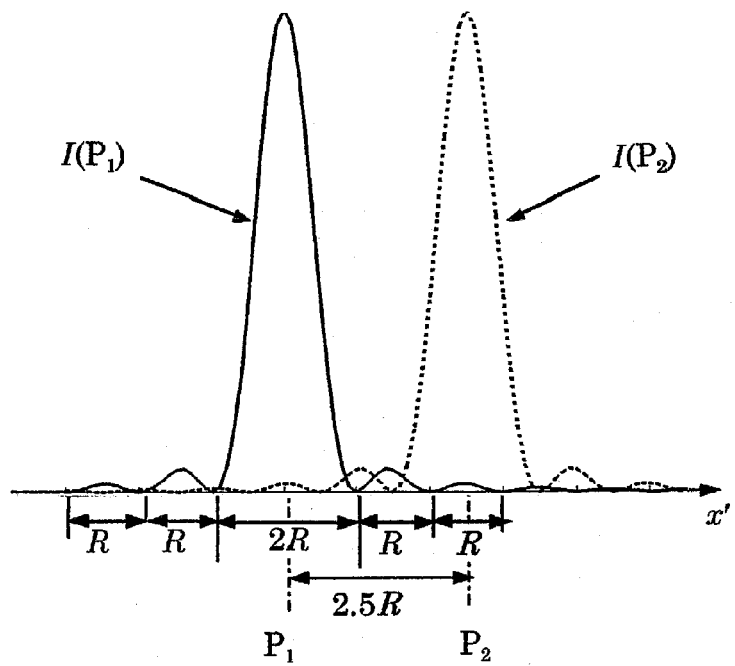
FIG. 14 is a diagram showing a positional relationship between intensity distributions $I(P_1)$ and $I(P_2)$ formed on a focal plane of a collimator lens when parallel beams $B_1$ and $B_2$ respectively pass not simultaneously but independently through the rectangular aperture $\mathcal{A}_l$ shown in FIG. 12.
Figure 15:
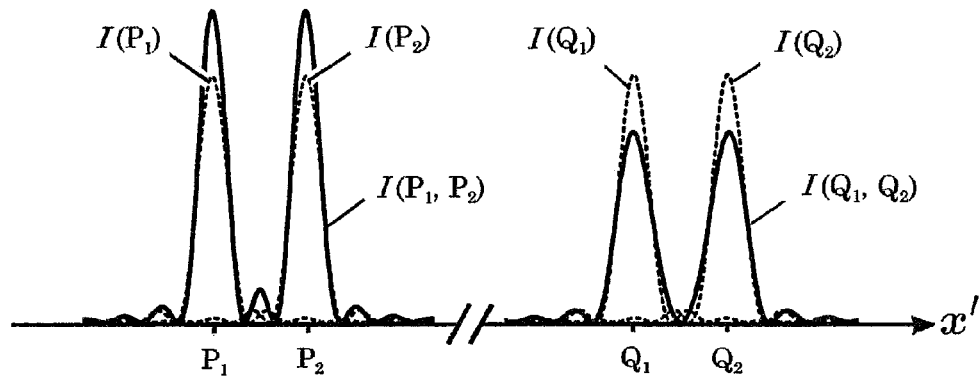
FIG. 15 is a diagram showing intensity distributions $I(P_1, P_2)$ and $I(Q_1, Q_2)$ on the focal plane obtained by the simultaneous incidence of the beams $B_1$ and $B_2$ on the rectangular apertures $\mathcal{A}_l$ and $\mathcal{A}_r$
Figure 16:
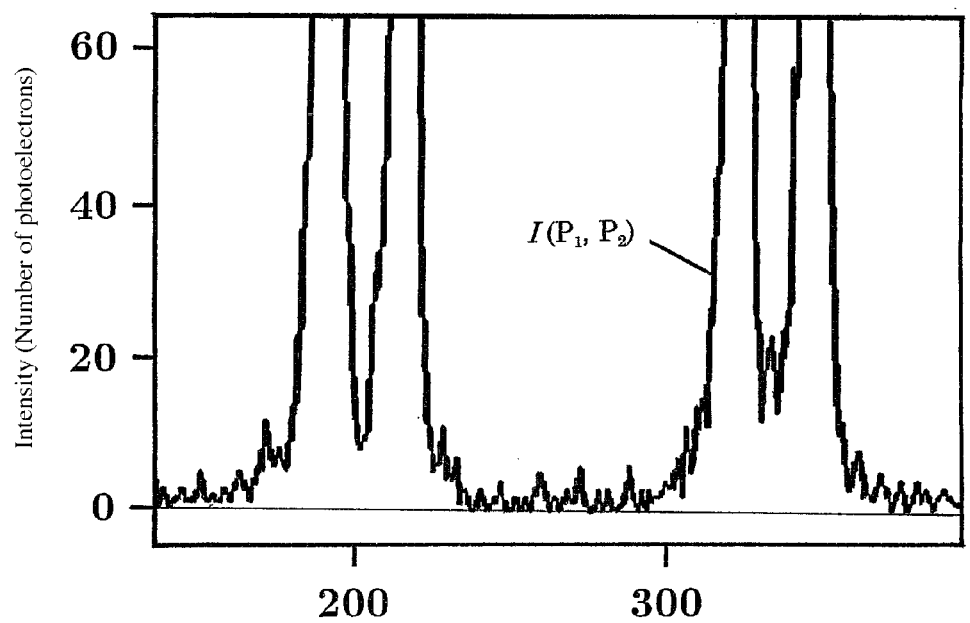
FIG. 16 is a diagram showing the actual measured values of the intensity distribution generated on the focal plane of the collimator lens by means of the interference fringes that are formed in the rectangular apertures $\mathcal{A}_l$ and $\mathcal{A}_r$ with the use of two extremely weak beams originated from an Ar laser.

Eqs. (195) and (196) are derived by substituting $m_0=0$ into Eqs. (182) and (190) respectively. Since photons are massless according to special relativity, each of them satisfies all of the above formulas. Especially Eq. (196) agrees formally with a wave equation that is satisfied by vector potential A, though the scalar wave function differs from the vector wave function. Because polarization of light can be ignored when only dealing with free photons, Eq. (196) can be identified as the wave equation for each individual free photon. Heisenberg assumed that an elastic collision occurs between the electron 16 and a photon as both being particles in the thought experiment of measuring the position of each electron explained using FIG. 7. The formulas from Eq. (194) through Eq. (196) support validity of such argument in which the photon is also treated as a particle on the same basis as the electron. In addition, agreement is also seen when we have concluded from the result of the experiment for simultaneously observing the duality of each individual photon shown in FIG. 12 that any arbitrary particle including each photon associates with a real phase wave ($\Psi$). On the other hand, dare to say without being afraid of some misunderstanding, provided that rays in geometrical optics are regarded as trajectories of photons, geometrical optics can be considered as particle mechanics concerning each individual photon. Usually, the trajectory of each photon intersects perpendicular to the wavefront of each phase wave associated with the photon. In the manner described above, photons may be categorized in the particles treated by relativistic dual mechanics.

In order to complete relativistic dual mechanics concerning photons, it is necessary to define relativistic statistical dual mechanics for photons. Provided that the wave function $\Psi$ in Eq. (196) is substituted by the statistical wave function $\psi$ representing a state of an ensemble of photons, the statistical wave equation concerning photons is obtained as follows:

$$\frac{\partial^2 \psi}{\partial t^2} - c^2 \nabla^2 \psi = 0. \tag{197}$$

The above equation is a fundamental equation concerning free photons in relativistic statistical wave mechanics. As it is easily understood, provided that $\psi$ is substituted by a monochromatic scalar wave in the vacuum $U(r, t)=U(r)e^{-i\omega t}$, the above equation coincides with a free scalar wave equation for a complex amplitude $U(r, t)$ of a light wave. Accordingly, the wave function $U(r, t)$ representing light waves in physical optics can correspond to a statistical wave function $\psi$ for photons. From these correspondence relationships, it is seen that formulas for propagation and diffraction of light waves can also be applied to the statistical wave function $\psi$ as well as the phase wave $\Psi$ associated with each individual photon. Until now, light has changed its physical characteristics in accordance with design objects. Light is considered as rays in designing lenses by applying geometrical optics, as electromagnetic waves in designing by applying physical optics, and as photons in designing photoelectric devices. In dual mechanics, each of photons may be dealt with solely as each of massless dual particles for any kind of design objects.

These propagation and diffraction formulas applied to the statistical phase wave $\psi$ for photons can naturally be applied also to the statistical de Broglie wave $\psi$. Even in quantum mechanics, for example, the diffraction and interference formulas have been applied to the probability wave $\psi$ associated with each particle in explaining the formation of interference fringes in a Young's double-slit interference experiment. Previously, a numerical solution of an equation of motion in classical mechanics was reviewed in relation to designing equipment. Similarly, a numerical solution of a wave equation in conventional wave optics will be reviewed in relation to solving problems of diffraction in designing equipment. However, attention must be given to the fact that, usually, a wave equation used in solving the boundary value problem concerning, for example, the light wave $U(r, t)$ is the Helmholtz equation with respect to the complex amplitude $U(r)$ without any dependence on time.

Figure 22:
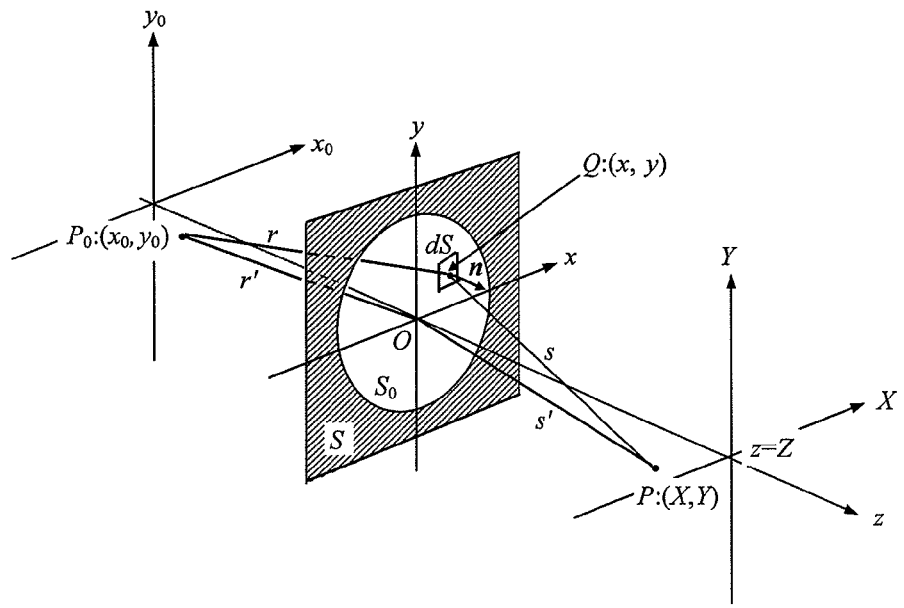
FIG. 22 is a diagram showing positional relationships among a point source, an aperture, and an observation point that are necessary for deriving a diffraction pattern by calculation.

The most fundamental equation for calculating a diffraction field of light is the Helmholtz-Kirchhoff integral theorem that gives a solution of the Helmholtz equation (Refer to M. Born and E. Wolf, the aforementioned book, p. 377, Eq. (7)). By introducing Kirchhoff's boundary conditions to the integral theorem, the original form of a Fresnel-Kirchhoff diffraction formula is obtained as follows:

$$U(P) = \frac{1}{4\pi} \int\!\!\int_{S_0} \left\{ U^{(i)} \frac{\partial}{\partial n}\left(\frac{e^{iks}}{s}\right) - \frac{e^{iks}}{s} \frac{\partial U^{(i)}}{\partial n} \right\} dS, \tag{198}$$

where n is the normal to an infinitesimal area dS within an aperture $S_0$ and s is the distance from a point of observation P to the infinitesimal area dS, as shown in FIG. 22. In this connection, the Kirchhoff's boundary conditions mean to make $$U = U^{(i)} \text{ and } \frac{\partial u}{\partial n} = \frac{\partial U^{(i)}}{\partial n} \tag{199}$$

only within the aperture $S_0$ on the screen S, and to make $U=0$ and $\partial U/\partial n=0$ in the integral domain outside $S_0$. Provided that an incident wave $U^{(i)}$ is a spherical wave from a point source $P_0$, the above boundary conditions can be represented by $$U^{(i)} = \frac{Ae^{ikr}}{r} \text{ and } \frac{\partial U^{(i)}}{\partial n} = \frac{Ae^{ikr}}{r}\left[ik - \frac{1}{r}\right]\cos(n, r), \tag{200}$$

where A is a constant and (n, r) represents an angle (acute angle) formed by a normal vector n and a line segment $P_0Q$ of length r. Substituting Eq. (200) into Eq. (198), the equation $$U(P) = -\frac{Ai}{2\lambda} \int\!\!\int_{S_0} \frac{e^{ik(r+s)}}{rs}[\cos(n, r) - \cos(n, s)]\, dS \tag{201}$$

is obtained, which is usually called the Fresnel-Kirchhoff diffraction formula (M. Born and E. Wolf, the aforementioned book, p. 380, Eq. (17)). Here, (n, s) represents an angle (acute angle) formed by the normal vector n and a line segment QP of length s. Based on this diffraction formula, any diffraction pattern generated in any diffraction phenomenon should be derivable.

When the point source $P_0$ is sufficiently distant from the aperture, the integral domain can be moved from the aperture $S_0$ onto the wave front of a spherical wave of radius $r_0$ centered at $P_0$ and covering the aperture. In this case, r becomes $r_0$ and, since the direction of $r_0$ agrees with that of n, $\cos(n, r_0)=1$. Further, setting $\chi=\pi-(r_0, s)$, Eq. (201) can be rewritten as $$U(P) = -\frac{i}{2\lambda} \frac{Ae^{ikr_0}}{r_0} \int\!\!\int_W \frac{e^{iks}}{s}(1 + \cos\chi)\, dS. \tag{202}$$

On the other hand, provided that, in FIG. 22, angles each formed by either a line segment $P_0O$ of length r' or a line segment OP of length s' and a line segment $P_0P$ are small, an approximation of $[\cos(n, r)-\cos(n, s)]=2\cos\delta$ is possible, where $\delta$ is an angle formed by the line segment $P_0P$ and the normal n standing on the aperture plane $S_0$. In addition, when Yrs can be substituted by 1/r's', Eq. (201) can be approximately rewritten as follows:

$$U(P) \approx -\frac{Ai}{\lambda}\frac{\cos\delta}{r's'}\int\int_{S_0} e^{ik(r+s)}\,dS. \tag{203}$$

Furthermore, provided that coordinates $x_{max}$ and $y_{max}$ that can be regarded as representing the dimensions of the aperture region $S_0$ are smaller than r' and s', Eq. (203) becomes as follows:

$$U(X,Y) = -\frac{i\cos\delta}{\lambda}\frac{Ae^{ik(r'+s')}}{r's'}\int\int_{S_0} e^{ikf(x,y)}\,dx\,dy. \tag{204}$$

Here, when the direction cosines are determined by $$\left.\begin{array}{ll} l_0 = -\dfrac{x_0}{r'}, & l = \dfrac{X}{s'} \\[4pt] m_0 = -\dfrac{y_0}{r'}, & m = \dfrac{Y}{s'} \end{array}\right\}, \tag{205}$$

f(x,y) can be expressed as $$f(x,y) = \tag{206}$$
$$(l_0 - l)x + (m_0 - m)y + \frac{1}{2}\left\{\begin{array}{l}\left(\dfrac{1}{r'} + \dfrac{1}{s'}\right)(x^2 + y^2) - \\[4pt] \dfrac{(l_0x + m_0y)^2}{r'} - \dfrac{(lx + my)^2}{s'}\end{array}\right\} + \ldots$$

In Eq. (206), a case where the quadratic and higher terms in x and y can be neglected is called Fraunhofer diffraction and a case where the quadratic terms cannot be neglected is called Fresnel diffraction (For details refer to M. Born and E. Wolf, the aforementioned book, pp. 382-386).

Two conditions that optical systems should satisfy to obtain Fraunhofer diffraction patterns are given below:

$$(1)\ |r'| \gg \frac{(x^2+y^2)_{max}}{\lambda}\ \text{and}\ |s'| \gg \frac{(x^2+y^2)_{max}}{\lambda}. \tag{207}$$

$$(2)\ \frac{1}{r'} + \frac{1}{s'} = 0\ \text{and}\ l_0^2, m_0^2, l^2, m^2 \ll \frac{|r'|\lambda}{(x^2+y^2)_{max}}. \tag{208}$$

Fraunhofer diffraction patterns obtained in those optical systems satisfying the condition (2) are especially valuable for applications in optics.

A concrete and easy-to-understand example of the condition (1) expressed by Eq. (207) will be given. Suppose in FIG. 22 that, since the point source $P_0$ exists on the z axis at infinity in the negative direction, a plane wave impinges on the circular aperture $S_0$ of diameter D. In this case, if position Z of an observation plane satisfies the condition $Z \gg D^2/4\lambda$, a Fraunhofer diffraction pattern will be observed. Provided that the aperture is a slit, the above condition can be written as $L \gg w^2/4\lambda$ by making the width of the slit $2a=w$ and substituting Z by L in FIG. 8.

Figure 23:
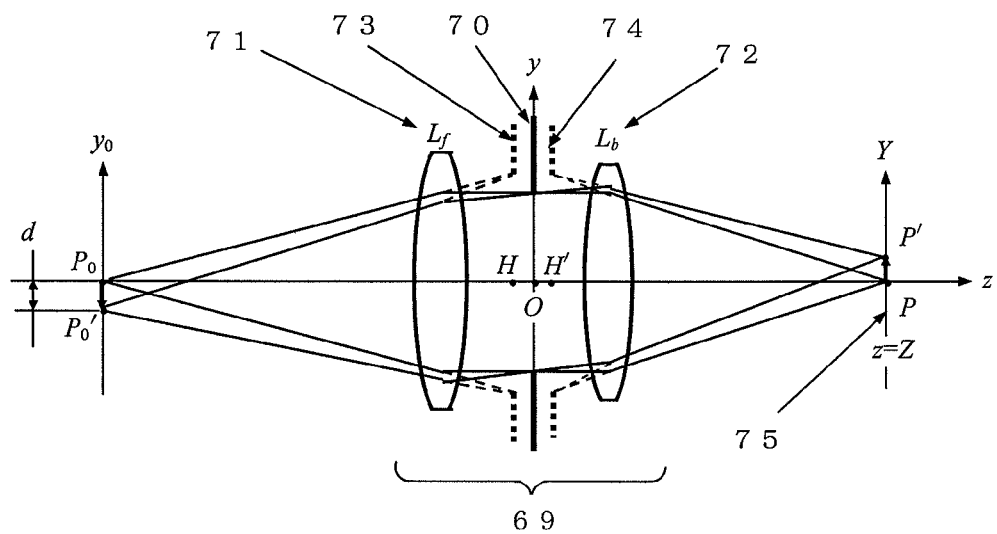
FIG. 23 is a diagram showing relationships among an aperture stop, an entrance pupil, and an exit pupil in an imaging lens.

FIG. 23 shows a concrete example of the condition (2) expressed by Eq. (208). This drawing schematically shows a situation of image formation by the imaging lens 69. Suppose that aberrations of the imaging lens 69, which consists of a front group of lenses ($L_f$) 71 and a rear group of lenses ($L_b$) 72 with an aperture stop 70 caught between them, are well removed. When the z axis is fixed for the optical axis of the lens, an image of the point source $P_0$ on the z axis is formed at the position of a point P. Similarly, an image of a point source $P_0'$ separated from $P_0$ by the distance d is formed at the position of a point P'. As shown in this drawing, when we look at the aperture stop through the front group of lenses $L_f$ from the position of $P_0$ or $P_0'$, a virtual image 73 of the aperture stop is seen at the same position. This virtual image 73 is called the entrance pupil. In addition, when we look at the aperture stop through the rear group of lenses $L_b$ from the position of P or P', a virtual image 74 of the aperture stop is seen at the same position. This virtual image 74 is called the exit pupil.

Now, suppose that the source is positioned at $P_0'$. For simplicity, suppose further that rays emitted from $P_0'$ become parallel rays after passing through the front group of lenses $L_f$ and the parallel rays incident on the aperture stop have direction cosines ($l_0, m_0, n_0$). When the parallel rays pass through the aperture stop 70, the aperture is assumed to uniformly diffract these parallel rays, the diffracted parallel rays having direction cosines (l,m,n). The direction cosines of the diffracted parallel rays can take various values in accordance with the shape of the aperture stop. In this case, since apparently r', s'→∞, the former of the two conditions in the above condition (2) is satisfied. The remaining later condition means that the distance d of $P_0'$ from the z axis and the distance of P' from the z axis are small. When these two conditions are satisfied, the exact same Fraunhofer diffraction patterns are observed at P and P' on the observation plane 75, which is parallel to the plane of the aperture stop, positioned at z=Z and equivalent to the focal plane of the rear group of lenses $L_b$. Such an imaging lens is included in the apparatus for simultaneous observation experiment shown in FIG. 12. In this drawing, a point source $P_0$ is produced at the focal point of the microscope objective 34. Since the collimator lens 35 corresponds to the front group of imaging lens and the collimator lens 42 to the rear group, these two collimator lenses constitute a single imaging system. Then, for example, the Fraunhofer diffraction pattern of the 2 a×2 b rectangular aperture $\mathcal{A}_1$ given by Eq. (91) is formed with its center at a focal point of the collimator lens 42, e.g., the point 44 ($P_1$).

Incidentally, since the rays passing through the aperture stop are assumed as parallel rays, the Fraunhofer diffraction pattern of the shape of the exit pupil is equivalent to the Fraunhofer diffraction pattern of the shape of the aperture stop. In this case, by setting $$p = l - l_0, \quad q = m - m_0, \tag{209}$$

Fraunhofer diffraction can be expressed as (M. Born and E. Wolf, the aforementioned book, p. 385, Eq. (38))

$$U(p,q) = \int\int_{S_0} G(x,y) e^{-\frac{2\pi i}{\lambda}(px+qy)}\,dx\,dy, \tag{210}$$

where G(x,y) is called a pupil function. Eq. (210) shows that a complex amplitude U(p, q) is expressed by the Fourier transform of the aperture $S_0$ or the pupil function G(x,y). In general, a beam that has passed through the front group of lenses of an imaging lens does not always become a parallel beam. Hence, the pupil function G(x,y) in Eq. (210) is generally defined in a form including a wave aberration at the exit pupil and the integral domain is not within the aperture but within the exit pupil. Such an expression of Eq. (210) is a fundamental diffraction formula applicable to physical optics evaluation and designing of imaging lenses.

Next, explanations will be made about the methods of applying the above individual diffraction formulas to evaluation and design of actual optical systems. The methods can roughly be classified into two methods. One method is to express a diffraction pattern in a form that may be numerically calculated by using a diffraction formula adapted to an object. An example of this method is Eq. (91). The other method is to express a surface integral with respect to an aperture region in a form that may be numerically integrated, and then numerically calculated. All of these methods have been well known for a long time, and now, a variety of software for physical optics evaluation and design of optical systems to which diffraction relates is on the market. A type of commercial software for outputting a Fraunhofer diffraction pattern by a slit will be introduced as an example of simple diffraction below.

Recently, a book entitled 'Optical design that is possible using Excel' has been published (H. Nakajima, 'Optical design that is possible using Excel' (New Technology Communications, Tokyo (2005; 1st ed. was issued in 2004) (in Japanese): Incidentally, 'Excel' is a trademark)). Many examples of calculations for simple optical design and Fraunhofer diffraction patterns applying geometrical optics and physical optics are recorded in an accompanying CD-ROM.

For example, provided that the aperture $S_0$ in FIG. 22 is a 2 W-wide slit, the diffraction field can be described on the XZ plane. When a plane wave having a wavelength $\lambda$ is incident on the slit, the Fraunhofer diffraction pattern on the observation plane separated from the slit by the distance Z is expressed as $$I(\theta) = I(O)\frac{\sin^2\beta}{\beta^2}, \qquad (211)$$

where $\beta \equiv kW \sin\theta$ ($k=2\pi/\lambda$) (H. Nakajima, the aforementioned book, p. 142, Eq. (8.7)). Further, making the distance from the aperture center O to an observation point P be denoted by R and an angle formed by a line segment OP and the z axis by $\theta$, $X=R \sin\theta$ and $Z=R\cos\theta$ are obtained. Since $X=Z \tan\theta$ is also obtained, $X \cong Z \sin\theta$ may follow provided that $R' \cong Z \gg X$ holds. In the accompanying CD-ROM, a calculation sheet for calculating the above $I(\theta)$ from given W, $\lambda$, and $\theta$ is recorded as exercise 1 for calculating diffraction. This calculation sheet can also be used for calculating diffraction patterns of probability waves.

Figure 2:
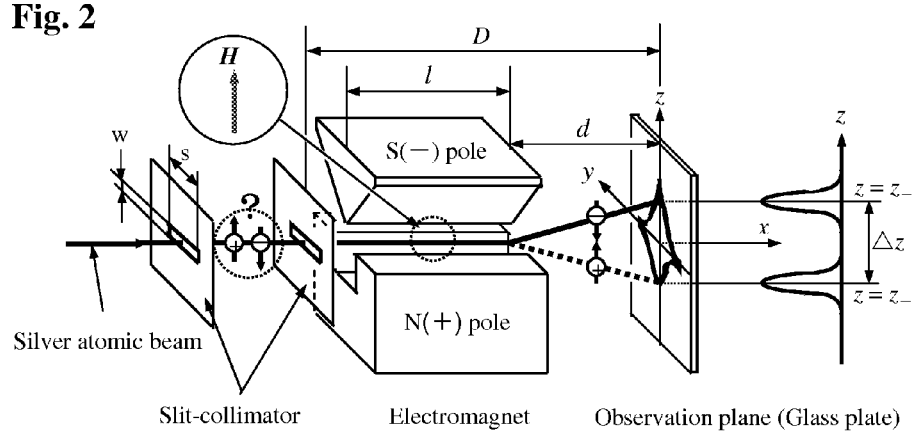
FIG. 2 is a diagram schematically showing an apparatus for the Stern-Gerlach experiment.
Figure 3:
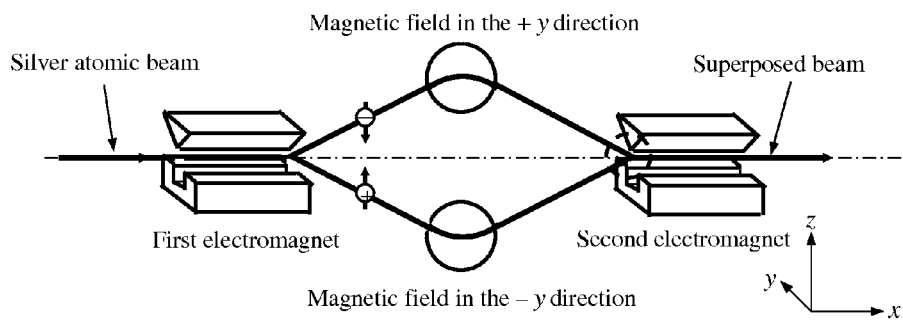
FIG. 3 is a diagram schematically showing a spin interferometer proposed by Bohm.
Figure 7:
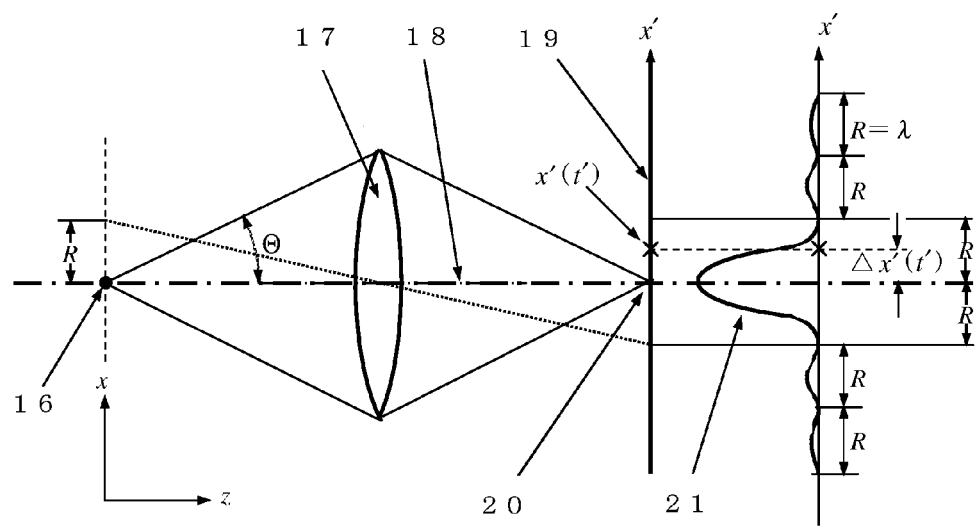
FIG. 7 is a diagram schematically showing an apparatus for the thought experiment for position measurement using a microscope, from which Heisenberg derived the uncertainty relation.

Even in quantum mechanics, a diffraction pattern $|\psi_S(P)|^2$ of the Schrödinger wave function $\psi_S$ as a probability wave has been calculated based on the Fresnel-Kirchhoff diffraction formula. For example, in the paper by Zeilinger et al. (A. Zeilinger, R. Gähler, C. G Shull, W. Treimer, and W. Mampe, Rev. Mod. Phys., 60, 1067 (1988)), FIG. 2 shows both results of an experiment and calculation of a diffraction pattern of a neutron beam (central wavelength: $\lambda$=1.926 nm) due to a slit (width 2 W=96.07 μm), and FIG. 7 shows results of an experiment and a calculation for a double slit. The calculated diffraction pattern was obtained based on Eq. (1) in the above paper, which is equivalent to the Fresnel-Kirchhoff diffraction formula of Eq. (203). Actually, since the incident wave on the slit or the double slit is no longer a simple plane wave because of the effects of coherent superposition due to a neutron source in a form of a slit having a width and incoherent superposition due to the neutron beam having a wavelength width, contrast of each individual diffraction pattern or interference pattern calculated is decreased. As a result, those positions where the diffraction pattern of the slit shows its own characteristic by taking minimum values have become obscure as shown in FIG. 2 of the above paper by Zeilinger et al., for example. In order to identify those positions, calculation of a diffraction pattern of a plane wave of a single wavelength ($\lambda$=1.926 nm) will be attempted by using the above Excel calculation sheet for the optical design.

First, whether or not the diffraction pattern observed at an observation plane separated from a slit by Z=5 m is a Fraunhofer diffraction pattern in the case when a plane wave having the de Broglie wavelength $\lambda$=1.926 nm impinges on the slit of the width 2 W=96.07 μm must be examined. According to the condition shown in Eq. (207), provided that $Z \gg W^2/\lambda$ is satisfied, the Fraunhofer diffraction pattern should be observed. Actually, although $Z \gg W^2/\lambda$ holds because Z=5,000 mm and $W^2/\lambda$=1,198 mm, $Z \gg W^2/\lambda$ is not always obtained. Thus, application of Eq. (211) representing the Fraunhofer diffraction pattern to this problem will be attempted as a trial.

Figure 24:
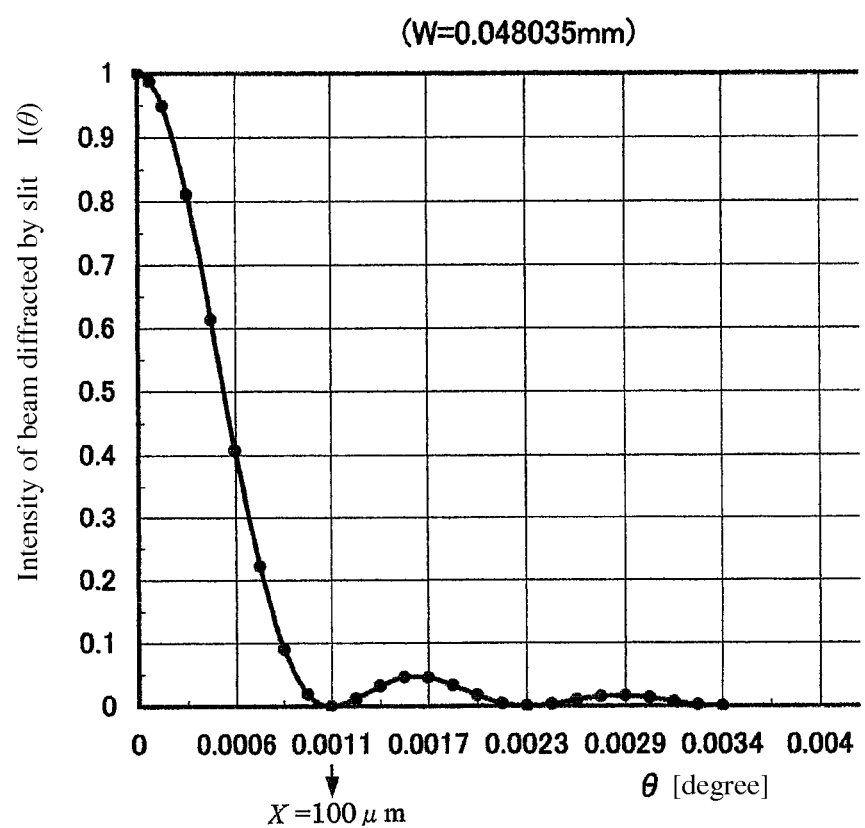
FIG. 24 is a diagram showing a Fraunhofer diffraction pattern obtained when a plane wave with a wavelength 1.926 nm is incident on a 96.07 μm-wide slit.

FIG. 24 shows the results of calculating the diffraction pattern using a work sheet of exercise 1, the first of three exercises contained in a file concerning chapter 8 of the Excel calculation sheet. The intensity distribution shown in this drawing has a characteristic that is very similar to the diffraction pattern shown in FIG. 2 included in the paper by Zeilinger et al. (A. Zeilinger et al., the aforementioned paper). In this FIG. 2, for example, a minimum value positioned just to the right of the central peak is separated from the center of this diffraction pattern by around 104 μm. On the other hand, an angle indicating the first minimum of the intensity distribution shown in FIG. 24 is $\theta$=0.001149 degrees. When deriving the position indicating the minimum value from $X=Z \tan\theta$, X=100 μm is obtained showing a good agreement. Therefore, although the Fraunhofer diffraction should have been experimentally applied to the diffraction of this neutron beam at first, this result verifies that the diffraction had been Fraunhofer diffraction. Incidentally, when deriving a position indicating a minimum value by applying the arrangement shown in FIG. 8 to the above problem and then using Eq. (77) concerning a statistical nonsimultaneous uncertainty relation, x'=100 μm is obtained resulting in recognizing that the same value as the result calculated by assuming the diffraction as the Fraunhofer diffraction can be extremely simply and accurately calculated.

As shown above, it appears that, at least in this experiment, not $Z \gg W^2/\lambda$ but $Z > W^2/\lambda$ is sufficient for the conditional formula to ascertain whether or not the diffraction is Fraunhofer diffraction. Actually, however, for the sake of discerning whether or not relevant diffraction is Fraunhofer diffraction by applying only one inequality, setting $Z \gg W^2/\lambda$, as shown by Eq. (207), is right even if each of W and $\lambda$ takes any one of every possible value.

Zeilinger et al. saw the agreement between the theory and experiments in diffraction of a neutron beam by a slit and interference of a neutron beam passing through a double slit and concluded that these results supported the correctness of quantum mechanics. However, a diffraction pattern and an interference pattern of a probability wave $\psi_S$ appearing to agree with experiments is due to the Copenhagen interpretation. Under this Copenhagen interpretation, the intrinsic paradox concerning interference of each single particle passing through the double slit has remained unsolved. Moreover, even the idea of super-high-speed quantum computers had been as an extension of such wrong "common sense" that quantum mechanics is correct. Such misunderstanding would never occur in designing based on dual mechanics in which a real phase wave (de Broglie wave) Ψ and a statistical phase wave (de Broglie wave) ψ are applied with discrimination between them.

Also with this invention, software including not only the commercial software but also conventional software for optical design and analysis dealing with diffraction of waves can be used in the design and analysis of devices and apparatus of massive dual particles. In that case, however, the following differences from conventional technologies arise:

(1) Conventionally, when we design and analyze devices and apparatus of light, it is necessary to choose the characteristics of light such as particles (rays), light waves as a type of electromagnetic waves, or photons according to object. In the case of massive particles, their characteristics of complementary duality have been used according to need such as being probability waves while traveling or being particles when detected. In contrast, in dual mechanical design, a trajectory is calculated for each individual traveling particle like in geometrical optics, and further, although it must be ascertained beforehand whether or not calculation of diffraction is necessary, the potential necessity of calculating diffraction concerning the real phase wave function Ψ or the newly defined statistical wave function ψ always exist. In that sense, there is basically no such complexity as separating the characteristics of particles.

(2) Until now, there has been no definition of a statistical wave function itself. For example, the intensity of light regarded as a wave has represented energy of an electromagnetic wave received per unit area and unit time. In contrast, a diffraction pattern calculated by applying a diffraction formula to the statistical wave function in dual mechanics represents a distribution of the number of particles detected per unit area and unit time, i.e., a distribution of density of particle parts. This is because a phase wave in dual mechanics can never carry energy.

(3) In design applying dual mechanics to massive particles, particle mechanical designing basically takes precedence and, wave mechanical designing such as a calculation of diffraction is then used for the sake of heightening the accuracy of design. When external field acting on particles exists, calculations of trajectories of particles are preferable to precede. This is because the external field does not directly affect de Broglie waves.

The above individual aspects can be guidelines indispensable in dual mechanics for designing devices and apparatus of microscopic massive particles by applying wave mechanics.

The second significance of referring to massless particles exists in the fact that, as a result of the system of dual mechanics accepting photons as massless particles, a potential basic contradiction in de Broglie's idea concerning matter waves has been clarified. This contradiction exists in the point that de Broglie assumed photons as massive particles, although an extremely small mass. There is a paper showing that de Broglie had considered individual massive photons at least up to 1972 (L. de Broglie and J. P. Vigier, Phys. Rev. Lett. 28, 1001 (1972): As a rebuttal to this paper, also refer to G J. Troup et al., Phys. Rev. Lett. 28, 1540 (1972)). The cause of giving rise to this discrepancy is presumed that de Broglie used not the Hamiltonian expressed by Eq. (182) but Eq. (2) as energy of a particle equivalent to E=hν (Including the description of an infinitesimal mass of a photon ($<10^{-50}$ g), refer to, for example, L. de Broglie, Nature 112, 540 (1923)). When v=0, Eq. (2) becomes invalid for a massless particle. However, if each photon has a very little mass, the concept of matter waves can be generalized even for photons. This suggests that de Broglie had continued to dwell on his own idea of contradicting special relativity for about 50 years. As shown above, a limitation common to many physicists, including de Broglie, individually involved in construction and development of quantum mechanics exists in the very point that they had not strictly conform to special relativity.

Finally, as the third significance, it is pointed out that there are no antiparticles to massless particles, as shown by Eq. (195). From Eq. (2) representing one of the definitions of relativistic energy, it is understood that, in the case where a particle has a finite mass, the sign of mass and that of energy must agree with each other. However, it is also seen from Eq. (2) that the energy becomes zero if the mass of the particle is zero. That is, this equation (2) cannot be applied to massless particles. In Eq. (182) representing the second definition of relativistic energy, the energy of the particle is not zero even if the mass is zero. Both of the positive and negative signs are included in the definition of energy for us humans to distinguish between a particle with negative mass and a particle with positive mass, and this distinction is therefore unnecessary for massless particles. $E=h\nu=\hbar\omega>0$ is true for massless particles, as with Eq. (194), for example. Under the above agreements, it follows that a particle having an antiparticle has a mass. Therefore, according to dual mechanics, it is concluded that neutrinos in which antiparticles are included each has a mass, resulting in agreement with recent experimental results.

As is clear from the arguments given thus far, the system of dual mechanics can be constructed such that all mechanics may be systematically and integrally surveyed by making the mass that is an internal degree of freedom for a particle as the only parameter. Consequently, from elementary particles including photons to magnificent celestial objects, every particle can generally be argued as an individual dual particle. On the other hand, the other internal degrees of freedom or attributions of those individual particles such as spins as well as polarization and electric charges cannot be argued at all. Therefore, operations to take those internal degrees of freedom together with indications of whether there are interactions with external fields in dual mechanics from outside are necessary. In order to proceed with those operations, it is naturally necessary to quantitatively know physical quantities of those individual internal degrees of freedom by relating those quantities to external fields.

Following the above arguments, brief consideration will be given to the Klein-Gordon equation in the case where potentials of external fields exist. Electric fields and magnetic fields can be assumed as the external fields. When individual particles have only electric charges, techniques to incorporate potentials concerning interactions of charges with the electric and magnetic fields in the Klein-Gordon equation are already known. Only covariance under the Lorentz transformation needs to be taken into consideration (Refer to, for example, W. Greiner, the aforementioned book, p. 34). However, whether or not solutions can be obtained is another problem. It seems that Schrödinger contrived the nonrelativistic Schrödinger equation and Dirac contrived the Dirac equation in order to obtain solutions.

The above argument can also be similarly applied to the case when incorporating interactions between each individual particle and external fields in the semirelativistic Schrödinger equation under the semirelativistic Lorentz transformation. As a matter of form, potentials concerning the interactions with the fields of external forces are incorporated in the semirelativistic Schrödinger equation so that this equation becomes covariant with respect to the semirelativistic Lorentz transformation. To verify this covariance, the operation to the limit $\beta^2 \to 0$ may be performed after applying the low-velocity Lorentz transformation similarly to when showing invariance of the semirelativistic Schrödinger equation. Actually, since relativity of time included in the semirelativistic Lorentz transformation may be ignored without trouble, it is considered that the technique for incorporating the potential of an external force into the nonrelativistic Schrödinger equation in the case when a particle has an electric charge should be applied as is (Refer to Eq. (50), for example).

7.1.4. Fourth Subject: Relativistic Space-Time Structure of a Free Particle and Space-Time Structure of the Universe The last remaining fourth subject completing the system of dual mechanics, that is, the 'relation between the relativistic space-time structure of each individual free particle and the space-time structure of the universe', will be examined. The dual structure of each individual particle in dual mechanics has often been mentioned. That is, in general, the particle consists of a particle part as a carrier of energy and a phase space having a frequency of oscillation intrinsic to the particle. The energy of an elementary particle including each individual photon without mass concentrates into a single point and the surrounding space of the particle is filled with the oscillating phase or a phase wave. Accordingly, the phase space of each individual free particle traveling in cosmic space must completely overlap with the cosmic space. The equation of gravitation in the general theory of relativity can be regarded as an equation of motion of the universe itself. Here, if the cosmological constant introduced artificially by Einstein is eliminated, a stationary solution is excluded from the equation, leaving only two nonstationary solutions of an expansion and a contraction. Bases for eliminating the cosmological constant exist also in the fact that Einstein himself who later knew the expansion of the universe admitted the introduction of the constant to be a failure. However, the more general bases for this elimination exist in a consideration that, since special relativity and general relativity are ultimate theories under conditions within which the theories are individually valid, any artificial modification without a physical basis should not be added to prerequisites for maintaining those theories and to results derived from the theories. Such line of thought is based on the experience that too much unnatural quantum mechanics has been constructed as a result of disregarding special relativity.

Now, it is a common theory that the universe was expanded from a point due to the Big Bang approximately 14 billion years ago and arrived at present through a stage when protons and neutrons had existed in a fixed ratio. The speed of expansion is much slower than that in the beginning. According to this dual mechanics, it is considered that the universe was divided into some sort of elementary particles and their phase spaces at the instant when the expansion of the universe from a point began. Accordingly, the cosmic space from which materials are removed is not a vacuum from the beginning but is filled with phase spaces or phase waves of all particles in the space. This is the basis for needing the phase space of each individual free particle traveling in the cosmic space to completely overlap with the cosmic space. In this way, space-time development of the actual universe and long-range space-time development of each individual free particle are completely synchronized via the phase space. In plain words, while the size of the universe changes temporally, the size of a free particle including its phase space also changes temporally and this size always agrees with the size of the cosmic space.

Incidentally, there are basic differences in individual conditions for validating special relativity and general relativity. Inertial systems in which special relativity is valid are mathematically Euclidean spaces whose radii of curvatures are all zero. Those spaces with zero radii of curvatures are called flat spaces. However, spaces that are dealt with by the equation of gravitation are basically non-Euclidean spaces whose individual radii of curvatures can be positive, negative, or zero. However, in the case of dealing with the cosmic space, the space with a zero radius of curvature can be excluded by eliminating the cosmological constant that is necessary to obtain a stationary solution. Thus, except for the case where the actual universe is a flat space with zero radius of curvature, there are geometrical differences in spaces to deal with. Though there are three types of radii of curvatures such as positive, negative, or zero also for two-dimensional spaces, differences in the radii of curvatures can be distinguished only by observing the two-dimensional spaces from a three-dimensional space that has one more dimension than the two-dimensional spaces. Hence, theoretically, inhabitants in the two-dimensional spaces cannot distinguish individual radii of curvatures of the spaces where they themselves live. However, there is just one method to distinguish whether or not the radius of curvature is positive. Whether or not a light beam emitted forward will return from behind must be ascertained. If the light beam should return, the radius of curvature must be positive, namely the two-dimensional space is closed. But if the beam does not return, the radius of curvature is either negative or zero.

Distinguishing three types of curvatures of three-dimensional spaces is also only possible theoretically by observing these spaces from a four dimensional space. Therefore, even if the distribution of galaxies within the universe is observed, the curvature of the universe cannot be determined, although whether or not the distribution is uniform and isotropic can be judged.

Therefore, though NASA announced two years ago (2003) that our universe is flat, this announcement is not necessarily correct. There are several reasons for us to consider that this announcement should rather be wrong. One of the reasons is the existence of cosmic microwave background radiation that is considered a remnant of the Big Bang. In addition, this radiation comes from all over the celestial sphere, though some nonuniformity in the distribution exists. Provided that the universe is isotropic, our local cosmic space including the Galaxy should be a space resulting from the big bang that happened long ago. Moreover, the radiation of photons should have occurred omnidirectionally in the early universe just after the Big Bang. If the cosmic microwave background radiation now coming from all over the celestial sphere is assumed as returning light of the early radiation of photons, the universe is considered being closed. Another reason why the universe is considered being closed is in the fact that, as already mentioned, the speed of the expansion has become remarkably slower than that at the beginning of the Big Bang. Accordingly, it is natural to consider that, down the line, the expansion will stop and turn to the contraction that is the only remaining solution of the equation of gravitation from which the cosmological constant is eliminated. The third reason is in the fact that, if the present universe started from a point, the universe must be considered as being closed at first. Though the reason will be given shortly after, a flat space of vacuum existing outside the closed space should not be considered. Furthermore, the closed cosmic space must be considered a closed space how ever much it will expand. This is because, as it is seen by considering the case of a two-dimensional closed surface, this two-dimensional closed surface will never be replaced by a flat plane while being expanded, though it may be possible for a part cut away from the two-dimensional closed surface in an advanced stage of expansion to seem flat. Similarly, it is impossible for the closed cosmic space in the early stage of the Big Bang to be replaced by a flat space while being expanded. In addition, provided that the universe was divided into some sort of elementary particles and their phase spaces at the instant when the expansion of the universe from a point began, there is no space called a vacuum in the cosmic space. That is, there is no reason for the existence of a flat space of vacuum in physics. As it is easily seen, if the universe including substances should be contained in a flat vacuous universe, the very point from which the expansion of the universe including the substances began becomes the origin of the universal space-time, and thus the existence of the origin contradicts the theory of relativity itself. In this way, it is clear that there is no physical consistency between the Big Bang and the flat universe. Judging comprehensively from dual mechanics including special relativity, the equation of gravitation from which the cosmological constant is eliminated, and the observational result of the cosmic microwave background radiation, it may be stated that the universe being closed and infinitely repeating periodic motion consisting of expansion from a point and contraction to a point are properties for a self-completed model of the universe having the highest possibility at the present time. Conventional cosmology that has never been able to argue physics of space-time, namely phase space, which is one of the two basic elements constituting the universe, has clearly been one-sided.

Previously, it was mentioned that there are geometrical differences between spaces dealt with in special relativity and those in general relativity. Let this problem be settled physically. Since the spaces dealt with in general relativity are non-Euclidean spaces, the Euclidean spaces dealt with in special relativity are mathematically approximate. However, the actual cosmic space is in the stage in which the expansion of the universe has progressed so much that the curvature of the universe is mistaken as being flat. Accordingly, it is quite permissible to apply special relativity to physical phenomena occurring around us, to which quantum mechanics has been applied entirely until now. Since there is only one space-time in which we live, there is no substantial difference between the space-time that is an object of special relativity and the space-time as an object of general relativity, even though there exist theoretical differences between them.

From the viewpoint of dual mechanics, it is necessary to draw attention to another established theory in astrophysics. It is considered in present astrophysics that, different from the present universe, particles and antiparticles existed equally in the early universe nearest to the Big Bang. An influential basis of this line of thought exists in the fact that the solution of the Dirac equation has components representing particles and antiparticles equally. However, as already shown, since the Dirac equation itself has an aspect of contradicting the equivalence principle of energy and special relativity, this equation was excluded from the system of dual mechanics. In addition, it is shown that, when particles are classified into two types of particles each having either positive mass or negative mass, the Klein-Gordon equation as the only remaining relativistic wave equation can deal with both types of particles quite independently from each other. Consequently, it may be said that it is not always necessary to presume the discrepancy between the ratio of the number of every particle to the number of every corresponding antiparticle in the early universe and said ratio in the present universe. In this way, it is seen that considering the system of dual mechanics together with general relativity may contribute to constructing more precise astrophysics.

This concludes the examination of the four fundamental subjects that are necessary for completing a new system of dual mechanics substituting the conventional system of mechanics shown in FIG. 1. Basic laws obtained through the above examination are summarized in the following:

(1) Symmetry (relativity) concerning the description of a particle in motion exists in all mechanics and the mechanics that does not have this symmetry such as, for example, nonrelativistic quantum mechanics cannot be correct physics.

(2) Since the Schrödinger equation with a mass term becomes covariant under the semirelativistic Lorentz transformation, semirelativistic wave mechanics making this semirelativistic Schrödinger equation as its fundamental equation is established.

(3) The equation of motion in semirelativistic particle mechanics is the Newtonian equation of motion that is covariant with respect to the semirelativistic Lorentz transformation and works well as an approximation of the relativistic equation of motion up to $\beta \lesssim 0.1$, that is, the velocity v of a particle accounting for 10% of the velocity of light ((2) and (3) together provide proof of existence of semirelativistic dual mechanics).

(4) The only relativistic wave equation is the Klein-Gordon equation that is derived based on both the two expressions concerning energy of a particle, that is, a wave-like expression $E=h\nu$ ($m_0 \gtreqless 0 \hbar h, \Rightarrow \gtreqless 0$) and a particle-like expression $$H = \underline{c}\sqrt{p_x^2 + p_y^2 + p_z^2 + m_0^2 c^2},$$

and the equivalence principle concerning those two types of expressions of energy (E=H) by going through a first step of making an equation $\hat{E}^2 \Psi = \hat{H}^2 \Psi$ and a second step of making wave mechanics (substituting E and p by the operators).

(5) Since the free Klein-Gordon equation with $m_0=0$ can be regarded as a wave equation concerning the phase wave $\Psi$ associated with each individual photon, each photon can be an object that is dealt with by applying dual mechanics, although approximately.

(6) The phase space that every free particle has coincides with the cosmic space. Accordingly, the temporal development of each individual free particle including its own phase space also coincides with the temporal development of the cosmic space. However, a flat space dealt with in special relativity should be regarded as a portion of an approximately flat space cut away from an enormous closed space dealt with in general relativity.

Summarizing the above, it can be said that natural laws must satisfy both conservation of energy in a broad sense including the equivalence principle of energy (E=H) and relativity. The Lorentz transformation that is a basis for wave mechanics is a superior law to special relativity concerning only particle parts of dual particles. Hence, except for general relativity, basic laws necessary and sufficient in dual mechanics are the principle of equivalence that holds between wave-like energy $E=h\nu$ and the relativistic Hamiltonian H as particle-like energy, the conservation of relativistic energy, the Lorentz transformation, and special relativity. The procedure for making wave mechanics (substituting E and p by the operators), the procedure for making statistical wave mechanics (constituting the statistical wave function $\psi$ from a wave function $\Psi$ associated with each individual particle), and the procedure for reducing to particle mechanics or the procedure for unification ($\Psi \rightarrow 0$, $\psi \rightarrow 0$) should be added to the above laws as physics. Note that $E=h\nu$ is a generalization of the hypothesis of light quantum that was proposed by Einstein in 1905 and is applicable to explaining the photoelectric effect.

7.2. Embodiments of the Invention

The first object of this invention, as already mentioned, exists in providing a new method for design and analysis of devices and apparatus by constructing dual mechanics as a novel system of mechanics that can be a general theory for engineering, that is, in other words, a design theory in the technological field of a broad range related to information processing having a core field of advanced technology involving each individual microscopic particle with mass. Further, the second object of this invention is to provide apparatus evaluating whether or not devices and apparatus, especially, quantum computers, all involving microscopic particles are realizable by applying the above new method for design and analysis.

The embodiments of this invention for the above objects will be explained in detail in the following.

7.2.1. First Embodiment: Application of Dual Mechanics to Designing

Figure 25:
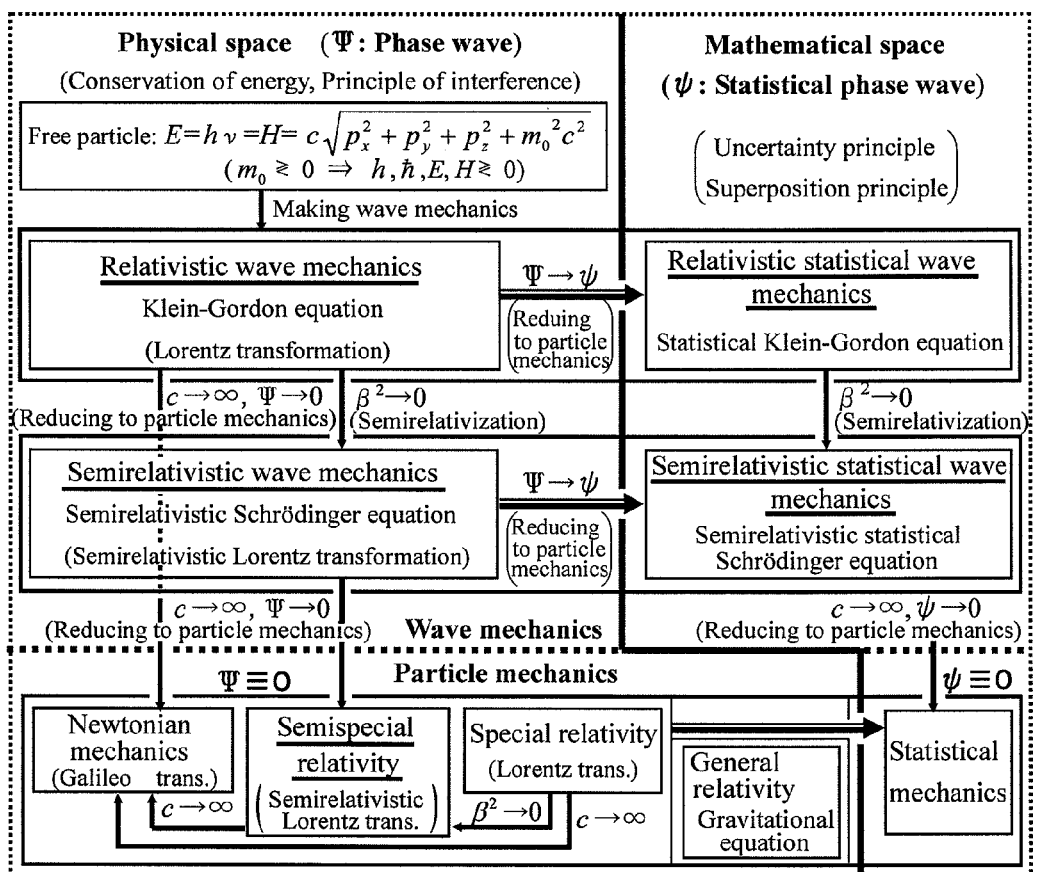
FIG. 25 is a diagram showing a fundamental system of mechanics including dual mechanics that is obtained by integrating particle mechanics and new wave mechanics.
Figure 26:
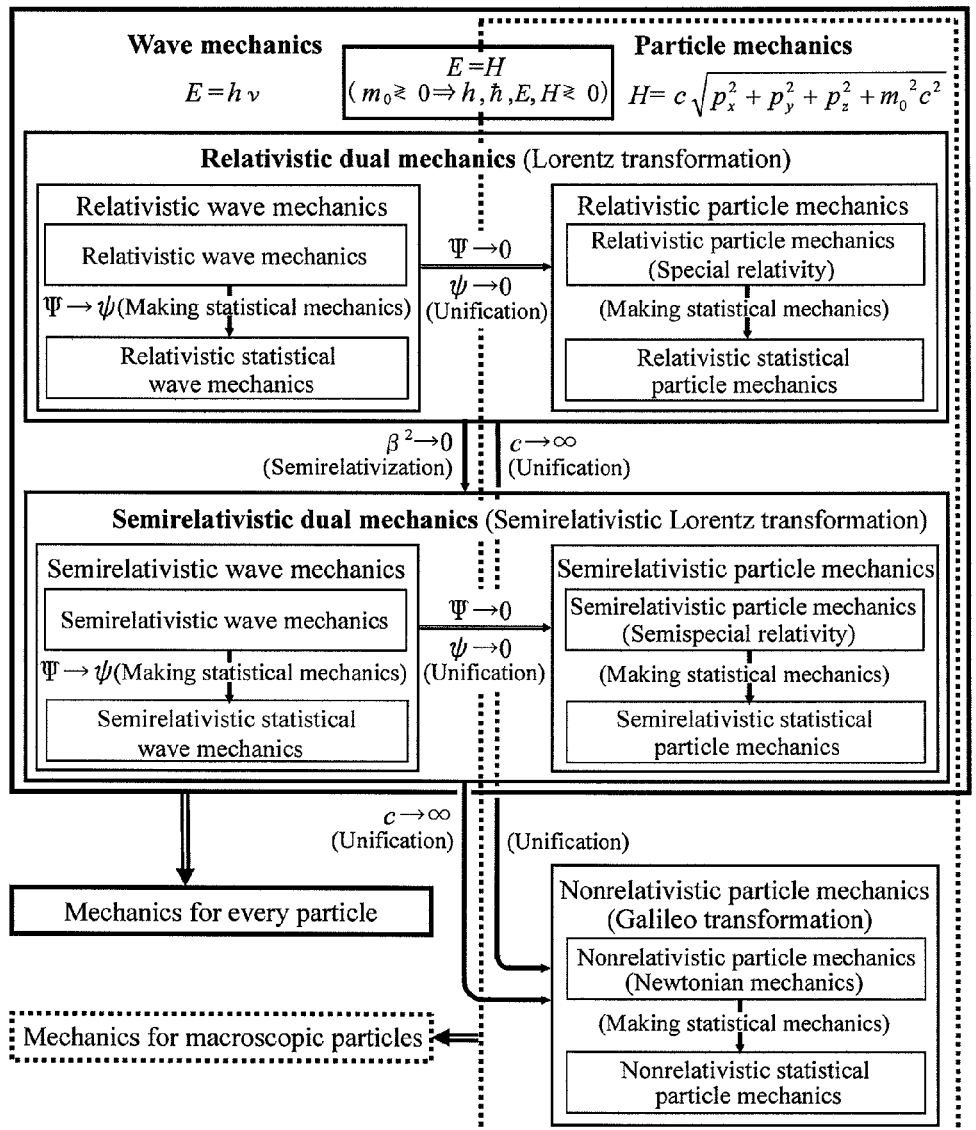
FIG. 26 is a diagram showing another fundamental system that represents the characteristics of the theoretical structure of dual mechanics itself in the best way.

For comparison with FIG. 1 showing a conventional system of mechanics, a newly constructed system of dual mechanics has been schematically arranged in FIGS. 25 and 26. As shown within a rectangular frame written by the thickest solid line in FIG. 26, dual mechanics consists of eight elementary mechanics. Which elementary mechanics should be applied when designing devices and apparatus by using dual mechanics will be explained in detail.

<First Embodiment>

FIG. 25 is a diagram concerning the first embodiment of this invention and expresses a theoretical structure of a fundamental system of mechanics including dual mechanics in a unific manner like a bird's-eye view. In contrast, FIG. 26 is a diagram showing another fundamental system of mechanics representing the characteristics with respect to the theoretical structure of dual mechanics itself in the best way.

In the system of dual mechanics as physics, two fundamental concepts are prescribed. One concerns the two most fundamental elements of realities consisting of substance (energy) and space-time (4-dimensional Minkowski space). The other concerns the fundamental model of a free particle. A single free particle (dual particle) consists of the above two elements of realities, that is, a localized matter particle (energy) and its phase space covering the entire space-time. The natural laws for each individual particle are primarily described using these elements of realities. Accordingly, there is no difference between the primary natural laws to which a microscopic particle conforms and those to which a macroscopic particle conforms. In other words, it can be said that there is no hierarchical structure classified by size of each individual particle in the natural world.

When regarding the system of dual mechanics as a system of the theory of technology or system of the theory of design, it becomes especially important to judge which of the eight individual elementary mechanics in the system of dual mechanics (Refer to FIG. 26) should be applied to a given technological subject. Firstly, one of the main items providing turning points for the above judgment is the magnitude of the ratio of a velocity of each individual particle to the velocity of light ($\beta = v/c$). Whether relativistic dual mechanics or semirelativistic dual mechanics should be applied can be determined according to this magnitude. In a formulistic argument, relativistic dual mechanics is approximately changed over to semirelativistic dual mechanics under a condition represented as $\beta^2 \to 0 (\beta \ll 1)$. Referring to a guide used in the field of accelerators, this transformation is permissible under a condition $\beta \lesssim 0.1$, that is, when the velocity of a particle v is lower than 10% of the velocity of light. Secondly, it is about whether to deal with either individual particle movement or an ensemble of individual particles in motion. In four elementary mechanics each dealing with each individual particle in motion, the motion of each particle is described using coordinates with respect to physical space, namely real space-time. However, when predicting or describing only results of an experiment in which an extremely large number of particles without any interaction among them is involved, describing the motion of each of these individual particles using the real space-time coordinates is extremely difficult although not impossible. In such cases, statistical mechanical techniques are useful. There are four elementary statistical mechanics each corresponding respectively to the four elementary mechanics dealing with each individual particle. Two of the four statistical mechanics are relativistic statistical wave mechanics and semirelativistic statistical wave mechanics approximately valid under the condition $\beta^2 \to 0(\beta \ll 1)$. These two statistical wave mechanics occupy one of the cores of dual mechanics when regarding this mechanics as the theory of design. With regard to wave functions, the wave function $\Psi$ in wave mechanics valid in the physical space represents a real phase wave or real de Broglie wave, and the wave function $\psi$ in statistical wave mechanics valid in the mathematical space is defined as an abstract statistical wave. Therefore, the statistical wave function is an artificial wave function that is invented for making a design that satisfies natural laws concerning microscopic particles rather than for describing the physical laws. Generally, the particle mechanical design is fundamental in the dual mechanical design consisting of wave mechanical design and particle mechanical design. In this sense, another core of the dual mechanical design is covered by the calculation of a trajectory of each individual particle. Next, wave mechanics is applied for the sake of improving design accuracy. Therefore, thirdly, it becomes important to ascertain whether or not wave mechanics should be applied. This ascertainment is carried out by evaluating diffraction of the wave function $\Psi$ of a wavelength $\lambda$ associated with each individual particle or of the statistical wave function $\psi$ of the wavelength $\lambda$ by an aperture of width w that is the narrowest part of an apparatus concerning those particles and restricts the path for them. FIGS. 25 and 26 are guidance diagrams of systems of mechanics that are essential for selecting elementary mechanics to use in design paying attention to the above three items. Detailed explanations about individual constitutional parts of the systems of mechanics shown in FIGS. 25 and 26 will be given in the following.

In the old system of mechanics shown in FIG. 1, the system has a three-layered structure consisting of relativistic quantum mechanics, nonrelativistic quantum mechanics, and classical mechanics, where then quantum mechanics and classical mechanics have been distinctly separated from each other by a thick solid line. This solid line can also be said to separate a mathematical space in which vectors, namely solutions of a wave equation, in a Hilbert space exist and a physical space in which trajectories of individual particles as solutions of an equation of motion exist. FIG. 25 also shows a three-layered structure consisting of a system of two types of wave mechanics, that is, relativistic wave mechanics and semirelativistic wave mechanics, and a system of particle mechanics. However, wave equations describing behaviors of phase parts of individual dual particles and equations of motion describing the motions of particle parts of individual dual particles are valid in the same physical space. Incidentally, the Newtonian mechanics is not in principle included in the system of particle mechanics in dual mechanics that is valid irrespective of the size of each individual particle. According to wave equations in dual mechanics, since $\Psi=0$ is automatically obtained in the limit c→∞, the unification must be allowed unconditionally. For such particles there are only macroscopic particles dealt with by the Newtonian mechanics that is valid also in the limit c→∞. Although the broken line is drawn between the system of wave mechanics and the system of particle mechanics, these two systems may be changed over to the system of particle mechanics provided that transition conditions of $\Psi \to 0 (\psi \to 0)$ are satisfied, and are not isolated from each other as in the case of the old system of mechanics shown in FIG. 1. However, mechanics that is valid in the physical space and statistical mechanics that is formulated in the mathematical space have been clearly classified into two systems by the vertical, thick, solid lines drawn between the two systems. There is almost no similarity between the system of mechanics shown in FIG. 25 and that shown in FIG. 1 except for the fact that each of the systems has a three-layered structure. Nonrelativistic quantum mechanics based on the Schrödinger equation and relativistic quantum mechanics based on the Dirac equation etc. are excluded from FIG. 25. This is because both mechanics have the same fundamental quantity of the probabilistic wave function that can be defined only in the mathematical space. The principle of superposition of states and the uncertainty principle that have been regarded as applicable to each individual particle in quantum mechanics are renewed and then made as laws that are valid only in statistical wave mechanics in dual mechanics. Notwithstanding, these laws can be basic laws that are useful for designing. Viewing from the opposite side, those mechanics in individual mechanics shown in FIG. 1, which are exactly the same as those mechanics in individual mechanics shown in FIG. 25, are only Newtonian mechanics, statistical mechanics based on the Newtonian mechanics, and general relativity, all of which do not belong to dual mechanics. The difference between special relativity shown in FIG. 1 and special relativity shown in FIG. 25 exists in the point that the special relativity shown in FIG. 25 is mechanics applicable only to the particle part of a dual particle.

Detailed explanations will be given in the following about characteristics in a structure of the new system of mechanics shown in FIG. 25. Those mechanics positioned on the left side of the vertical thick solid line are, except for the Newtonian mechanics and general relativity, a system of dual mechanics dealing with each individual particle. This system has a dual structure consisting of a system of wave mechanics comprising relativistic wave mechanics and semirelativistic wave mechanics and a system of particle mechanics comprising relativistic particle mechanics and semirelativistic particle mechanics. Mechanical systems dealt with by this system are subject to the physical space and inertial systems are applied to describe the states of these mechanical systems. Photons each without rest mass are also covered by relativistic dual mechanics. Geometrical optics based on Snell's law corresponds to particle mechanics to which each particle part of photons conforms and each phase wave of photons conforms to the Klein-Gordon equation in which $m_0=0$. Consequently, the wave function $\Psi$, which is associated with each individual particle, represents an oscillation of a phase space, namely a phase oscillation of each particle when the particle is at rest and represents a phase wave or a de Broglie wave propagating in the physical space when each particle is in motion. Relativistic wave mechanics and relativistic particle mechanics constitute relativistic dual mechanics, and this dual mechanics changes over to semirelativistic dual mechanics consisting of semirelativistic wave mechanics and semirelativistic particle mechanics under the condition $\beta^2 \to 0$. In relativistic dual mechanics, the relativistic equation of motion and the Klein-Gordon equation, which are both covariant under the Lorentz transformation, are simultaneously applied when describing the motion of each individual particle. Also when interactions between each particle and external forces are introduced to these equations, they are made covariant with respect to the Lorentz transformation. When the motion of each individual particle is described in semirelativistic dual mechanics, the Newtonian equation of motion and the semirelativistic Schrödinger equation, which are both covariant under the semirelativistic Lorentz transformation, are simultaneously applied. Also when interactions between each particle and external forces are introduced to these equations, they are basically made covariant with respect to the semirelativistic Lorentz transformation.

Both relativistic dual mechanics and semirelativistic dual mechanics are respectively unified into nonrelativistic particle mechanics, that is, Newtonian mechanics, which can be applied only to macroscopic particles after the transition to the non-physical limit c→∞ in which $\Psi=0$. In addition, since a macroscopic particle having a larger velocity should have a shorter wavelength of a phase wave, $\Psi=0$ is also valid. In this way, since both wave mechanics in relativistic dual mechanics and semirelativistic dual mechanics dealing with the macroscopic particle have practically no occasion to show the significance of their existence, the macroscopic particle may conform only to particle mechanics regardless of its velocity.

On the other hand, the mechanics dealing with microscopic particles corresponding to Newtonian mechanics has been proven to be semirelativistic particle mechanics whose fundamental equation is also the Newtonian equation of motion. However, in the case of each microscopic particle, the lower the velocity of the particle becomes, the longer the wavelength of the de Broglie wave becomes, and thus wave mechanics cannot be ignored. However, even with a microscopic particle, provided that the diffraction phenomenon of each individual particle can be ignored because the velocity of the particle is so large that the wavelength $\lambda$ of the phase wave becomes sufficiently shorter than the size w of the smallest structure of a design object, the unification is possible on the premise that the transition to the limit $\Psi \to 0$ is possible. Also in this case, wave mechanics becomes unnecessary for a basic design of the object.

Incidentally, only general relativity is isolated because this relativity is also defined in a physical space that is geometrically different from the physical space in which those mechanics shown above are defined. However, this does not mean that general relativity is irrelevant to household appliances. In fact, a car navigation system utilizing a GPS cannot be designed without special relativity and general relativity (Refer to T. Nakamura, "Car navigation systems and the theory of relativity" in Nihon Butsuri Gakkai-shi, 60, 742 (2005) (in Japanese)).

Those mechanics to the right of the vertical thick solid line represent the system of statistical mechanics dealing with an ensemble corresponding to all of the large number of particles involved in an experiment. This system consists of the system of statistical mechanics, which is comprised of, from the top, relativistic statistical wave mechanics and semirelativistic statistical wave mechanics, and of statistical particle mechanics positioned below the dotted line. Further, this statistical particle mechanics consists of, as already mentioned, relativistic statistical particle mechanics, semirelativistic statistical particle mechanics, and nonrelativistic statistical particle mechanics. This nonrelativistic statistical particle mechanics is identical to classical statistical mechanics based on Newtonian mechanics and is not the statistical mechanics in dual mechanics. The system of statistical wave mechanics is utilized for statistically describing or predicting results of an experiment in which an unspecified large number of particles is involved as a result of motion of an abstract single particle that is defined as an ensemble including innumerable particles, which may correspond to an unspecified large number of particles supplied to the experiment. Relativistic wave mechanics changes over to relativistic statistical wave mechanics positioned to the right of the vertical thick solid line through a procedure of $\Psi \rightarrow \psi$, and similarly semirelativistic wave mechanics changes over to semirelativistic statistical wave mechanics positioned to the right of the vertical thick solid line through the procedure of $\Psi \rightarrow \psi$. Note that $\Psi \rightarrow \psi$ also means a procedure of making statistical mechanics.

The procedure for building the statistical wave function ($\psi$) from the phase wave ($\Psi$) associated with each individual particle will be presented briefly: When each wave function associated with each individual particle of a total number N involved in an experiment is denoted as $\Psi_n$, since a simple sum of all these individual wave functions is expressed by $\Sigma\Psi_n$, this sum should be multiplied by the normalization coefficient $1/N^{1/2}$ for normalization. In this way, we can obtain a statistical wave function $\psi=(1/N^{1/2})\Sigma\Psi_n$ representing the state of an ensemble consisting of N particles through this procedure thus far. Next, the operation to the limit as $N \rightarrow \infty$ is performed so as to make it seem as if innumerable particles are contained in the above ensemble, thereby defining the normalized statistical wave function $\psi$, which may correspond to any ensemble including an unspecified large number of particles involved in the experiment.

By applying such method as shown above to the case where each individual particle can take either one of two eigenstates, normalized statistical eigenfunctions $\psi_1$, and $\psi_2$ corresponding to respective eigenstates may be created so as to consequently represent the state of the total system as $\psi=a_1\psi_1+a_2\psi_2 (|a_1|^2+|a_2|^2=1)$. Therefore, provided that the total number of the particles involved in the experiment is N as before, the number of particles each having the eigenstate $\psi_1$ is given by $|a_1|^2 N$ and the number of particles each having the eigenstate $\psi_2$ by $|a_2|^2 N$. It is easily seen that the above equation is a representation of the statistical principle of superposition of states and the paradox accompanied by the quantum mechanical principle of superposition of states will vanish. Since the method of building such a statistical wave function is not restricted to only a single way but is necessary to build properly in accordance with individual problems, how to build will concretely be shown in subsequent individual embodiments. Incidentally, a wave equation that the generated statistical wave function $\psi$ satisfies should have the same form as that of the wave equation that each individual phase wave function $\Psi$ constituting $\psi$ satisfies.

Characteristics of the system of statistical wave mechanics consisting of relativistic statistical wave mechanics and semirelativistic statistical wave mechanics will be explained. The statistical wave equations that are fundamental in respective statistical wave mechanics must have the same forms as those of wave equations that are fundamental in respectively corresponding wave mechanics. These statistical wave mechanics are usually applied when predicting results of an experiment in which a large number of microscopic particles is involved. In each of these experiments, each of an extremely large number of particles prepared under similar initial conditions is fed into the same experimental system and then detected by an observation apparatus provided accordingly. How many particles exist simultaneously in the experimental system is not considered when supplying each individual particle. That is, one supposes that interactions between particles can entirely be ignored. The object of the experiment will be achieved after statistically processing data for errors if necessary from a distribution of all particles that have arrived at the surface of a detection plane. Theoretically, with respect to an ensemble defined as including an infinite number of particles so as to be able to correspond to all the particles supplied to the experiment as a single abstract particle, the state of the abstract particle is represented by the statistical wave function $\psi$. As in the case of the principle of superposition of states, the uncertainty principle becomes a statistical law valid in the system of statistical wave mechanics.

Relativistic statistical wave mechanics changes over to semirelativistic statistical wave mechanics in the limit $\beta^2 \rightarrow 0$, to relativistic statistical particle mechanics in the limit $\psi \rightarrow 0$, and results directly in classical statistical mechanics in the limit $c \rightarrow \infty$. But $\psi \rightarrow 0$ is identical to $\Psi \rightarrow 0$. Semirelativistic statistical wave mechanics changes over to semirelativistic statistical particle mechanics in the limit $\psi \rightarrow 0$, and also results in classical statistical mechanics in the limit $c \rightarrow \infty$. These statistical wave mechanics are entirely new statistical mechanics different from quantum statistical mechanics and classical statistical mechanics.

Usually in quantum statistical mechanics or classical statistical mechanics, the objects dealt with by these statistical mechanics are systems each of which contains an extremely large number of particles simultaneously existing in an actual physical space. Hence, interactions between the particles influence the state of the system.

In contrast, it is assumed in statistical wave mechanics that there is no interaction between an unspecified large number of real particles, which correspond to a single abstract particle represented by a statistical wave function. (Though there is some exception to this assumption, explanation is omitted since there is no influence of the exception to the present fundamental method for design.) Hence, even in statistical particle mechanics over which statistical wave mechanics has changed through the transition to the limit, the treatment is simple and different from usual.

As shown above, FIG. 25 representing a basic system of mechanics at the core of which there exists dual mechanics covers all types of individual elementary mechanics necessary for describing motion of individual particles ranging from elementary particles including photons to magnificent celestial objects, and especially individual phenomena in each of which an ensemble of microscopic particles without any interaction among them is involved. In addition, these mechanics are systematically arranged while showing mutual relationships among the mechanics. According to dual mechanics, even every microscopic particle has a trajectory, and the trajectory can be calculated. Moreover, different from classical mechanics, the particle drawing its own trajectory is always accompanied by a phase wave. A characteristic of this drawing exists in the point that such a phase wave associated with the microscopic particle is stipulated as being a wave in the physical space. Therefore, it is also shown that electronic devices and apparatus should be designed on the premise that, for example, electrons traveling in electronic circuits are accompanied by de Broglie waves. Note that the Dirac equation is omitted from FIG. 25. Though this directly indicates that the Dirac equation contradicts the equivalence principle of energy and the conservation of relativistic energy, this also indirectly shows that the concept of spins in quantum mechanics is doubtful. Based partially on this question, the possibility that electrons are not elementary particles but two types of different composite particles corresponding to positive and negative spins has already been shown. From this it is seen that an apparatus for producing silver atoms having only either one of the two types of spins can be designed by improving the apparatus used in the Stern-Gerlach experiment.

FIG. 25 is a diagram of the system of dual mechanics constituted by the three-layered structure for easy comparison to the old system of mechanics of FIG. 1. However, apart from FIG. 1, it is necessary to clearly express the essential characteristics of the theoretic structure of the system of dual mechanics. The basic system of dual mechanics reconfigured from the viewpoint of simultaneous, complete duality possessed by every particle including macroscopic particles is shown within the rectangular frame written by a thick solid line in FIG. 26. It is seen that dual mechanics essentially has a concise two-layered structure constituting of relativistic dual mechanics and its approximate theory of semirelativistic dual mechanics. The characteristics of each of individual mechanics and mutual relationships between them are basically the same as those explained in relation to FIG. 25.

Newtonian mechanics unrelated to the equivalence principle of energy E=H and the conservation of relativistic energy does not belong to the category of dual mechanics. Moreover, semirelativistic particle mechanics that involves particles in low-velocity motion and has a fundamental equation of the Newtonian equation of motion already exists in the system as an approximation of relativistic particle mechanics. The reasons for retaining Newtonian mechanics in FIG. 26 are that Newtonian mechanics existed after the unification of both dual mechanics even though the non-physical transition is applied as $c \to \infty$ and that its historical background as the first mechanics has been respected. In principle, dual mechanics can be applied to every particle whether microscopic or macroscopic. However, it is realistically impossible for a phase oscillation or a phase wave associated with each individual macroscopic particle to be concerned with the motion of it. Hence, it is possible to make only the system of particle mechanics that is enclosed by a dotted line and has a three-layered structure as the system of mechanics for macroscopic particles. In this case, however, it is unnecessary to make the distinction between semirelativistic particle mechanics and Newtonian mechanics.

Since the de Broglie wavelengths become extremely short as velocities of particles approach the velocity of light even if the particles are microscopic, it is usually unnecessary to take their wave properties into consideration. Relativistic wave mechanics becomes unnecessary for designing of equipment concerning such particles, and only relativistic particle mechanics, namely special relativity, should be applied. Similarly, when semirelativistic dual mechanics is applicable, only semirelativistic particle mechanics can be utilized for the design method provided that the diffraction of de Broglie waves is negligible in a design object system. Either case signifies the unification of dual mechanics.

However, means for ascertaining whether or not the above unification is possible is necessary in design. More specifically, a method of evaluating whether or not the diffraction of de Broglie waves or phase waves can be ignored inside of design objects becomes necessary. The diffraction of de Broglie waves easily occurs when a structure that remarkably narrows a path for particles, for example, a slit aperture, exists inside of equipment. In order to precisely evaluate the diffraction, as already mentioned, it is necessary to calculate the diffraction pattern with respect to the statistical wave function ($\psi$) based on the Fresnel-Kirchhoff diffraction formula. Except for the case when an optical system is designed from the beginning by dealing with light as a light wave, which is one type of electromagnetic wave, it is convenient in designing equipment concerning matter particles to simply evaluate whether or not the diffraction should be taken into consideration.

Figure 8:
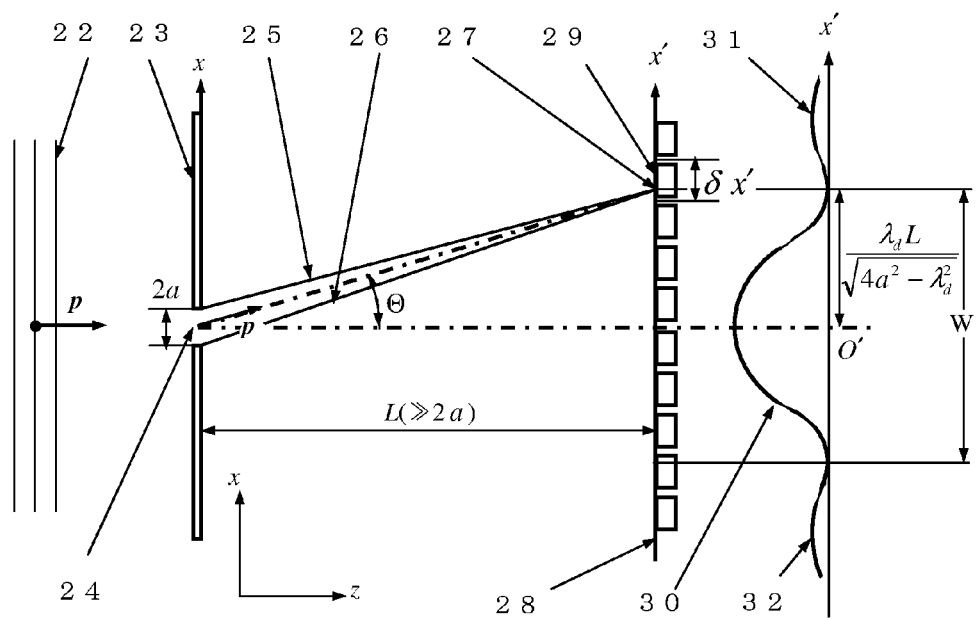
FIG. 8 is a diagram schematically showing the apparatus for the thought experiment for position measurement using a slit, from which the statistical nonsimultaneous uncertainty relation and the simultaneous uncertainty relation are derived.
Figure 11:
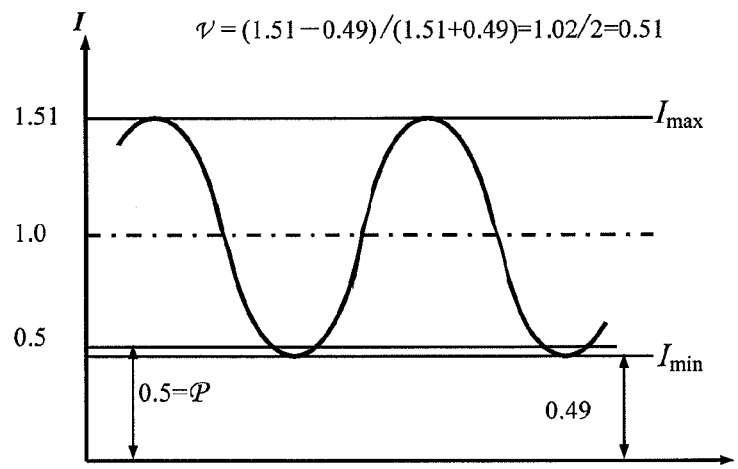
FIG. 11 is a diagram explaining an example of values of a statistical duality obtained when the simultaneous observation of duality for each individual particle is realized.
Figure 27:
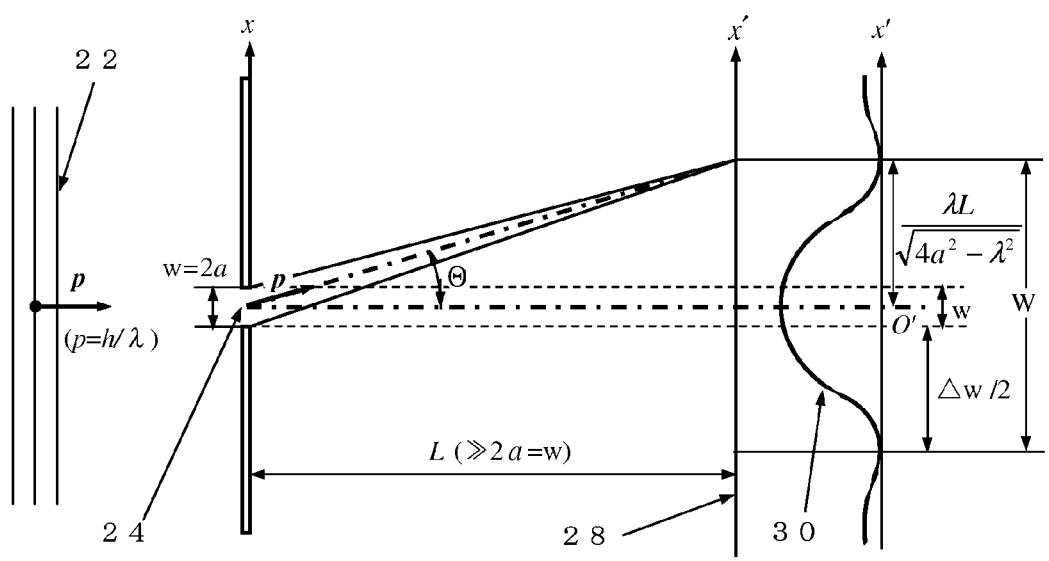
FIG. 27 is a diagram for deriving a formula for evaluating the effect of diffraction based on a statistical nonsimultaneous uncertainty relation.

In designing an apparatus as an example for the first embodiment, a conditional expression for judging whether or not the diffraction should be taken into consideration will be examined using FIG. 27. Meanings of symbols and numbers in FIG. 27 are basically the same as those in FIG. 8. However, the width 2a of the slit aperture 24 in FIG. 8 is denoted by w=2a and the de Broglie wavelength $\lambda_d$ is denoted by $\lambda$ to represent the wavelength of a phase wave in general. Previously, whether or not the Fraunhofer diffraction might occur in the object system was examined with respect to the slit aperture 24, and a conditional expression derived from Eq. (207) was found. When applying the symbols used in FIG. 27, this condition can be represented as L>>w²/4λ. Provided that the distance L between the slit and the observation plane (detection plane 28) satisfies this condition, calculation of the Fraunhofer diffraction is necessary. However, as already shown in the explanation about FIG. 8, the above condition was not necessarily satisfied in the diffraction experiment of a neutron beam by using a slit, which was examined by Zeilinger et al., but the Fraunhofer diffraction pattern was obtained at the observation plane 5 m away from the slit even though L>w²/4λ. Then, since the width W of the central peak 30 of the diffraction pattern and the ratio R of W to the width w of the slit can be expressed with the use of Eq. (77) related to the statistical uncertainty principle as $$R = \frac{W}{w} \text{ and } W = \frac{2\lambda L}{\sqrt{w^2 - \lambda^2}} \quad (w > \lambda), \qquad (212)$$

$$L \gg w$$

it was confirmed that W/2=x'=100 μm was obtained using w=96.07 μm, λ=1.926 nm, and L=5 m. But for Eq. (212) representing W to be valid, L>>w must hold as shown in FIG. 27. In addition, in Eq. (212), since at least R>1 (W>w) must be maintained, it is necessary that 2λL≥w² by considering the case when w>>λ. In the experiment by Zeilinger et al. (A. Zeilinger, R. Gähler, C. G Shull, W. Treimer, and W. Mampe, Rev. Mod. Phys., 60, 1067 (1988)), these two conditional expression L>>w and 2λL≥w² are satisfied. In this way, since the value of W obtained from Eq. (212) agrees with the value of W shown by the Fraunhofer diffraction pattern calculated using Eq. (211), the conditional expressions of $$L \gg w \text{ and } 2\lambda L \geq w^2 (w \gg \lambda) \qquad (213)$$

can be used in the case when judging whether or not Fraunhofer diffraction should be taken into consideration. It may be understood that L>>w usually means approximately L≥1,000 w.

Moreover, without going so far as to calculate by applying the diffraction formula represented by Eq. (211), the values of W and R can be easily obtained using Eq. (212). This value of W may be used as, for example, a minimum width that a neutron detector placed at an observation plane in the experiment carried out by Zeilinger et al. should have, assuming that a parallel neutron beam is incident on the slit and that at least neutrons included in the central peak of the diffraction pattern are detected.

Figure 28A:
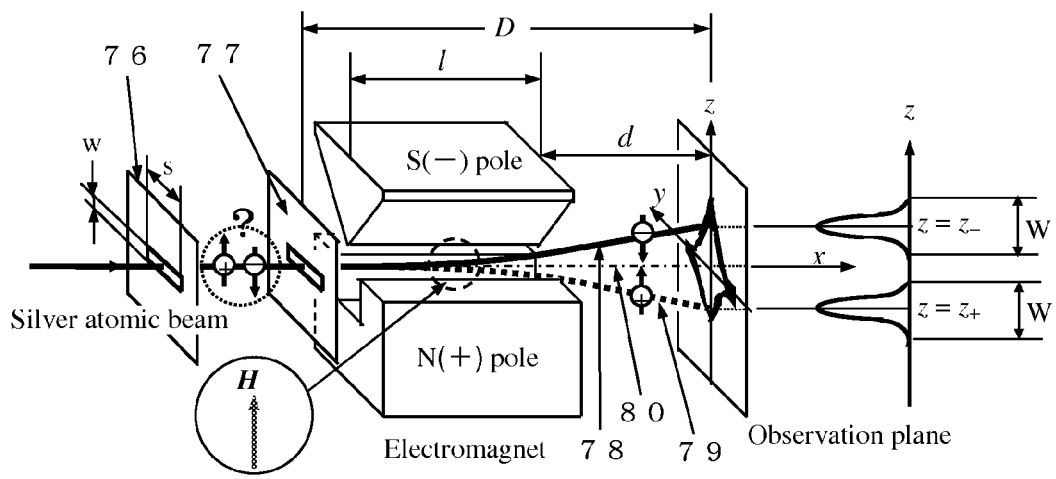
FIGS. 28A to 28C are schematic diagrams of the apparatus in the Stern-Gerlach experiment quoted for explaining in principle the usage of both particle mechanics and wave mechanics in designing devices and apparatus by applying the designing method based on dual mechanics.

Next, the apparatus used in the Stern-Gerlach experiment shown in FIG. 28A will be examined using Eq. (213). The width of the slit aperture is between 0.03 mm and 0.04 mm. In this case, the width is set to w=30 μm. As already shown, since the average velocity of silver atoms in this experiment was estimated as v~5.5×10² m/s, provided that the mass is M=1.8×10⁻²⁵ kg, the momentum is 9.9×10²³ m·kg·s⁻¹. Therefore, the average wavelength of phase waves (de Broglie waves) associated with silver atoms is calculated from $\lambda=h/p$ as 6.7×10⁻⁶ μm. Furthermore, by referring to the fact that the length of magnet poles is l=3 cm and the drawing in the paper by Stern and Gerlach (W. Gerlach and O. Stern, Ann. Phys. 74, 673 (1924), FIG. 1), a distance D between a slit aperture in a screen 77 and the observation plane for silver atoms is presumed to be under 5 cm. Then, assume that this distance is D=L=5 cm. Eq. (213) is calculated using these values. Though L>>w is satisfied, since $2\lambda L < w^2$ is a result, the conditions for Fraunhofer diffraction are not satisfied. Incidentally, L=67.2 m is necessary for obtaining $2\lambda L = w^2$. Consequently, at least L>67.2 m must be kept for obtaining the Fraunhofer diffraction pattern.

In order to know whether or not diffraction should be taken into consideration when distance to an observation plane is small such as L=5 m, another judging method different from Eq. (213) is necessary. This method will be derived again based on the statistical uncertainty relation in the subsequent embodiment.

It has already been shown that a diffraction pattern of a statistical phase wave caused by an aperture having a simple shape such as a circle or a rectangle, which is not limited to a slit, may easily be calculated by applying commercially available software for optical design only in the case of a Fraunhofer diffraction pattern. However, calculation of a diffraction pattern on an observation plane not so distant from an aperture is not simple as with a Fraunhofer diffraction pattern except for the case of a certain shaped aperture, even if the calculation is for Fresnel diffraction. Although, in principle, Eq. (204) representing the Fresnel-Kirchhoff diffraction formula may be numerically integrated by applying it to a statistical phase wave, whether or not such commercial software exists is unknown. In such cases of near-field diffraction, since the values of R and W can easily be obtained by the use of a judging method shown in the next embodiment, the method is sufficient to use for the fundamental design of equipment.

Even if evaluation of diffraction could be carried out as described above, the basis of designing exists in the design applying particle mechanics. This is because when external forces acting on a particle exist, a trajectory of the particle will stray from a straight line due to a factor other than the diffraction. As already explained in detail in relation to the flowchart shown in FIG. 19, the trajectory of a massive particle may be calculated by applying the relativistic equation of motion or the Newtonian equation of motion as the semirelativistic equation of motion. When the result of diffraction is calculated by applying Eq. (213) or an evaluation equation shown in the subsequent embodiment and that a wave mechanical design is not necessary is determined, only particle mechanics is used for designing equipment and dual mechanics is unnecessary. It has already been explained that the basis of design using particle mechanics exists in the calculation of a trajectory of a particle.

Finally, the nonrelativistic Schrödinger equation and the Dirac equation, which are both excluded from the system of dual mechanics described in FIGS. 25 and 26, will be mentioned again. Strictly complying with both the equivalence principle of wave-like energy and particle-like energy and special relativity is a fundamental guideline for constructing the system of dual mechanics. For this reason, the above two wave equations contradicting both the equivalence principle of energy and the conservation of relativistic energy cannot be incorporated in the category of dual mechanics. However, it is also certain that these equations have led to reasonably correct results in physics. Hence, how to arrange these equations in regard to wave equations in physically complete dual mechanics remains to be solved. As a way of thinking for this subject, it seems possible to interpret that these equations give mathematical physical means for solving problems in certain restricted fields of dual mechanics.

A constant term $E_0 = m_0 c^2$ included in the Hamiltonian expressed by Eq. (51) does not influence the equation of motion (P. A. M. Dirac, the aforementioned book, p. 118). Hence, even if $E_0 = m_0 c^2$ is omitted from the Hamiltonian, energy levels of a Hydrogen atom can be derived based on the nonrelativistic Schrödinger equation, which is obtained from the reduced Hamiltonian, to which potential energy V is added. In other words, when solving the given problem, if $E_0 = m_0 c^2$ is ascertained not to influence the solution, $E_0 = m_0 c^2$ may be omitted. However, as atomic power engineering from which $E_0 = m_0 c^2$ is excluded is invalid, there is essentially no change in the fact that the nonrelativistic Schrödinger equation is unnatural.

In the case of the Dirac equation, Dirac's Hamiltonian represented by Eq. (187) does not satisfy the 'equivalence principle of energy'. However, it is possible to fix $\alpha$ and $\beta$ so that an imaginary wave equation $(\hat{E}^2 - \hat{H}_D^2)\Psi = 0$, which results from combining two equations not simultaneously valid and corresponding to two respective different particles, which have positive and negative energy respectively, coincides with the free Klein-Gordon equation although formally. Each component of $\alpha$ and $\beta$ obtained through such procedure are represented by 4×4 matrices and the wave function $\Psi$ that is primarily a scalar becomes a vector consisting of four components, although this vector differs from a four-vector. The free Dirac equation $(\hat{E} - \hat{H}_D)\Psi = 0$ represented using these $\alpha$ and $\beta$ is only formally invariant with respect to the Lorentz transformation. However, the free Dirac equation is essentially antiphysical in that the solution of this equation violates the conservation of relativistic energy. Furthermore, although Dirac stated that the expression of this solution is based on the relativistic principle of superposition of states, this idea is simply Dirac's misunderstanding, as already shown.

As shown above, though the free Dirac equation is expressed only in a mathematical space, this equation is observed to not be completely unrelated to the free Klein-Gordon equation, as seen in the way of determining $\alpha$ and $\beta$. Realistically, based on the Dirac equation incorporated with the field of an external force for applying to an electron in motion under the field of central force, a fine structure of the energy levels of a Hydrogen atom can be derived by taking the spin into consideration according to the quantum mechanical formalism entirely developed in the mathematical space. Consequently, this allows a view that the free Dirac equation has been prepared for solving the Klein-Gordon equation not through pure physics but mathematical physics.

On the other hand, the description of the Dirac equation recognized in the paper by Dirac himself (Refer to P. A. M. Dirac, Scientific American 208, 45 (1963), p. 47) in brief is as follows: 'By correctly accounting for the spin of the electron, the discrepancy between the results of applying Schrödinger's relativistic equation (Klein-Gordon equation) and the experiments was completely resolved.' However, a notable point in this paper rather exists in Dirac's prediction stating that the present developing quantum theory will lead to more evolved stages of physics in which the role of the present uncertain relation or observation in the theory become meaningless. The Heisenberg uncertainty principle has been shown to be a mistake and the role of observation like that in the Copenhagen interpretation has become meaningless in dual mechanics. It follows that dual mechanics is evolved physics predicted by Dirac.

As shown above, while the nonrelativistic Schrödinger equation and the Dirac equation both demonstrate sufficient practicability for specific subjects on one hand, these equations are completely unable to correctly represent behaviors of microscopic particles in the physical space on the other hand. In result, the theory of elementary particles after Dirac's relativistic theory of electrons had taken in two problems concerning the following principles: (1) Violation of both the equivalence principle of energy and the conservation of relativistic energy and (2) Negation of the existence of free particles, making the number of particles and antiparticles be equal.

Here, the relationship between the above-mentioned Japanese Patent Application Laid-open No. Hei 8-329128 (U.S. Pat. No. 6,321,182 B1) and embodiments of this invention will be clarified. Japanese Patent Application Laid-open No. Hei 8-329128 (U.S. Pat. No. 6,321,182 B1) discloses an invention contrived based on the fact that solutions of either the relativistic wave equations or semirelativistic Schrödinger equation (Eq. (11) in the above application) satisfy relativity in (the description of) motion and therefore that 'phase waves as the solutions have physical realities'. It also mentions that, as a result of the space-time dual structures of quanta becoming apparent based on the realities of phase waves, the new system of quantum mechanics may be constructed. Incidentally, all claims of the above application relate to the fact or natural law that, since individual quanta involved in forming signals have the above spatiotemporal dual structures, each of their individual particle parts (cores) must enter into either one of the two branch wirings at the branch point. However, since wirings in these individual branch wirings are symbolically represented simply as line segments without spatial structures, which are different from those in this invention, involvement of phase waves is not expected at all.

On the other hand, descriptions on the conventional Schrödinger equation and the Dirac equation are invalid because these equations do not hold in the physical space according to dual mechanics. However, since it is shown that the Klein-Gordon equation is the relativistic wave equation for every free particle and the semirelativistic Schrödinger equation is a relativistically approximated wave equation, the present invention does not undermine the validity of the invention shown in the claims of Japanese Patent Application Laid-open No. Hei 8-329128 (U.S. Pat. No. 6,321,182 B1).

Meanwhile, the present invention does not include those inventions utilizing only probabilistic allocation of each individual particle part of dual particles to the circuits at the respective branch destinations. Accordingly, it is impossible for this application to conflict with the prior application.

Those embodiments concerning cases in which dual mechanics explained hitherto is applied to more specific technical subjects will be explained successively in the following.
7.2.2. Second Embodiment: Application of the Nonsimultaneous Uncertainty Relation to Design In relation to several concrete thought experiments (Refer to FIGS. 5, 6, 7, and 8) and the experiment of simultaneous observation of duality (FIG. 12), several detailed explanations have been given thus far stating that the Heisenberg uncertainty principle was erroneous. But the nonsimultaneous uncertainty relation valid in statistical wave mechanics can effectively be utilized for designing apparatus. Hence, the technical meaning of the nonsimultaneous uncertainty relation will be reconfirmed in the embodiment given below. At the same time, a conditional equation for judging whether or not to consider the effect of diffraction on an observation plane placed relatively close to an aperture will be established.

<Second Embodiment>

The thought experiment shown in FIG. 8 in which the position of each individual particle is measured by a slit will be reexamined. In this drawing, the slit 24 of width 2 a formed in the screen 23 functions as a device for measuring the position of each individual particle passing through the slit. In this case, the accuracy of the position measurement (or maximum measurement error) is $\Delta x = 2a$. Let the de Broglie wave function associated with each individual particle traveling toward the slit be expressed as $\Psi_n(x, t)$ ($n = 1, 2, \ldots, N$) inside or just behind the slit 24. N is the total number of particles passing through the slit in this experiment. The de Broglie wave function that passes through the slit and is diffracted is represented by $\Psi_n(x', t')$ on a detection plane 28 for particles. Though $\Psi_n(x', t')$ can be obtained by applying the Kirchhoff's diffraction formula to the incident plane wave $\Psi_n(x, t)$ inside the slit aperture, its functional form is the same regardless of the value of n provided that the difference in the initial phase of every de Broglie wave function associated with each individual particle is ignored. Then, when the position where the particle associated with the de Broglie wave $\Psi_n(x', t')$ that is also a probability wave should be detected is denoted by $x_n'$, $x_n'$ corresponds to a continuous eigenvalue. This is because, at the limit as the total number N of particles having passed through the slit becomes an extremely large number, the density per unit one-dimensional area (dx') of points each indicating a position where a particle has been detected may be regarded as a continuous function, resulting in accordance with a diffraction pattern having the highest central peak 30 and lower peaks 31 and 32 etc. on both sides of the central peak on the detection plane 28. However, sufficient attention must be paid to the fact that such expression according to the continuous function is a nonphysical idealization. This is because no matter how much the density of mathematical points is increased, the distribution of the points can never become a continuous function. Physics must adopt a mathematical form of expression. Hence, when formulating physics, it becomes important to discern the point up to which physical expressions are maintained and from which mathematical expressions begin to lose physical strictness.

Next, the process of changing over from wave mechanics in the physical space to statistical wave mechanics defined in a mathematical space will be formulated based on the wave mechanical behavior of each individual particle given above. In other words, techniques for deriving the statistical wave function $\psi$ from each individual wave function $\Psi_n$ in the physical space will be shown. Showing the result first, the statistical wave function $\psi(x, t)$ inside or just behind the slit 24 is defined as follows:

$$\psi(x, t) \equiv \lim_{N \to \infty} \frac{1}{\sqrt{N}} \sum_{n=1}^{N} \Psi_n(x, t), n = 1, 2, \ldots, N. \tag{214}$$

Since the time that a de Broglie wave for each individual particle passes through the slit differs for every individual particle, $\Psi_n(x, t)$ in the above equation should actually be written as $\Psi(x, t_n)$. However, since the function form of $\Psi$ is not dependent on time $t_n$ when the de Broglie wave passes through the slit, it is written as $\Psi_n(x, t)$ where n should be considered only a mark for distinguishing each individual particle. Thus, since the wave function $\Psi_n(x, t)$ of each individual particle has been represented in a form that does not depend on the initial phase and the time $t_n$, $\Psi_n(x, t)$ in the above equation has already lost its reality and changed into a mathematical representation. Consequently, the statistical wave function $\psi(x, t)$ constituted of such mathematical wave functions naturally becomes a mathematical wave function. In this way, the procedure of generating the statistical wave function from each individual de Broglie wave function $\Psi_n(x, t)$ originally having reality, that is, $\Psi \rightarrow \psi$, is called the procedure of making statistical mechanics ('statisticalization'). Here, with the use of $$\sum_{n \neq m} \langle \Psi_n(x, t) | \Psi_m(x, t) \rangle = 0, \tag{215}$$

$$|\psi(x, t)|^2 = \langle \psi(x, t) | \psi(x, t) \rangle \tag{216}$$

$$= \lim_{N \to \infty} \frac{1}{N} \sum_{n=1}^{N} \langle \Psi_n(x, t) | \Psi_n(x, t) \rangle$$

is obtained. Since $$\int_{-\infty}^{\infty} |\psi(x,t)|^2 dx = 1 \tag{217}$$

is readily derived from the above equation, it is apparent that the statistical wave function $\psi(x, t)$ defined by Eq. (214) has been normalized. As stated above, although the variable x of $\psi(x, t)$ obtained through the procedure of making statistical mechanics has a one-to-one correspondence with the real spatial coordinate x, the variable t does not correspond with the real time t. According to this procedure, the problem in the physical space transfers to a problem in a mathematical space. Similarly, $\psi(x', t')$ on the detection plane 28 can be defined as follows:

$$\psi(x', t') \equiv \lim_{N \to \infty} \frac{1}{\sqrt{N}} \sum_{n=1}^{N} \Psi_n(x', t'), n = 1, 2, \ldots, N. \tag{218}$$

The above equation corresponds to the procedure of 'statisticalization' expressed as $\Psi' \rightarrow \psi'$. If the de Broglie wave function $\Psi$ is a solution of the Klein-Gordon equation, $\psi$ becomes a solution of the statistical Klein-Gordon equation, and if that is a solution of the semirelativistic Schrödinger equation, $\psi$ becomes a solution of the statistical semirelativistic Schrödinger equation.

As already pointed out in relation to FIG. 8, when the varied portion of the momentum of each individual particle whose position has been measured with an error (maximum error) of $\Delta x=2$ a equivalent to the width of the slit is measured on the detection plane 28, the portion of approximately 90% of the total number of particles that have passed through the slit is represented according to Eq. (74) as $$\Delta p_{x'} \lesssim \frac{h}{2a}. \tag{219}$$

As a result, using the above equation and the error $\Delta x=2$ a, the following nonsimultaneous uncertainty relation expressed as Eq. (75) is obtained in the form $$\Delta x(t) \times \Delta p_x(t') \lesssim h(t < t').$$

Also in the case when the position is measured using an optical microscope with a resolving power of $\Delta x=R \approx \lambda$, the same statistical nonsimultaneous uncertainty relation $$\Delta x(t) \times \Delta p_x(t') \lesssim h(t < t')$$

as shown in Eq. (71) is valid. Here, $\Delta x(t)=R$ is measurement accuracy of particle position by which approximately 90% of the measured particles are measured for their position. Hence, the maximum value of the change in momentum before and after measurement for those 90% of the particles is given by $\Delta p_x(t') \approx h/R \approx h/\lambda$. Here, $h/\lambda$ is the momentum of each single photon that has the wavelength $\lambda$ and is used as a probe. It is necessary to recognize again that this uncertainty relation is also applicable to macroscopic particles. However, the change in momentum equivalent to approximately the momentum of a single photon does not bring about any detectable change of the trajectory in observation compared to the original momentum of a macroscopic particle. Thus, the statistical uncertainty relation represented by the above equation can entirely be ignored for macroscopic particles.

The statistical uncertainty relation as a secondary principle is no longer such an important principle in physics. However, this relation provides a powerful means to evaluate whether or not wave mechanics as a designing method is necessary for the design of apparatus concerning microscopic particles in motion.

A simple method for evaluating whether or not diffraction by a slit on the screen 77 should be taken into consideration in the apparatus for the Stern-Gerlach experiment will be explained referring to FIGS. 28A to 28C. Assuming that a de Broglie plane wave impinges on this slit, Eq. (219) gives $\Delta p_z \lesssim h/w$. Further, returning to FIG. 27, $\Theta \approx \Delta p_z/p = \lambda/w$ is obtained. When expressing $W=w+\Delta w$ in this drawing, it is apparent that $\sin \Theta \approx \Delta w/2 L=\lambda/w$ is obtained. Accordingly, $\Delta w=2\lambda L/w$ is finally obtained. Previously, referring to the drawing etc. described in the paper by Stern and Gerlach (Ann. Phys. 74, 673 (1924), FIG. 1), the distance D from the slit aperture on the screen 77 to the observation plane for silver atoms was presumed under 5 cm in FIG. 28A. Furthermore, at least $L>67.2$ m was necessary for providing the Fraunhofer diffraction pattern. Provided that $L=5$ cm, $\Delta w=2.23 \times 10^{-2}$ μm is obtained using $w=30$ μm and $\lambda=6.7 \times 10^{-6}$ μm. By calculating a ratio R of W to w, $R=1.00074$ is obtained. If L exists in the Fraunhofer region, approximately 10% of the total number of silver atoms reaches outside of the width W. However, since $L=5$ cm means that the observation plane exists in the Fresnel region near the aperture, only a little of the silver atoms reach outside of the width W. In this way, since spreading of the silver atomic beam due to diffraction can be ignored in this experiment, it is concluded that wave mechanics is not necessary for designing and evaluating the apparatus. It is apparent that application of quantum mechanics to the analysis of the Stern-Gerlach experiment was completely off base. Although it is supposed in the above calculation that a plane wave is incident on the slit, the incident wave is in general not restricted to a plane wave. It will be shown in a sixth embodiment that if the extent of $R \leq 1.01$ is obtained even in such a case, diffraction may be excluded from design. Since the value of R gives a simple criterion for judging whether or not diffraction should be evaluated in designing, R and W will be expressed again using $\lambda$, w, and L in the following:

$$R = \frac{W}{w}, \tag{220}$$

-continued where $W = w + \frac{2\lambda L}{w}$.

The above equation has no restriction on the distance L from the aperture to the observation plane. Hence, this equation enables evaluation of diffraction occurred from near the aperture to the region of Fresnel diffraction, resulting in supplementing Eqs. (212) and (213) for evaluating whether or not the diffraction is Fraunhofer diffraction. However, as is easily seen, when w>>λ holds, setting W'=(W−w)=2λL/w in Eq. (220) allows W' to coincide with W in Eq. (212). Eq. (220) is useful for many cases when giving consideration to the diffraction in a system. In a most orthodox sense, R=W/w is a value indicating a multiple of the width w of a slit in which width W of the central peak in a diffraction pattern extends. Therefore, for example, there is a use for determining that wave mechanical designing is unnecessary if R≤1.01, as already mentioned. On the other hand, it may be directly used, for example, for designing apparatus in such a way that the minimum width of a detector for detecting silver atoms is determined based on the value of W.

As shown above, it is apparent that Eq. (220) derived based on the statistical nonsimultaneous uncertainty relation may not only provide a simple method for deciding whether or not wave mechanics should be applied when designing devices or apparatus concerning microscopic particles, but may also be utilized for designing itself.

7.2.3. Third and Fourth Embodiments: Applications of the Statistical Principle of Superposition of States Next, two embodiments in which the principle of superposition of states valid in statistical wave mechanics is applied to specific problems will be given. Discrete eigenvalues will be involved in these embodiments.

<Third Embodiment>

The fundamental functions of apparatus corresponding to quantum computers will be examined according to wave mechanics. Each individual quantum device functioning as a quantum bit (qubit) is assumed to be a two-level molecule such as a chloroform molecule, for example (As an experimental research on making chloroform molecules as quantum devices, refer to I. L. Chuang, L. M. K, Vandersypen, X. Zhou, D. W. Leung and S. Lloyd, Nature 393, 143 (1998), for example). Let chloroform molecules be referred to as particles hereafter. Further, assuming that there exists an extremely large number of single-particle systems simultaneously without any interaction among them, the state of each individual single-particle system is represented by $\Psi_n$ (n=1, 2, ..., N) using a de Broglie wave function, where N is the total number of the single-particle systems. Suppose that, for the state $\Psi_n$ of each individual particle, there are two different eigenstates, that is, an excited state $\Psi_{n1}$ and a ground state $\Psi_{n2}$. Assuming that every particle is in the excited state $\Psi_{n1}$ at time t=0 and let the half-life of the excited state be denoted by τ. Note that every particle is at rest in each individual closed box so as not to interact with each other, and a light source for exciting the particle and a photodetector for detecting a photon emitted through the transition from the excited state to the ground state are prepared inside each individual box.

When the number of particles in excited states $\Psi_{n1}$ at the time t is denoted by $N_1$, the statistical wave functions $\psi_1(t)$ and $\psi_2(t)$ can be defined as follows:

$$\psi_1(t) \equiv \lim_{N \to \infty} \frac{1}{\sqrt{N_1}} \sum_{i=1}^{N_1} \Psi_{i1}(t), \, i = 1, 2, \ldots, N_1, \ldots, N. \quad (221)$$

$$\psi_2(t) \equiv \lim_{N \to \infty} \frac{1}{\sqrt{N-N_1}} \sum_{j=N_1+1}^{N} \Psi_{j2}(t), \quad (222)$$

$$j = N_1 + 1, N_1 + 2, \ldots, N \, (t > 0),$$

where i+j=N, $N_i$=N at t=0, and differences in initial phases of particles should be neglected. However, attention must be given to the fact that, strictly speaking, each de Broglie wave function $\Psi_n$ loses its reality at the instance the differences in initial phases of particles are neglected. Then, the de Broglie wave function $\Psi_n(t)$ associated with each of individual particles that exist in different positions at the same time should be written more precisely as $\Psi_n(x, t)$. However, the function form of each individual rest wave function $\Psi_n$ does not depend on the position x, thus allowing Eqs. (221) and (222). Therefore, these equations show the method for building the normalized statistical wave functions $\psi_1(t)$ and $\psi_2(t)$ each representing the state of an ensemble, which corresponds to many single-particle systems each being in a specified eigenstate, using each individual de Broglie wave function $\Psi_n$ that exists originally or, in short, the procedure of 'statisticalization' $\Psi \to \psi$. The operation to the limit as N→∞ is necessary for corresponding to an arbitrary number of quantum devices used in a quantum computer. According to a sequence of these operations, the state of an ensemble of the single-particle systems corresponding to the total number of single-particle systems can be represented by a continuous function with respect to time. Letting the total energy (rest energy) of a particle in the excited state be denoted by $E_1$ and that in the ground state by $E_2$ ($E_1 > E_2$), the states of the rest particle can be written respectively as follows:

$$\Psi_{i1}(t) = \exp\{-iE_1 t/\hbar\} \quad (223)$$

$$\Psi_{j2}(t) = \exp\{-iE_2 t/\hbar\} \quad (224)$$

Accordingly, $\psi_1(t)$ and $\psi_2(t)$ defined by Eqs. (221) and (222) respectively can substantially be expressed as $$\psi_1(t) = \exp\{-iE_1 t/\hbar\} \quad (225)$$

$$\psi_2(t) = \exp\{-iE_2 t/\hbar\} \quad (226)$$

The above $\psi_1(t)$ and $\psi_2(t)$ become solutions of statistical wave equations that are obtained by automatically making the substitution $\Psi \to \psi$ in the free Klein-Gordon equation or the free semirelativistic Schrödinger equation. Different from the second embodiment, although spatial variables do not have corresponding relationships to real spatial coordinates in this embodiment, the time variable t can be made to have a one-to-one correspondence with the real time t. Since each individual particle is assumed to be at rest, denoting the normalized statistical wave function representing the state of the ensemble corresponding to all of the single-particle systems by (t), and half-life in the excited state by τ, $\psi(t)$ is generally simply expressed as a function of time in any statistical wave mechanics as follows:

$$\psi(t) = \sqrt{2^{-t/\tau}} \psi_1(t) + \sqrt{1 - 2^{-t/\tau}} \psi_2(t). \quad (227)$$

The above equation represents the result of applying the principle of superposition of states in statistical wave mechanics to two statistical eigenstates $\psi_1$ and $\psi_2$. $\psi_1$ and $\psi_2$ represent the states of two subensembles each contains particles having the same particular eigenvalues, and are individually normalized. Hence, their correspondence to the states of subensembles appears in the fact that the sum of the squares of the absolute values of the two individual coefficients of $\psi_1$ and $\psi_2$ becomes 1, as seen from Eq. (227). Note that a mean lifetime $\bar\tau$ that is expressed as $\tau=\bar\tau \log 2$ may be employed instead of the half-life $\tau$ in the above equation. Eq. (227) shows an appearance of the energy of the state $\psi(t)$ decreasing continuously over time. Such representation is obtained because $\psi_1(t)$ and $\psi_2(t)$ have been defined respectively by Eqs. (221) and (222) under the transition to the limit $N \to \infty$ so as to allow correspondence to all of the unspecified large number of single-particle systems.

The number of particles supplied to an experiment is set to 100 to examine the experimental significance of the statistically superposed state $\psi(t)$ expressed by Eq. (227). Since $\psi(0)=\psi_1$ holds at t=0 according to Eq. (227), the 100 particles are all in the excited state, resulting in satisfying the initial condition. When t=r, it is seen that the number of particles in the excited state is 50 and those in the ground states is 50, resulting in a fifty-fifty split. After time $t=7\tau$ elapses, the number of particles in the excited state becomes under 1 and the possibility of all particles making transitions to the ground state increases. Since the number of particles in the excited state is only 0.4 at $t=8\tau$, it may regarded that all of the particles have made transitions to the ground state. In this way, it is seen that $\psi(t)$ is able to represent an energy state of a system consisting of an arbitrary finite number of particles whose energy decreases nonlinearly and discretely over time. Since each individual detector placed inside each individual closed box containing only a single particle detects each individual photon emitted momentarily, the aspect of a time-dependent alteration of the state $\psi(t)$ can be known after this experiment. Therefore, theoretically, it is apparent that this system satisfies the conservation of energy. The reason why the above view is possible is that, different from the case of Eq. (1) in which the principle of superposition of states is applied to a single particle, the principle is applied to a plurality of particles each satisfying the conservation of energy.

Eq. (227) is applicable to arbitrary individuals. The above 100 particles may be 100 molecular devices or, although it is somewhat of a leap, 100 cats. An unrealistic event that occurs when the superposition principle is applied to a single Schrödinger's cat will never happen to atoms or molecules as well as cats. In that sense, it can be said that the function of a qubit as a quantum device is exactly the same as that of a conventional digital functional device.

The possibility of realizing the super high-speed quantum computer utilizing qubits has been completely denied. At the same time, the Schrödinger's cat paradox also has vanished. In this way, it is seen that the statistical principle of superposition of states is a necessary tool for fundamental design and performance evaluation of apparatus utilizing many atomic devices or molecular devices. It is clearly substantiated that, different from quantum mechanics, dual mechanics is also a theory of design for apparatus utilizing microscopic particles as devices.

It has already been concluded in 4.5. that further discussing in detail quantum computers each utilizing many photons based on the ordinary 'principle of interference' is unnecessary in view of the interferometer becoming much complex and another related reason. Hence, the possibility of realizing them remains only in quantum computers each utilizing such interference phenomena occurring among different particles that are peculiar to dual particles. However, extreme difficulty in realization of quantum computers based on the premise that such interference phenomena, which Dirac pronounced never occur between two different particles, occur among many different particles will speak for itself.

Next, an embodiment in which statistical wave mechanics according to this invention is applied to Bohm's version of the EPR experiment will be given.

<Fourth Embodiment>

Figure 4:
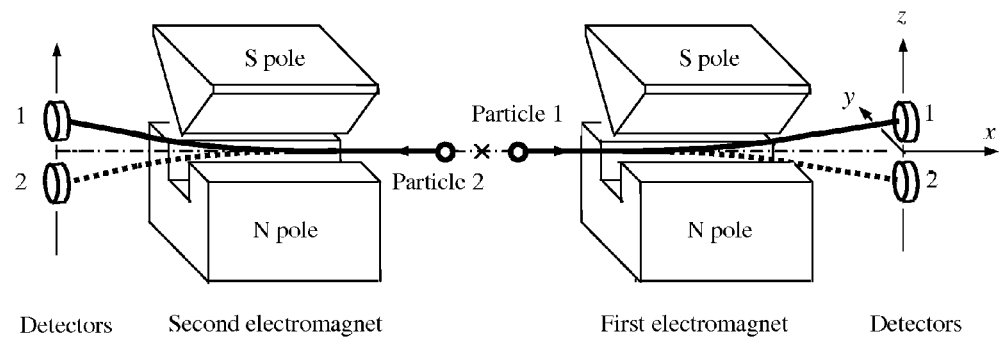
FIG. 4 is a diagram schematically showing Bohm's version of the EPR thought experiment.

As schematically shown in FIG. 4, two particles 1 and 2 having reversed spins proceed in mutually opposite directions on the x axis and then impinge on Stern-Gerlach electromagnets respectively in this experiment. The state of z components of spins for this two-particle system at the observation planes has been expressed according to Bohm by Eq. (42)

$$\psi = \frac{1}{\sqrt{2}}[u_+(1)u_-(2)e^{i\alpha_c} + u_-(1)u_+(2)e^{i\alpha_d}].$$

As already mentioned, this expression includes three errors of principle. The first is that the existence of a physical quantity called an electronic spin looks unnatural as long as electrons are classified as elementary particles conforming to special relativity. The second is that a state represented by a product of two eigenfunctions, i.e., $u_+(1)u_-(2)$, does not exist. The third is that phase disturbances that were assumed as occurring due to the observation of spins do not exist. Concerning the first problem, each individual electron should at least be considered a composite particle having an internal structure. If the spin and its associated magnetic moment are substituted by some internal degree of freedom, a magnetic charge may be conceived and discussions may develop by regarding $u_+(1)$ or $u_-(2)$ as an eigenfunction for the internal degree of freedom. However, as already indicated beforehand, discussions should proceed following the conventional name of spins because the existence of magnetic charges has not yet been confirmed by experiment at the present moment. Concerning the second problem, recalling that the principle of superposition of states has primarily been derived based on the wave equation being linear with respect to wave functions, it is seen that the state of a system must be represented by a linear combination of eigenfunctions for respective particles. Although the third problem should simply be ignored, quantum mechanics becomes invalid at that instant. In any case, Eq. (42) turns out physically invalid.

In novel wave mechanics, an ensemble of two-particle systems corresponding to all of the two-particle systems supplied to the experiment is regarded as a single abstracted two-particle system. Furthermore, different from the second and third embodiments, these functions have no corresponding relation to the real space-time coordinates since space-time variables are not used for representing wave functions.

The abstracted two-particle system contains two abstract particles. Further, in the case where there are two two-particle systems, they must be classified into two cases. That is, one is the case when particle 1 has + spin and particle 2 has − spin and the other is the case when particle 1 has − spin and particle 2 has + spin. Accordingly, four abstract particles are actually included. For simplification of discussion, when the total number of two-particle systems supplied to the experiment is denoted by N and the limit when N approaches infinity is considered, these two cases are assumed to occur fifty-fifty. Under such conditions, four normalized statistical wave functions $$\psi_1^+(1) \equiv \lim_{N \to \infty} \frac{1}{\sqrt{N}} \sum_{n=1}^N \Psi_{n1}^+(1), \tag{228}$$

-continued $$\psi_2^-(2) \equiv \lim_{N \to \infty} \frac{1}{\sqrt{N}} \sum_{n=1}^{N} \Psi_{n2}^-(1), \quad (229)$$

and $$\psi_2^-(1) \equiv \lim_{N \to \infty} \frac{1}{\sqrt{N}} \sum_{n=1}^{N} \Psi_{n2}^-(1), \quad (230)$$

$$\psi_1^+(2) \equiv \lim_{N \to \infty} \frac{1}{\sqrt{N}} \sum_{n=1}^{N} \Psi_{n1}^+(2) \quad (231)$$

can be built from the de Broglie wave function associated with each individual particle, where the individual numbers as subscripts for Ψs correspond to the individual numbers of the detectors, and it is assumed that the wave vectors of wave functions Ψ(1) and Ψ(2) for particles with different numbers point in mutually opposite directions. The above equations represent the four abstract particles each corresponding to an ensemble of particles all having a specific eigenvalue. For example, $\psi_1^+(1)$ is a statistical wave function representing an ensemble of particles 1 each having a + spin and detected by a detector 1. Hence, $\Psi_{n1}^+(1)$ is a de Broglie wave function for each individual particle 1 having a + spin and detected by the detector 1. Letting statistical wave functions representing ensembles of the two types of two-particle systems mentioned above be $\psi_a$ and $\psi_b$, these individual wave functions can be expressed with the use of Eq. (228) to Eq. (231) and the statistical principle of superposition of states as $$\psi_a = \frac{1}{\sqrt{2}} [\psi_1^+(1) + \psi_2^-(2)], \quad (232)$$

$$\psi_b = \frac{1}{\sqrt{2}} [\psi_2^-(1) + \psi_1^+(2)]. \quad (233)$$

Accordingly, by reapplying the principle of superposition of states to $\psi_a$ and $\psi_b$, a statistical wave function representing an ensemble corresponding to all of the two-particle systems can finally be expressed as $$\psi = \frac{1}{\sqrt{2}} [\psi_a - \psi_b] \quad (234)$$

$$= \frac{1}{2} \{[\psi_1^+(1) + \psi_2^-(2)] - [\psi_2^-(1) + \psi_1^+(2)]\}.$$

In this way, the statistical wave function representing the state of an ensemble corresponding to all of the two-particle systems to be observed may simply be represented by the linear combination of the four statistical wave functions.

When comparing Eq. (234) with Bohm's quantum mechanical expression of Eq. (42) representing an "entangled state", the difference is obvious. In the case of representing the state of each individual two-particle system by the "entangled state", existence of the so-called "nonlocal correlation" meaning that the sign of the spin of particle 2 can be identified without any observation at the time that the sign of the spin of particle 1 is identified through observation has been emphasized. However, in Eq. (234), ψ representing the state of an ensemble including all of the two-particle systems is expressed by the linear combination of the four statistical wave functions $\psi_1^+(1)$, $\psi_2^-(2)$, $\psi_2^-(1)$, and $\psi_1^+(2)$, which represent the states of individually independent subensembles respectively, by correctly applying the statistical principle of superposition of states. As a result, the "entangled state" is invalidated, and at the same time, the quantum mechanical "nonlocal correlation" is also extinguished. When basing on the conservation of angular momentum in each individual two-particle system, the spin of particle 1 and that of particle 2 always have different signs from each other. Since causality based on various laws of conservation in particle mechanics exists from the beginning, the fact that the spin of particle 1 and that of particle 2 have different signs from each other is no more than a classical correlation as one of the indications of the causality. It turns out that the above causality holds regardless of whether particles are individually microscopic or macroscopic in dual mechanics partly including classical mechanics as particle mechanics.

Previously, errors of the Heisenberg uncertainty principle were pointed out, and opposite to the quantum theoretical requirement, the simultaneous reality of the position and momentum of each individual free particle was assured. In addition, it was shown that the "entangled state" has no physical meaning. Accordingly, it follows that a hidden variable λ itself used when deriving Bell's inequality (Refer to J. S. Bell, Physics (Long Island City, N.Y.) 1, 195 (1964)) never existed. That is, the reason why Bell's inequality does not hold in experiments (Refer to L. E. Ballentine, Am. J. Phys. 55, 785 (1987)) is not because quantum mechanics is correct but because the hidden variable itself never existed in the natural world from the beginning. In this way, Bell's inequality is proven meaningless and the EPR paradox is completely solved. Further, the cause of a "zero-point oscillation" of He molecules at the absolute zero may be considered that the motion of electrons in each of the individual molecules do not freeze even at this temperature. In contrast, it can be said that the "zero-point oscillation" of a vacuum leading to the divergence of energy is an unsound and unrealistic concept.

Quantum cryptographic communications, which allows detection of wiretapping and thereby allowing establishment of a countermeasure against wiretapping, has attracted attention. Although the nonexistence of the quantum mechanical EPR effect utilized in a part of the above communication system has been confirmed, the classical correlation exists irrelevant to the confirmation. Hence, by utilizing this classical correlation, the same object may in principle be achieved. However, constructing the communication system in which each individual pair of photons as carriers of signals is handled at will is difficult without end. At the same time, it is extremely difficult to provide compatibility of such quantum cryptographic communication system with conventional communication systems. Thus, in principle, as a result of having lost the possibility of realizing super high-speed quantum computers for decrypting cryptograph, the necessity of the quantum cryptographic communication system itself is also almost gone.

7.2.4. Fifth Embodiment: Description of Interference Phenomena Due to Statistical Wave Functions The next embodiment concerns interference phenomena. The phenomena will be formulated based on novel wave mechanics and statistical wave mechanics. The principle of superposition of states in quantum mechanics is classified into the principle of interference of each individual particle and the statistical principle of superposition of states concerning ensembles of particles in dual mechanics. The principle of interference is essentially different from the statistical principle of superposition of states and may also be called a relativistic principle of superposition of states valid in real space time. Here, regarding a beam splitter such as a semitransparent mirror, a double slit, or the like as a device, the functions of these devices will be clarified from the aspect of technology through the above formulation.

<Fifth Embodiment>

Figure 5:
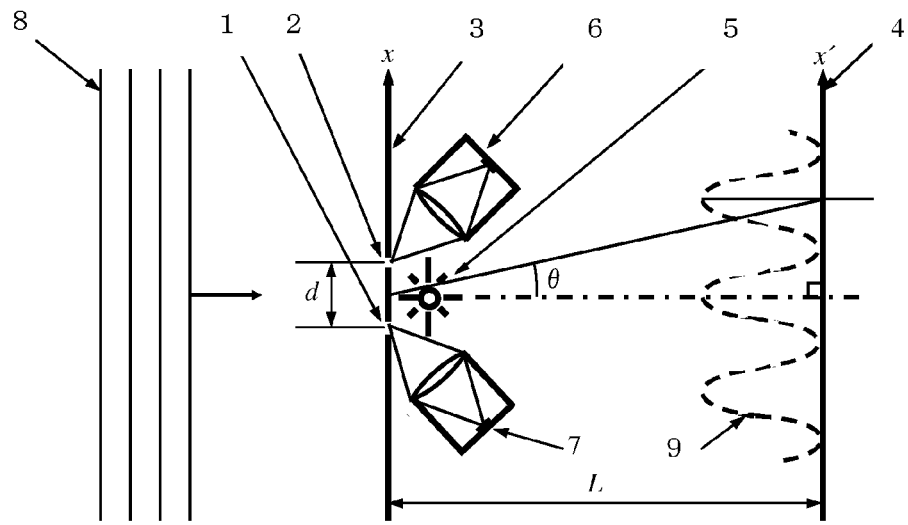
FIG. 5 is a diagram schematically showing a particle interference experiment (thought experiment) using a Young's interferometer.
Figure 6:
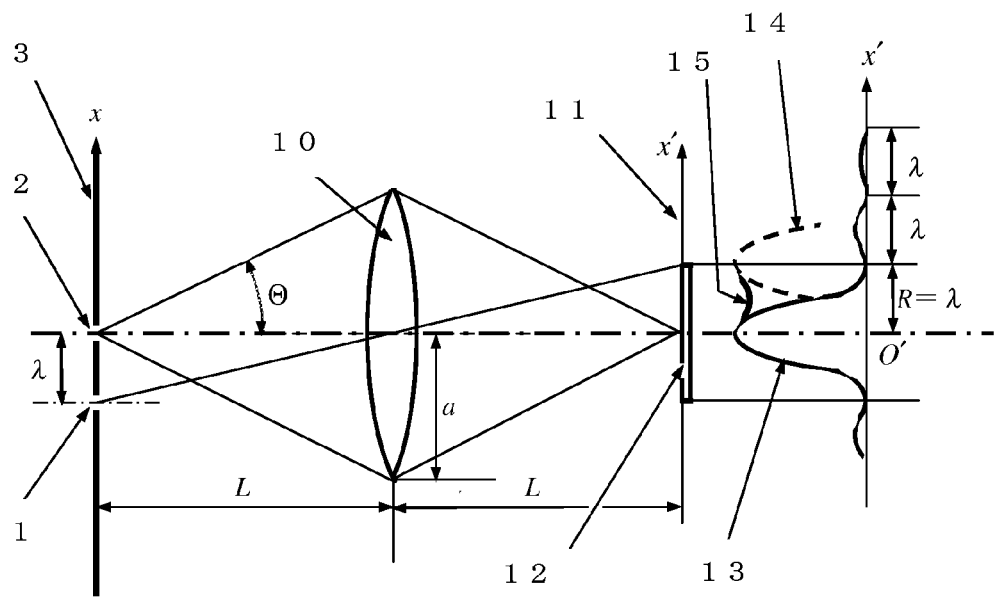
FIG. 6 is a diagram explaining how to evaluate the path-distinction probability using an optical system for distinguishing the path of a particle shown in FIG. 5.

Consideration will be given to a Young's double-slit interferometer obtained by eliminating a light source 5 and photodetectors 6 and 7 from the apparatus shown in FIG. 5. Denoting the total number of particles provided for formation of interference fringes 9 on an observation plane by N and the de Broglie wave function associated with the nth particle by $\Psi_n$ results in $$\Psi_n = \frac{1}{\sqrt{2}}(\Psi_{n1} + \Psi_{n2}), n = 1, 2, \ldots, N. \quad (235)$$

$\Psi_{n1}$ is a de Broglie wave generated by an incident de Broglie wave 8 passing through a slit 1, $\Psi_{n2}$ is another de Broglie wave generated by the incident de Broglie wave 8 passing through a slit 2, and the particle is associated with either one of the two de Broglie waves.

An interference phenomenon of each individual particle on the observation plane 4 can be expressed with the use of Eq. (235) as $$|\Psi_n|^2 = \frac{1}{2}(|\Psi_{n1}|^2 + |\Psi_{n2}|^2 + \langle \Psi_{n1} | \Psi_{n2} \rangle + \langle \Psi_{n2} | \Psi_{n1} \rangle). \quad (236)$$

Also in this case, the normalized statistical wave functions can be defined as follows:

$$\psi_1 \equiv \lim_{N \to \infty} \frac{1}{\sqrt{N}} \sum_{n=1}^{N} \Psi_{n1}, \quad (237)$$

$$\psi_2 \equiv \lim_{N \to \infty} \frac{1}{\sqrt{N}} \sum_{n=1}^{N} \Psi_{n2}. \quad (238)$$

Assuming m=1, 2, ..., N, since it is generally safe to say that two different particles do not interfere with each other, the following relations $$\sum_{n \neq m} \langle \Psi_{n1} | \Psi_{m1} \rangle = \sum_{n \neq m} \langle \Psi_{n2} | \Psi_{m2} \rangle \quad (239)$$

$$= \sum_{n \neq m} \langle \Psi_{n1} | \Psi_{m2} \rangle$$

$$= \sum_{n \neq m} \langle \Psi_{n2} | \Psi_{m1} \rangle$$

$$= 0$$

hold. Accordingly, for statistical wave functions $$|\psi_1|^2 = \langle \psi_1 | \psi_1 \rangle = \lim_{N \to \infty} \frac{1}{N} \sum_{n=1}^{N} \langle \Psi_{n1} | \Psi_{n1} \rangle \quad (240)$$

and $$\langle \psi_1 | \psi_2 \rangle = \lim_{N \to \infty} \frac{1}{N} \sum_{n=1}^{N} \langle \Psi_{n1} | \Psi_{n2} \rangle, \quad (241)$$

and related equations are valid. Here, when written as $$\psi \equiv \lim_{N \to \infty} \frac{1}{\sqrt{N}} \sum_{n=1}^{N} \Psi_n, \quad (242)$$

the statistical wave function providing interference fringes is obtained from Eqs. (235), (237), and (238) as $$\psi = \frac{1}{\sqrt{2}}(\psi_1 + \psi_2). \quad (243)$$

The above equation corresponds to the case in which a substitution of $\Psi \to \psi$ has been made in Eq. (235). The intensity distribution of interference fringes should be found by calculating $|\psi|^2$ based on Eq. (243). It is easily verified that substituting Eqs. (237) and (238) into $\psi_1$ and $\psi_2$ respectively and then calculating with the use of Eqs. (240), (241) and related equations gives the interference fringes whose expression agrees with the equation $$|\psi|^2 = \frac{1}{2}(|\psi_1|^2 + |\psi_2|^2 + \langle \psi_1 | \psi_2 \rangle + \langle \psi_2 | \psi_1 \rangle) \quad (244)$$

that can be obtained by making the substitution of $\Psi \to \psi$ in Eq. (236). The reason for making $N \to \infty$ for the number of particles in Eqs. (237) and (238) is to deal with the fact that the intensity distribution of interference fringes given by Eq. (244) is expressed as a continuous function. For example, when deriving the intensity distribution of interference fringes in the Young's interference experiment, Eq. (243) can be applied. In that case, although $\psi$ does not mean a wave function in real space time, for only obtaining the results of the experiment, $\psi_1$ and $\psi_2$ on the observation plane may be derived by assuming the statistical plane wave incident on the double slit as $\psi_i$, for example, and then applying the Fresnel-Kirchhoff diffraction formula. As for boundary conditions, reflection of a statistical de Broglie wave from the walls of the apparatus is usually neglected. As shown above, the process of forming the interference fringes has been formulated under dual mechanics.

When substituting $\psi$ in Eq. (244) with the scalar wave function U in physical optics, this equation agrees with an equation giving interference fringes of light. This result is also a corroborative evidence for showing that, as already mentioned, relativistic wave mechanics can be applied to photons as particles with rest mass $m_0=0$. Previously, Eq. (92) generally representing the intensity distribution of interference fringes in physical optics was shown. Further, it was also proved, according to Eq. (95), that the intensity of interference fringes at each individual position on the observation plane can be divided into components of individual beams according to the ratio of the intensities of two beams before interference occurs, that is, the beam ratio. Therefore, both the fact that the coefficient of $\psi_1$ and that of $\psi_2$ are equal in Eq. (243) and Eq. (244) corresponding to Eq. (92) signify that the numbers of energy carriers of particlesassociated with the individual statistical wave functions $\psi_1$ and $\psi_2$ representing the states of subensembles respectively are equal, and further that the number of particles associated with the statistical wave function $\psi_1$ and the number of particles associated with the statistical wave function $\psi_2$ both causing formation of the interference fringes at each individual position are also equal. From the above, by applying the normalized statistical wave function $\psi$ representing the state of the ensemble including all of the N particles involved in forming the interference fringes and the normalized statistical wave functions $\psi_1$ and $\psi_2$ representing the states of the two subensembles of particles that have passed through only either one of the two slits, the interference fringes can generally be expressed as $|\psi|^2 = |a_1\psi_1 + a_2\psi_2|^2$, where $|a_1|^2 + |a_2|^2 = 1$. For simplicity, it is assumed that the widths of individual slits of the double slit are the same but only the transmittances of them are possible to differ, and that $|\psi_1(x')|^2 = |\psi_2(x')|^2$ holds on the observation plane. In this case, the numbers of particles belonging to individual subensembles are given by $|a_1|^2 N$ and $|a_2|^2 N$. That is, the squares of the absolute values of the coefficients of the respective statistical wave functions give the percentage of the number of particles belonging to a subensemble whose state is expressed by that statistical wave function. Hence, provided that the intensity distribution of the particle beam incident on the double slit is uniform on a cross section perpendicular to the particle beam, $|a_1|^2$ and $|a_2|^2$ are proportional to the number of particles passing through the slit 1 and that passing through the slit 2 respectively. This point is remarkably different from physical optics. This is because, in physical optics, carriers of energy are basically electromagnetic waves themselves. Further, this point is also remarkably different from quantum optics. This is because, according to quantum optics, each individual photon passes through the slit 1 with a probability of $|a_1|^2$ and passes through the slit 2 with a probability of $|a_2|^2$.

On the other hand, it was proved that the space-time structure of each individual matter particle consists of a localized particle part and an oscillating phase space surrounding the particle part, where the oscillating phase space is transformed to the phase wave $\Psi$ in relative motion to its observation system. When a dual particle having such a space-time structure passes through the double slit, the particle part passes through either one of the two slits and the phase wave passes through both slits, resulting in interfering with each other. In this way, by defining both the phase wave function $\Psi$ associated with each individual particle and the statistical wave function $\psi$ representing the state of an ensemble of interfering individual particles, the paradox in the interference of each individual particle, which has been considered to have no physically rational solution, has vanished. Any paradox existed in quantum mechanics cannot occur under dual mechanics.

A law stating that the number of particles passing through each individual slit is proportional to the transmittance of the slit is also valid for other beam splitters such as a semitransparent mirror etc. When 100 particles impinge on the semitransparent mirror, it may be considered that 50 particles will be transmitted while 50 particles will be reflected. However, when only a single particle impinges, this particle will either be transmitted or be reflected but not both. Such law is applicable to the design of various beam splitters. Naturally, as long as multiple waves generated by a beam splitter are not superposed again, interference phenomena never occur. When applying the beam splitter as a mere energy splitter, it may be considered, for example, in Eq. (244) that the equation from which two interference terms are omitted is valid. In this way, difference in design of the case where a beam splitter as a device is incorporated in an interferometer and of the case where the beam splitter is used simply as an energy splitter is clearly shown. Note that when a single wiring branches into multiple wirings in an electronic circuit, the branch point can be regarded as a beam splitter. When two branched wirings are rejoined resulting in a single wiring, interference between de Broglie waves associated with electrons may occur in the rejoined single wiring. However, since each individual electron in each branched wiring repeats drift motion and at each time the velocity and direction of propagation of a de Broglie wave change, stationary interference fringes are never formed.

7.2.5. Sixth Embodiment: Application of Particle Mechanics to Design

In the second embodiment and thereafter, although the system of wave mechanics in its broad sense consisting of wave mechanics and statistical wave mechanics has been applied in the embodiments up to now, particle mechanics do not appear therein. However, a characteristic of dual mechanics exists in the point that it has been constructed also on the basis of particle mechanics. The Stern-Gerlach experiment will be taken up again in the following as a concrete example to which both of wave mechanics and particle mechanics are applied. As shown in the second embodiment concerning the statistical nonsimultaneous uncertainty relation and its application to design, this experiment can basically be dealt with by applying only particle mechanics. But, in the embodiment shown below, wave mechanics will be applied only for the object to formally show a typical technique to apply dual mechanics. For simplicity, descriptions on the procedure of 'statisticalization' in which a statistical wave function is constructed from de Broglie wave functions will be omitted.

<Sixth Embodiment>

FIG. 28A, as in FIG. 2, schematically shows an apparatus for the Stern-Gerlach experiment. The slit-collimator for forming a silver atomic beam incident on an electromagnet consists of first screen 76 and a second screen 77 each having a slit aperture of width w. The distance from this second screen 77 to an observation plane is denoted by D.

General steps for applying dual mechanics to designing devices and apparatus consists of a first step of defining the statistical wave function $\psi$ for an object system, and a subsequent step of evaluating diffraction when the statistical wave function is incident on a part (width w) that restricts the path for each individual particle. In FIG. 28A, Eq. (220) is applied for simply obtaining the width W of a spread on the observation plane caused by the diffraction of a plane wave that is assumed to be incident on the slit aperture on the second screen 77. Substituting L in Eq. (220) with D gives $$R = \frac{W}{w}, \quad (245)$$

$$\text{where } W = w + \frac{2\lambda D}{w}.$$

Here, by assuming that the evaluation gives the value $R = W/w > 1.01$, the diffraction can not be neglected.

The object of designing this experimental apparatus exists in spatially separating the distribution of silver atoms having + spins and those having − spins from each other on the z axis in the observation plane. The first design step for achieving that object is to derive a position $z = z_+$ on the z axis at which each individual silver atom having + spin and initially having moved on the x axis arrives and a position $z = z_-$ on the z axis at which each individual silver atom having − spin and initially having moved on the x axis arrives. As a next step, the performance of the slit-collimator is particle mechanically (geometrical optically) evaluated, and spread $w_c$ on the z axis is derived (FIG. 28B). For achieving that object, if the spread on the observation plane caused by the diffraction when the silver atomic beam represented by a plane wave is incident on the slit is set as width W, at least $z_- - z_+ \geq W + w_c$ must hold as shown in FIG. 28C.

The two positions $z = z_+$ and $z = z_-$ on the z axis shown in FIG. 28A are calculated. Previously, in relation to FIG. 2, when the origin was fixed to the entrance of the electromagnet on the x axis, trajectories of silver atoms having individual spins in a gap between electromagnet poles were derived, resulting in two parabolas represented by Eq. (27):

$$z = \pm \frac{\mu B_0'}{2Mv^2} x^2 \quad (\mu < 0).$$

Here, z-coordinates of each of individual silver atoms at the exit of the electromagnet were derived from Eq. (31) and $\Delta t = l/v$ as $z_\pm = \pm \mu B_0' l^2 / 2Mv^2$, and gradients of the two parabolas at the exit of the electromagnet were given by $\pm \mu B_0' l / Mv^2$. Hence, in FIG. 28A, the positions of the cross points of straight trajectories 78 and 79 and the z axis were given from Eq. (30) as $$z \pm = \pm \frac{\mu B_0' l}{Mv^2} \left( \frac{l}{2} + d \right).$$

From the above equation, $z_- - z_+$ is derived as follows:

$$z_- - z_+ = -\frac{\mu B_0' l}{Mv^2}(l + 2d). \tag{246}$$

In the above, it was assumed in deriving Eq. (27) representing trajectories that the gradient of magnetic field $B_0'$ in the gap between electromagnet poles is uniform along the x axis. Incidentally, the magnetic field and its gradient in the gap between electromagnet poles may be derived accurately by applying a finite element method, for example. Similarly, the trajectories of each of individual silver atoms under the magnetic field obtained by applying such method can also be derived more accurately by applying the numerical calculation method for trajectories introduced previously.

Figure 28B:
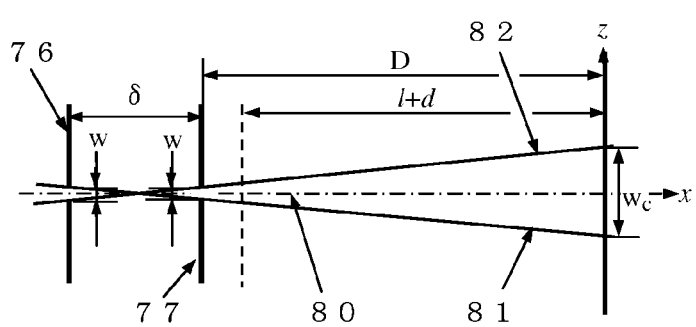

Next, performance of the slit-collimator will be evaluated referring to FIG. 28B. The silver atomic beam from a silver atom source having sufficient size impinges on the slit-collimator comprised of the first screen 76 and the second screen 77 separated by an interval 6. The slit aperture of the width w is provided in each of the two screens. Further, a central axis of the silver atomic beam coincides with an x axis 80. Factors for determining the spread of the silver atomic beam in this case are a straight line 81 connecting the upper edge of the slit aperture on the screen 76 and the lower edge of the slit aperture on the screen 77, and a straight line 82 connecting the lower edge of the slit aperture on the screen 76 and the upper edge of the slit aperture on the screen 77. Denoting the distance between two points where these straight lines cross the z axis by $w_c$ gives $$w_c = w\left(1 + \frac{2D}{\delta}\right). \tag{247}$$

Figure 28C:
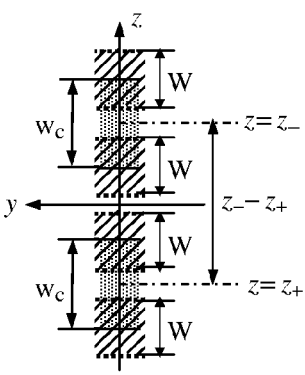

FIG. 28C schematically shows the spread along the z axis of silver atoms deposited on the observation plane, namely the yz plane. As is easily seen from this drawing, silver atoms each having a – spin are deposited on the positive side of the z axis with its center at $z = z_-$. In this case, the width within which those silver atoms should be deposited can be obtained by adding the width $w_c$, which is the spread with its center at $z = z_-$ caused by the atoms geometrical optically passing through the slit-collimator, and the width W, which is the spread with its center at $z = z_- \pm w_c/2$ caused by diffraction. Consequently, values of upper and lower boundaries of that width become $z = z_- \pm (w_c + W)/2$. Similarly, boundaries of the width within which silver atoms each having + spin are deposited are represented on the negative side of the z axis by $z = z_+ \pm (w_c + W)/2$. Hence, for the silver atoms each having – spin and the silver atoms each having + spin deposited and separated on the z axis from each other, a value obtained by subtracting the upper boundary value $z = z_+ + (w_c + W)/2$ of the width within which silver atoms each having + spin are deposited from the lower boundary value $z = z_- - (w_c + W)/2$ of the width within which silver atoms each having – spin are deposited must be positive. Such a conditional formula is therefore given by $(z_- - z_+) - (W + w_c) > 0$. Rewriting this condition using Eqs. (245), (246), and (247) gives $$-\frac{\mu B_0' l}{Mv^2}(l + 2d) - 2w\left\{1 + D\left(\frac{1}{\delta} + \frac{\lambda}{w^2}\right)\right\} > 0. \tag{248}$$

The above is a general step of fundamentally designing devices and apparatus for microscopic particles using dual mechanics. Wave mechanics together with particle mechanics must be used in principle, as described above.

There is a problem of distribution of velocities of silver atoms as a factor that has not been mentioned in the above examination. If the individual silver atoms have a distribution in their velocities, the distribution coupled with nonuniformity of magnetic fields broadens the width of a distribution of silver atoms deposited on the observation plane. This problem of the distribution of velocities of silver atoms can be analyzed by applying semirelativistic statistical particle mechanics. This semirelativistic statistical particle mechanics corresponds to classical statistical mechanics in the system of mechanics shown in FIG. 1, and knowledge from the classical statistical mechanics can be utilized in analyses in semirelativistic statistical particle mechanics.

The above discussion concludes the explanations of embodiments in which dual mechanics has been applied to the fundamental problems concerning the uncertainty principle, the principle of superposition of states, and the principle of interference. In any of the above problems, defining the statistical wave function ψ adequate for each individual object system was an indispensable requirement for designing devices and apparatus. Comparing with the way of dealing with these principles in quantum mechanics, the essential differences between new and old mechanics are apparent. In quantum mechanics, both of the motion of each individual particle and the result of an experiment in which an unspecified large number of particles are involved are described by applying only the wave function ψ as a mathematical probability wave. As a result, the distinction between physics and mathematics has been obscure from the beginning. Therefore compensation for physical defects has been attempted by people-oriented interpretations. On account of the appearance of dual mechanics as an engineering design theory, it follows that the fundamental theory of mechanics applicable to any particle has first been established irrespective of the artificial criterion of whether the individual object particles are microscopic or macroscopic. Thus, it is seen that making for the first time since the creation of quantum mechanics that a trajectory can in principle be set for the motion of each microscopic particle is a significant development in technology.

Incidentally, a designing program performing a geometrically optical simulation for calculating the trajectory of each individual electron has already been utilized in the design of a shadow mask in the Braun tube. In addition, as already seen in the [Appendix 1] in 7.1.2., the calculation of a trajectory or an orbit of each individual microscopic particle has been carried out by applying classical mechanics also in the field of accelerators. Although it is quite natural, dual mechanics as the engineering design theory does not include such designing techniques applying only conventional classical mechanics also contradicting the principles in quantum mechanics. Not restricted to these examples, unitary designing techniques such as either classical mechanics or the classical wave theory both having no consistency with the quantum theory have been used in no small measure in the fields of physics and technology. Even though it is the same calculation of a trajectory, calculation of a trajectory based on dual mechanics must be a trajectory calculation after evaluating whether or not wave mechanical designing techniques that should simultaneously be applied together with particle mechanical designing techniques are necessary by using statistical wave mechanics.

Information Processing Apparatus for Implementing the Invention

Here, an information processing apparatus as the apparatus for practicing individual methods of design and evaluation described in the above-mentioned plurality of embodiments will be explained in detail again using FIGS. 29 and 30.

Figure 29:
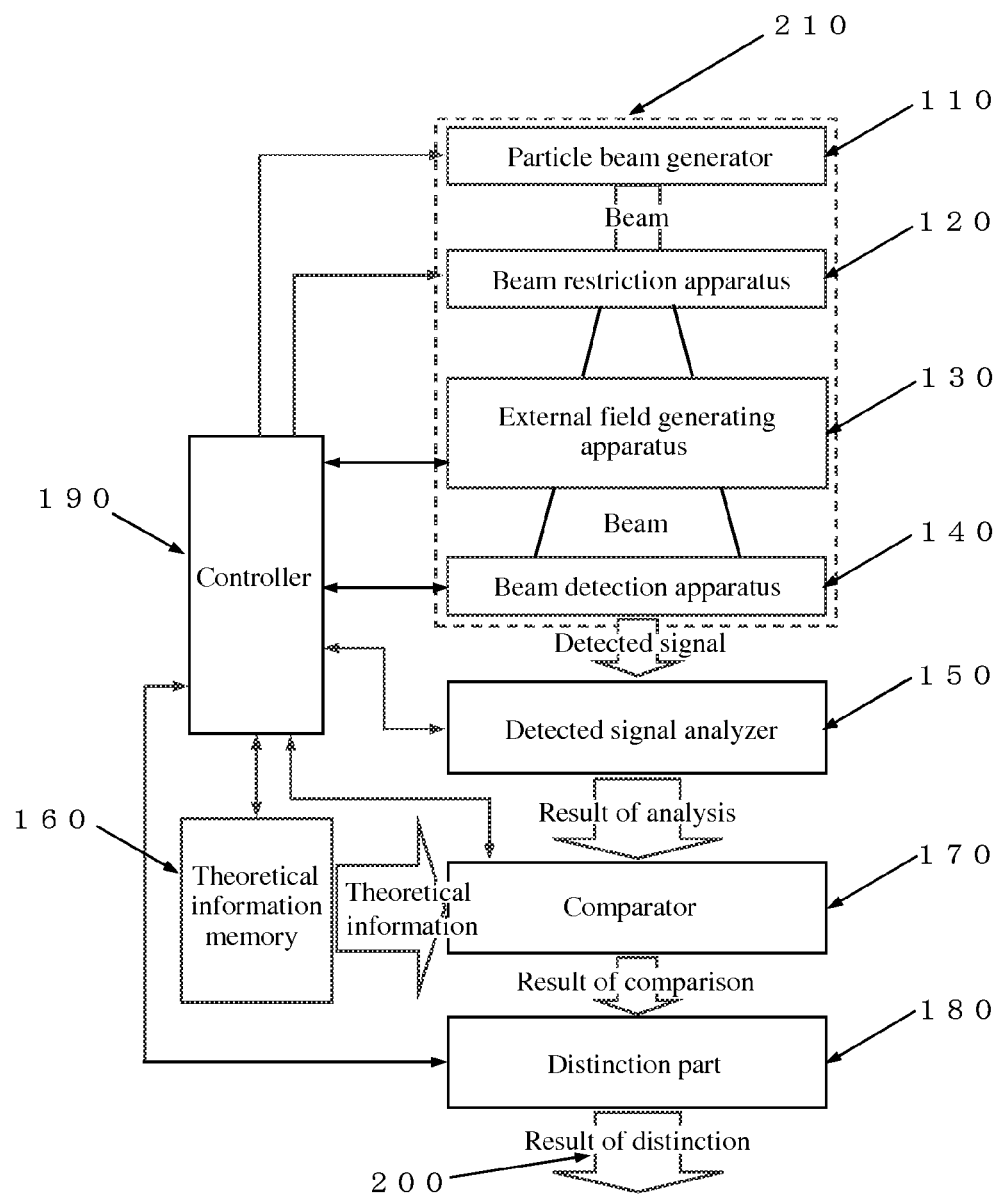
FIG. 29 is a block diagram showing a schematic configuration of an information-processing apparatus to be used in plural embodiments of the present invention.

As shown in FIG. 29, the information processing apparatus as the apparatus for practicing individual methods of design and evaluation described in the above-mentioned plurality of embodiments includes at least a beam generating apparatus 110, which generates a particle beam, a beam restriction apparatus 120, which is a part to narrowly restrict a path for each individual particle emitted by the beam generating apparatus 110, e.g., a slit aperture etc. formed in a screen, an external field generating apparatus 130, which is provided in accordance with particle type and generates a field for an external force acting on each individual particle included in the particle beam passed through the beam restriction apparatus 120, a beam detection apparatus 140, which is capable of detecting a quantity of particles arrived after passing through the external field generating apparatus 130, a detected signal analyzer 150, which analyzes the width of a spread of particles diffracted by the beam restriction apparatus 120 based on detection results (detection signal) by the beam detection apparatus 140, a theoretical information memory 160, which stores the analysis results (width of a spread of particles) obtained by the detected signal analyzer 150 and predicted information that is predicted beforehand by applying the respective mechanics introduced in the respective above-mentioned embodiments, a comparator 170, which compares the predicted information from the theoretical information memory 160 and the analysis results from the detected signal analyzer 150, a distinction part 180, which evaluates the performance of an object apparatus of evaluation 210 from the beam generating apparatus 110 through the beam detection apparatus 140 based on the comparison results from the comparator 170, and a controller 190, which controls the total system and simultaneously performs various calculations at any time based on the respective mechanics and theories mentioned above, and then stores the calculation results in the theoretical information memory 160.

The beam generating apparatus 110 generates a silver atomic beam, for example. However, in this case, an apparatus continuously generating a large number of particles is basically applicable. The beam restriction apparatus 120 may be a slit-collimator consisting of two screens each of which has a slit aperture and separated from each other at a fixed distance, or a double slit etc.

The detected signal analyzer 150 may be constituted so as to sequentially provide correct results of detection by setting the quantity and range of arrived particles most adequately in accordance with particle type and type of detecting surface of the beam detection apparatus 140.

The theoretical information memory 160 is stored with theoretical values provided in advance by the controller 190 and the like and explained in the respective above-given embodiments, that is, in short, the theoretical values given in the respective embodiments, and the detected values. Then, the comparator 170 compares the values (analysis results) that are derived from a detection range of detected signals analyzed by the detected signal analyzer 150 and stored information from the theoretical information memory 160. The comparator then outputs the comparison results to the distinction part 180. This distinction part 180 decides whether or not the performance of the object apparatus of evaluation 210 is good from the comparison results by the comparator 170 and then outputs the results of the decision. The results of the decision may be output by a display or by a printer.

Figure 30:
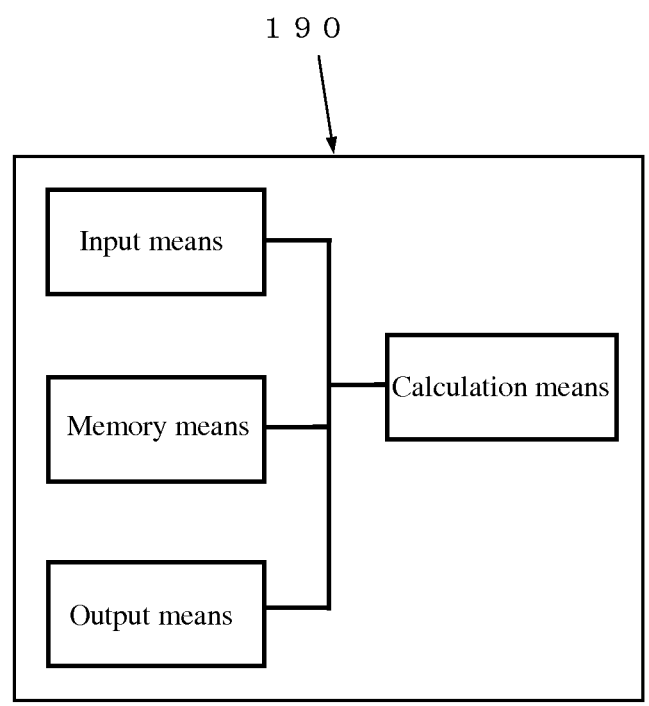
FIG. 30 is a block diagram showing a schematic configuration of a controller of the information-processing apparatus shown in FIG. 29.

Moreover, as shown in FIG. 30, the controller 190 includes an input means such as a keyboard, a mouse etc. for inputting various commands, values and the like, a storage means such as a hard disk, RAM or the like for storing the values etc. input by the above input means, a calculation means such as a CPU or the like for reading out the values etc. stored in the memory means and then carrying out calculations, and an output means such as a display, a printer, or the like for outputting the calculation results (process results).

The design and the evaluation apparatus each having the above constitution introduced in the embodiments has implemented the following functions:

(1) The controller 190 calculates required theoretical values, which are calculated using at least either relativistic statistical wave mechanics or semirelativistic statistical wave mechanics both in the system of dual mechanics consisting of relativistic dual mechanics and semirelativistic dual mechanics, which are obtained by integrating broad particle mechanics and broad wave mechanics under both the equivalence principle of energy E=H indicating equivalence between energy of a wave-like expression E=hv and the relativistic Hamiltonian H as a particle-like expression of energy and the law of conservation of relativistic energy, stores these calculated theoretical values in the theoretical information memory 160, and then compares these values with the analysis results from the detected signal analyzer 150; where the broad particle mechanics is constructed by adding statistical particle mechanics, which consists of relativistic statistical particle mechanics and semirelativistic statistical particle mechanics both based on narrow particle mechanics and dealing with ensembles each including particles, to the narrow particle mechanics, which consists of relativistic particle mechanics and semirelativistic particle mechanics both insisting that there is a trajectory of each individual microscopic massive particle in motion included in a beam generated by the beam generating apparatus 110, and the broad wave mechanics is constructed by adding statistical wave mechanics, which consists of relativistic statistical wave mechanics and semirelativistic statistical wave mechanics both based on narrow wave mechanics and dealing with states of individual ensembles each including particles involved in at least a part of each individual object apparatus of evaluation, to the narrow wave mechanics, which consists of relativistic wave mechanics and semirelativistic wave mechanics both insisting that a real phase oscillation associates with each individual particle at rest and a real phase wave associates with each individual particle in motion.

Here, each individual microscopic massive particle means, for example, an electron, a proton, a neutron, etc., an atom of H, I, Na, Si, Fe, Ag, or the like or an ion thereof, or a molecule of $H_2$, $O_2$, chloroform, or the like. In dual mechanics, even if a particle with rest mass $m_0$ is at rest, since the phase space of the particle oscillates with a proper frequency $v=m_0c^2/h$, this oscillation is called a phase oscillation. The individual object apparatus for evaluation are general apparatus such as, for example, AV equipment such as video cameras and televisions, and computers and their related equipment. Furthermore, at least a part of each individual object apparatus for evaluation means parts and devices constituting the apparatus and raw materials constituting those parts and devices.

Integrating broad particle mechanics and broad wave mechanics under both the equivalence principle of energy E=H and the law of conservation of relativistic energy means as follows:

According to the above two principles concerning energy, when describing the motion of each individual particle associated with its real phase wave $\Psi$, that is, each individual dual particle, it is necessary to apply both relativistic wave mechanics in which the Klein-Gordon equation as the relativistic wave equation with respect to a phase wave $\Psi$ is a fundamental equation and relativistic particle mechanics in which the relativistic equation of motion applied to a particle part of the dual particle is a fundamental equation. In this way, the mechanics that is constituted by integrating relativistic wave mechanics and relativistic particle mechanics under the above two principles is called narrow relativistic dual mechanics. When adding both relativistic statistical wave mechanics and relativistic statistical particle mechanics that are derived based on respective mechanics in narrow relativistic dual mechanics to narrow relativistic dual mechanics, broad dual mechanics is obtained. Letting the ratio of the velocity of a particle v to the velocity of light c be expressed by $\beta(=v/c)$, when at least $\beta^2$ can be approximated to 0, that is, when $\beta \leq 0.1$ is valid as a practical condition, instead of the above broad dual mechanics, broad semirelativistic dual mechanics obtained by adding both semirelativistic statistical wave mechanics and semirelativistic statistical particle mechanics derived based on respective mechanics in narrow semirelativistic dual mechanics to the narrow semirelativistic dual mechanics may be approximately applied. Note that the mechanics constituted by integrating semirelativistic wave mechanics in which the semirelativistic Schrödinger equation (54) with respect to a phase wave $\Psi$ is a fundamental equation and semirelativistic particle mechanics in which the Newtonian equation of motion as a semirelativistic equation of motion is a fundamental equation under the two above energy principles is called narrow semirelativistic dual mechanics. In this case, since the role of a wave equation is carried out by the semirelativistic Schrödinger equation and the role of an equation of motion is carried out by the Newtonian equation of motion as the semirelativistic equation of motion, operations for solving these equations become easier than those for solving relativistic equations.

Deriving statistical wave mechanics based on narrow wave mechanics means the following: For correctly predicting or describing only the results of an experiment with which all of individual particles are involved, a new wave function is necessary for describing the state of an ensemble of all of those particles. When the phase wave associated with an nth particle in N number of particles is expressed as $\Psi_n$, such the statistical wave function $\psi$ can be created by summing all of each individual wave function $\Psi_n$ conforming to the relativistic wave equation and then normalizing the sum (procedure for making statistical mechanics). The statistical wave function $\psi$ thus defined satisfies the statistical Klein-Gordon equation that is obtained by substituting $\Psi$ in the Klein-Gordon equation with $\psi$ or, in other words, the relativistic statistical wave equation. Therefore, relativistic statistical wave mechanics can be defined by making this equation as a fundamental equation. It is extremely important that a mathematical boundary value problem solving this statistical wave equation can be set in accordance with a subject of designing individual devices and apparatus, and the solution obtained by solving the problem will automatically satisfy physical fundamental laws. This is because $\psi$ and $\Psi$ satisfy the same relativistic wave equation as a matter of form. Corresponding to relativistic statistical wave mechanics, relativistic statistical particle mechanics may be defined based on relativistic particle mechanics. Similarly, at least when $\beta^2$ can be approximated to 0, that is, when $\beta \leq 0.1$ is valid, the statistical wave function $\psi$ can be created by summing all of each wave function $\Psi_n$ associated with each of the N particles satisfying the semirelativistic Schrödinger equation and then normalizing the sum (procedure for making statistical mechanics). Accordingly, semirelativistic statistical wave mechanics whose fundamental equation is the semirelativistic Schrödinger equation having the statistical wave function $\psi$ as a solution holds. Corresponding to semirelativistic statistical wave mechanics, semirelativistic statistical particle mechanics may be defined based on semirelativistic particle mechanics. When the density of particles is low, the semirelativistic statistical particle mechanics is practically equivalent to classical statistical mechanics.

Mechanics obtained by adding statistical particle mechanics comprising relativistic statistical particle mechanics and semirelativistic statistical particle mechanics both dealing with an ensemble of particles to narrow particle mechanics is called broad particle mechanics, and mechanics obtained by adding statistical wave mechanics comprising relativistic statistical wave mechanics and semirelativistic statistical wave mechanics dealing with an ensemble of particles to narrow wave mechanics is called broad wave mechanics. There are circumstances in which these two broad mechanics have been derived retaining an inseparable relation under the two principles concerning energy. If this procedure is called integration, dual mechanics consisting of relativistic dual mechanics and semirelativistic dual mechanics is considered to hold as a result of integrating broad particle mechanics and broad wave mechanics.

As is clear from the above explanations, aside from whether relativistic or semirelativistic, in order to correctly design individual devices and apparatus concerning an unspecified large number of microscopic dual particles, statistical wave mechanics in which an ensemble of those particles is regarded as an abstract single particle and the state of the abstract single particle is represented by the statistical wave function ψ is essential in principle.

Note that the procedure of defining the statistical wave function ψ is carried out by us of humans for the respective questions. Hence, in order to avoid differences due to individual persons, it is necessary to clearly determine the contents of the procedure. Since this procedure has been concretely shown in the respective embodiments, only the most fundamental contents of the procedure will be shown here. Assume that there exists a system consisting of a device or an apparatus concerning each individual microscopic massive particle and an inertial system fixed to the device or apparatus. At this point, with the use of statistical wave mechanics that is able to describe the state of an ensemble corresponding to all of the above individual particles, the statistical wave function (ψ) representing the state of the ensemble can be determined by unifying at least one of the space-time coordinates as variables of the wave function ($\Psi_n$) representing the state of each individual particle belonging to the above ensemble, that is, for example, unifying all of each individual time $t_n$ into a hypothetical time t representing the same time, and then summing all of those wave functions.

Here, when all of each individual particle is in motion, the unified time t represents an abstract time as shown below:

For example, assume an experiment in which N number of particles each arriving randomly at an observation plane are detected. Supposing that an nth particle in the N number of particles are detected at time $t_n$, a real wave function associated with that particle is expressed at that time as $\Psi_n(x, t_n)$, where n=1, 2, . . . , N. Next, sum $\Sigma\Psi_n(x, t_n)$ of all wave functions associated with those N number of particles is made at the time that the detection of all these particles is finished. Since the function form of the wave function $\Psi_n(x, t_n)$ is the same for all wave functions except for the initial phase irrespective of n and the time $t_n$, $\Psi_n(x, t_n)$ can be written as $\Psi_n(x, t)$ or as $\Psi(x, t)$ in the extreme case. At this point, the time t becomes an abstract time not meaning real time, which is different from $t_n$. Then, since the sum $\Sigma\Psi_n(x, t_n)$ can be written as $\Sigma\Psi_n(x, t)$ and $\Sigma\Psi_n(x, t)$ is expected to also be represented by $\Sigma\Psi(x, t)$, the statistical wave function can be defined by multiplying the normalization coefficient $1/N^{1/2}$ as $\psi(x, t) \equiv (1/N^{1/2}) \Sigma\Psi_n(x, t)$. Since $\langle \Psi_n(x, t)| \Psi_m(x, t)\rangle = 0$ for n≠m, $\langle \psi(x, t)|\psi(x, t)\rangle = (1/N) \Sigma\langle \Psi_n(x, t)|\Psi_n(x, t)\rangle = (1/N) \Sigma \langle \Psi(x, t)|\Psi(x, t)\rangle = \langle \Psi(x, t)|\Psi(x, t)\rangle$ is finally obtained irrespective of the number N of particles. Since $\Sigma\Psi_n(x, t_n)$ has been normalized, it can be seen that the statistical wave function ψ(x, t) has been normalized and also satisfies the same wave equation satisfied by $\Psi_n(x, t_n)$.

Note that when all of individual particles are at rest, each individual real, rest wave function for the N number of particles can be written as $\Psi_n(x, t)$ using the real time coordinate t as long as differences among initial phases are neglected. Since the function form of this $\Psi_n$ is the same irrespective of individual particles, the statistical wave function ψ(x, t) represented by the sum of each individual $\Psi_n$ can be defined. Here, the time t of ψ(x, t) may be regarded as corresponding to real time. In this case, however, since the coordinate x representing position expresses an abstract coordinate, ψ(x,t) becomes an abstract wave function in any case.

As shown above, when designing a device or apparatus involving microscopic particles, the statistical wave function ψ(x, t) should always be definable, using each individual microscopic particle associated with a phase oscillation or a phase wave as an element of an ensemble. Further, a rest particle may be a chloroform molecule assumed to function as a calculation device for a quantum computer, for example. However, the rest particle may symbolically mean a single-electron device etc. that also may be utilized as a calculation device for a quantum computer. Even in such cases, since the statistical rest wave function can be defined based on the rest wave function $\Psi_n$ for molecular devices or single-electron devices, evaluation of the function of the calculation device for the quantum computer is facilitated (Refer to individual embodiments). In the design and the evaluation of functions shown above, operations to set and solve a boundary value problem concerning a statistical wave equation become unnecessary.

(2) In the case of making a system consisting of a device or an apparatus concerning all of individual particles associated with de Broglie waves included in a beam generated by the beam generator 110 and an inertial system fixed to a detection plane for all of the above particles that are involved with the above device or apparatus as an object of evaluation, the controller 190 performs control including: a first step of determining the statistical wave function (ψ) representing the state of an ensemble by applying statistical wave mechanics that can describe the state of the ensemble corresponding to all of the above-described individual particles, a second step of determining whether or not to take into consideration a spread on the detection plane of the beam detection apparatus 140 due to diffraction when a statistical plane de Broglie wave is incident on the aperture (width w) of the beam restriction apparatus 120, which narrowly restricts the path for each individual particle in the beam generated by the beam generator 110 and a third step of calculating the spread (width $w_c$) of particle rays on the above detection plane, where the rays have geometrical optically passed through the above aperture (width w), which narrowly restricts the path for each individual particle, by applying particle mechanics or statistical particle mechanics, as well as calculating a main spread (width W) of the diffraction pattern on the detection plane of the beam detection apparatus 140 assuming that the statistical plane de Broglie wave has been incident on the aperture (width w) when the diffraction should be taken into consideration, and calculating only the spread (width $w_c$) of the particle rays that have geometrical optically passed through the aperture 24 (width w) by applying particle mechanics or statistical particle mechanics when consideration of diffraction is unnecessary.

Here, the device concerned with all of the individual particles associated with the de Broglie waves is, for example, a screen having a slit aperture, and the apparatus is, for example, an apparatus similar to the Stern-Gerlach experimental apparatus having the slit-collimator. In this invention, the judgment of whether or not the spread of those particles concerned with a device or an apparatus on the detector plane due to diffraction when a statistical de Broglie wave is assumed to have been incident on the aperture of the device or the apparatus can be simply performed based on, for example, the statistical nonsimultaneous uncertainty principle. Moreover, there are also cases where whether or not the diffraction should be taken into consideration can be determined based on the comparison of the wavelength of the de Broglie wave with the size of the above aperture. When the decision of taking the diffraction into consideration is obtained, the spread (width $w_c$) of particle rays on the detection plane is calculated by applying particle mechanics or statistical particle mechanics, where the rays have geometrical optically passed through the aperture (width w) narrowly restricting the path for each individual particle, and the main spread (width W) of the diffraction pattern on the detection plane is calculated by assuming that a statistical plane de Broglie wave has been incident on the aperture (width w). When a field of an external force exists in the space from the aperture to the detection plane, since the external force does not act on the de Broglie wave, particle mechanical design must be fundamental in the end, except for preparation for designing. The values of the widths $w_c$ and W thus calculated are used to design a particle detector that should be fixed on the detection plane, for example. Most simply said, this means making the width of the detection plane itself of the particle detector be $w_c$+W, or making the width of an aperture placed just in front of the detector be $w_c$+W when the particle detector has a broad detection plane. This width of the aperture may be slightly narrower than $w_c$+W. Incidentally, when expecting to accurately derive a diffraction pattern, the diffraction pattern $|\psi(P)|^2$ of the statistical wave function ($\psi$) should be numerically calculated based on the Fresnel-Kirchhoff diffraction formula expressed by the former Eq. (201). In fact, this technique for deriving a diffraction pattern by applying the Fresnel-Kirchhoff diffraction formula is nothing else but the solution of the boundary value problem concerning the Helmholtz equation as a wave equation (Refer to Eq. (198)). The boundary conditions used here are called Kirchhoff's boundary conditions (Refer to Eq. (199)). Further, when the above detector is a substrate for a film formed by particles from a particle source, making the width of an aperture on a shield plate placed just in front of the substrate be $w_c$+W or W is possible.

(3) Similarly, when measuring or restricting a first physical quantity (e.g., position of a particle) of every individual particle associated with a de Broglie wave ($\Psi$) using a device or an apparatus, the distinction part 180 performs a distinction by applying the statistical nonsimultaneous uncertainty relation that is valid between a maximum value of measurement errors or range of restricted values and change in a second physical quantity (momentum of each particle), which is in a canonical conjugate relation with the first physical quantity, due to the above measurement or restriction.

Here, restricting the position of a particle by applying a device or an apparatus means that the position of each individual particle is restricted within the width w by making particle rays pass through the slit of width w, for example. While the maximum of measurement errors means the maximum of errors in measurement of a position using, for example, a microscope, the maximum of measurement errors in this case and the range of restricted values w due to the slit are synonymous to the maximum statistical uncertainty $\Delta x$ of the position of each individual particle. Accordingly, if $\Delta x = w$ is set in the statistical nonsimultaneous uncertainty relation $\Delta x(t) \times \Delta p_x(t') \lesssim h$ of Eq. (108), for example, since $\Delta p_x \lesssim h/w$ is obtained, the width W of a spread of particles on the detection plane caused by the diffraction of particle rays passing through the aperture of the width w can be estimated from the value $\Delta p_x$. It follows that whether or not the diffraction should be taken into consideration can be decided from the measure of W thus obtained or of the ratio R of W to w (R=W/w) and the width that the particle detector should have or the width of an aperture that should be placed just in front of the detector can also be designed based on the width W.

(4) Further, in a specific method of judging whether or not the influence of diffraction should be taken into consideration in designing an apparatus, it follows that at least the above judgment should be made based on the comparison between W and w, that is, for example, the value of R=W/w, where width W of the main spread of the distribution of particles on the detection plane caused by the diffraction is given by W=w+2$\lambda$L/w, $\lambda$ denoting the de Broglie wavelength, w denoting the maximum of measurement errors of the position of each individual particle or width of the range of the position restricted by the beam restriction apparatus 120, and L denoting the distance from the position of the aperture (width w) on the beam restriction apparatus 120 to the detection plane.

The above method of evaluating diffraction derived from the statistical nonsimultaneous uncertainty relation can be effectively used especially for the case in which the observation plane for evaluating diffraction is situated in a region where the Fresnel diffraction is obtained or in a region closer to the aperture than the Fresnel diffraction region. Further, when numerical calculations of diffraction patterns in such regions are not easy, individual devices and apparatus may be designed by regarding the values W and R as effects of diffraction. For example, when a de Broglie wave incident on a region having the width w can be regarded as a homogeneous plane wave, it is possible to use the value W for the width of a detector itself for detecting particles or for the width of an aperture placed in front of the detector. In each of these cases, approximately 10% of the particles not staying within the width W are lost. When the above incident wave cannot be regarded as a plane wave, after calculating width $w_c$ of the spread of particles on the detection plane where the particles geometrical optically passed through the region of the width w are detected, $w_c$+W, for example, may be used instead of W as the width of the detector. Also in this case, approximately 10% of the particles not staying within the width W are lost. However, since the absolute quantity of particles staying within the width $w_c$+W increases, the larger the size of $w_c$, the smaller the percentage of actually lost particles. Incidentally, although it depends on the accuracy required in designing, as a general guide, if R≤1.01 holds for the value of R, consideration of the influence of diffraction is unnecessary.

(5) A quantum computer uses two-level molecules such as chloroform molecules or optical and/or electronic devices produced by following those molecules as memory and/or calculation devices for a quantum mechanical fundamental unit, i.e., a quantum bit (qubit), of information. When N number of devices or two-level particles each of which is able to take two different states are applied under an initial condition of the N number of devices all being in the excited state at t=0 and the state of the N number of devices or two-level particles at a later time t is written as $\psi(t) = (2^{-t/\tau})^{1/2} \psi_1(t) + (1-2^{-t/\tau})^{1/2} \psi_2(t)$ with the use of a half-life $\tau$ of an excited state, the statistical wave function $\psi_1(t)$ representing the excited state, and the statistical wave function $\psi_2(t)$ representing a ground state, inputting at least the values of the half-life $\tau$ of the above device or two-level particle and the time t or the value of the ratio t/$\tau$ of the time t to the half-life $\tau$ using a keyboard or the like, at least one of the two formulas $(2^{-t/\tau})$ and $(1-2^{-t/\tau})$ representing the squares of two individual coefficients included in the expression of the above $\psi(t)$ and at least the values of the half-life $\tau$ of the above device or two-level particle and the time t or the value of the ratio t/$\tau$ of the time t to the half-life $\tau$ input using the above keyboard or the like are stored in memory of the controller 190, at least one of the stored formulas $(2^{-t/\tau})$ and $(1-2^{-t/\tau})$, and at least the stored values of the half-life $\tau$ of the above device or two-level particle and the time t or the stored value of the ratio t/$\tau$ of the time t to the half-life $\tau$ are read out, and at least one of the values of $(2^{-t/\tau})$ and $(1-2^{-t/\tau})$ or when the number N of the above devices or two-level particles has been input, at least one of the values of the number of devices or two-level particles $2^{-t/\tau}$ N in excited states and the number of devices or two-level particles $(1-2^{-t/\tau})$ N in the ground states are calculated using the same controller 190 based on at least one of the two formulas $(2^{-t/\tau})$ and $(1-2^{-t/\tau})$, and at least the values of the half-life $\tau$ of the above device or two-level particle and the time t or the value of the ratio t/$\tau$ of the time t to the half-life $\tau$, thereby allowing output of the calculation results.

(6) When the above device concerning each of the microscopic particles is a wave splitter, the controller 190 can perform a step of dividing an ensemble corresponding to all of the individual particles incident on the wave splitter into ensembles each corresponding to individual particles associated with plural de Broglie waves obtained when a de Broglie wave associated with each individual particle has been split by the wave splitter, that is, the same number of subensembles as number of split de Broglie waves, and then determining statistical wave functions that are mutually orthogonal or interfere with each other and correspond to each of individual subensembles, thus representing a statistical wave function corresponding to all of the above particles by a linear combination of those statistical wave functions, and a step of deriving the square of the absolute value of the obtained statistical wave function for the ensemble corresponding to all of the above particles.

(7) In the above case, it follows that the number of particles normalized to 1 included in the ensemble corresponding to all of the above individual particles will be distributed as ratios of numbers of particles belonging to the subensembles corresponding to individual statistical wave functions obtained when assuming that the above statistical wave function for the ensemble corresponding to all of the particles has been split by the above wave splitter in proportion to the intensities of those individual statistical wave functions.

(8) Furthermore, when applying particle mechanics to design individual devices or apparatus concerning each individual particle associated with a de Broglie wave whose diffraction cannot be neglected, the controller 190 is characterized by using semirelativistic particle mechanics as an approximation of relativistic particle mechanics for calculating at least a part of a geometric optical trajectory of each particle in the individual devices and apparatus in the case when $\beta^2$ can be approximated to 0, $\beta(=v/c)$ being the ratio of a velocity of a particle v to the velocity of light c.

Here, the individual devices or apparatus concerning each individual particle associated with the de Broglie wave whose diffraction cannot be neglected mean that each of these devices or apparatus has a part to narrowly restrict the path for each of the above individual particles such as an aperture so that the diffraction of the de Broglie wave caused by the aperture cannot be neglected. When assuming the incidence of a homogeneous plane de Broglie wave on the aperture where width of the aperture is denoted by w and width of the main spread of the distribution of particles on the detection plane due to diffraction is denoted by W, one criterion for distinguishing the case in which the diffraction cannot be ignored is given by R=W/w>1.01. Further, the geometric optical trajectory of each individual particle means such a trajectory that is obtained by assuming that a particle ray emitted by a particle ray source has geometrical optically passed through the above aperture without causing any diffraction. An advantage of performing the calculation of diffraction and the calculation of trajectories independently as shown above exists in the fact that the spread of particle rays on the detection plane may be obtained simply by adding the spread of geometrical optical particle rays and the spread by diffraction. The above calculations are also possible when an external force field exists. When the velocity of a particle is lower than approximately 10% of the velocity of light, the calculation of the trajectory is possible by applying the Newtonian equation of motion as the fundamental equation in semirelativistic particle mechanics. The algorithm of the numerical calculation in this case is simple compared to the algorithm for calculating a relativistic trajectory. Further, the above calculation has a clear difference from the technique in calculating a trajectory by applying only Newtonian mechanics and has no problem of principle like the uncertainty principle in quantum mechanics.

When actually numerically calculating the trajectory of a particle, the way of calculation consists of the following steps: a step of an input means inputting at least physical quantities of the particle at t=0 as initial conditions such as mass, position, and velocity or momentum, the position where the particle should be detected, and when a field of an external force acting on the particle exists, also inputting for example, the charge of the particle, the position where the external force acts, and the field of the external force such as the electric field, a step of a calculation means calculating the trajectory to the position where the particle should be observed based on the above inputs and the equation of motion in each of the above individual particle mechanics, and a step of an output means outputting the trajectory of the particle or the position where the particle should be observed. In short, the difference between the calculation of the relativistic trajectory and the calculation of semirelativistic trajectory is that, while the dependence of the mass of the particle on velocity or on time must be taken into consideration in relativistic case, the rest mass is used for the mass of the particle irrespective of the magnitude of the velocity in semirelativistic case.

(9) Since the controller 190 is also a calculation apparatus that calculates a geometric optical trajectory of each individual particle associated with a de Broglie wave whose diffraction cannot be neglected, when at least the physical quantities of the particle at t=0 as the initial conditions, and if the field of the external force exists, the position where the external force acts and the field of the external force are input, those inputs and the equation of motion for calculating the trajectory of the particle based on those inputs are stored, and the calculation of the trajectory is carried out based on the above stored inputs and equation of motion, making it possible to output the trajectory or the position where the particle should be detected.

Here, the equations of motion that make it possible to calculate the trajectory mean the former Eqs. (162) and (165) in the relativistic case and the equations that are obtained by substituting $\gamma_i=1$ and $m_i=m_0$ into Eqs. (162) and (165) in the semirelativistic case.

What is claimed is:

1. An information processing apparatus for evaluating the function of a device or an apparatus concerning each of individual microscopic massive particles comprising:

an analyzer using at least a statistical wave function defined as an evaluation function for evaluating the function of said device or apparatus concerning said microscopic particles; said analyzer comprising:

N number of devices or N number of two-level particles capable of being in either of two different states concerning microscopic particles, wherein the state of said N number of devices or said N number of two-level particles after the time t elapses is represented by $\psi(t)=(2^{-t/\tau})^{1/2}\psi_1(t)+(1-2^{-t/\tau})^{1/2}\psi_2(t)$ based on a premise that in an initial condition all of said N number of devices or said N number of two-level particles are in an excited state at time t=0, where $\tau$ denotes the half-life in the excited state, $\psi_1(t)$ denotes a statistical wave function representing the excited state, and $\psi_2(t)$ denotes a statistical wave function representing a ground state;

an outputter for outputting evaluation result obtained by said analyzer, wherein said statistical wave function represents at least one state of an ensemble of said microscopic particles; said information processing apparatus further comprising:

an inputter for inputting at least a half-life $\tau$ concerning said N number of devices or said N number of two-level particles and a time t or a ratio t/$\tau$ of the time t to the half-life $\tau$;

a memory for storing at least one of the two formulas $(2^{-t/\tau})$ and $(1-2^{-t/\tau})$ obtained by carrying out the square of each of two individual coefficients included in the expression of said $\psi(t)$ and at least the half-life $\tau$ of said N number of devices or said N number of two-level particles and the time t or the ratio t/$\tau$ of the time t to the half-life $\tau$ input by said inputter; and a calculator for calculating at least one of the values of $(2^{-t/\tau})$ and $(1-2^{-t/\tau})$ or, when the number N of said devices or said two-level particles has been input, at least one of the number of said devices or said two-level particles $2^{-t/\tau}$ N in the excited state and the number of the devices or two-level particles $(1-2^{-t/\tau})$ N in the ground state, based on at least one of said stored formulas $(2^{-t/\tau})$ and $(1-2^{-t/\tau})$ and at least said stored half-life $\tau$ concerning said N number of devices or said N number of two-level particles and the time t or said stored ratio t/$\tau$ of the time t to the half-life $\tau$.

2. The information processing apparatus of claim 1, wherein said device or apparatus concerning said microscopic particles comprises:

beam generator for generating a beam containing said microscopic particles;

restrictor for restricting a path for the beam generated by said beam generator to be narrower;

wave guide for guiding a beam passed through said restrictor; and detector having a detection surface for detecting particles included in said beam arrived through a wave guiding path of said wave guide, wherein said analyzer evaluates performance of said wave guide for wave guiding by calculating the spread of particles included in said beam on said detection surface using a statistical de Broglie wave representing the beam incident on said restrictor as said statistical wave function.

3. The information processing apparatus of claim 1, wherein said information processing apparatus comprises:

beam generator for generating a beam containing said microscopic particles;

restrictor for restricting a path for the beam generated by said beam generator to be narrower;

wave guide for guiding a beam passed through said restrictor; and detector having a detection surface for detecting particles included in said beam arrived through a wave guiding path of said wave guide, wherein said analyzer evaluates performance of said wave guide for wave guiding by calculating the spread of particles included in said beam on said detection surface using a statistical de Broglie wave representing the beam incident on said restrictor as said statistical wave function.

4. The information processing apparatus of claim 2, wherein said analyzer judges whether or not to take into consideration the spread of said beam on the detection surface of said detector caused by the diffraction of a statistical plane de Broglie wave that is assumed to come from said beam generator and to impinge on said restrictor, calculates a spread of particle rays, which have geometrical optically passed through said restrictor, on the detection surface and calculates a main spread of a diffraction pattern on the detection surface of said detector on the assumption that the statistical plane de Broglie wave have impinged on said restrictor when the diffraction is judged as necessary to be taken into consideration, and calculates only the spread of said particle rays on said detection surface when the diffraction is judged as unnecessary to be taken into consideration.

5. The information processing apparatus of claim 4, wherein said analyzer judges at least whether or not an effect of diffraction should be taken into consideration in designing the device or apparatus based on a comparison of W represented by W=w+2$\lambda$L/w to w, where $\lambda$ denotes the average wavelength of a statistical de Broglie wave representing the beam passed through said restrictor, w denotes the width of a part restricting a path in said restrictor to be narrower, L denotes the distance between the position of said part of restricting the path and the detection surface of said detector, and W denotes the main spread of the diffraction pattern on said detection surface calculated on the assumption that said statistical plane de Broglie wave having wavelength $\lambda$ has impinged on said part of restricting the path.

6. The information processing apparatus of claim 5, wherein said analyzer further calculates, when calculating the geometric optical trajectory of each individual particle associated with a de Broglie wave, the trajectory of the particle based on physical quantities of the particle at t=0 as initial conditions for each of individual particles included in a beam generated by said beam generator, the shape and position of a beam generating part of said beam generator, the shape and position of said part of restricting the path, at least an external force caused by said wave guide, the shape and position of said detection surface, and an equation of motion used for numerically calculating the trajectory of the particle.

7. The information processing apparatus of claim 3, wherein said analyzer judges whether or not to take into consideration the spread of said beam on the detection surface of said detector caused by the diffraction of a statistical plane de Broglie wave that is assumed to come from said beam generator and to impinge on said restrictor, calculates a spread of particle rays, which have geometrical optically passed through said restrictor, on the detection surface and calculates a main spread of a diffraction pattern on the detection surface of said detector on the assumption that the statistical plane de Broglie wave have impinged on said restrictor when the diffraction is judged as necessary to be taken into consideration, and calculates only the spread of said particle rays on said detection surface when the diffraction is judged as unnecessary to be taken into consideration.

8. The information processing apparatus of claim 7, wherein said analyzer judges at least whether or not an effect of diffraction should be taken into consideration in designing the device or apparatus based on a comparison of W represented by W=w+2$\lambda$L/w to w, where $\lambda$ denotes the average wavelength of a statistical de Broglie wave representing the beam passed through said restrictor, w denotes the width of a part restricting a path in said restrictor to be narrower, L denotes the distance between the position of said part of restricting the path and the detection surface of said detector, and W denotes the main spread of the diffraction pattern on said detection surface calculated on the assumption that said statistical plane de Broglie wave having wavelength $\lambda$ has impinged on said part of restricting the path.

9. The information processing apparatus of claim 8, wherein said analyzer further calculates, when calculating the geometric optical trajectory of each individual particle associated with a de Broglie wave, the trajectory of the particle based on physical quantities of the particle at t=0 as initial conditions for each of individual particles included in the beam generated by said beam generator, the shape and position of a beam generating part of said beam generator, the shape and position of said part of restricting the path, at least an external force caused by said wave guide, the shape and position of said detection surface, and an equation of motion used for numerically calculating the trajectory of the particle.

10. An information processing method for evaluating the function of a device or an apparatus concerning each of individual microscopic massive particles including the steps of:
    using at least a statistical wave function defined as an evaluation function for evaluating the function of said device or apparatus to thereby evaluate the function of said device or apparatus, wherein said evaluating the function includes:
    using N number of devices or N number of two-level particles capable of being in either of two different states concerning microscopic particles, wherein the state of said N number of devices or said N number of two-level particles after the time t elapses is represented by $\psi(t)=(2^{-t/\tau})^{1/2}\psi_1(t)+(1-2^{31\ t/\tau})^{1/2}\psi_2(t)$ based on a premise that in an initial condition all of said N number of devices or said N number of two-level particles are in an excited state at time t=0, where $\tau$ denotes the half-life in the excited state, $\psi_1(t)$ denotes a statistical wave function representing the excited state, and $\psi_2(t)$ denotes a statistical wave function representing a ground state;
    inputting at least a half-life $\tau$ concerning said N number of devices or said N number of two-level particles and a time t or a ratio $t/\tau$ of the time t to the half-life $\tau$;
    storing at least one of the two formulas $(2^{-t/\tau})$ and $(1-2^{-t/\tau})$ obtained by carrying out the square of each of two individual coefficients included in the expression of said $\psi(t)$ and at least the half-life $\tau$ of said N number of devices or said N number of two-level particles and the time t or the ratio $t/\tau$ of the time t to the half-life $\tau$ input by said inputting step; and
    calculating at least one of the values of $(2^{-t/\tau})$ and $(1-2^{-t/\tau})$ or, when the number N of said devices or said two-level particles has been input, at least one of the number of said devices or said two-level particles $2^{-t/\tau}$ N in the excited state and the number of the devices or two-level particles $(1-2^{-t/\tau})$ N in the ground state, based on at least one of said stored formulas $(2^{-t/\tau})$ and $(1-2^{-t/\tau})$ and at least said stored half-life $\tau$ concerning said N number of devices or said N number of two-level particles and the time t or said stored ratio $t/\tau$ of the time t to the half-life $\tau$; and
    outputting result of said evaluating step, wherein said statistical wave function represents at least one state of an ensemble of said microscopic particles.

11. The information processing method of claim 10, wherein said device or apparatus concerning said microscopic particles comprises:
    beam generator for generating a beam containing said microscopic particles;
    restrictor for restricting a path for the beam generated by said beam generator to be narrower;
    wave guide for guiding the beam passed through said restrictor; and
    detector having a detection surface for detecting particles included in said beam arrived through a wave guiding path of said wave guide, wherein in said evaluating step, the performance of said wave guide for wave guiding is evaluated by calculating the spread of particles included in said beam on said detection surface using a statistical de Broglie wave representing the beam incident on said restrictor as said statistical wave function.

12. The information processing method of claim 11, wherein, for designing said device or apparatus concerning said microscopic particles, said evaluating step further including the steps of:
    judging whether or not to take into consideration the spread of said beam on the detection surface caused by the diffraction of an statistical plane de Broglie wave that is assumed to impinge on said restrictor instead of the statistical de Broglie wave as said statistical wave function indicating the beam incident on said restrictor;
    evaluating the performance of said wave guide for wave guiding either by calculating the spread of a diffraction pattern, which is the spread of particles included in said beam, on said detection surface on the assumption that said statistical de Broglie wave enters said restrictor or by calculating a spread of particle rays, which have geometrical optically passed through said restrictor, on the detection surface in conformity with the judgment result in said judging step, and
    altering at least one of the settings of physical quantities of the particle at t=0 as initial conditions for each of individual particles included in the beam generated by said beam generator, the shape and position of a beam generating part of said beam generator, the shape and position of said restrictor for restricting a path, at least an external force caused by said wave guide, and the shape and position of said detection surface when a predetermined performance for wave guiding is not obtained by said evaluating, and reevaluating the performance of said wave guide for wave guiding.

13. A device or apparatus concerning microscopic particles designed by using the information processing method of claim 12.

* * * * *

UNITED STATES PATENT AND TRADEMARK OFFICE
CERTIFICATE OF CORRECTION

| | | |
|---|---|---|
| PATENT NO. | : 8,619,242 B2 | Page 1 of 1 |
| APPLICATION NO. | : 12/086977 | |
| DATED | : December 31, 2013 | |
| INVENTOR(S) | : Takashi Suzuki | |

It is certified that error appears in the above-identified patent and that said Letters Patent is hereby corrected as shown below:

In the Claims,

Col. 159, line 33 - Col. 161, line 17 and Col. 162, line 7-line 55, Claims 2-9 and 11-13 are cancelled.

Signed and Sealed this
Eighteenth Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,619,242 B2                                       Page 1 of 1
APPLICATION NO.   : 12/086977
DATED             : December 31, 2013
INVENTOR(S)       : Takashi Suzuki It is certified that error appears in the above-identified patent and that said Letters Patent is hereby corrected as shown below:

On the title page, under abstract "13 Claims, 19 Drawing Sheets" should read --2 Claims, 19 Drawing Sheets--.

In the Claims,

Col. 159, line 33 - Col. 161, line 17 and Col. 162, line 7-line 55, Claims 2-9 and 11-13 are cancelled.

This certificate supersedes the Certificate of Correction issued November 18, 2014.

Signed and Sealed this
Sixteenth Day of December, 2014

Michelle K. Lee
*Deputy Director of the United States Patent and Trademark Office*